US012078793B2

(12) United States Patent
Masarik et al.

(10) Patent No.: US 12,078,793 B2
(45) Date of Patent: Sep. 3, 2024

(54) WEAPON SIGHT SYSTEMS

(71) Applicant: Maztech Industries, LLC, Irvine, CA (US)

(72) Inventors: David Michael Masarik, Newport Beach, CA (US); Michael Raymond Masarik, Missoula, MT (US); Matthew James Masarik, Newport Beach, CA (US); David Alexander Steinweg, Irvine, CA (US)

(73) Assignee: Maztech Industries, LLC, Irvine, CA (US)

( * ) Notice: Subject to any disclaimer, the term of this patent is extended or adjusted under 35 U.S.C. 154(b) by 0 days.

(21) Appl. No.: 18/440,242

(22) Filed: Feb. 13, 2024

(65) Prior Publication Data

US 2024/0184092 A1 Jun. 6, 2024

Related U.S. Application Data

(63) Continuation of application No. PCT/US2022/040664, filed on Aug. 17, 2022.
(Continued)

(51) Int. Cl.
*G02B 23/12* (2006.01)
*F41G 11/00* (2006.01)
*G02B 27/01* (2006.01)

(52) U.S. Cl.
CPC ............ *G02B 23/12* (2013.01); *F41G 11/001* (2013.01); *G02B 27/0189* (2013.01)

(58) Field of Classification Search
CPC .... G02B 27/0189; G02B 23/12; F41G 11/001
See application file for complete search history.

(56) References Cited

U.S. PATENT DOCUMENTS

| 4,554,744 A | 11/1985 | Huckenbeck |
| 4,658,139 A | 4/1987 | Brennan et al. |

(Continued)

FOREIGN PATENT DOCUMENTS

| CN | 105547048 | 5/2016 |
| CN | 205749902 | 11/2016 |

(Continued)

OTHER PUBLICATIONS

"ATN ThOR Series: Thermal Optical Riflescopes", American Technologies Network Corp., Thor Series Operator's Manual, Rev. 3, <https://www.atncorp.com/pdf/manuals/ThOR_2-3_Color_2-3_B &W_manual.pdf>, Dec. 2010, pp. 44.

(Continued)

*Primary Examiner* — Muhammad N Edun
(74) *Attorney, Agent, or Firm* — Knobbe, Martens, Olson & Bear, LLP

(57) ABSTRACT

Certain aspects of a firearm sight system that can include a direct view image, an infrared (IR) video image, and/or an auxiliary video image comprising auxiliary information. The firearm scope may be used as s clip-on sight system that transmits the direct view image, the infrared (IR) video image, and the auxiliary video image to a primary firearm scope. The auxiliary video image may include a bore-sighted reticle image superimposed on the direct view image or the IR video image.

26 Claims, 38 Drawing Sheets

Related U.S. Application Data

(60) Provisional application No. 63/299,788, filed on Jan. 14, 2022, provisional application No. 63/234,671, filed on Aug. 18, 2021.

(56) References Cited

U.S. PATENT DOCUMENTS

| | | |
|---|---|---|
| 5,035,472 A | 7/1991 | Hansen |
| 5,129,309 A | 7/1992 | Lecuyer |
| 5,140,151 A | 8/1992 | Weiner et al. |
| 5,434,704 A | 7/1995 | Connors et al. |
| 5,497,266 A | 3/1996 | Owen |
| 5,946,132 A | 8/1999 | Phillips |
| 6,000,163 A | 12/1999 | Gordon |
| 6,020,994 A | 2/2000 | Cook |
| 6,204,961 B1 | 3/2001 | Anderson et al. |
| 6,295,754 B1 | 10/2001 | Otteman et al. |
| 6,772,550 B1 | 8/2004 | Leatherwood |
| 6,911,652 B2 | 6/2005 | Walkenstein |
| 7,051,469 B1 | 5/2006 | Pochapsky et al. |
| 7,100,321 B2 | 9/2006 | Holmberg |
| 7,121,036 B1 | 10/2006 | Florence et al. |
| 7,145,703 B2 | 12/2006 | Sieczka et al. |
| 7,292,262 B2 | 11/2007 | Towery et al. |
| 7,319,557 B2 | 1/2008 | Tai |
| 7,409,792 B2 | 8/2008 | Narcy et al. |
| 7,421,818 B2 | 9/2008 | Houde-Walter |
| 7,483,213 B2 | 1/2009 | Pochapsky |
| 7,574,824 B2 | 8/2009 | Holmberg |
| 7,661,221 B2 | 2/2010 | Holmberg |
| 7,687,751 B2 | 3/2010 | Page |
| 7,743,547 B2 | 6/2010 | Houde-Walter |
| 7,787,012 B2 | 8/2010 | Scales et al. |
| 7,842,921 B2 | 11/2010 | Reed et al. |
| 7,911,687 B2 | 5/2011 | Scholz |
| 7,999,925 B2 | 8/2011 | Liang |
| 8,046,950 B2 | 11/2011 | Holmberg |
| 8,047,118 B1 | 11/2011 | Teetzel et al. |
| 8,065,807 B2 | 11/2011 | Rucinkski |
| 8,100,044 B1 | 1/2012 | Teetzel et al. |
| 8,117,780 B2 | 2/2012 | Matthews et al. |
| 8,156,679 B1 | 4/2012 | Swan |
| 8,156,680 B2 | 4/2012 | Holmberg |
| 8,186,093 B1 | 5/2012 | Chung |
| 8,215,044 B2 | 7/2012 | Arbouw |
| 8,230,636 B1 | 7/2012 | Swan |
| 8,240,077 B2 | 8/2012 | Holmberg |
| 8,296,991 B1 | 10/2012 | Chung |
| 8,297,173 B1 | 10/2012 | Teetzel et al. |
| 8,400,712 B2 | 3/2013 | Dennis |
| 8,432,610 B2 | 4/2013 | Szapiel et al. |
| 8,448,373 B2 | 5/2013 | Matthews et al. |
| 8,453,368 B2 | 6/2013 | Bockmon |
| 8,459,552 B2 | 6/2013 | Arbouw |
| 8,461,529 B2 | 6/2013 | Hunter |
| 8,505,231 B2 | 8/2013 | Chung |
| 8,505,434 B2 | 8/2013 | Wieland |
| 8,561,518 B2 | 10/2013 | Teetzel et al. |
| 8,564,668 B2 | 10/2013 | Plotsker |
| 8,587,659 B1 | 11/2013 | Socolinky et al. |
| 8,607,495 B2 | 12/2013 | Moore et al. |
| 8,638,387 B2 | 1/2014 | Aizpuru et al. |
| 8,648,914 B1 | 2/2014 | Winker et al. |
| 8,656,628 B2 | 2/2014 | Jock et al. |
| 8,656,629 B2 | 2/2014 | Holmberg |
| 8,656,631 B2 | 2/2014 | Koesler et al. |
| 8,733,011 B2 | 5/2014 | Spuhr |
| 8,915,008 B2 | 12/2014 | Mauricio et al. |
| 8,925,238 B2 | 1/2015 | Anderson |
| 8,943,732 B2 | 2/2015 | Schmidt et al. |
| 8,978,539 B2 | 3/2015 | Teetzel et al. |
| 8,997,393 B2 | 4/2015 | Bar Yona |
| 9,010,012 B2 | 4/2015 | Matthews et al. |
| 9,033,232 B2 | 5/2015 | Bockmon |
| 9,036,035 B2 | 5/2015 | Lupher et al. |
| 9,057,583 B2 | 6/2015 | Matthews et al. |
| 9,057,584 B2 | 6/2015 | Chung |
| 9,069,172 B1 | 6/2015 | Morley |
| 9,086,253 B2 | 7/2015 | Oh et al. |
| 9,113,061 B1 | 8/2015 | Morley |
| 9,127,911 B2 | 9/2015 | Varshneya et al. |
| 9,140,521 B2 | 9/2015 | Millett |
| 9,157,701 B2 | 10/2015 | Vatshneya et al. |
| 9,229,216 B2 | 1/2016 | Staley, III et al. |
| 9,239,213 B2 | 1/2016 | Chen et al. |
| 9,250,035 B2 | 2/2016 | Sullivan et al. |
| 9,298,062 B2 | 3/2016 | Jikihara et al. |
| 9,323,061 B2 | 4/2016 | Edwards et al. |
| 9,335,124 B2 | 5/2016 | Maryfield et al. |
| 9,347,742 B2 | 5/2016 | Varshneya et al. |
| 9,383,167 B1 | 7/2016 | Connolly et al. |
| 9,389,046 B2 | 7/2016 | Cheng et al. |
| 9,395,155 B1 | 7/2016 | Bockmon |
| 9,395,156 B2 | 7/2016 | Newzella et al. |
| 9,417,037 B2 | 8/2016 | Jahromi |
| 9,453,707 B2 | 9/2016 | Williams et al. |
| 9,488,445 B2 | 11/2016 | Houde-Walter |
| 9,506,723 B2 | 11/2016 | Teetzel et al. |
| 9,593,945 B2 | 3/2017 | Sisney et al. |
| 9,632,304 B2 | 4/2017 | Waterman et al. |
| 9,791,242 B2 | 10/2017 | Christiansen et al. |
| 9,791,244 B2 | 10/2017 | Maryfield et al. |
| 9,816,782 B2 | 11/2017 | Maryfield et al. |
| 9,857,143 B2 | 1/2018 | Teetzel et al. |
| 9,857,144 B2 | 1/2018 | Richards |
| 9,897,415 B2 | 2/2018 | Zhang et al. |
| 9,906,736 B2 | 2/2018 | Patton et al. |
| 9,939,229 B2 | 4/2018 | Davidson et al. |
| 10,003,756 B2 | 6/2018 | Masarik et al. |
| 10,012,474 B2 | 7/2018 | Teetzel et al. |
| 10,054,852 B2 | 8/2018 | Lupher et al. |
| 10,113,837 B2 | 10/2018 | Masarik et al. |
| 10,119,787 B2 | 11/2018 | Geissele |
| 10,126,099 B1 | 11/2018 | Hammond et al. |
| 10,151,564 B2 | 12/2018 | Galli |
| 10,180,565 B2 | 1/2019 | Havens et al. |
| 10,215,532 B2 | 2/2019 | Giraud et al. |
| 10,274,286 B2 | 4/2019 | Maryfield et al. |
| 10,330,439 B2 | 6/2019 | Jeung et al. |
| 10,345,077 B1 | 7/2019 | Loebig et al. |
| 10,359,258 B2 | 7/2019 | Geissele |
| 10,379,135 B2 | 8/2019 | Maryfield et al. |
| 10,443,981 B2 | 10/2019 | Tinichigiu et al. |
| 10,443,984 B2 | 10/2019 | Maryfield et al. |
| 10,458,750 B2 | 10/2019 | Lee |
| 10,466,484 B1 | 11/2019 | Yoon et al. |
| 10,480,903 B2 | 11/2019 | Lupher et al. |
| 10,520,716 B2 | 12/2019 | Havens et al. |
| 10,534,166 B2 | 1/2020 | Summerfield et al. |
| 10,551,149 B2 | 2/2020 | Teetzel |
| 10,591,249 B2 | 3/2020 | Campbell |
| 10,606,061 B2 | 3/2020 | Havens et al. |
| 10,612,890 B2 | 4/2020 | McHale et al. |
| 10,634,453 B1 | 4/2020 | Spuhr |
| 10,663,261 B2 | 5/2020 | Summerfield et al. |
| 10,697,734 B1 | 6/2020 | Jahromi |
| 10,704,862 B2 | 7/2020 | Chung |
| 10,732,399 B2 | 8/2020 | Havens et al. |
| 10,747,314 B1 | 8/2020 | Chang et al. |
| 10,754,240 B2 | 8/2020 | Peel et al. |
| 10,823,532 B2 | 11/2020 | Gallery et al. |
| 10,837,738 B1 | 11/2020 | Hung |
| 10,852,101 B2 | 12/2020 | Haag et al. |
| 10,866,070 B2 | 12/2020 | Nerheim |
| 10,866,402 B2 | 12/2020 | Havens et al. |
| 10,871,350 B1 | 12/2020 | Thomas et al. |
| 10,876,816 B2 | 12/2020 | Campbell |
| 10,890,414 B2 | 1/2021 | Cabrera et al. |
| 10,969,199 B2 | 4/2021 | Belenkil et al. |
| 11,187,884 B2 | 11/2021 | Havens et al. |
| 11,204,221 B2 | 12/2021 | Haag et al. |
| 11,209,243 B1 | 12/2021 | Masarik et al. |
| 11,473,874 B2 | 10/2022 | Masarik et al. |
| 2005/0268519 A1 | 12/2005 | Pikielny |

(56) References Cited

U.S. PATENT DOCUMENTS

| | | |
|---|---|---|
| 2006/0230665 A1 | 10/2006 | Narcy et al. |
| 2008/0252882 A1 | 10/2008 | Kesterson |
| 2011/0261204 A1 | 10/2011 | Smith |
| 2012/0007987 A1 | 1/2012 | Gaber |
| 2012/0019700 A1 | 1/2012 | Gaber |
| 2012/0030985 A1 | 2/2012 | Mauricio et al. |
| 2012/0033195 A1 | 2/2012 | Tai |
| 2012/0090216 A1 | 4/2012 | Li |
| 2012/0097741 A1 | 4/2012 | Karcher |
| 2012/0262615 A1 | 10/2012 | Geber |
| 2013/0008072 A1 | 1/2013 | Chung |
| 2013/0104438 A1 | 5/2013 | Hines |
| 2013/0279013 A1 | 10/2013 | Edwards et al. |
| 2013/0333266 A1 | 12/2013 | Gose et al. |
| 2014/0184476 A1 | 7/2014 | McHale et al. |
| 2014/0190062 A1 | 7/2014 | Turner, Jr. et al. |
| 2014/0211020 A1 | 7/2014 | John, Jr. |
| 2014/0226214 A1 | 8/2014 | Edwards et al. |
| 2014/0259854 A1 | 9/2014 | Williams et al. |
| 2015/0016777 A1 | 1/2015 | Abovitz et al. |
| 2015/0369565 A1 | 12/2015 | Kepler |
| 2016/0061567 A1 | 3/2016 | Regan et al. |
| 2016/0381297 A1 | 12/2016 | Aliaksandr |
| 2018/0073840 A1 | 3/2018 | Kristoffersen |
| 2018/0131879 A1 | 5/2018 | Nagata et al. |
| 2018/0204364 A1 | 7/2018 | Hoffman |
| 2018/0224650 A1 | 8/2018 | Havens et al. |
| 2018/0224651 A1 | 8/2018 | Havens et al. |
| 2018/0292168 A1 | 10/2018 | Borrico |
| 2018/0302576 A1 | 10/2018 | Masarik et al. |
| 2019/0129162 A1 | 5/2019 | Hodelin |
| 2019/0219812 A1 | 6/2019 | Havens et al. |
| 2019/0219813 A1* | 7/2019 | Summerfield .......... F41G 1/345 |
| 2019/0249958 A1 | 8/2019 | Teetzel et al. |
| 2019/0293919 A1 | 9/2019 | Hamilton |
| 2019/0316881 A1 | 10/2019 | Biran |
| 2019/0324260 A1 | 10/2019 | Hamilton et al. |
| 2019/0353455 A1* | 11/2019 | McHale ................ H04N 23/55 |
| 2019/0376755 A1 | 12/2019 | Teetzel et al. |
| 2019/0376764 A1 | 12/2019 | Hammond |
| 2020/0011640 A1 | 1/2020 | Moseman et al. |
| 2020/0041890 A1 | 2/2020 | Peel |
| 2020/0049455 A1* | 2/2020 | Hamilton ............... G02B 27/18 |
| 2020/0103201 A1 | 4/2020 | Cabrera et al. |
| 2020/0103203 A1 | 4/2020 | Seznec-Serpaggi |
| 2020/0232762 A1 | 7/2020 | Hamilton et al. |
| 2020/0272044 A1 | 8/2020 | Walker |
| 2020/0292838 A1 | 9/2020 | Watanabe et al. |
| 2020/0309485 A1 | 10/2020 | Shi |
| 2020/0333534 A1 | 10/2020 | Cotton |
| 2021/0010784 A1 | 1/2021 | Sheets, Jr. |
| 2021/0190456 A1 | 6/2021 | Patel |
| 2021/0262758 A1* | 8/2021 | Parker ..................... F41G 3/165 |
| 2023/0213312 A1 | 7/2023 | Masarik et al. |

FOREIGN PATENT DOCUMENTS

| | | |
|---|---|---|
| CN | 112179209 | 1/2021 |
| DE | 10 2004 047576 | 4/2006 |
| EP | 1 032 859 | 12/2003 |
| EP | 1 772 695 | 4/2007 |
| WO | WO 2005/121688 | 12/2005 |
| WO | WO 2007/136885 | 11/2007 |
| WO | WO 2011/031204 | 3/2011 |
| WO | WO 2012/061154 | 5/2012 |
| WO | WO 2014/024188 | 2/2014 |
| WO | WO 2014/151394 | 9/2014 |
| WO | WO 2016/014655 | 1/2016 |
| WO | WO 2016/033565 | 3/2016 |
| WO | WO 2016/145122 | 9/2016 |
| WO | WO 2016/145124 | 9/2016 |
| WO | WO 2017/219275 | 12/2017 |
| WO | WO 2018/236578 | 12/2018 |
| WO | WO 2019/007973 | 1/2019 |
| WO | WO 2019/025557 | 2/2019 |
| WO | WO 2019/038476 | 2/2019 |
| WO | WO 2019/183230 | 9/2019 |
| WO | WO 2019/236114 | 12/2019 |
| WO | WO 2020/071864 | 4/2020 |
| WO | WO 2020/096933 | 5/2020 |
| WO | WO 2020/106340 | 5/2020 |
| WO | WO 2021/168132 | 8/2021 |
| WO | WO 2023/023200 | 2/2023 |

OTHER PUBLICATIONS

"Dracorex EO₊IR Thermal Fusion rifle Scope Sight", SPi Infrared, <https://www.x20.org/vanguard-eoir-thermal-fusion-rifle-scope/>, Sep. 1, 2016, pp. 10.

Edwards et al., "High-brightness displays in integrated weapon sight systems", Proc. SPIE 9086, Display Technologies and Applications for Defense, Security, and Avionics VIII; and Head- and Helmet-Mounted Displays XIX, 90860C, Jun. 13, 2014, pp. 15.

"Form 8-K", Kopin Corp, Filed Jan. 14, 14 for the Period Ending Jan. 13, 14, <http://d1lge852tjqow.cloudfront.net/NasdaqGlobal-KOPN/5f894bb5-230b-4547-9561-0a5d0e720f7d.pdf>, pp. 22.

Gilstrap et al., "Integrated Sight Boresighting", <https://apps.dtic.mil/dtic/tr/fulltext/u2/a400238.pdf>, Mar. 1998, pp. 11.

Grayson, Chris, "Holographic Waveguides: What You Need to Know to Understand the Smartglasses Market", <https://web.archive.org/web/20170516184200/https://uploadvr.com/author/cgrayson/>, May 4, 2017, pp. 17.

Hogan et al., "Augmenting Reality in Direct View Optical (DVO) Overlay Applications", Display Technologies and Applications for Defense, Security, and Avionics VIII; and Head- and Helmet-Mounted Displays XIX, Proc. of SPIE, vol. 9086, 2014, pp. 11.

International Search Report and Written Opinion received in PCT Application No. PCT/US2021/018603 as mailed May 18, 2021 in 11 pages.

International Search Report and Written Opinion received in PCT Application No. PCT/US2022/040664 as mailed Oct. 11, 2022 in 22 pages.

Ledertheil et al., "Small arms video sight for the 'German Army Soldier-of-the-Future Program': lessons learned", Proc. SPIE 7298, Infrared Technology and Applications XXXV, 72981G, May 6, 2009, pp. 10.

"Luna Optics & The Latest Night Vision Technologies", <https://web.archive.org/web/20200402074219/https://www.lunaoptics.com/nvtechnology.html>, Apr. 2, 2020, pp. 2.

Marshall et al., "Integrated sight modules: fire control technology for the 21st century", Proc. SPIE 10281, Technologies for Advanced Land Combat: A Critical Review, 102810P, Apr. 17, 1995, pp. 18.

"Select an Accurate Dedicated or Clip on Long Range Thermal Weapon Sight or Thermal Rifle Flir Scope", SPi Infrared, <https://www.x20.org/product/t14x-low-cost-thermal-rifle-scope/>, Sep. 2014, pp. 20.

"Steiner Introduces 'Intelligent' Combat Sight (ICS)", Jan. 15,2 015, https://www.steiner-optics.com/news/steiner-introduces-%E2%80%9Cintelligent%E2%80%9D-combat-sight-ics, 1 page.

* cited by examiner

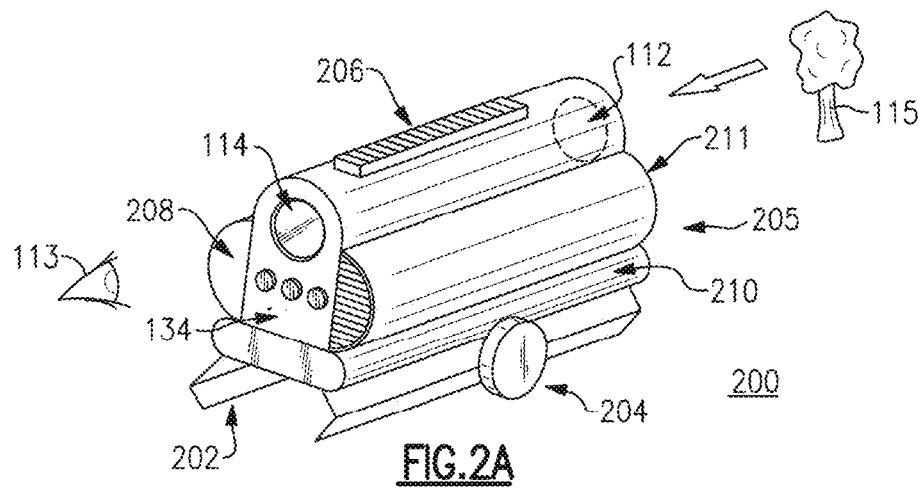
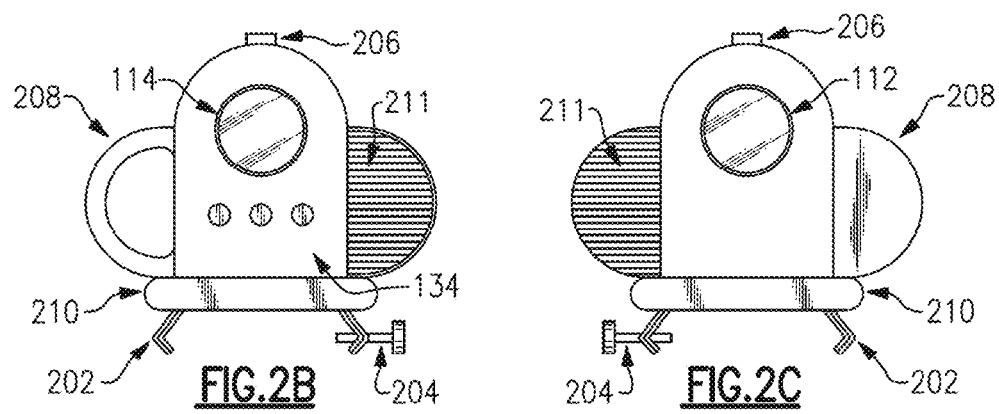
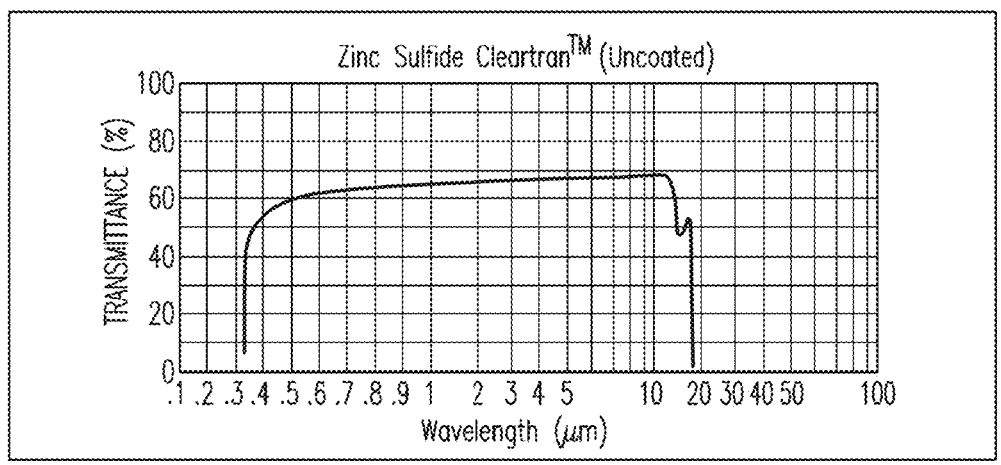

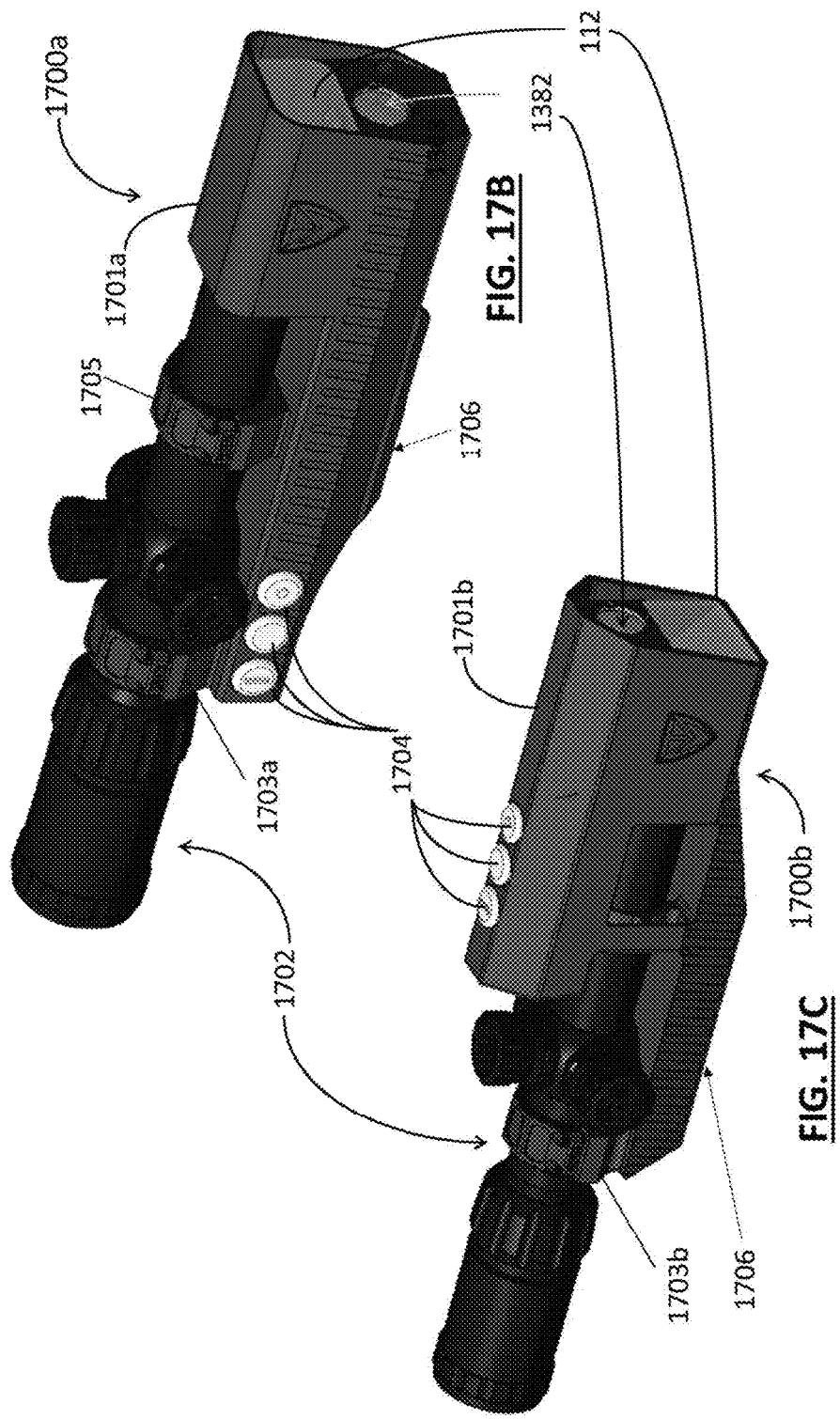

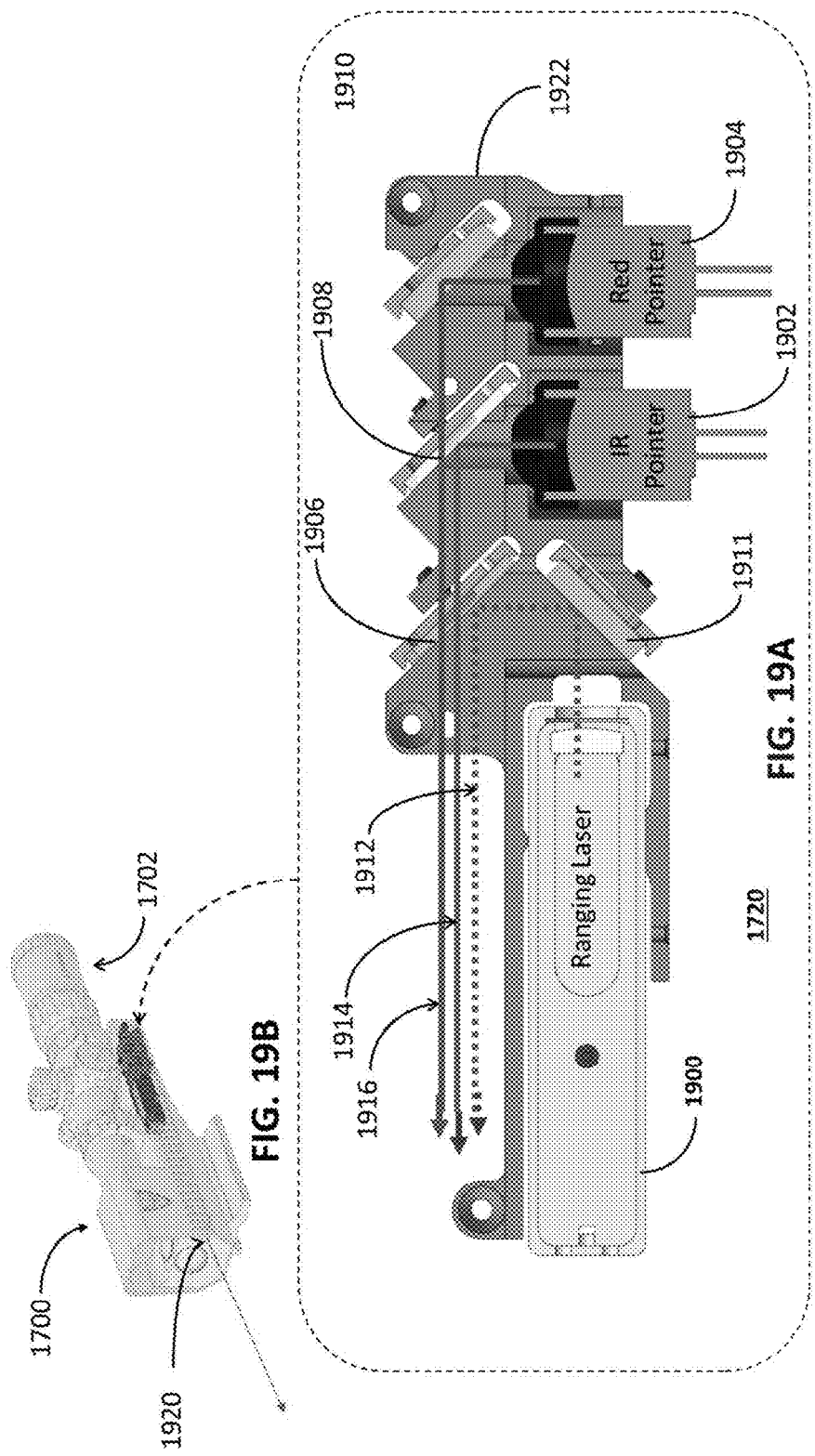

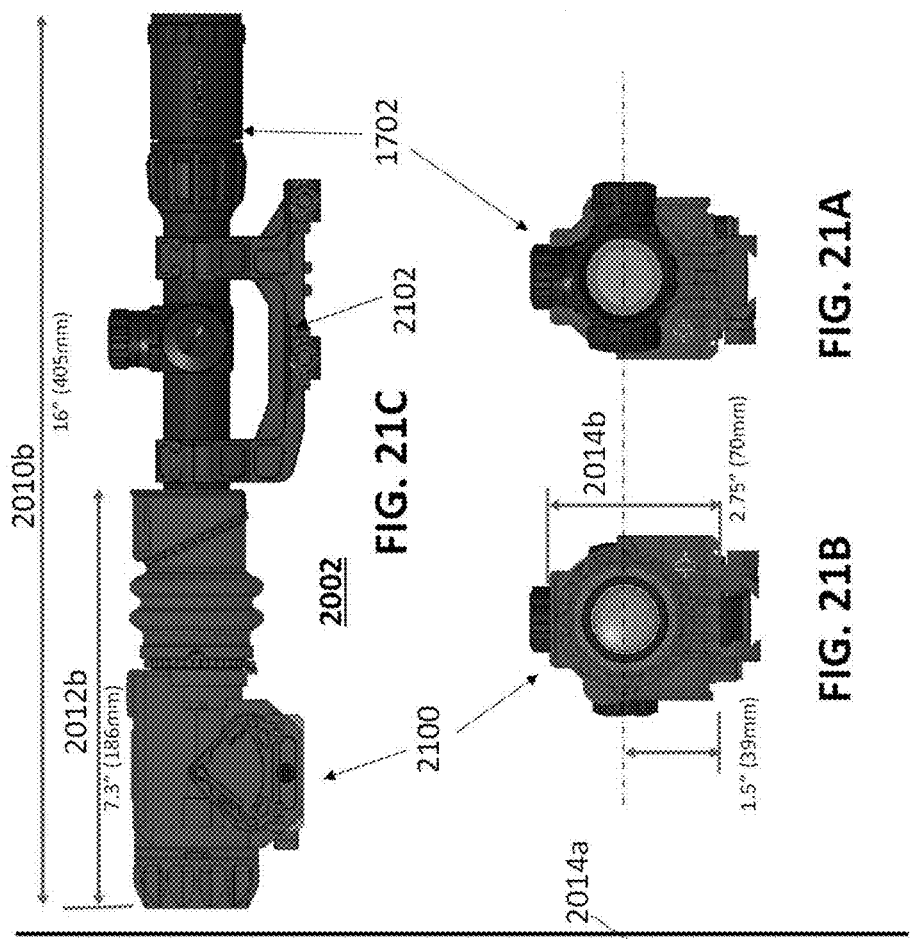
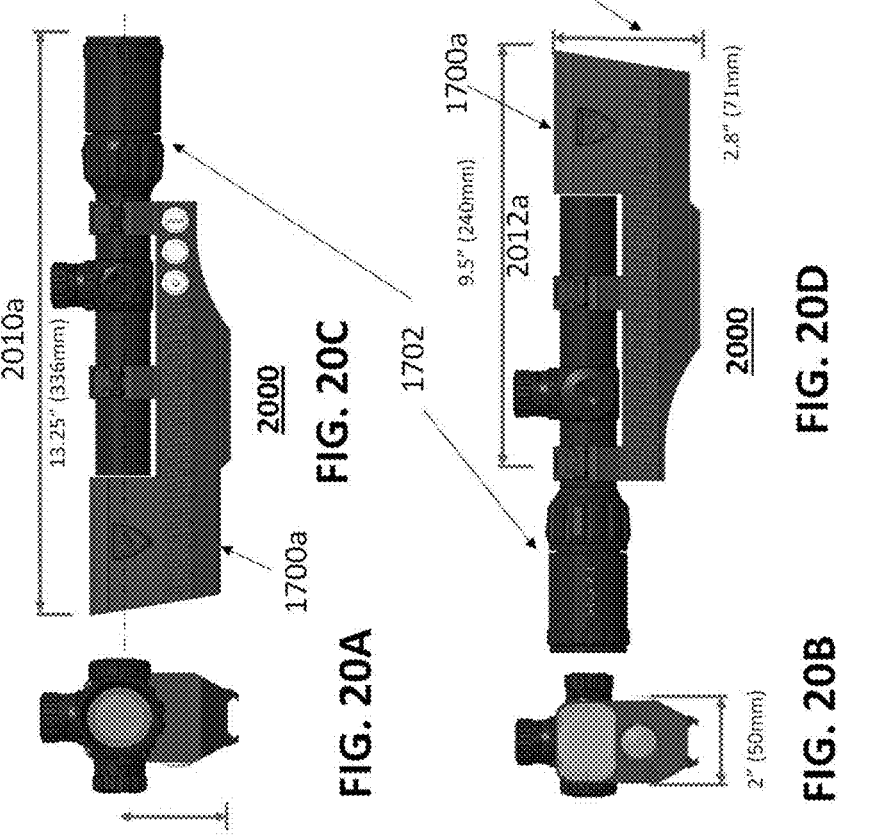

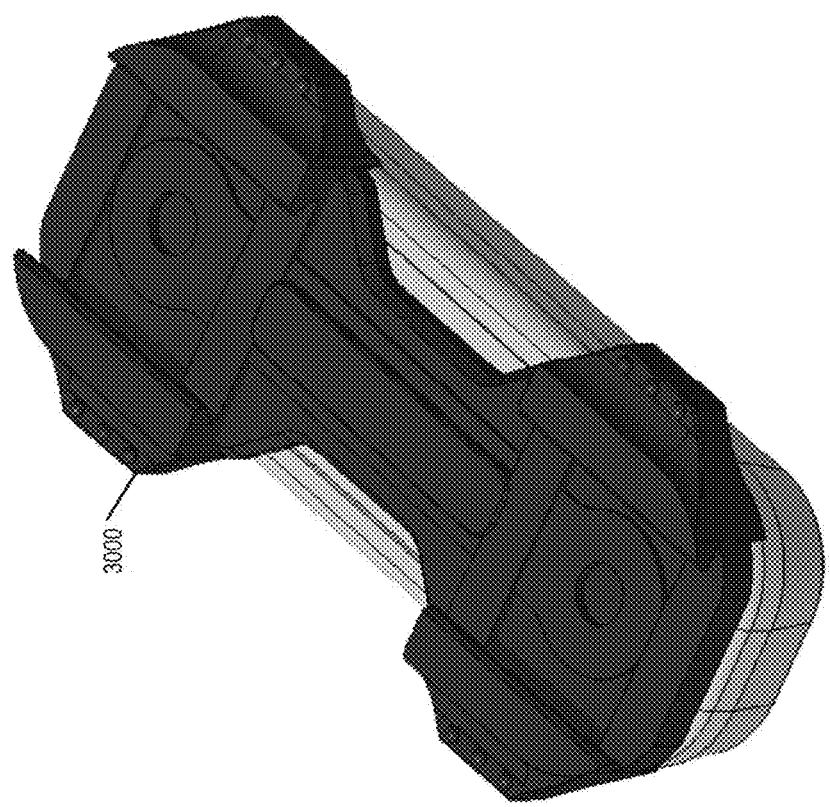
FIG. 30

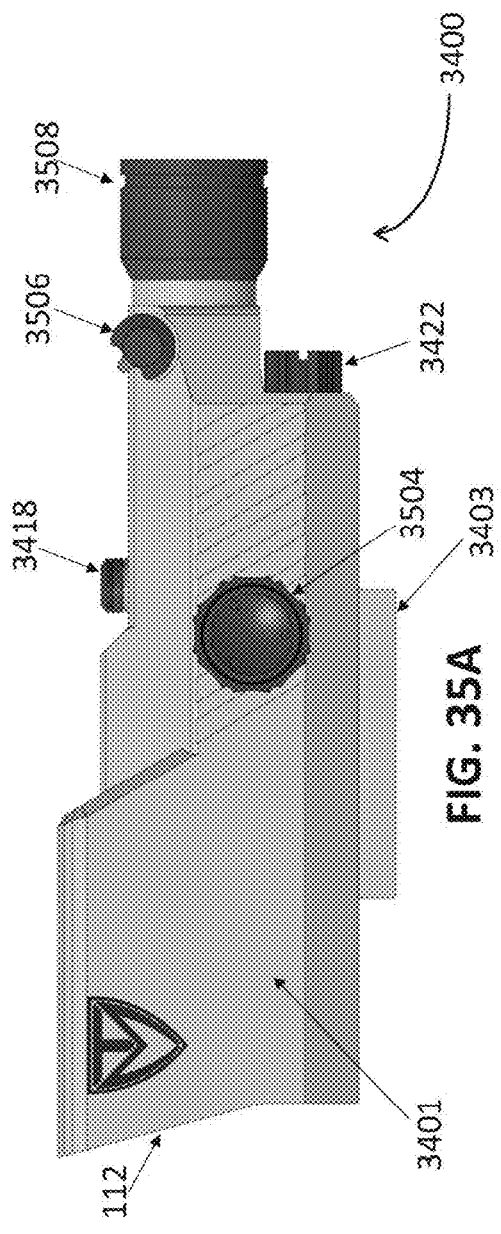
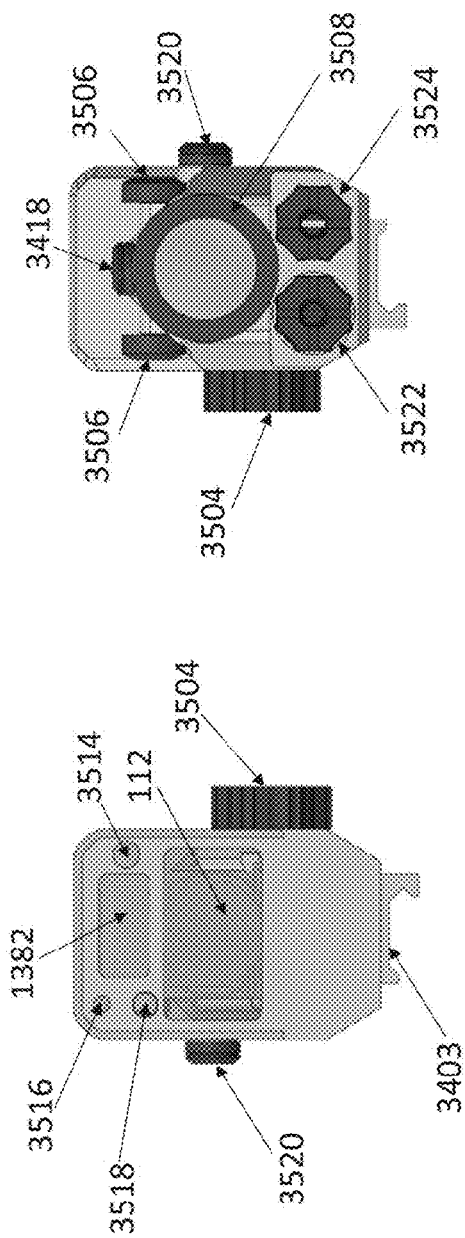
FIG. 35A
FIG. 35B
FIG. 35C

WEAPON SIGHT SYSTEMS

INCORPORATION BY REFERENCE

This application is a continuation of International Application No. PCT/US2022/040664, filed Aug. 17, 2022 and titled "WEAPON SIGHT SYSTEMS," which is hereby incorporated by reference in its entirety for all purposes, and which claims priority to U.S. Provisional Application No. 63/234,671, filed on Aug. 18, 2021 and titled "WEAPON SIGHT SYSTEMS," and to U.S. Provisional Application No. 63/299,788, filed on Jan. 14, 2022 and titled "WEAPON SIGHT SYSTEMS," the disclosures of each of which is hereby incorporated by reference in its entirety for all purposes. Further, certain embodiments of the present disclosure can be implemented by or combined with certain embodiments of U.S. patent application Ser. No. 17/178,990, filed Feb. 18, 2021, entitled "WEAPON SYSTEM WITH MULTI-FUNCTION SINGLE-VIEW SCOPE," the entire contents of which are hereby incorporated by reference herein and made a part of this specification. Any and all applications for which a foreign or domestic priority claim is identified in the Application Data Sheet as filed with the present application are hereby incorporated by reference under 37 CFR 1.57.

TECHNICAL FIELD

This disclosure relates to weapon scopes. More specifically, this disclosure relates to weapon scopes that can provide a direct view of a target scene, one or more video views, and/or superimposed symbology (e.g., letters, numbers, or symbols) through a single window or aperture.

BACKGROUND

Scopes can be used with weapons to enable a user to more clearly see a target compared to not using a scope. Typically, scopes are designed with optics that includes one or more lenses to focus the light entering the scope on the user's eye and enabling the user to see at a greater distance. The optics often make the scope heavy, particularly when a high degree of magnification is supported by the scope. Further, the viewing aperture of the scopes are often relatively small to prevent excess light from entering the scope.

SUMMARY

The systems, methods, and devices of this disclosure each have several innovative aspects, no single one of which is solely responsible for all the desirable attributes disclosed herein. Details of one or more implementations of the subject matter described in this specification are set forth in the accompanying drawings and the description below.

Certain aspects of the present disclosure relate to a weapon system that includes a firearm and a firearm scope. The firearm may comprise a mount configured to support attachment of an accessory to the firearm. The firearm scope may be mountable to the firearm via the mount of the firearm. The firearm scope may comprise a sight system configured to admit light via a first window of the firearm scope and present a target scene or an image of the target scene, to a user via a second window of the firearm scope, wherein the image of the target scene is formed based at least in part on light admitted by the first window of the firearm scope. The sight system may comprise: a first image source configured to generate a first image for presentation to the user, wherein the first image source generates the first image based at least in part on the admitted light; a second image source configured to generate a second image comprising a reticle for presentation to the user; a waveguide display configured to display the second image superimposed on the first image to the user; and an image projector configured to project at least the first image onto the waveguide display.

Additional aspects of the present disclosure relate to a firearm scope capable of providing both a video-view mode and a direct-view mode through a single viewing window. The firearm scope may comprise: a housing comprising a first window configured to admit light and a second window that enables a user to view a target scene; and a sight system at least partially housed within the housing, the sight system configured to process the admitted light and to present the target scene to the user via the second window. The sight system may comprise: a direct view display viewable through the second window, the direct view display having a luminous transmittance greater than or equal to about 30% using CIE Illuminant D65 when viewed within at least 10 degrees of perpendicular to the direct view display, thereby permitting a direct view of the target scene through a transparent display substrate of the direct view display; a redirection element configured to redirect at least some of the admitted light received through the first window towards an image sensor when in a first state; the image sensor configured to generate an image based on the light received from the redirection element; and a projector configured to project the image onto the transparent display substrate of the direct view display.

Yet additional aspects of the present disclosure relate to a firearm scope capable of displaying superimposed source imagery on a waveguide display. The firearm scope may comprise: a housing comprising a first window configured to admit light and a second window that enables a user to view a target scene; and a sight system at least partially housed within the housing, the sight system configured to process the admitted light and to present the target scene to the user via the second window. The sight system may comprise: a first image source configured to generate a first image for presentation to the user, wherein the first image source generates the first image based at least in part on the admitted light; a second image source configured to generate a second image for presentation to the user, wherein the second image comprises symbology; a waveguide display configured to display the second image superimposed on the first image to the user; and an image projector configured to project at least the first image onto the waveguide display.

Further aspects of the present disclosure relate to a firearm scope capable of providing both a thermal-view mode and a direct-view mode through a single viewing window. The firearm scope may comprise: a housing comprising a first window configured to admit light and a second window that enables a user to view a target scene; and a sight system at least partially housed within the housing, the sight system configured to process the admitted light and to present the target scene to the user via the second window. The sight system may comprise: a direct view display viewable through the second window, the direct view display transparent when viewed at a range of angles, thereby permitting a direct view through a transparent display substrate of the direct view display; a beam splitter configured to permit the transmission of light within a visible wavelength range while reflecting light within an infrared wavelength range towards an image sensor; the image sensor configured to generate a thermal image based on the light within the infrared wavelength range received from the beam splitter, thereby permitting a thermal view; and a projector configured to project the thermal image onto the transparent display substrate of the direct view display.

Certain aspects of the present disclosure relate to a firearm scope configured to provide a view of a target scene to a user. The firearm scope may comprise: a housing comprising a first aperture configured to admit light and a second aperture configured to present the target scene to the user; and a sight system at least partially housed within the housing, the sight system configured to process the admitted light and to present the target scene to the user via the second aperture. The sight system may comprise: a dichroic mirror configured to reflect at least some light of the admitted light that is within infrared spectrum and transmit at least some light of the admitted light that is within visible spectrum; a moveable mirror configured to reflect at least some light within the visible spectrum towards an optical subsystem when the moveable mirror is within a first position associated with a first state; an image processor configured to generate an image based on light received from the optical subsystem; a projector configured to project the image into a first point of ingress of a holographic waveguide; and the holographic waveguide configured to present the image to the user when in the first state.

Certain aspects of the present disclosure relate to a firearm scope configured to provide a direct view image and a video image of a target scene to a user via an eyepiece, wherein the video image comprises a thermal video image or a visible video image of the target scene. The firearm scope may comprise: a housing comprising an entrance window configured to admit light and an exit aperture configured to output the direct view image of the target scene and the video image. The sight system may be at least partially housed within the housing and configured to process at least a portion of the admitted light to generate output light comprising at least one of the direct view image or the video image, the sight system may comprise: a dichroic beam splitter configured to transmit a first portion of the admitted light and to reflect a second portion of the admitted light, wherein the first portion of the admitted light is within a visible spectrum and wherein the second portion of the admitted light is within an infrared spectrum; an objective lens configured to generate a first image using the first portion of the admitted light, an auxiliary video system comprising at least an auxiliary video projector configured to generate a first auxiliary video image; a beam splitter configured to redirect the first auxiliary video image from the auxiliary video system and to overlay the first auxiliary video image on the first image to form a composite image where the beam splitter can have a luminous transmittance greater than or equal to 70% and less than or equal to 95% with respect to CIE Illuminant D65; an image sensor configured to generate a thermal video signal using the second portion of the admitted light; a video projector configured to generate the thermal video image of the target scene based on the thermal video signal; and a redirection element configured to redirect the thermal video image toward the eyepiece and block the direct view image when the redirection element is in a first state and the sight system is in a thermal video view mode. The eyepiece may generate the direct view image based on the composite image. The brightness of the auxiliary video projector may be greater than a brightness of the video projector.

BRIEF DESCRIPTION OF THE DRAWINGS

Aspects and advantages of the embodiments provided herein are described with reference to the following detailed description in conjunction with the accompanying drawings. Throughout the drawings, reference numbers may be reused to indicate correspondence between referenced elements. The drawings are provided to illustrate example embodiments described herein and are not intended to limit the scope of the disclosure. In addition, various features of different disclosed embodiments can be combined to form additional embodiments, which are part of this disclosure. Any feature or structure can be removed or omitted.

FIG. 2A illustrates a perspective view of an example scope or sight system in accordance with certain aspects of the present disclosure.

FIG. 2B illustrates a view of the rear face of the sight system in accordance with certain aspects of the present disclosure.

FIG. 2C illustrates a view of the front face of the sight system in accordance with certain aspects of the present disclosure.

FIG. 2D shows the optical transmission (e.g., a measure of a ratio between transmitted and incident optical intensity) through an example zinc sulfide window plotted against the wavelength of the incident light.

FIGS. 17B and 17C illustrate a perspective front view of two compound firearm scopes comprising two firearm scopes (or clip-on sight systems) connected to a primary scope in accordance with certain aspects of the present disclosure.

FIG. 19A illustrates an example of the tri-laser subsystem included in the firearm scope shown in FIG. 17B.

FIG. 19B illustrates is perspective from view of the firearm scope shown in FIG. 17B connected to a primary scope illustrating the position of the tri-laser subsystem shown in FIG. 19A inside the firearm scope shown in FIG. 17B and a laser aperture located on the frond surface of the firearm scope.

FIG. 20A-20D illustrate different views of an example compound firearm scope comprising the firearm scope shown in FIG. 17B connected to a primary scope.

FIG. 21A-21C illustrate different views of another compound sight system comprising a night vision clip-on sight system mounted on the primary scope shown in FIG. 20A-20D.

FIG. 30 illustrates an example remote controller in accordance with certain embodiments.

FIGS. 35A-35C illustrate a side-view (A), a front view (B), and a back-view (C) of the example firearm scope shown in FIGS. 34A and 34B.

DETAILED DESCRIPTION

Introduction

Figure 1:
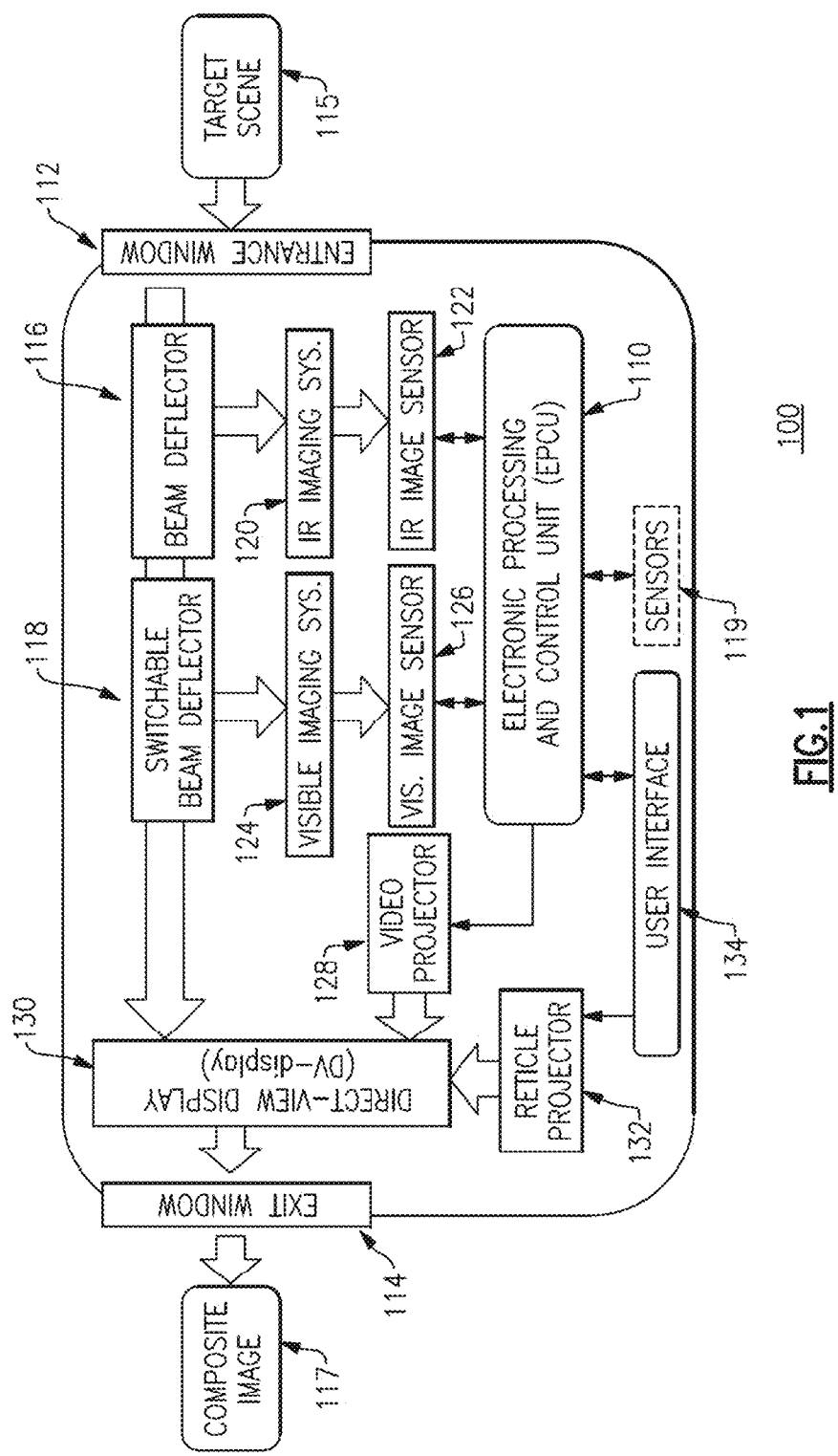
FIG. 1 is a block diagram of an example scope or sight system in accordance with certain aspects of the present disclosure.

The following description of certain embodiments presents various descriptions of specific embodiments. However, the innovations described herein can be embodied in a multitude of different ways, for example, as defined and covered by the claims. In this description, reference is made to the drawings where like reference numerals can indicate identical or functionally similar elements. It will be understood that elements illustrated in the figures are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

In this description, references to "an embodiment," "one embodiment," or the like, mean that the feature, function, structure, or characteristic being described is included in at least one embodiment of the technique introduced herein. Occurrences of such phrases in this specification do not necessarily all refer to the same embodiment. On the other hand, the embodiments referred to are also not necessarily mutually exclusive.

Several terms are used interchangeably within this description. Each of the terms are intended to have their customary ordinarily understood plain meaning in addition to the meanings described throughout this application.

For example, the terms "scope", "weapon sight system," "firearm scope," and "sight system" can be used interchangeably. In addition to their plain meanings, the foregoing terms may refer to a device that provides an image of a target scene under one or more lighting conditions. Although the sight system or scope may be referred to as a weapon sight system or a firearm scope, aspects of the system described herein can be used without a weapon. For example, certain aspects of the present disclosure may be implemented with other sighting systems, such as binoculars. A scope or sight system can include telescopic sights, sights with digital zoom, sights without optical power, sights that insert symbology (such as, for example, a reticle or an ammunition count) into a field of view, or a combination of sight systems.

The terms "far infrared (FIR)", "long wavelength infrared (LWIR)" and "thermal radiation" can be used interchangeably to refer to the same infrared wavelength range. This foregoing infrared wavelength range may vary, but generally includes wavelengths that can be used to create a thermal image. For example, the LWIR may be between 8 to 12 micrometers or 8 to 15 micrometers. In some cases, FIR may include wavelengths between 15-1000 micrometers and may be used to detect explosives. Accordingly, an image generated using LWIR may sometimes be referred to as "thermal view" or "thermal video view".

In some cases, "infrared (IR) wavelength ranges" may be divided into three ranges termed near-IR, mid-IR, and far-IR wavelength ranges. In some cases, an IR image or video view may correspond to an image or video signal generated by an IR sensor that is sensitive to one or more wavelength ranges. Further, IR wavelength ranges may include additional ranges, such as short-wavelength infrared and long-wavelength infrared. Generally, although not necessarily, the infrared range of between 8-15 micrometers may be used to generate a thermal image.

Certain aspects of a novel weapon sight system or firearm scope described herein may allow the user to select between a direct view, a daylight, or an infrared (IR) video view mode. The firearm scope may be mountable to the firearm via the mount of the firearm. In various embodiments, the firearm may comprise a rifle, a shotgun, a machine gun, or the like. In some cases, a weapon system may be a non-firearm weapon, such as a bow, dart gun, or other projectile-based weapon. In some cases, at least some of the view modes may be simultaneously active. For example, the direct view and the IR video view may be simultaneously active. Further, the one or more view-modes may be provided while providing a bore-sighted reticle image superimposed on the selected view. In other words, the firearm barrel's bore axis can be aligned with the reticle image and the target image or scene observed by the user (shooter) via direct-view or one of the video view modes. In direct view mode, a user directly sees the light rays emitted or reflected by objects within a target scene without the assistance of any optical or optoelectronic elements. In other words, in direct view mode, the user is presented with a target scene that is equivalent to what a user may see without the scope, but, in some cases, with the addition of a reticle image.

In video viewing modes, the light rays, which may include both visible and infrared rays, emitted or reflected by the objects within a target scene are captured by an optical system, which may form a first image of the target scene on an image sensor (e.g., an optoelectronic sensor). Subsequently, the output of the image sensor may be provided to one or more displays that generate a second image that is observable by the user. In daylight video view mode, the first image may be formed on an image sensor using light within the visible spectrum. For example, the image sensor used in video view mode may be sensitive to light between 0.4 to 0.7 micrometers. In some cases, the image sensor may have a wider sensitivity range. For example, the image sensor may be capable of generating an image from light with wavelengths between 0.3 to 1.5 micrometers, 0.4 to 2.5 micrometers wavelength range, or a range there between. This image sensor capable of processing light within the visible spectrum may be referred to as a visible image sensor. Although referred to as daylight view mode, the daylight view mode may be used during the day or at night and may generate an image of a target scene based on the amount of visible light available. Accordingly, the daylight view mode may be used during the day and/or at night with or without the use of additional or auxiliary illumination. Auxiliary illumination may be used to supplement the visible or IR light and may provide illumination in any of the foregoing visible light and IR wavelength ranges previously described. Without auxiliary illumination, the daylight view may be used with reduced visibility.

In IR video view mode, the first image is formed on an image sensor with a sensitivity to light wavelengths within the infrared range. For example, the image sensor may generate an image based on light with wavelengths between 2.5 to 5 micrometers, 5 to 8 micrometers, 8 to 12 micrometers, 8 to 15 micrometers, or any other range within the infrared wavelength range. This image sensor capable of generating an image from infrared light may be referred to as IR image sensor. The IR video view mode may be used during night or when little to no illumination in the visible range (e.g., between 0.4 to 0.7 micrometers) is available. However, the IR video mode is not limited to night, and a thermal image may be generated and presented during the day or when visible light is available. The IR video view can be used with or without auxiliary illumination. Auxiliary illumination may provide illumination in the wavelength range 0.7 to 2.5 micrometers, among others. Without auxiliary illuminations, the IR view may form thermal images of a target by focusing thermal radiation emitted by the target on a thermal image sensor that is sensitive to optical radiation with wavelengths within the infrared light range (e.g., between 8 and 15 micrometers). In some such cases, the IR video view mode may be referred to as a thermal video view mode.

Advantageously, in certain aspects, the availability of the direct-view mode in addition to the one or more video view modes enables the firearm scope to be used when a video view mode may not be available (for example due to technical issues or when batteries are depleted). The capability of combining a direct-view mode and a video-view mode into a single scope is enabled by a direct view display hereafter referred to as DV-display. The use of the DV-display enables multiple view modes, including direct-view, to be combined into the firearm scope using a single view-path. In other words, in each mode, light may be admitted to the scope via a single window or aperture, and a user may view a target scene through a single window or aperture. Further, the DV-display not only allows switching between direct, daylight video, and IR video view modes using a single entrance aperture, but it also enables the presentation of a bore-sighted reticle image superimposed on all views. Additionally, using the DV-display, symbolic and/or numeric information (e.g., obtained from sensors and/or peripheral devices) can be provided along with the target and reticle images. Moreover, by combining each of the view modes into a single view-path, the size of the firearm scope may be minimized, and may be equal in size and/or weight, to certain existing firearm scopes that only support a single view mode.

A DV-display (or a see-through display) can be a display device that displays one or more images to a user without significantly distorting or dimming the direct view image of the scene behind the display compared to the image that could be observed in the absence of the display. In other words, the DV-display may be capable of superimposing one or more images generated by other devices (e.g., projector, LCD, etc.) on the direct view image such that the observer's eye can simultaneously focus on the scene directly behind the display and the plurality of the images provided through the DV-display. As such, the DV-display may be capable of generating composite or combined images within the exit window of a scope by superimposing the direct view and one or more video images received from one or more image sensors. The DV-display may form color or monochrome composite images from one or more images generated by other devices (e.g., projector, LCD, etc.) and/or the direct view image. The DV-display may be a retinal or near-eye display that is transparent in the visible light range (e.g., has a luminous transmittance of greater than 80% using CIE illuminant D65). In some cases, the DV-display may have a luminous transmittance of greater than or equal to about 30% using CIE Illuminant D65 when viewed within at least 10 degrees of perpendicular to the direct view display. An example of a DV-display may include a transparent display substrate comprising a slab waveguide with at least one input image port (also referred to as input port) or point of ingress of the waveguide and at least one output image port. An input image port can be an optical input location of the DV-display where the image can be received from an image projector. An output image port can be an optical output location where the image can be viewed by an observer.

In some cases, an optical coupler may be used to couple the image output by the image projector to the input image port. Different types of DV-display (e.g., reflective, surface relief and holographic) may exploit different physical mechanisms for receiving and/or projecting images, and consequently, may employ different configurations for the input and output image ports. In some cases, the DV-display can be an augmented reality display.

FIG. 1 presents a block diagram of an example firearm scope 100 or sight system in accordance with certain aspects of the present disclosure. As previously described, embodiments described herein are not necessarily mutually exclusive. Thus, embodiments of the scope 100 may include other embodiments described herein and vice versa. Further, each embodiment or iteration of the scopes described herein may share one or more features of the other scopes described herein. Moreover, the firearm scope 100 may be used with any type of firearm and may be capable of presenting any type data that may be received from a firearm. For example, the firearm scope 100 may present weapon status information and or magazine cartridge counts using one or more of the embodiments described in U.S. Pat. No. 10,557,676, dated Feb. 11, 2020, titled "FIREARM AMMUNITION AVAILABILITY DETECTION SYSTEM," which is hereby incorporated by reference in its entirety for all purposes.

The thin black arrows and thick gray arrows of FIG. 1 depict electric connection and optical propagation respectively. In certain aspects, the sight system or scope 100 may include an entrance window 112. The entrance window 112 may permit light rays from the target scene 115 to enter the sight system or firearm scope 100. Further, the scope 100 may include an exit window 114 that permits a user to view a direct view of the target scene 115 and/or an electronically transferred image of the target/target scene. The scope 100 may further include one or more optical subsystems 120, 124 that facilitate the forming or generating of infrared and visible images, respectively by, for example, focusing the light onto one or more sensors. Further, the scope 100 may include infrared image sensor 122, and visible image sensors 126 that can convert the infrared and visible images generated by the optical imaging subsystems 120, 124 into video or other types of electronic signals. The infrared image sensor 122 may include an IR focal-plane array or any other type of sensor capable of generating an infrared or thermal image from infrared light. Further, the visible image sensor may include a Complementary metal-oxide-semiconductor (CMOS) sensor or any other type of sensor capable of generating a user-visible image from visible light. Advantageously, because the target scene may be presented using a video-view, it is possible to use a larger entrance window 112 and/or exit window 114 compared to optical scopes that use lenses in the viewing path. Further, because lenses may be omitted from the viewing path, the shape of the entrance and/or exit window is not restricted and may include a square, rectangle, or other convenient viewing shape.

In addition, the scope 100 may include an electronic processing and control unit (EPCU) 110 that can receive and process the electronic signals generated by the image sensors 122, 126. The EPCU 110 may also control one or more of the electronic, optoelectronic, and electro-mechanical devices included in the scope. In some cases, the EPCU may facilitate data and/or control communication between one or more of the subsystems of the scope 100.

Further, the scope 100 may include a moveable or pivotable mirror 118 (a first redirection element) that enables a user to transition the view between a direct view and a video view. The pivotable mirror 118 may permit visible light to travel between the entrance window 112 and the exit window 114 when in a first position that does not interrupt the traversal of light within the scope 100. Conversely, the pivotable mirror 118 may redirect visible light received from the entrance window 112 towards the visible optical imaging subsystem 124 when in a second position. In some implementations, the pivotable mirror can be replaced by any redirection element, moveable or otherwise, that is configured to redirect the light within the visible wavelength range (380 to 740 nanometer) towards the visible optical imaging subsystem 124.

In some cases, the pivotable mirror 118 may be replaced by a dichroic mirror or beam splitter that permits light associated with some wavelengths to be transmitted while reflecting or redirecting light of other wavelengths. In some such cases, the beam splitter may have a luminance transmittance of 50% in the visible range. Other degrees of luminance transmittance are possible. For example, the beam splitter may have a luminance transmittance of between 40% and 60% or between 35% and 65%. In yet some other cases, the pivotable mirror 118 may be replaced by a switchable mirror, which can change from transparent to translucent, or vice versa, when an electric signal is applied. Thus, the switchable mirror can permit the transmission of light associated with certain wavelengths when in a first state associated with a first electric signal and reflect the light associated with the certain wavelengths when in a second state associated with a second electric signal. In some cases, the one of the states may be associated with the non-application of an electrical signal to the switchable.

Moreover, the scope may include a beam deflector 116 (or a second redirection element), or dichroic mirror/beam splitter, that may allow the transmission of light within a selected wavelength range (e.g., a visible light range, such as between 0.4 and 2 micrometers), while re-directing light within a different wavelength range (e.g., an infrared light range, such as between 5 to 15 micrometers) toward the infrared imaging subsystem 120, which is capable of focusing the infrared light into the IR image sensor 122.

Further, the pivotable mirror 118 may redirect the visible light, transmitted through the dichroic beam splitter 116, to a visible imaging subsystem 124 capable of generating an image on the visible image sensor 126. The scope may further include a first image projector 128 capable of generating and projecting a first image on an input image port. For example, the image projector 128 can be a video projector 128 that projects video images generated by the infrared 122 or visible 126 image sensors onto an input image port of a Direct-View display (DV-display) 130.

In some cases, the scope 100 may further include a second image projector (second projector) 132, configured to project a second image onto an input image port of the DV-display 130. The second image projector 132 can be a reticle image generator or a reticle projector that projects a bore sighted reticle image onto an input image port of the DV-display 130. In some cases, the second projector 132 projects the reticle image onto the same image port as the video projector 128. In other cases, the second projector 132 projects the reticle image onto a different image port than the video projector 128 projects its image. In some embodiments, the second projector may also project images that comprise symbology in addition to or instead of the reticle image.

In some cases, the user may view a combined or composite image 117 through the exit window 114. The composite image may be a superposition of the reticle image projected by the reticle projector 132 (second projector) and a target scene or image generated by one or more of the image sensors 122, 126 and projected by the first projector (video projector) 128.

In some cases, the composite image 117 may be a combination of a direct-view image formed from light that enters the entrance window 112 and traverses to the exit window 114 without intermediary processing, and the reticle image. Additionally, in some cases, the composite image 117 may include symbolic information. This symbolic information may, in some cases, include the reticle image. Further, the symbolic information may include additional or auxiliary information or symbols indicative of additional data. The EPCU 110 may obtain the auxiliary information from one or more sensors 119. As illustrated in FIG. 1, the sensors 119 may be included as part of the scope 100. Alternatively, or in addition, one or more of the sensors 119 may be external to the scope 100. For example, one or more of the sensors 119 may be sensors integrated with a firearm or magazine useable with a firearm. Examples of the symbolic information may include a number of cartridges within a magazine inserted into a firearm that includes the scope 100, a number of cartridges within a set of magazines registered with the firearm, battery life for one or more batteries in the scope 100, battery life for one or more batteries in the scope 100 or a magazine, wind speed, a distance from a target, an operating mode of the sight system, etc. The scope 100 may obtain data from the sensors 119 and/or other peripheral devices, through a wired or wireless communication channel. The wireless communication channel may be implemented using a Wideband Networking Waveform (WNW) or any other type of military communications protocol. Alternatively, or in addition, the wireless communication channel may use one or more personal or near-field communication protocols, including, but not limited to Bluetooth®, Zigbee®, and the like. In some cases, the communication between sensors 119 and/or peripheral devices, and the scope 100 may include direct contact electrical links, contact or non-contact optical links, and the like. The scope 100 may further include one or more user interface 134, which may enable the user to control and adjust various functions and parameters of the sight system (directly or via EPCU 110). For example, the user interface 134 may be used to activate/deactivate modes of the scope 100, to adjust or modify a configuration of the reticle image, to select symbology to display, and the like. The user interface 134 may be integrated with the sight system 100 or be individual modules (e.g., mounted on the weapon) that may communicate with EPCU 110 through wired, wireless, or optical links. The user may use the user interface to control the one or more images presented by the DV-display 130 via the second (exit) window 114 by enabling or disabling the first or the second projector.

In some cases, the scope 100 may further include a third projector, which may be a low power projector that generates an image and projects it onto an input image port of the DV-display 130. In some cases, the third projector projects the image onto the same image port as the video projector 128. In other cases, the third projector projects the image onto a different image port than the video projector 128 projects its image.

Example Scope

FIG. 2A illustrates a perspective view of an example firearm scope or sight system 200 in accordance with certain aspects of the present disclosure. The firearm scope 200 can include one or more of the aspects described with respect to the firearm scope 100.

The firearm scope 200 includes a housing 205 that may include two faces positioned at the two ends of the housing. One aperture may be provided on each face such that the scene 115 behind a first aperture on the first face can be directly seen by a user 113 looking through a second aperture provided on the second face. A first window 112 may be located in the first aperture provided on a first face of the scope 200 (also illustrated in FIG. 2C) and a second window 114 may be located in the second aperture provided on a second face of the scope 200 that is opposite to the first face (also illustrated in FIG. 2B). The first window 112 can be an entrance window that permits the entry of light. The light that enters the entrance window 112, may directly propagate toward the exit window 114 and/or be used to generate one or more video images that may be displayed using the DV-display 130. The second window 114 can be an exit window that permits a user to directly view the scene 115 behind the first window 112 and/or one or more images provided through the DV-display 130.

The entrance window 112 may be formed from a material that is transparent (e.g., transmits at least 60% of the incident light) within a wavelength range spanning the visible light spectral range (e.g., 0.4-0.8 micrometers), near infrared light spectral range (e.g., 0.8-2.5 micrometers), mid infrared light spectral range (e.g., 2.5-8 micrometers), and long infrared light spectral range (e.g., 8-15 micrometers). In some cases, the material may also be transparent to the far infrared light spectral range (e.g., 15-100 micrometers). As a non-limiting example, the entrance window 112 can be formed from zinc sulfide. However, the entrance window 112 may be formed from other at least partially transparent materials. FIG. 2D shows the measured transmittance (a ratio between incident and transmitted optical intensities) through an example entrance window using zinc sulfide, plotted against the wavelength of the incident light. Additionally, in some implementations, the exit and/or entrance windows 114, 112, respectively. can include antireflection (AR) coatings (on one or both sides) to reduce reflection of visible and/or infrared wavelengths.

The exit window 114 may be formed from a material that is transparent at least for visible light. For example, the exit window 114 may be formed from a material having a luminous transmittance of greater than 80% using CIE illuminant D65. Some examples of materials that may be used for the exit window 114 include fused silica and other types of optical glasses, Plexiglass®, acrylic, plastic, or other materials that are transparent in the visible wavelength range. In some examples, the exit window 114 may be formed from a material that is transparent (e.g., transmits at least 60% of the incident light) within a wavelength range spanning the visible light spectral range (e.g., 0.4-0.8 micrometers), near infrared light spectral range (e.g., 0.8-2.5 micrometers), mid infrared light spectral range (e.g., 2.5-8 micrometers), and long infrared light spectral range (e.g., 8-15 micrometers). In some implementations, the exit window 114 can be tilted with respect to the entrance window 112 to prevent multiple collinear reflections between the two windows (112 and 114), between the exit window 114 and the DV-display 130, and/or between the entrance window 112 and the DV-display 130. The entrance window 112 and exit window 114 can both have different shapes (for example, circular or rectangular) and/or different thicknesses (for example between 2-5 mm). The entrance window 112 and exit window 114 can have the same or different shapes from each other. In some implementations, the entrance and exit windows 112, 114 may be configured differently or the same. Further, in some cases, the entrance window 112 may include one or more of the aspects described with respect to the exist window 114, and vice versa.

The housing structure 205 may be formed using metal, plastic, composites, a combination of materials, or other materials that may be both durable and lightweight for military applications and/or sport applications.

One or more interfaces may be provided on the housing 205, permit the user to electronically or mechanically adjust one or more features of the firearm scope 200. For example, the user interface controls 134 may enable the user to adjust a visible intensity of a reticle image and/or the reticle's position with respect to the exit window 114, switch between supported sight modes (for example, direct view, daylight video view, IR or thermal video view, and the like), adjust an amount of digital or electronic zoom, and the like. A user interface 134 may include buttons, or knobs attached to the housing and/or the electronic compartment. Alternatively, or in addition, a user interface 134 may include a touchscreen and/or haptic interface. In some implementations, the user interface 134 may be provided as a separate system that is remote from the firearm scope 200. For example, the firearm scope 200 may be controllable from a user interface that is part of a weapon capable of supporting the firearm scope 200. This remote user interface may communicate with the EPCU 110 through electric wires, a wireless link (e.g., Bluetooth), an optical link, or any other type of communication interface capable of providing commands from a remote user interface to the scope 200. In other implementations, the user interface 134 may be provided as a separate system mounted on a weapon rail of a weapon. In some such cases, in addition to wired, wireless and optical links, the user interface may communicate with the EPCU using a micro rail communication module, which may enable digital communication over power lines that may be integrated with the rail.

The housing 205 can include a rail mount 202 that allows the firearm scope 200 to be permanently or removably mounted to a mount of a weapon, for example, a receiving or mounting rail of a firearm, weapon system, or other device that may exploit the functionalities provided by the firearm scope 200. In some examples, the mount may comprise a Picatinny rail or a Weaver rail. The firearm scope 200 may be attached to a firearm or weapon using any type of attachment mechanism that enables the firearm scope 200 to be securely affixed to the weapon. For example, the firearm scope 200 may have a thumbscrew 204 that can be used to manually tighten and loosen the rail mount 202 to or from a receiving rail on a weapon. As another example, the firearm scope 200 can be attached using a snap-in mechanism, hooks, screws, bolts, and the like.

In some implementations, the housing 205 can include one or more mounting rails 206, which may be integrated with or otherwise attached to the housing 205 for mounting, powering, and/or connecting add-on modules to the firearm scope 200. In some cases, the add-on modules may also be bore-sighted. These add-on modules may include, for example, an ultraviolet imager, an infrared illuminator, a laser pointer, or the like. The mounting rails 206 and/or the rail mount 202 can be configured to be compatible with Picatinny rails, Weaver rails, or the like.

In some cases, the rail mount 202 and/or the integrated rail mounts 206 can be configured to provide and/or receive power to/from the firearm and/or the add-on modules. The power can be provided or received through inductive coupling or a direct electrical connection. The mounting rail 106 and/or the rail mount 102 may be also configured to exchange data between the firearm scope 200, the add-on modules, and/or the firearm (or other device) to which the firearm scope 200 is attached. Further, the data can be exchanged through non-contact optical, contact optical, direct contact electrical links, capacitive data transfer, or inductive data transfer.

The firearm scope 200 can include one or more power sources situated within or outside of the housing 205. For example, the housing 205 can include one or more separate batteries to provide power to the reticle projector and/or the electronic processing and control module (EPCU) 110. In some cases, the one or more batteries that power elements of the firearm scope 200 may be within the same compartment as the EPCU 110 and/or other electronics within the firearm scope 200 (e.g., the image sensors 122, 126). In other cases, one or more batteries may be housed in separate detachable compartments attached to the firearm scope 200. In yet some other cases, a power source can be positioned in a separate location from the firearm scope 200 and can be connected to the electronics of the firearm scope through electrically conductive lines. For example, one power source may be located within a handle of a firearm or weapon system and may be electrically connected or coupled to the firearm scope 200 (for example, via a mounting rail).

In certain aspects, the firearm scope 200 may be divided into multiple compartments. For example, the housing 205 may have three compartments: an optical compartment 208, an electronics compartment 210, and a battery compartment 211. More or fewer compartments may exist. For example, the components included in the electronics compartment 210 and the optical compartment 208 may be combined into a single compartment. As another example, the battery compartment 211 may be separated into two compartments, each having a separate battery. For instance, one battery compartment may have a battery (or set of batteries) to power the EPCU 110, and another compartment may have a battery (or set of batteries) to power the reticle projector 132.

The electronic compartments 210 can house the EPCU 110. The EPCU 110 may include electronic circuits that control and monitor an image sensor, a pivotable mirror, one or more the power sources, or other sensors 119 (e.g., inertial sensor, altimeter, wind sensor, light sensor etc.) and add-on devices (e.g., laser rangefinder, infrared illuminator) that may be included with or attached to the scope 200. Additionally, the electronic compartment can include image acquisition and processing circuitry, and data acquisition (e.g., from sensors) and processing circuitry that may provide information pertaining the weapon or the environmental condition that may be used by the shooter during target acquisition and effective employment of the weapon.

Figure 3A:
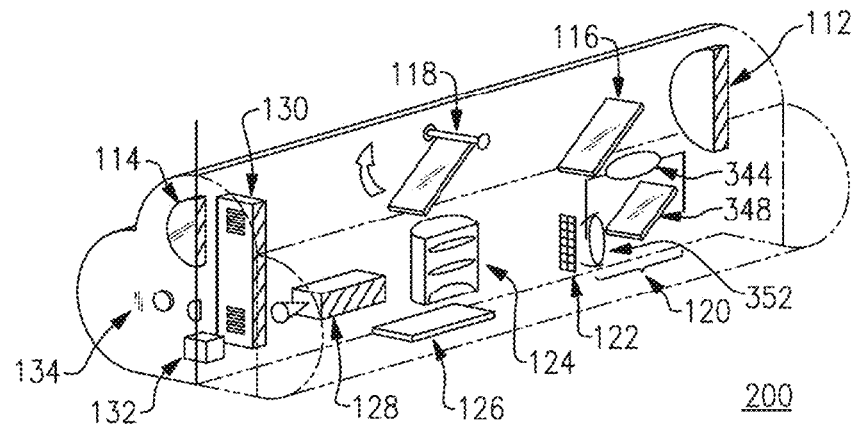
FIG. 3A illustrates a cross-sectional perspective view of the optical compartment of an example sight system in accordance with certain aspects of the present disclosure.
Figure 3B:
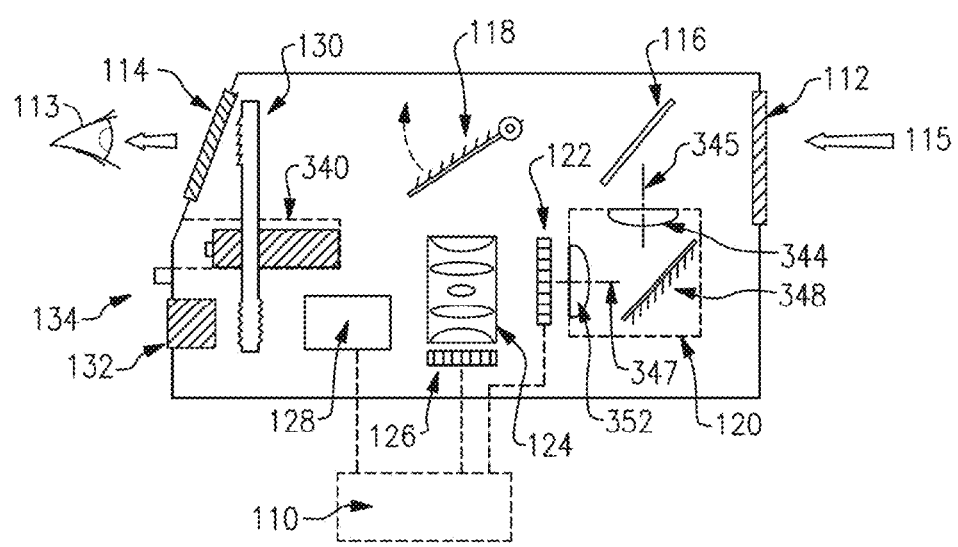
FIG. 3B illustrates a side-view cross-section of the optical compartment of an example sight system in accordance with certain aspects of the present disclosure.

FIGS. 3A and 3B illustrate a perspective cross sectional view and a side view of the optical compartment 208 of the example firearm scope 200. The components within the optical compartment 208 may be arranged and/or configured to enable direct view and/or video view, while providing a bore-sighted reticle image and/or symbolic information as a single composite image. The optical compartment 208 may include an entrance window 112 and an exit window 114 placed in the apertures provided on the first and second faces of the optical compartment respectively. Light may enter the scope through the entrance window 112 and the direct view or the video images may be viewed by the user through the exit window 114. The optical compartment 208 may further include a beam splitter 116, a pivotable mirror 118, an IR imaging subsystem 120, a visible imaging subsystem 124, an IR image sensor 122, and a visible wavelength image sensor 126. The beam splitter 116 may redirect a portion of incident IR light toward an IR imaging subsystem 120 while allowing transmission of a portion of incident visible light toward the pivotable mirror 118. The pivotable mirror 118 may redirect the incident visible light toward the visible imaging subsystem 124. The IR imaging subsystem 120 forms an IR image on the IR image sensor 122 that converts it to an electronic signal. The visible imaging subsystem 124 forms a visible image on the visible image sensor 126 that converts it to an electronic signal. Further, the optical compartment 208 may include a video projector 128 (that generates visible video images using the electronic signals received from the IR image sensor 122 or the visible image sensor 124), a reticle projector 132 that may generate an image of a reticle and a DV-display 130 that may generate a combined (composite) image by superimposing the images received from various projectors on board (e.g., reticle projector 132 and video projector 128) and the image seen directly through the optical path extended from the entrance window 112 to the exit window 114. The DV-display 130 may project the image of the reticle into the same plane as the video image, which may be associated with an electronic signal received from the IR image sensor 122 or the visible image sensor 124. Advantageously, by projecting the reticle image into the same plane as the video image (e.g., the visible light video image and/or the IR image), the positioning of the reticle may remain unchanged when the user views the images at different angles with respect to the video images. Further, as the video image and the reticle image are projected in the same plane, the perceived relative position of the images to each other remains constant regardless of the position of the user's eye; as a result, a larger entrance and/or exit window may be used compared to traditional scopes and/or scopes that use optics within the viewing axis.

The beam splitter 116 may be a dichroic beam splitter or a wavelength selective reflector (or mirror) that allows a portion of optical intensity within a first wavelength range (e.g., in the visible region) to be transmitted while reflecting a portion of optical intensity within a second wavelength range (e.g., in the IR region). For example, the dichroic beam splitter may transmit more than 90% of the optical intensity having a wavelength between 0.4 micrometers and 0.9 micrometers and reflect more than 90% of the optical intensity having a wavelength between 8 micrometers and 15 micrometers. The beam splitter 116 may be positioned between the first window 112 and the pivotable mirror 118. Further, the beam splitter 116 may be positioned above the IR imaging subsystem 120. The described relative positioning of the elements described herein is exemplary, and that other positions are possible. For example, the beam splitter 116 may be positioned below the IR imaging subsystem 120 and the beam splitter 116 may reflect infrared light up towards the IR imaging subsystem 120.

The dichroic beam splitter 116 may be tilted with respect to the front window 112 to reflect the incoming light beam toward the IR imaging subsystem 120. For example, the angle between the first window 112 and the beam splitter 116 can be 45 degrees or 60 degrees. The beam splitter 116 may be formed from a piece of material that may transmit, for example, 90% of the optical intensity within a selected wavelength range (e.g., between 0.4 micrometers and 0.9 micrometers) with one or more dielectric layers coated on the side of the beam splitter 116 facing the entrance window 112. The coated layer may reflect more than 90% of the optical intensity within the long wavelength IR (LWIR) range (e.g., 8-15 micrometers).

The pivotable mirror 118 may be positioned between the beam splitter 116 and the DV-display 130. The state of the pivotable mirror can be switched between "ON" and "OFF" states, or between a video-view state and a direct-view state. In the OFF or direct-view state, the pivotable mirror 118 may be positioned to not block the optical path between the beam splitter 116 and the DV-Display 130. In cases when the pivotable mirror 118 is in the OFF state, the user can directly see a scene behind the entrance window 112 (e.g., the target). In the ON state, the pivotable mirror 118 may be positioned to reflect the light rays emerging from the beam splitter 116 toward the entrance aperture of the visible imaging subsystem 124 enabling a visible light video view. In other words, the reflection of the light towards the visible imaging subsystem 124 enables a video digital image of the target scene 115 to be generated for presentation to a user on the DV-display 130. The state of the pivotable mirror 118 can be electronically or mechanically controlled by the user. The pivotable mirror 118 can be a metallic or dielectric mirror that reflects, for example, more than 95% or the optical intensity in the visible range (e.g., between 0.4 and 0.9 micrometers). As another example, the pivotable mirror can be a silver coated mirror which reflects more than 89% of optical intensity between 0.4 micrometers and 10 micrometers. The pivotable mirror 118 can be a pivotable mirror that in the OFF state can be pivoted up, or out of an incident path of the visible light, or in the ON state can be pivoted down, or into the incident path of the visible light, by mechanical rotation or movement, which may be controlled mechanically or electrically. Alternatively, the state of the pivotable mirror 118 can be switched using a step motor (or other electro-mechanical actuators) controlled by the user via the user interface 134 and/or EPCU 110. In some cases, the pivotable mirror 118 can be an electrochromic mirror mounted at a particular position and/or a particular angle (e.g., 45 degrees or 60 degrees) with respect to the optical axis of the visible imaging subsystem 124. The state of the electrochromic mirror can be switched by the user by means of electronic signals sent from the EPCU 110 to the electrochromic mirror. In the ON state, the electrochromic mirror 118 may reflect more than 90% of the optical intensity having a wavelength within the visible range (e.g., 0.4-0.9 micrometers). In the OFF state, the electrochromic mirror 118 may transmit more than 90% of optical intensity having a wavelength within the visible range (e.g., 0.4-0.9 micrometers).

The infrared imaging subsystem 120 may be positioned below the dichroic beam splitter 116 and in front of the infrared image sensor 122. As previously described, the relative position of elements as described herein is exemplary, and other positions are possible. Thus, for example, in some other cases the infrared imaging subsystem 120 may be positioned above the dichroic beam splitter 116. The infrared imaging subsystem 120 may function as an infrared telescope. Further, the exit aperture of the imaging subsystem 120 may be rotated with respect to the entrance aperture. For example, the exit aperture may be 90 degrees rotated with respect to the entrance aperture. The infrared imaging subsystem 120 may generate a thermal image of objects placed at distances much larger than the focal length of the system. A thermal image may include an image that illustrates and/or is formed based on an amount of heat that one or more objects generate or emit. For example, the heat of a human or animal may be distinguished from the heat emitted by a brick or wooden wall.

The infrared imaging subsystem 120 may comprise a first lens (objective lens) 344, an IR mirror 348 and a second lens (eyepiece) 352. In some non-limiting implementations, the optical axis 345 of the first lens 344 is rotated with respect to the optical axis 347 of the second lens 352 (e.g., the rotation angle can be 30, 45, 60 or 90 degrees). The focal length of the first lens 344 may differ (for example, be larger) than the focal length of the second lens 352. Further, the infrared mirror 348 can be placed at an angle (e.g., 45 degrees or 60 degrees) with respect to the optical axis 345 of the first lens 344 to deflect the light rays emerging from first lens 344 by 90 degrees.

In some implementations, the first and second lenses can be formed from a piece of material coated with one or more dielectric layers that transmit more than 80% of the incident optical intensity having a wavelength between 8 and 15 micrometers. For example, the first and second lenses may be formed from a piece of germanium coated with one or more dielectric layers such that the lens transmits more than 84% of the incident optical intensity having a wavelength in the LWIR range (e.g., between 8 and 15 micrometers). The coated dielectric layers may form a broadband antireflection (BBAR) layer. The IR mirror 348 can be made of semiconductor, dielectric, or metallic materials. In some cases where the IR mirror 348 is made from a semiconductor or dielectric material, the reflecting surface of the IR mirror 348 that faces the first lens 344 and second lens 352 may be coated with a layer that reflects, for example, more than 95% of the incident optical intensity having a wavelength in the LWIR range (e.g., between 8 and 12 micrometers). As another example, the IR mirror 348 may be a metallic mirror comprising a gold layer disposed on an aluminum substrate (e.g., aluminum 6061-T6), which reflects more than 98% of the incident optical intensity having a wavelength between 2 and 12 micrometers.

The IR image sensor 122 may be positioned at the exit aperture of the infrared imaging system 120. The IR image sensor 122 may convert the optical intensity variations in the IR wavelength range (e.g., wavelength in the 1-15 micrometers range) to a video signal or other type of electronic signal (e.g., digital). Further, the IR image sensor 122 can generate an image, or electronic data that can be converted into an image and may be projected by the video projector 128. In some cases, the EPCU 110 may process data received from the IR image sensor 122 to generate or refine an image. The image generated by the image sensor 122 or the EPCU 110 may appear equal in size to a user as a target scene 115 directly viewed by a user (e.g., using a direct-view mode or without using a scope). Alternatively, the image generated by the image sensor 122 may be zoomed in or out compared to directly viewing the target scene 115.

In some implementations, the IR image sensor 122 may be, or may include a focal-plane array (FPA). For example, the IR image sensor 122 can be a focal-plane array (FPA) of 640 by 480 pixels where the size of each pixel may vary between 10 and 20 micrometers. The FPA can be sensitive to infrared radiation with wavelengths between 2 micrometers and 6 micrometers, between 6 and 8 micrometers, or between 2 and 15 micrometers. The FPA may also be a thermal image sensor that is sensitive to LWIR or thermal radiation having a wavelength between 8 micrometers and 15 micrometers. The IR image sensor 122 can be configured to generate the same bore sighted image as the direct view channel. The IR image sensor 122 can be a cooled or uncooled image sensor. Cooling the image sensor may reduce the electronic noise in the sensor. If cooled, the IR image sensor 122 may be placed on a cooling device (e.g., thermo-electric cooler, TEC) that may be provided to maintain its temperature below a selected value (e.g., −10, −20, or −40 or −80 degrees centigrade).

In some aspects, the IR image 122 sensor can be a zoom-capable imager. In some cases, the user can adjust the magnification settings of the IR image sensor 122 using one or more user interfaces. In some cases, the combination of the infrared image sensor 122 with the infrared imaging subsystem 120 can provide an effective field of view of between 2 degrees and 18 degrees depending on the selected magnitude of the digital zoom. For example, in a case without magnification when the video image is the same size as the direct view image, the field of view can be 18 degrees. In contrast, when the magnification is set to 8×, the field of view may be reduced to 2 degrees. For any given magnification, the effective field of view may exceed 18 degrees (e.g., the effective field of view may be 30, 60, 90 degrees)

The IR image sensor 122 can be made of a semiconductor material. For example, the IR image sensor 122 can be made of mercury cadmium tellurite (HgCdTe) or an antimonide based material (e.g., InAs, GaSb, AlSb). The semiconductor material can be a superlattice made of one or more of the aforementioned materials. Alternatively, the IR image sensor 122 can also be formed from an array of microbolometers.

The visible imaging subsystem 124 may include one or more of the aspects described with respect to the infrared imaging subsystem 120. Further, the visible image sensor 126 may include one or more of the aspects described with respect to the infrared image sensor 122.

The visible imaging subsystem 124 may be positioned below the pivotable mirror 118 and above the visible image sensor 126. As previously described, the relative position of elements as described herein is exemplary, and other positions are possible. Thus, for example, in some other cases, the visible imaging subsystem 124 may be positioned above the pivotable mirror 118 and below the visible image sensor 126. The visible imaging subsystem 124 may generate a real or visible light image of one or more objects viewed via entrance window 112. These objects may be placed at distances much larger than the focal length of the imaging subsystem 124. The visible light subsystem 124 may operate within the visible wavelength range (e.g., 380-740 nanometers) or an extended wavelength range that includes the near IR region (e.g., 0.4-2.5 micrometers).

The visible image sensor 126 may be positioned at the image plane of the visible imaging subsystem 124. The visible image sensor 124 may convert the spatial variations of optical intensity in the visible wavelength range or visible and near IR wavelength ranges, to a video signal or digital data. The image sensor may be placed below the visible imaging subsystem 124 at its focal length (image plane). For example, the visible image sensor 126 can be a focal-plane array (FPA) with 3848 by 2168 pixels where the size of each pixel size may vary between 2 and 4 micrometers. The peak sensitivity of the visible image sensor 126 may be in the visible wavelength range, for example, between 0.4 micrometers to 0.7 micrometers. The visible image sensor 126 can be configured to generate the same image that is viewable via the direct view channel. Alternatively, or in addition, the visible image sensor 126 may formed a zoomed in or out image of what may be viewable via the direct view channel. The displayed image may be a bore-sighted image.

The visible image sensor 126 can be any type of sensor that can generate an image based on visible light. For example, the visible image sensor 126 may be a charge coupled display (CCD) sensor or a CMOS sensor. Further, the visible image sensor 126 can be a zoom-capable imager capable of generating a zoomed image that can be smaller or larger compared to the direct-view image. The amount of magnification can be adjusted by the user through one or more user interfaces. Further, the visible image sensor 126 can be combined with the imaging subsystem 124. The combined visible image sensor 126 and imaging subsystem 124 can have an effective field of view of between 2 degrees and 18 degrees. The generated image of the visible image sensor 126 can be converted to an electronic signal that is based in part on the magnitude of the selected digital zoom. For example, when no magnification is selected, the video image may be the same size as the direct view image, or the view of the target scene 115 through the direct-view channel, or without the scope 200. In some such cases, the field of view can be 18 degrees. In contrast, when a magnification of 8× is selected, the field of view may be reduced to 2 degrees. For any given magnification, the effective field of view may exceed 18 degrees (e.g., the effective field of view may be 30, 60, 90 degrees)

The electronic signals generated by the visible image sensor 126 or the IR image sensor 122 may be received, amplified, and processed by the EPCU 110 to generate a video signal. This video signal may be provided to a projector 128 that generates or projects an image on the DV display 130. The projected image may be based on the image projected on the visible image sensor 126 by the visible imaging subsystem 124 and/or on the image projected on the IR image sensor 122 by the IR imaging subsystem 120. The image generated by the projector 128 may be output by an exit aperture of the projector 128. The video projector 128 can be an LCD- or LED-based monochrome or color micro display. The video projector 128 can be configured to project imagery, symbology, and/or other types of visual data received from EPCU 110. The video projector 128 may be positioned such that it can provide an image corresponding to the image received by one of the image sensors 122, 126 to the DV-display 130.

Figure 4A:
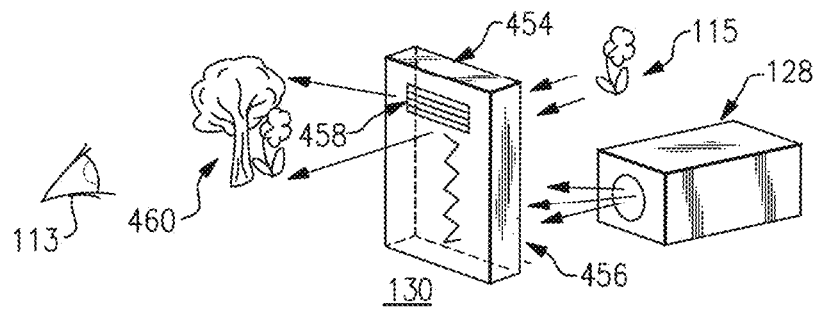
FIG. 4A illustrates a perspective view of an example direct view display (DV-display) with one input image port and one output image port.

FIG. 4A illustrates a perspective view of an example DV-display 130 (also referred to as holographic display or waveguide display). The DV-display 130 may be used to simultaneously observe a scene 115 (e.g., a target scene) behind the DV-display 130 (or external to the scope 200) and a video image received from the projector 128 as a composite image 460. For example, the DV-display 130 may be configured to project an image received from the projector 128 on the same image plane where the scene is imaged such that an observer 113 (a user of the firearm scope 200) can simultaneously focus on both parts of the composite image 460 (the scene image and the projected image). In some cases, by simultaneously viewing the scene 115 and a video image, an augmented reality image may be formed. In the example shown the composite image 460 may be an augmented reality image.

Alternatively, or in addition, the DV-display 130 may be used to observe the video image projected from the projector 128 without directly viewing the scene 115. In yet other cases, an observer may view the scene 115 through the DV-display 130 without viewing a video image, or while viewing a reticle image, but not a video-image of a scene.

The DV-display 130 may be positioned inside the scope housing 205 (or inside the optical compartment 208 of the housing 205) such that its output image port 458 faces the exit window 114 and its input port 456 faces the exit aperture of the projector 128. The DV-display 130 may receive an image from the video projector 128 through its input image port 456 and may output a corresponding image through its output image port 458 that may be seen by the observer 113 through the exit window 114. Simultaneously, if light rays entering the scope 200 via the entrance window 112 are incident to the DV-display 130, the observer 113 may also see an image of the outside world (scene 115) or a direct view image. As such, the DV-display 130 can superimpose the video image received from the projector 128 with the direct view image received through the entrance window 112 to form an augmented reality display.

The DV-display 130 can be a waveguide display. The waveguide display can be a transparent display substrate comprising a waveguide 454 such as a slab waveguide 454 formed from a piece of material that is transparent in at least the visible wavelength range (e.g., having a luminous transmittance of greater than 80% using CIE illuminant D65) and can transport the image received from one or more input image ports 456 to the output image port 458. In some examples, the waveguide 454 can be a holographic waveguide or any other type of waveguide that can be used to facilitate displaying a video image to an observer while permitting the observer to see through the waveguide when the scope operates in a direct-view mode or a combined direct-view and video and/or thermal view mode.

The image may be transmitted from the input image port(s) 456 to one or more output image ports 458 by means of total internal reflection (TIR). The input image port 456 may be disposed at or near one edge (e.g., a bottom edge) of the waveguide 454 and the output image port 458 may be disposed at or near a different edge (e.g., a top edge) of the waveguide 454. The input image port 456 may be configured to receive an image (e.g., from a display or projecting device) and transform it into guided waves (or a bundle of optical rays propagating inside the waveguide) that can travel inside the slab waveguide 454. The output image port 458 may be configured to transform the guided waves (or a bundle of optical rays) into an output image 460 that can be observed while looking at the scene behind the slab.

Figure 4B:
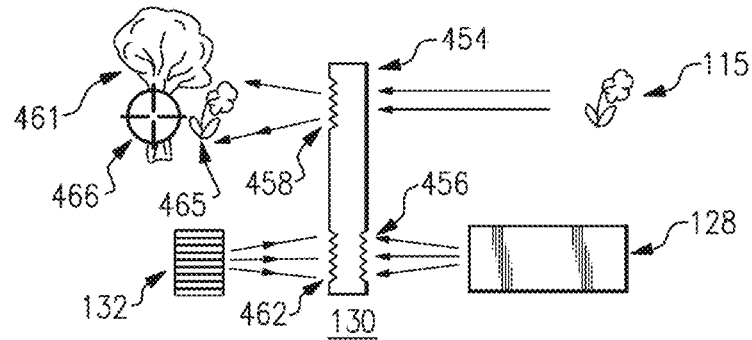
FIG. 4B illustrates a side-view of an example DV-display with two input image ports and one image output port.

In some implementations, the DV-display 130 can have a first input image port 456 and a second input image port 462 disposed on the same or opposite faces of the waveguide 454 near a particular edge (FIG. 4B). Although not limited as such, the input and output ports of the waveguide 454 may be positioned near an edge so that the various electronics and non-transparent components of the scope 200 are not positioned within the direct-view channel preventing the components of the scope 200 from blocking a user's direct-view of a target scene 115. Further, the first input image port 456 and the second input image port 462 can be a first optical input location and a second optical input location of the waveguide display (DV-display) configured to receive two separate images from two distinct projecting devices. The two separate images received from the first input image port 456 and the second input image port 462 may be guided by the waveguide 454 and generate a composite image through the output image port 458 of the waveguide 454. The composite image may be superimposed on the direct-view image seen through the transparent waveguide 454. The waveguide 454 may be configured to project the image received at the first image input port 456 and the image received at the second input port 462 into the same image plane so that an eye of the observer 113 (e.g., a user of the firearm scope) can simultaneously focus on different parts of the composite image. Advantageously, by projecting both images into the same plane the positioning of the two images remain unchanged when the user views the images at different angles with respect to the video images.

In the example shown in FIG. 4B, the first input image port 456 and a second input image port 462 may be disposed on the opposite faces of the waveguide 454. The first image 461 is received from the first projector 128 and the second image 466 is received from the second projector 132. These images 461, 466 may be superimposed on the direct view image 465 of the scene behind the DV-display 430 resulting in a composite image. In the example scope 200 shown in FIGS. 3A and 3B, this composite image can be viewed through the exit window 114. As a non-limiting example, the second projector 132 can be a reticle projector 132 and the second image 466 can be the image of a reticle generated by the reticle projector 132. The reticle image 466 generated through the output image port 458 of the DV-display 130 can be parallax free within the field of view of the sight system. In some implementations, the reticle projector 132 can be configured to project alternative or additional symbology corresponding to data generated or received by the scope 200. For example, the reticle projector 132 can project a magazine cartridge count associated with a number of cartridges within a magazine inserted into a weapon. In yet other cases, a separate projector may be used to project symbology that is separate from the reticle projector 132. As described above, the reticle image 466 and the first image 461 (e.g., a video image generated using an electronic signal received from the IR image sensor 120 or the visible image sensors 126), may be projected on the same image plane. Advantageously, when the first image 461 and the reticle image 466 are projected in the same plane, the perceived relative position of the reticle image 466 and the first image 461 to each other remains constant regardless of the position of the user's eye; as a result, a larger entrance and/or exit window may be used compared to traditional scopes and/or scopes that use optics within the viewing axis.

In some cases, coupling optics (e.g., an optical beam combiner) may be used to combine multiple images received from different image sources or projectors to form a composite image. The composite image may then be supplied to one of the input ports 456 or 462 of the DV-display 130.

For example, the coupling optics may combine a first image output by the first image projector 128 and a second image output by the second projector 132, to obtain a third image comprising the second image superimposed on the first image. Subsequently, the coupling optics may project the third image onto the first image port 456 or the second image port 462 so that the user can observe the third image via the output image port 458.

Figure 4C:
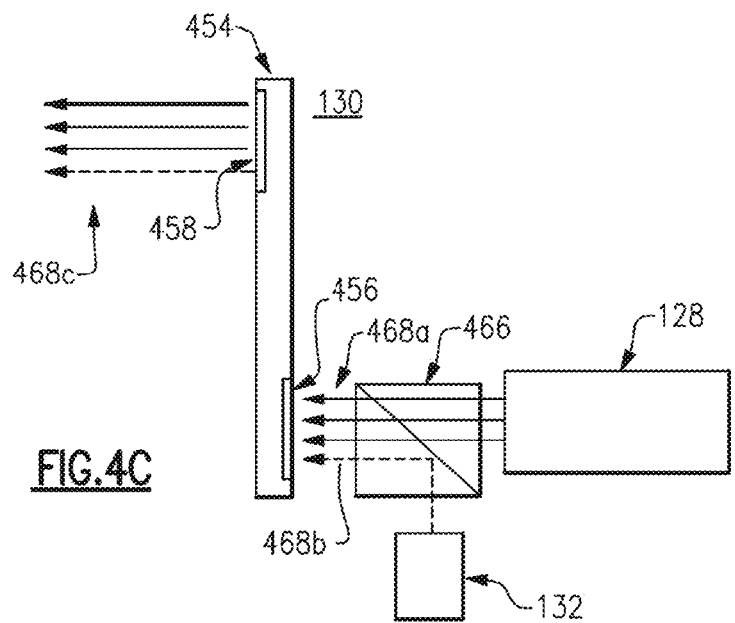
FIG. 4C illustrates a side-view of an example DV-display with one input image port and one image output port that receives a composite image generated by two projectors and a beam combiner.

In some examples, a beam combiner may be used to combine images received from multiple sources. The multiple sources may include multiple projectors or a projector and light receiving from an input window. FIG. 4C illustrates a DV-display 130 with a single image input port 456 configured to receive a composite image from a beam combiner 466. The beam combiner may include any type of lens, dichroic mirror, or other device that can combine beams or rays of light. The beam combiner 466 can receive a first image from a first projector 128 (e.g., a video projector) and a second image from a second projector 132 (e.g., a reticle projector, a thermal image projector, or a second video projector) and outputs a composite image comprising a superposition of the first and the second images. In the example shown, a bundle of rays 468a, illustrated by the solid line arrows, represent the first image received from the first projector 128 (e.g., an image generated using a video signal received from the visible image sensor 126 or the IR image sensor 122), and the ray 468b, illustrated by the dotted line arrow, represents the second image received from the second projector 132. The beam combiner 466 (a beam splitting cube in this case), may be configured to allow the bundle of rays 468a to pass without refraction and reflect (or redirect) the ray 468b, received from a direction perpendicular to the direction of propagation of the bundle of rays 468a, such that all rays are normally incident on the input image port 456. The rays may be received at different angles than illustrated with the beam combiner 466 being positioned at an angle that enables the beams from the two sources to be combined. Once coupled to the waveguide 454, the rays 468a and 468b propagate towards the image output port and are coupled out as a single bundle of rays 468c (representing the composite image formed by combining the first and the second image). The beam combiner 466 can be a beam splitter cube (the example shown) comprising two right-angle prisms glued together along their major surfaces. When used in reverse the beam splitter cube may function as a beam combiner. In some examples, the beam combiner 466 can be a holographic beam combiner or other type of optical beam combiner. Further, more than two sources can be combined by the beam combiner. For example, a visible light video image, a thermal image, and a reticle image can be combined with the beam combiner 466. In some cases, multiple beam combiners may be used. For example, the visible light video image may be combined with a thermal or LWIR image using a first beam combiner. The resultant image may be combined with a reticle image using a second beam combiner. The resultant image from the second beam combiner may be provided to the waveguide 454 via the input port 456 and presented to the user via the output port 458.

Advantageously, using a single DV-display with a beam combiner may reduce the overall size of the display system while supporting displaying composite images. For example, using a single port DV-display and a beam combiner in firearm scope 200 or 1300, may allow positioning both projectors (e.g., the video projector 128 and the reticle projector 132) on the same side (e.g., the right side (FIG. 12A) or on the left side (FIG. 15A)) of the DV-display 130. In some cases, positioning both projectors on the same side enables the DV-display 130 to be positioned closer to the rear side of the housing (near the exit window 114) compared to embodiments that position a projector on each side of the DV-display 130. In some embodiments, the space freed up by positioning both projectors on one side of the display may be used to place some of the electronic components or systems. In some other embodiments, moving both projectors on one side of the DV-display 130 may allow positioning the DV-display closer to rear end of the firearm scope 200 or 1300 and closer the exit window 114; such configuration may facilitate viewing images projected via the DV-display 130 while reducing the overall size of the housing and therefore the firearm scope 200 or 1300.

In some embodiment, a third video projector may generate a third image and couple the third image to the waveguide 454 through the first or second input image port (e.g., image input port 456 or 462). In some other embodiments, the slab waveguide 454 may have a third input image port to receive the third image projected by the third camera. In yet other embodiments, the image generated by the third video projector may be combined with the image generated by the first or the second projector using a beam combiner and may be coupled to the waveguide 454 via the first or the second input image port. In various embodiments, multiple beam combiners may be used to generate composite images based on images received from multiple projectors and couple the composite images via one or more ports of the DV-display.

In some examples, the third projector may be a low power projector that also receives video signals from the IR image sensor 122 and/or the visible image sensor 126. Advantageously, in certain embodiments, the power consumption of the scope can be reduced by using the third projector in video-view mode. In some cases, the low power projector can be a projector with lower resolution, lower brightness, or support a narrower range of colors.

The images emerging from the DV-display 130 (e.g., images received from the visible image sensor, the IR image sensor, and/or the reticle projector) can be collimated so that the user's eye can simultaneously focus on the superimposed images or the composite image. Moreover, each of the images constituting the composite image can be boresighted.

The input image port(s) 456, 462 and the output image port 458 of the waveguide 454 may comprise one or more diffraction gratings (e.g., surface grating or holographic gratings) disposed on an optical input location or on an optical output location of the waveguide 454. The diffraction gratings may include periodic structures that are disposed along one of the faces of the slab waveguide 454 and can convert an image to a guided wave and vice versa. In some other implementations, the input image ports 456, 462 and the output image ports 458 may include transreflective micro-mirrors or transparent mirrors embedded inside the waveguide 454. The diffraction gratings can be etched or optically generated on or below the surface of the waveguide 454. The entrance or exit gratings may comprise multiple diffraction gratings. The diffraction gratings may be disposed using direct writing (e.g., using a focused ion beam device) or lithography that uses patterned photoresist and etching. In the lithographic approach, the photoresist may be pattered using a photomask, e-beam, or holography. In some such cases, where the gratings are generated using holographic methods) the resulting DV-display 130 may be referred to as holographic waveguide display.

The diffraction gratings in the input image port may be configured to diffract light projected by a projector into a point of ingress of the waveguide (e.g., a holographic waveguide), such that the resulting diffracted light propagates inside the waveguide 454 and is guided by the waveguide 454. The diffraction gratings in the output image port may be configured to diffract guide light inside the waveguide, such that the resulting diffracted light is coupled out of the waveguide and propagate, in free space, toward the exit window 114.

In some embodiments, the DV-display may include a stack of waveguides (or waveguide layers) that may receive one or more images from one or more input image ports. Each waveguide may have an input image port comprising one or more diffraction gratings (e.g., one or more surface relief gratings or holographic gratings), configured to couple a portion of an image received from an image projector (e.g., first projector 128 or the second projector 132) to the waveguide layer. In some cases, the portion of image can be a portion generated by light having a wavelength within a specific wavelength range associated with the waveguide layer. For example, each waveguide layer in the stack of waveguides may be configured to receive and transport light within a specific wavelength range associated with a color (e.g., blue layer for blue light having wavelength between 0.400 and 0.520 micrometers, green layer for green light having wavelength between 0.520 and 0.520 micrometers, and red layer for red light having wavelength between 0.625 and 740 micrometers). In some examples, different portions of an RGB output of a projector may be received via the input image ports of different waveguide layers and generate a color image at an output image port of the stack of waveguides. The output image port of the stack of waveguides can be an output image port that receives images from the output ports of the waveguide layers. In some embodiments, where the DV-display 130 includes a stack of waveguides, the DV-display 130 can generate a composite image (e.g., by the superposition of two or more images transported by two or more of the waveguide layers) through an output image port.

In some embodiments, an image projector (e.g., the first image projector 128 or the second image projector 132) may be configured to project the light within the red wavelengths to an input port of the red layer, project the light within the green wavelengths to an input port of the green layer, and project the light within the blue wavelengths to an input port of the blue layer.

In some embodiments, the input image port(s) 456, 462 and the output image port 458 of the waveguide 454 may comprise an array of micromirrors embedded within an input optical coupling region or output optical region of the waveguide 454. The array of micromirrors of an input image port (or optical input region) of the waveguide may be oriented to redirect light projected by a projector onto the input image port so that light propagates inside the waveguide. The array of micromirrors of an out image port (or optical output region) of the waveguide may be oriented to redirect light propagating in the waveguide so that light exits the waveguide and propagates in free space (e.g., toward the exit window 114).

Figure 5A:
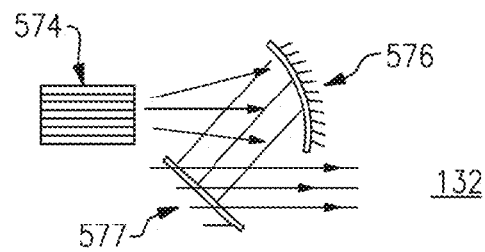
FIG. 5A illustrates an example of a reticle projector comprising a point-like light source, a concave mirror, and a flat mirror.

FIG. 5A illustrates examples of certain aspects of the reticle projector 132. In some such examples, the reticle projector 132 may comprise a point-like light source 574 (e.g., an LED, a laser diode, etc.), a concave mirror 576, and/or a flat mirror 577. The light emitted by the light source 574 can be collimated by the concave mirror 576 and reflected toward the entrance grating 462 of the DV-Display 130 by the flat mirror 577.

Figure 5B:
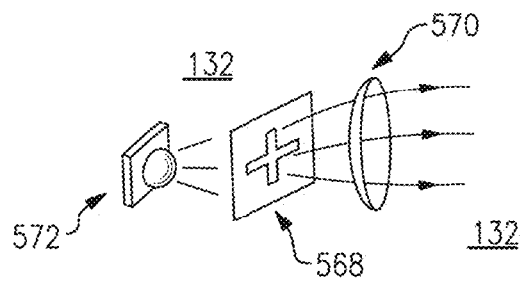
FIG. 5B illustrates an example of a reticle projector comprising a light source, a reticle mask, and a lens.

FIG. 5B illustrates additional examples of certain aspects of the reticle projector 132. The reticle projector 132 can comprise an illuminator 572 (e.g., a laser diode), a reticle mask 568, and an imaging lens 570. The illuminator 572 can be a point-like light source (e.g., LED, laser, etc.) that illuminates the reticle mask 568. The reticle mask 568 can be an opaque film with a transparent region which has the shape of a reticle. One or more imaging lenses 570 may be positioned between the reticle mask 568 and one of the input image ports 462 of the DV-display 130. When the reticle mask 568 is illuminated, the imaging lens 570 may form an image of the reticle on the input image port 462 of the DV-display 130. The image projected on the input image port 462 can be a collimated image.

Figure 5C:
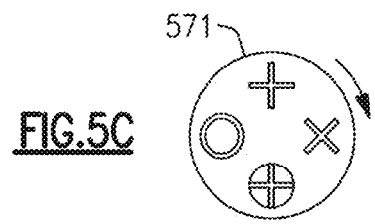
FIG. 5C illustrates an example of a rotatable multi-pattern reticle mask that allows selecting from two or more reticle patterns.

The reticle mask 568 can include more than one reticle pattern. For example, FIG. 5C shows a reticle mask 571 with multiple reticle patterns. This mask 571 can be a rotatable mask that allows user to select one of the reticle patterns as projected pattern, by rotating the mask.

Figure 5D:
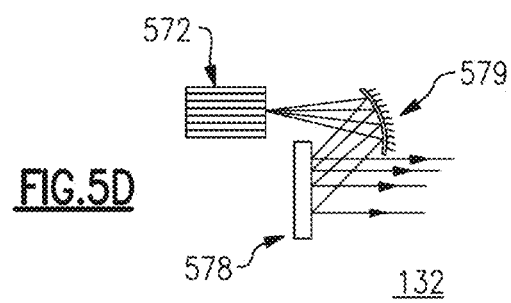
FIG. 5D illustrates an example of a reticle projector comprising a light source, a concave mirror, and a reticle grating.
Figure 5E:
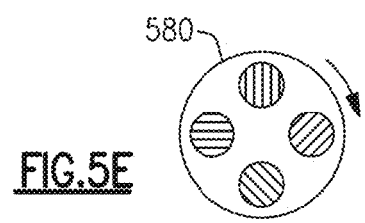
FIG. 5E illustrates an example of a rotatable multi-pattern reticle grating that allows selecting from two or more reticle patterns.

FIG. 5D illustrates yet additional examples of aspects of the reticle projector 132. The reticle projector 132 may comprise an illuminator 572 (e.g., a laser diode), one or more mirrors 579, and a reticle grating 578. The illuminator 572 can be a point-like light source (e.g., LED, laser, etc.). The light emitted by the illuminator 572 may be collimated by the mirror 579 and redirected toward the reticle grating 578. The reticle grating 578 may be configured to diffract light such that the diffraction pattern corresponds to the desired reticle image. The reticle grating 578 can generate a collimated reticle image that can be projected on the input image port 462 of the DV-display 130. Further, the reticle grating 578 can include more than one grating for generating more than one reticle image. For example, FIG. 5E shows a reticle mask 580 with multiple reticle gratings. This reticle mask 580 can be a rotatable grating that allows a user to select one of the reticle patterns as a projected pattern by rotating the reticle mask 580.

The multi-pattern reticle mask 571 or the multi-pattern reticle grating 580 may be rotated directly or using an electro-mechanical actuator controlled by the user via the user interface 134. The position and orientation of the reticle image generated by the reticle projector 132 can be manually controlled by the control buttons or knobs, for example, through direct mechanical manipulation of the reticle mask 568, flat mirror 577, or the reticle grating 578. Manually operable rotary knobs can be provided on the rear face of the housing, for example, below the exit window 114 (as shown in FIGS. 2A and 3A) or other locations on the housing 205 that enable operation or configuration of the reticle projector 132 by the user. In other examples, the user interface 134 may be used to adjust the position/orientation of the reticle image by changing the position and direction of the illuminator 572 itself. In yet other examples, the reticle image can be adjusted by adjusting a configuration of the reticle projector 132. The ability to adjust the position of the reticle in the field of view of the scope enables a user to manually bore-sight the reticle image.

The housing 205 may include one or more battery compartments 211 that can provide power to electronic, optical, and electro-mechanical components and systems employed in the scope 200. In some embodiments, the one or more batteries that provide power to the reticle projector 132 may be positioned inside a compartment within the housing 205 and the one or more batteries that power other electronic, optical, and/or electro-mechanical components within the scope 200 may be located within one or more detachable modules. Advantageously, in certain aspects, by providing a separate power source for the reticle projector (the second projector) 132, the reticle may be displayed to a user regardless of a charge-state of the one or more batteries that power the components that create the video-views or provide other features of the scope 200. Moreover, as the reticle projector 132 may use significantly less power than the EPCU 110 and/or other systems of the firearm scope 200 (e.g., image sensors, video projectors, etc.), the reticle projector 132 may operate for substantially longer than the video projector 128 in some cases. In some embodiments, a power source that powers the reticle projector may also provide power to a video projector 128 and selected modules inside the EPCU 110 enabling the display of additional symbology with the reticle image regardless of whether the image sensors and other modules are active, turned off, or in a power-saving mode.

Figure 6A:
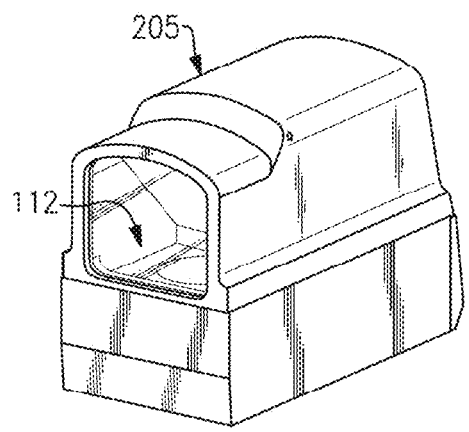
FIG. 6A illustrates a front perspective view of an example scope or sight system in accordance with certain aspects of the present disclosure.
Figure 6B:
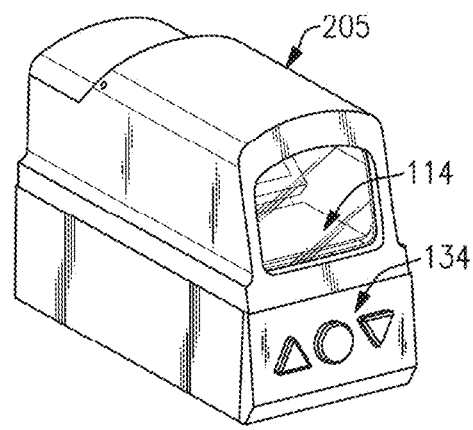
FIG. 6B illustrates a rear perspective view of an example scope or sight system in accordance with certain aspects of the present disclosure.

FIGS. 6A and 6B illustrate the front and rear perspective view of additional examples of the sight system or firearm scope 200 in accordance with certain aspects. Embodiments illustrated in FIGS. 6A and 6B can include one or more of the previously described embodiments with respect to the firearm scope 200. As illustrated in FIGS. 6A and 6B, the firearm scope 200 may have an entrance window 112 and/or an exit window 114 with a substantially rectangular shape. In the examples illustrated in FIGS. 6A and 6B, the EPCU 110, one or more batteries, and some or all the optical components may be positioned in a housing 205 with one or more compartments.

Figure 6C:
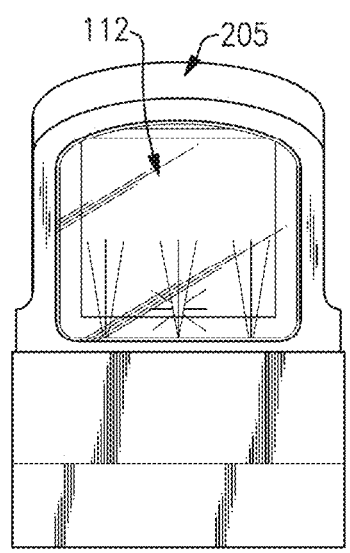
FIG. 6C illustrates a front view of an example scope or sight system in accordance with certain aspects of the present disclosure.
Figure 6D:
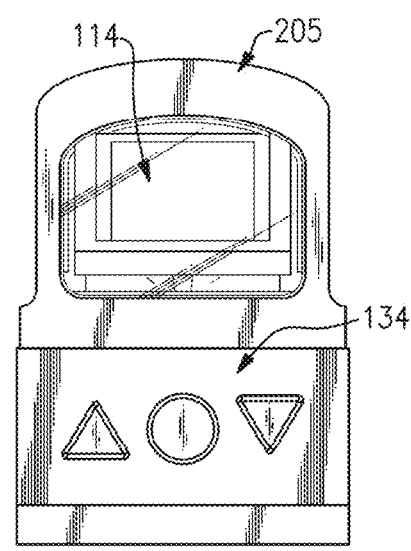
FIG. 6D illustrates a rear-view of an example scope or sight system in accordance with certain aspects of the present disclosure.
Figure 6E:
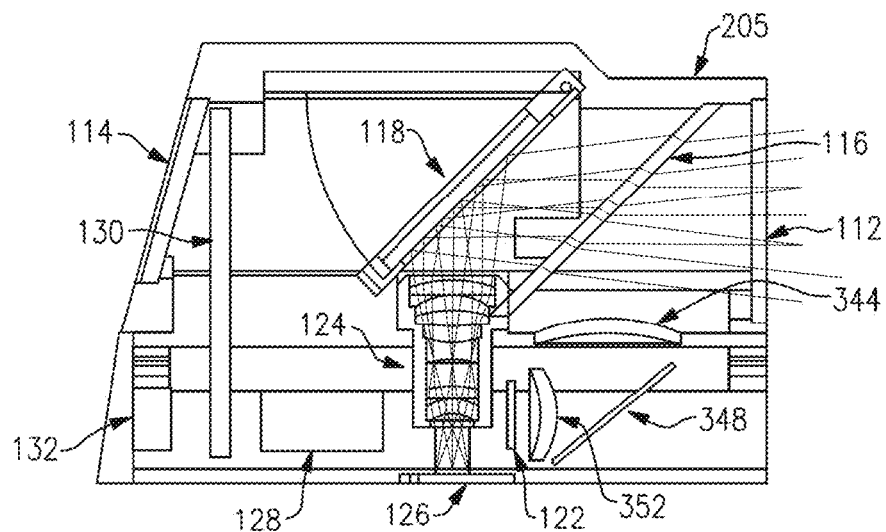
FIG. 6E illustrates a side view cross-section of an example scope or sight system shown in FIG. 6A to 6D.

FIGS. 6C and 6D illustrate the front and rear view, respectively, of the firearm scope shown in FIGS. 6A and 6B. FIG. 6E illustrates a side view cross-section of the sight shown in FIGS. 6A to 6D showing the arrangement of the components involved in the image formation inside the housing 205 when the pivotable mirror is in an ON state (e.g., when the mirror 118 is positioned within the visible light path). As a non-limiting example of the flow of light within the scope 200 in a video-view mode, FIG. 6E illustrates several visible light rays. The light rays enter a sight system of the firearm scope 200 through the entrance window 112 and are focused on the visible image sensor 126 by the moveable or pivotable mirror 118 and the visible optical imaging system 124. The visible light rays may pass through the beam splitter 116 with less than 5% attenuation and a displacement proportional to the thickness of the beam splitter 116.

Some aspects of the firearm scope may provide the direct-view image combined with a video image and a reticle image. In some such implementations, the video image may include an IR image (or thermal image), a visible-light image, or a combination of the two. In certain implementations, one of the IR image or the visible-light image is omitted from the scope. In some such implementations, the beam splitter may be omitted.

Figure 7:
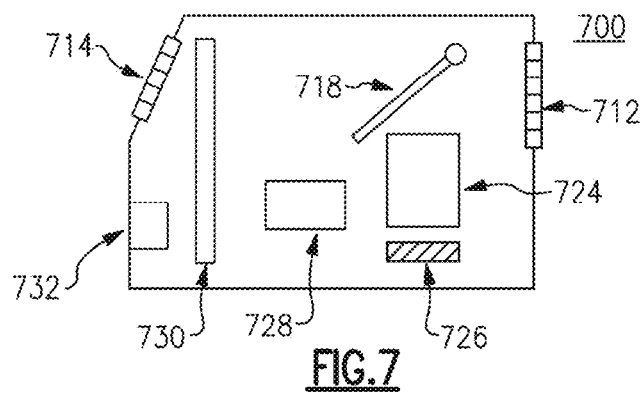
FIG. 7 illustrates a side view cross-section of an example sight system that supports direct view and a video view.

In some examples, the weapon scope may support a single video-view mode. FIG. 7 shows an example of such an embodiment. This embodiment comprises an entrance window 712, an exit window 714 that is transparent in the visible wavelength range, a pivotable mirror 718, an imaging subsystem 724, an image senor 726, a video projector 728, a reticle projector 732, a DV-display 730 and a user interface 734. In some implementations of the scope 700, the user may select between a video-view or a direct-view by switching the state of the pivotable mirror 718 between an ON or lowered state and an OFF or raised state. When the pivotable mirror 718 is in the ON state, the incident light (passing through the entrance window 712) may be redirected toward the imaging subsystem and a video view may be provided through the exit window 714. When the pivotable mirror 718 is in an OFF state, the optical path from the entrance window 712 to the exit window 714 is cleared by raising the pivotable mirror and direct view becomes available.

In some implementations of the scope 700, the visible video view and direct view may be provided. In some such cases, the entrance window 712 may be at least transparent in the visible wavelength range and the pivotable mirror 718 may reflect the light at least within the visible wavelength range. In cases where the entrance window is at least transparent in the visible range, the imaging subsystem 724 may form an image on the image sensor 726 that can be sensitive at least within the visible wavelength range. In some examples, the video image may be provided in certain lighting conditions (e.g., day light), while in other examples the video image may be provided in any lighting conditions. In implementations where the video-image is supported under most or all lighting conditions, the image sensor may have enhanced sensitivity and/or the scope may include an image intensifier (e.g., a vacuum tube device that increases the light intensity), and/or an IR illuminator to emit light in the sensitivity range of the selected image sensor. In other examples, only the IR video view and direct view may be provided. In some such examples, the entrance window 712 may be at least transparent in the LWIR wavelength range, the pivotable mirror 718 may reflect the light at least within the LWIR wavelength range, the imaging subsystem 724 may form an image on the image sensor at least in LWIR wavelength range, and the image sensor may be sensitive at least within the LWIR wavelength range. In some cases, multiple view modes may be provided simultaneously. For example, in some cases, direct-view and video-view may be provided simultaneously. In some such cases, the pivotable mirror may be at least partially transparent enabling direct-view while redirecting at least some light to the image sensor 726 to provide the video-view and/or thermal view.

Figure 8:
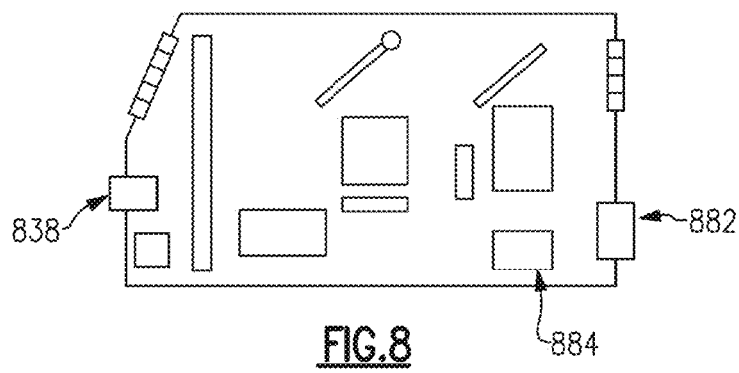
FIG. 8 illustrates a 2D cross-sectional view of the of the sight system with an integrated laser rangefinder, an integrated eye tracker, an integrated inertial measurement unit.

In some implementations, the firearm scope 200 may further include one or more supplemental systems, or display data from one or more supplemental systems. These supplemental systems may include: a laser rangefinder (LRF) module, an inertial measurement unit (IMU), an eye tracker, an electronic compass, a digital clock, an altimeter, a wind sensor, a thermometer, or any other supplemental system that can be combined with a firearm scope or which may display data on an augmented display of a firearm scope. The EPCU can combine the information provided by one or more of the supplemental systems or devices disclosed herein, with the video image received from one of the image sensors so that the composite image can be provided to the projector 128 and transferred to the exit window 114 through DV-display 130 for display to a user along with the target image through the exit window 114. FIG. 8 illustrates a side view cross section of an example embodiment of the sight system that includes an LRF 882, an inertial measurement unit (IMU) 884 and an eye tracker 838.

The LRF 882 module may comprise a pulsed laser, a photodetector, and electronic circuitry for driving the laser and processing the signal detected by the photodetector. The LRF 882 may be capable of measuring the distance between a target and the sight system by sending a laser pulse toward the target and detecting the pulse reflected by the target. The time delay between emission of a single pulse and detection of the corresponding reflected signal can be provided to the ECPU 110, which can convert the time delay to a measure of distance. The EPCU may send the measured distance as a video signal to the projector 128 so that it can be displayed through the DV-display along with other symbolic information and video images, and/or as an overlay depicted with the direct-view image. The LRF module 882 can be provided on the front side of housing below the entrance window.

The eye tracker module 838 can generate a signal that can be used by the EPCU to determine whether the user is looking through the exit window 114. The determination of whether a user is looking through the scope 200 can be used to determine whether to enter a power-saving mode. If it is determined that a user is not using the scope 200, one or more systems within the firearm scope 200 may be turned off or may enter a sleep mode where power consumption is reduced. For example, in a sleep mode, components that enable a video-view may be deactivated. The eye tracker 838 may be positioned on the rear side of housing below the exit window 114. The eye tracker 838 can be a time of flight (ToF) eye tracker that detects the direction of a user's gaze using the emission and detection of a laser pulse. In some cases, the eye tracker 838 can be an eye detector configured to detect whether an eye of the user is within a threshold distance of the exit (second) window. In some such cases a controller (e.g., a controller in EPCU 110) may deactivate the image sensors and the projectors, or enter a low-power mode, when the eye of the user is not detected within the threshold distance of the second window indicating that the user is not using the scope to observe the target scene. Advantageously, deactivating the image sensor when the scope is not used may extend the battery life or charging period of the scope.

The IMU 884 is a module for measuring the orientation and movement. The IMU 884 can be included inside the housing to measure the movement and orientation of the sight system and send the corresponding information as an electronic signal to the EPCU for processing.

Figure 9:
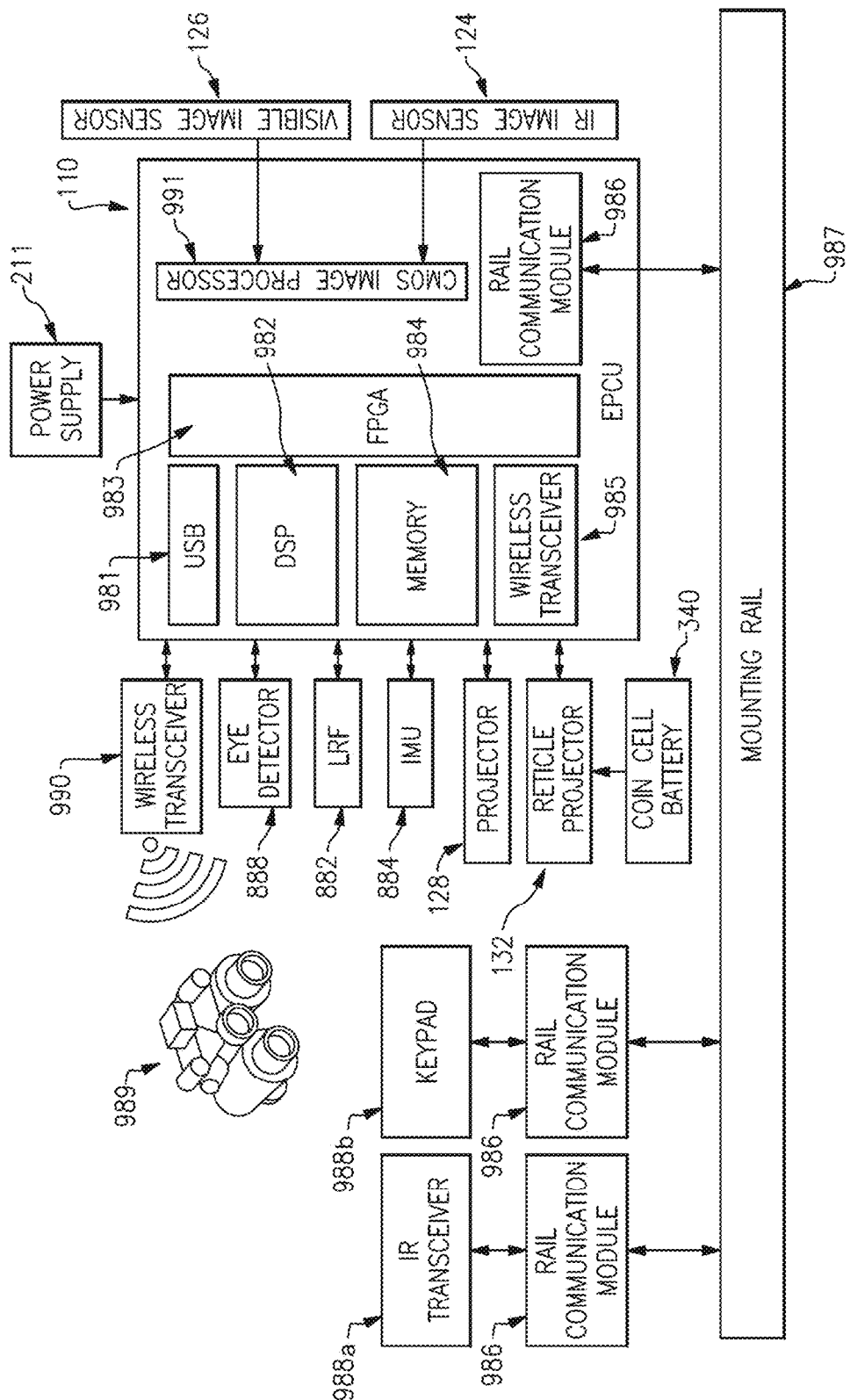
FIG. 9 is a block diagram of an Electronic Processing and Control Unit of an example scope.

FIG. 9 is a schematic block diagram showing examples aspects of the EPCU 110 of a scope (e.g., the scope 200). Further, FIG. 9 illustrates the connection between EPCU 110, and devices and components that are controlled by and/or communicate with the EPCU 110. The EPCU 110 may include a field programmable gate array (FPGA) 983, a memory unit 984, a digital signal processing unit 982, a CMOS image processor 991, a USB adapter 981, and/or an internal wireless transceiver 985. In addition to the disclosed image sensors and projectors, some non-limiting examples of the devices that may be controlled and/or accessed by the EPCU include: an inertial measurement unit 884, an eye tracker 838, a laser rangefinder (LRF) 882, an external wireless transceiver 990, an altimeter (not shown), a wind sensor (not shown), an electronic compass (not shown), and/or a magazine sensor (not shown). The EPCU 110, the image sensors, the projector and one or more sensors and peripheral devices may be powered by a first power supply 211, while the reticle projector 132 may be powered by a second power supply 340 (e.g., a coin cell battery). In some embodiments, the projector 128 and the electronic subsystems used to project symbols and/or numbers associated with one or more sensor outputs or system parameters may be temporarily powered by the second power supply 340. For example, the EPCU may automatically switch the power source for subsystems needed for projection of auxiliary information from the first power source 211 to the second power source 340 when the first power source 211 runs out of charge. In certain circumstances, when the first power supply 211 runs out of charge and the scope is used in direct view mode, this capability may allow the user to see the information associated with one or more sensors (or system parameters) along with the reticle image. In other implementations, the second power supply 340 is reserved to power the reticle projector 132. Thus, the reticle may remain available even when power for the other systems described herein is lost.

In some examples, the FPGA 983 module may control some of the subsystems of the EPCU and the devices connected to it. In other examples, the subsystems and devices may be controller may be controlled by a non-programmable circuit. The internal memory 984 can be used to store images, video recordings, system parameters, and/or selected data obtained from the sensors. The USB adapter 981 may be used to store selected information from the internal memory 984 to an external information storage device. The CMOS image processor 991 may receive video signals from one or more of the image sensors 126, 124 and transfer the processed signal to the video projector 128. The DSP unit 982 may be used to process the signals received from the sensors (e.g., LRF 882, eye detector 838, IMU 884) and generate outputs that can be transferred to the video projector 128. The optional internal wireless transceiver 985 may be used to connect the scope to available wireless networks in the vicinity of the scope Some of the sensors may be electrically connected to the EPCU 110. For example, the eye tracker 838, LRF 882, and IMU 884 that may be attached to or enclosed inside the housing 205 of the scope (as shown in FIG. 8) can be connected to the EPCU 110 through wires or conductive strips. Alternatively, electric connectivity may be provided through mounting rail 987 used to attach the scope to the weapon (or other devices used in conjunction with the scope). Using rail communication modules 986, the EPCU 110 can control peripheral devices and exchange data with them. For example, EPCU 110 may be connected to a keypad 988*b* and an IR transceiver 988*a* through the mounting rail 987. In some examples, the mounting rail 987 may also serve as a power line to exchange power between the scope and the devices mounted on the rail. The keypad 988*b* may be an extension of the scope's user interface 134 or an individual module that enables the controlling of one or more features of the firearm scope 200 (e.g., the reticle's position with respect to the exit window 114, switching between supported viewing modes, and the like), certain of the scope. The IR transceiver 988*a* may be used to link the scope to other devices via IR radiation. Non-limiting examples of such devices may include devices that enable the display of environmental conditions within a particular distance of the scope (e.g., wind, light, humidity, temperature, etc.), devices that can assist with target acquisition and engagement (ballistic calculator, rangefinder, etc.), positioning devices (e.g., global positioning systems or GPS), communication devices (e.g., broadband wireless, satellite communication, etc.) and the like. The disclosed devices may exchange information with the scope via wireless (such as, for example, radio frequency, NFC, or optical) links. For example, a magazine sensor may be integrated with the weapon and send information to EPCU through a non-contact optical link. In some aspects, the firearm scope 200 may receive data from a weapon that supports a magazine with an ammunition counter. In some such aspects, the firearm scope 200 may display the ammunition count as symbology on the DV-display 130. Certain examples of an ammunition counter that can be used with the features described herein are described in U.S. application Ser. No. 16/297,288 (now U.S. Pat. No. 10,557,676), filed Mar. 8, 2019, titled "FIREARM AMMUNITION AVAILABILITY DETECTION SYSTEM," the entire contents of which are hereby incorporated by reference herein and made a part of this specification.

In certain additional aspects, using a transceiver 990, the scope (e.g., the scope 200) may communicate with other equipment or devices 989 of a user, such as a pair of night vision goggles, a head mounted display, a display system attached to a helmet, and/or any other type of equipment that may be included as part of a user's or soldier's kit. In some cases, the scope 200 may communicate with a different user than the user holding or operating the scope 200 or weapon system that includes the scope 200. For example, a soldier may be using a weapon system that includes the scope 200 and the transceiver 990 of the scope 200 may transmit a video-view of the scope 200 to a helmet or computing device of another user (e.g., a commanding officer, squad leader, or other observer). Further, the transceiver 990 may transmit the video-view, or other data, to both equipment of the user using the scope 200 (e.g., helmet or other heads-up-display) and to equipment of another user (e.g., helmet or computing device of a commanding officer).

The transceiver 990 may be a wired or wireless transceiver. The scope 200, using the transceiver 990, may establish a bidirectional wireless connection with a pair of goggles 989 to transmit/receive video, commands, and/or other data to/from the goggles 989 or other equipment of the user. In some cases, the connection may be unidirectional. For example, in some cases, the scope 200 may transmit data to the goggles or other equipment 989 (e.g., the goggles of the user), but may not receive data. In other cases, the scope 200 may receive data, but not transmit data to equipment 989. Further, in some implementations, whether the scope 200 is capable of transmitting, receiving, both transmitting and receiving data, or neither transmitting nor receiving data to/from the equipment 989, the scope 200 may still be capable of communicating with a weapon system to which the scope 200 is mounted. Any discussion of communicating data, commands, or video between the scope 200 and the goggles or other equipment 989 may include communicating data, commands, and video.

In some embodiments, the scope 200 may establish a wireless connection with an electronic device 989 to exchange data, commands, and/or video with the electronic device. The scope 200 may communicate the video-view using any type of video format (e.g., MP4, MPEG, AVI, MOV, and the like). Further, the scope 200 may communicate any type of data (e.g., environmental data or firearm data) or commands, using the transceiver 990, to/from the electronic device 989. In some examples, the data may include environmental data received from an environmental sensor, such as: altitude, temperature, level of light, humidity, wind speed/direction and the like. In some examples, the data may include firearm or weapon system data received from a firearm (e.g., the firearm on which the firearm scope is mounted) and may include: a cartridge count of cartridges within one or more magazines registered with and/or inserted into the firearm, a jam state of the firearm, a battery status of a battery within the firearm, a status of electronics included in the firearm, a magazine insertion status of the firearm, a firearm safety status, status of the scope (e.g., battery status, mode of operation, reticle status, etc.), and the like. Further, the data may include one or more views generated or viewable when a user looks through the scope, regardless of whether the user is actively looking through the scope. For example, the data may include a video view and/or thermal or infrared view captured and/or generated by the scope 200. Further, the data may include a reticle or reticle position with respect to one or more views transmitted to the device 989. Additional data may include rangefinder data, target acquisition data, target identification data, or any other data that may be detected, determined, or provided to equipment of a soldier, a hunter, a peace officer, or other user of a scope 200. Further, in some cases, the data may include commands to facilitate operation of the scope 200, the weapon upon which the scope is mounted or registered, or any other equipment of the user. For example, the commands may include commands to activate/deactivate one or more features of the scope (e.g., reticle, video-view, thermal view), to transmit or cease transmitting data (e.g., cartridge count or other magazine data, weapon state data, scope state data, video, or thermal views, etc.), or any other type of command for controlling the scope 200 or other devices carried by the user.

The wireless connection can be a Bluetooth® wireless link, a military wideband connection, or other near-field communication system. Advantageously, using such wireless connection the user can acquire and engage a target without bringing the weapon close to the eye and removing the goggles 989 (e.g., a night vision goggle) or other devices that may interfere with positioning the scope 200 in front of the user's eye. Although the communication between the scope 200 and the device 989 has been primarily described as wireless, wired communication is also possible. For example, an optical or electrical cable may be used to connect the scope 200 to a helmet of goggles 989 of the user. Further, although communication has been described as the scope 200 directly communicating with the device 989, an intermediary device may facilitate communication. For example, the scope 200 may communicate with a weapon system or firearm, which may then communicate with the device 989. As another example, the user may carry a personal network device that may facilitate communications between one or more pieces of equipment of the user (e.g., between a scope, firearm, helmet, and other accessories carried by a user or soldier).

The EPCU 110 may receive the signals generated by the image sensors and after processing and/or storing the corresponding information, provide a first video signal that carries the information needed to generate an image of the target scene. Simultaneously, the EPCU may also receive electronic data from the sensors and other peripheral devices that may be connected to the scope (e.g., eye tracker, IMU, LRF, etc.) by various means, and may generate a second video signal that carry the information received from the sensors or other peripheral devices in symbolic form. Further, the EPCU 110 may combine the two video signals to generate an image of the target scene with symbolic information superimposed on it. For example, the information received from the magazine sensor, the LRF, and the wind sensor may be superimposed on the target scene such that during target acquisition the user can see the distance from the target, the wind speed and the number of rounds or cartridges remaining in the magazine as symbolic information, without moving the user's eye away from the exit window the scope.

Figure 10:
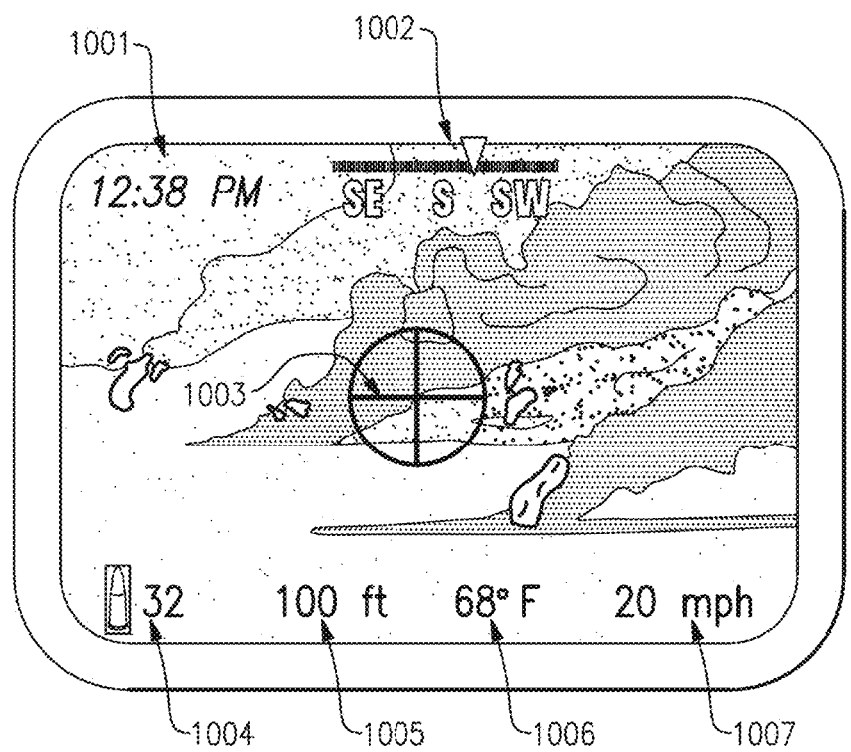
FIG. 10 shows an example of a composite image viewable through the sight system (e.g., image of a war zone, the bore-sighted image of the reticle and examples of auxiliary information).

FIG. 10 shows an example of the image seen by the user through the firearm scope 200 (e.g., a war zone) with the bore-sighted image of the reticle and auxiliary information superimposed on the image (e.g., ammunition count, time, target range, temperature, wind speed, electronic compass), In the depicted example, the user can observe a bore sighted reticle image 1003, the number of rounds left in the magazine 1004 (e.g., acquired by a magazine sensor), the distance from the target 1005 (e.g., acquired by the LRF 882), the temperature 1006 (e.g., acquired by a temperature sensor included in the side), the wind speed 1007 (e.g., acquired by a wind sensor mounted on the rail), the orientation of the weapon 1002 (e.g., acquired by the IMU and/or an electronic compass), and the time 1001 (e.g., provided by a digital clock).

Example Use Cases

Certain aspects of the operation of an example firearm scope or sight system 100. 200 of the present disclosure are described below. The sight system may operate in different modes. For example, the configurations shown in FIGS. 3A, 3B, and 6E may support multiple modes of operation. These modes of operation may include, for example, 1) Simultaneous thermal video-view and direct-view; 2) direct-view; or 3) video-view only (IR/thermal or visible). Other modes of operation are possible as described herein. For example, it is possible to have simultaneous video and direct view modes. Moreover, it is possible to have simultaneous, video, direct, and thermal view modes. Moreover, in each of the viewing modes, the reticle may be simultaneously presented. By supporting multiple view modes simultaneously, it is possible for a user to see augmented data that augments a direct view. For example, thermal views and/or video views may augment the direct view.

Figure 12A:
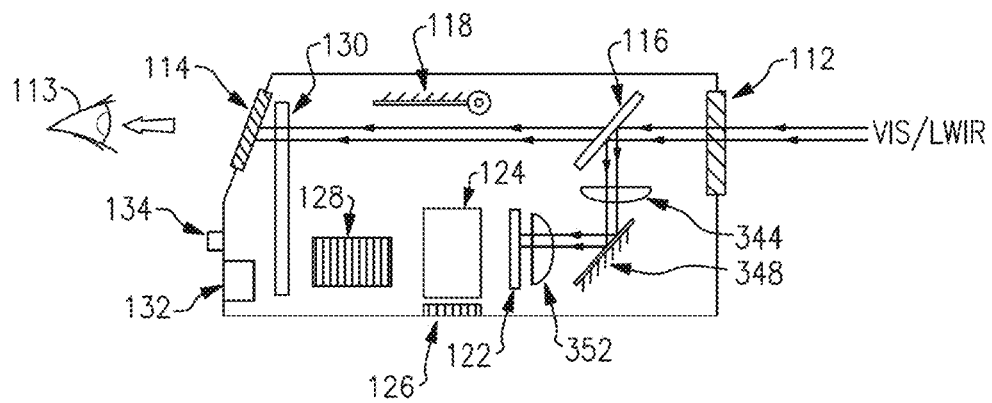
FIG. 12A illustrates the side view cross-section of an example sight system (shown in FIG. 3B) configured to operate in direct-view and/or IR/thermal video view modes.
Figure 12B:
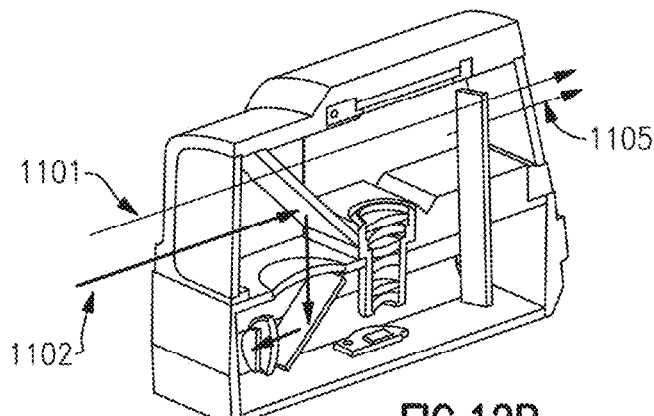
FIG. 12B illustrates the perspective view cross-section of an example sight system (shown in FIG. 6E) configured to operate in direct-view and/or IR/thermal video view modes.
Figure 12C:
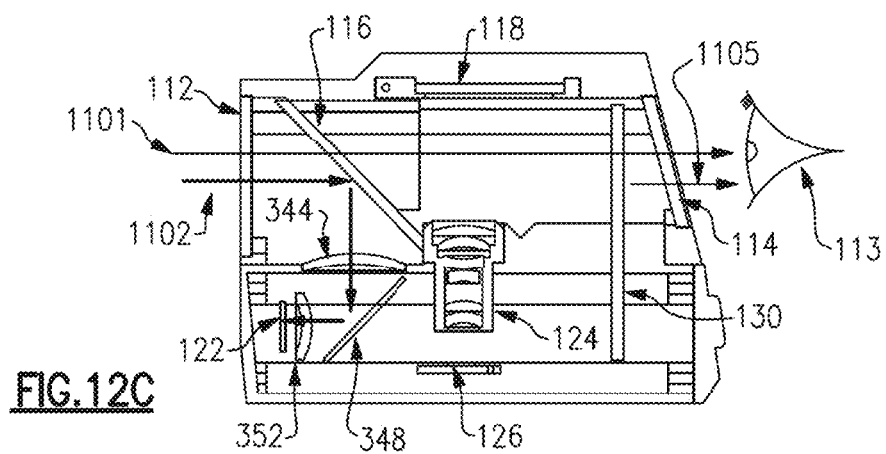
FIG. 12C illustrates the side-view cross-section of an example sight system (shown in FIG. 6E) configured to operate in direct-view and/or IR/thermal video view modes.

1) Simultaneous thermal video-view and direct-view: In this mode of operation, the pivotable mirror 118 may be in an "OFF" state to enable direct-view and the video projector 128 may receive a video signal from the thermal image sensor 122. The user can directly see the target scene along with the thermal video image, the reticle image, and auxiliary information, if any. To reduce power consumption, the display of certain auxiliary information may be omitted. For example, the EPCU may be configured to automatically disable a selected set of auxiliary information, or the user interface may be configured to allow the user to disable selected set of auxiliary information. FIG. 12A shows a side cut-away view of a configuration of certain embodiments of the sight system shown in FIGS. 6A-6E where the flip mirror 118 is rotated up (or the switchable mirror is in the OFF state) allowing the direct-view image to be seen through the exit window 114. In addition to the direct view, the video signal received from the IR image sensor 122 can be simultaneously projected by the DV-display 130 providing a thermal image superimposed on the directly observed image in the exit window 114. Additionally, the image of the reticle can be superimposed on the displayed images. Each of the images can be bore-sighted. FIGS. 12B and 12C show the same mode of operation for the example shown in FIGS. 6A-6E. The visible light rays 1101 may directly reach the user 113 after passing through the entrance window 112, beam splitter 116, and the exit window 114. The IR light rays 1102 may be reflected by the beam splitter 116 and imaged on the IR image sensor 122 using the objective lens 344, IR mirror 348, and eyepiece 352. The IR image sensor 122 can generate a video signal and transmit the video signal to the projector 128. The projector 128 can generate and project the image to the input image port of the DV-display 130, which may generate and/or direct visible light rays 1105 to the exit window 114 so that the user 113 can observe the corresponding image.

2) Direct view only: in this mode the pivotable mirror 118 is in an "OFF" state (as shown in FIGS. 12A, 12B, and 12C) and the EPCU 110 subsystems associated with video projection (e.g., CMOS image processor, image projector) may be turned off. As such, the user can only observe the direct-view image of the target scene naturally formed in user's eye. In some implementations, the user may still be presented with a bore sighted image of a reticle. Further, in some cases, auxiliary symbolic information may be presented on the DV-display 130 with the direct-view. To reduce power consumption, the EPCU can be turned off to eliminate the use of the main power source. In some such cases, only the image of the reticle may be superimposed on the direct-view image. The reticle projector 132 may be powered by its own power source separate from the power source used by the EPCU 110 and/or other systems used to generate the video-view. Due to low power consumption of the reticle projector 132, the power source for the reticle projector 132 may last for months or years before needing replacement or recharging. Advantageously, in certain implementations, by having a separate power source for the reticle, a user may continue to use the reticle when power for other systems within the scope 200 is lost or drained. Moreover, in certain implementations, because the reticle projector 132 typically uses less power than a video-display system, the reticle projector 132 may remain powered for a longer time than a system that utilizes a single power source for the reticle and the video-mode. Advantageously, in use-cases where new batteries or recharging is not available, a user may continue to have access to the reticle when access (due, for example, to a drained battery) to a video-mode is lost.

Figure 11A:
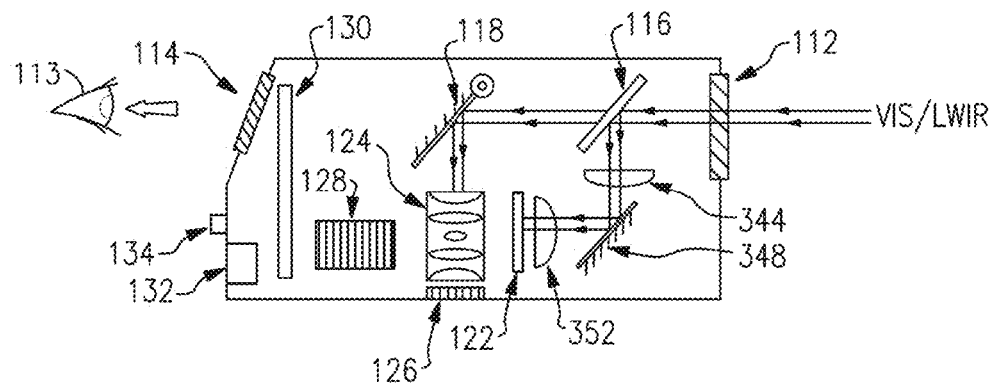
FIG. 11A illustrates the side view cross-section of an example sight system (shown in FIG. 3B) configured to operate in IR/thermal or daylight video view modes.
Figure 11B:
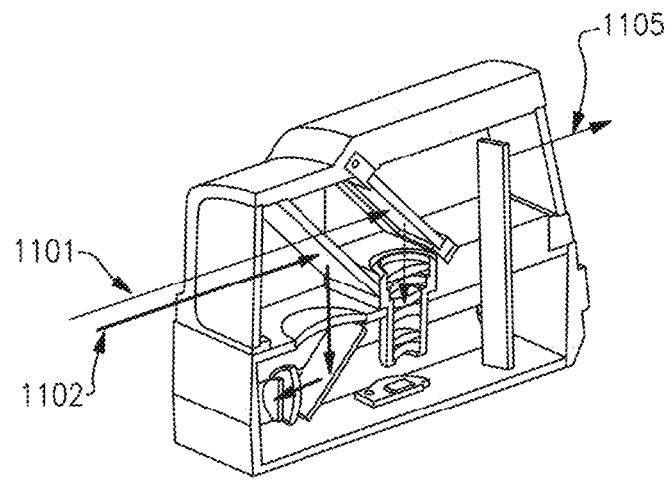
FIG. 11B illustrates the perspective view cross-section of an example sight system (shown in FIG. 6E) configured to operate in IR/thermal or daylight video view modes.
Figure 11C:
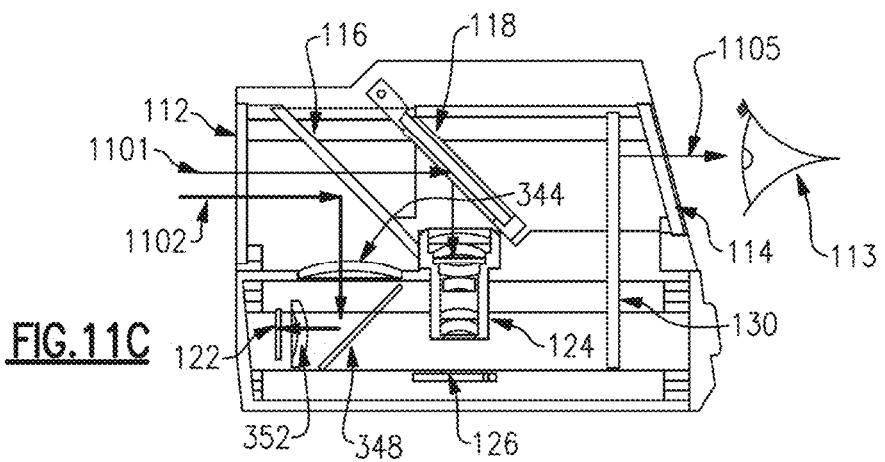
FIG. 11C illustrates the side view cross-section of an example sight system (shown in FIG. 6E) configured to operate in IR/thermal or daylight video view modes.

3) Video-view only: in this mode the pivotable mirror 118 is in an "ON" state (as shown in FIGS. 11A, 11B and 11C) and reflects the incoming visible light rays 1101 toward the aperture of the visible light imaging subsystem 124 resulting in the formation of the target scene image on the visible light image sensor 126. FIG. 11A shows a side cut-away view of a configuration of certain embodiments of the sight system shown in FIGS. 6A-6E where the flip mirror 118 is rotated down (or the switchable mirror is in the ON state) to enable video-view only mode. In this mode, the incoming IR light rays 1102 may be deflected toward the objective IR lens 344 by the beam splitter resulting in formation of the target scene image on the IR image sensor 122. The video projector 128 may receive the video signal from the visible image sensor 126 or the IR image sensor 122. The user 113 can simultaneously see the video image of the target scene, the reticle image, and the auxiliary information, if any. To save battery a selected set of the auxiliary information may be disabled automatically (e.g., by the ECPU) or manually (e.g., through the user interface). The user can change the electronic magnification of the video system and zoom on a target or selected region of a scene. FIGS. 11B and 11C show the same mode of operation for the example shown in FIGS. 6A-6E. In FIGS. 11B and 11C, the flip mirror 118 is rotated down (or the switchable mirror is in an ON state) to reflect the visible light rays 1011 passing through the dichroic splitter 116 toward the aperture of the visible light imaging subsystem 224. Simultaneously, the IR light rays 1102 may be deflected toward the objective IR lens 344 by the beam splitter resulting in formation of the target scene image on the IR image sensor 122. The signal fed to the video projector 128 can be either received from the visible imager 126 (e.g., in a visible light video view mode) or the IR/thermal image sensor 122 (e.g., in a thermal video view mode). A selection between thermal video-view, visible light video-view mode, or both thermal and visible light video-view mode can be performed through a user interface. The image projected by DV-display 130 through the exit window 114 is a visible image of the target scene. Further, regardless of the selected video-modes, the reticle can be superimposed on the video image. The video images and the reticle image can be bore-sighted. In some implementations, the scope 200 can be configured to automatically switch between a visible-light video view and a thermal video-view based on a detected amount of visible light in the environment. The amount of ambient or available visible light in the environment may be measured by a light sensor integrated with or added to the firearm scope 200.

Additional Embodiments

Figure 13A:
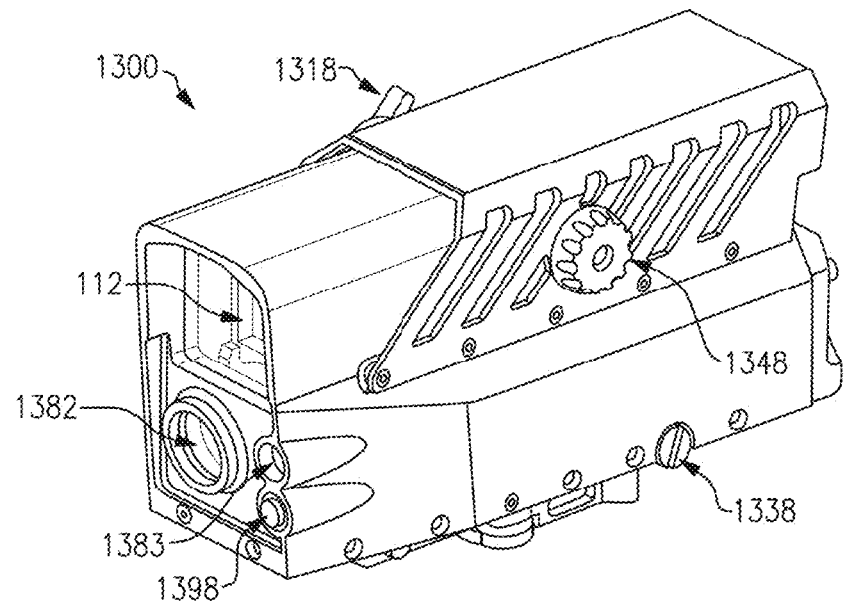
FIG. 13A illustrates the front perspective view of an example scope or sight system in accordance with certain aspects of the present disclosure.
Figure 13B:
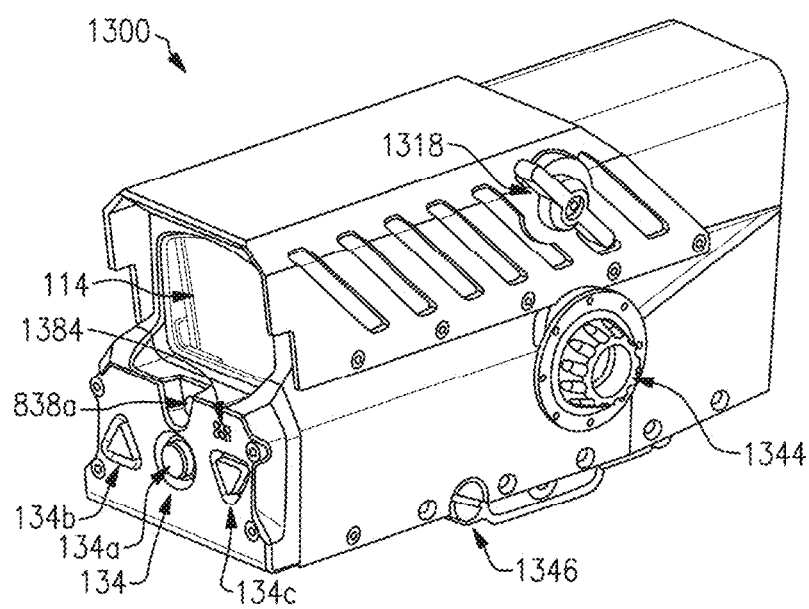
FIG. 13B illustrates the back perspective view of an example scope or sight system in accordance with certain aspects of the present disclosure.

FIGS. 13A and 13B illustrate the front and back perspective views of an example firearm scope or sight system 1300 in accordance with certain aspects of the present disclosure. Embodiments illustrated in FIGS. 13A and 13B can include one or more of the previously described embodiments with respect to the firearm scope or sight system 200. In some embodiments, various imaging subsystems of the scope 1300 may be identical to the imaging subsystems of the scope 200.

As illustrated in FIGS. 13A and 13B, similar to firearm scope 200, the firearm scope 1300 may have an entrance window 112 and an exit window 114 with a substantially rectangular shape. The entrance window 112 and exit window 114 may be shaped differently. Advantageously, in certain embodiments, because the scope 200 does not require optics in the direct-viewing path, the shape of the entrance window 112 and the exit window 114 do not have the same limitations as a scope that relies on optics within the viewing path.

The laser rangefinder of the firearm scope 1300 may have two separate apertures or a combined aperture positioned in the front surface of the scope 1300 for transmitting and receiving laser beams. In some examples, a laser beam is transmitted via a laser transmitter aperture 1383 (laser Tx aperture) and the corresponding reflected laser beam is received via a laser receiver aperture 1382 (laser Rx aperture).

Further, the scope 1300 may include controls for positioning the reticle. For example, the scope 1300 may include an elevation adjustment knob 1338 that allows the user to adjust the elevation of the reticle. Moreover, the scope 1300 may include an azimuth adjustment knob 1346 that allows the user to adjust the azimuth of the reticle. Other reticle position adjustment controls may be used instead of or in addition to the elevation adjustment knob 1338 and/or the azimuth adjustment knob 1346. For example, the reticle may be adjusted in a horizontal plane. As another example, the shape, intensity, color, or brightness of the reticle may be adjusted.

The scope 1300 may further include a flip mirror control knob 1318 that can be used to change the state of a pivotable mirror (e.g., pivotable mirror 118) or a switchable mirror, between an OFF state for direct view through the entrance window 112 (e.g., direct-view mode), or an ON state for activating the video-view mode (e.g., visible video-view mode). In OFF state, the pivotable mirror 118 may be turned, moved up, or otherwise removed from the optical or viewing path between the beam splitter 116 and exit window 114. In the ON state, the pivotable mirror 118 may be turned, move down or otherwise positioned within the optical path between the beam splitter 116 and exit window 114 and may block the direct view. In some cases, the pivotable mirror 118 permits some visible light to travel through to the exit window 114 while redirecting some visible light. In some such cases, a direct-view and video-view may be combined or viewed simultaneously. Similarly, a thermal or infrared view may be combined or viewed simultaneously with a direct and/or video view.

In some examples, the flip mirror control knob 1318 may also control the power supply to the electronic components and circuitry associated with video imaging (e.g., the CMOS image processor 991 and the visible image sensor 126). In some such examples, when the flip mirror control knob 1318 is in ON state, where the mirror blocks the direct optical path between the entrance window 112 and exit window 114, the CMOS image processor and the visible image sensor may be turned off. In other implementations, separate controls may be used to activate/deactivate video or thermal view modes. Advantageously, the ability to control the activation and deactivation of video and thermal view modes can extend the battery life of the scope power supply by reducing power consumption during periods when only direct view is used.

In some cases, the reticle may include a red dot sight. In some such cases, a user interface 134 of the firearm scope 1300 may be used to adjust the red dot sight. For example, the user interface may include three buttons, 134a, 134b and 134c, that may be used to control the state and position of the reticle image (e.g., a red dot) projected by the scope 1300 (or the scope 200). In some cases, an on/off button 134a may be used to turn the reticle image on or off, and buttons 134b and 134c may be used to control the position of the red dot sight or reticle image. The user interface 134 may also include an environmental sensor 1384 (e.g., for monitoring altitude, temperature, humidity, and the like), and an eye tracker aperture 838a that allows the eye tracker 838 to track the user's eye movement of position. Tracking the user's eye position can be used to determine whether the user is looking in the scope. By determining whether the user is looking in the scope, certain features (e.g., video-view mode) can be activated or deactivated providing for power savings. For example, the video-view mode can be deactivated when a user ceases looking into the scope 1300 and reactivated when the user moves his/her eye back to a viewing aperture or window of the scope.

The scope 1300 may also include an external power connector 1398 that may be used to provide power to the scope 1300 from an external power supply (e.g., to power up the scope externally or to charge one or more batteries in the scope 1300). The external power connector 1398 may be instead of or in addition to a powered rail interface that may be used to provide power to the scope 1300 from a power source within the weapon.

Figure 14A:
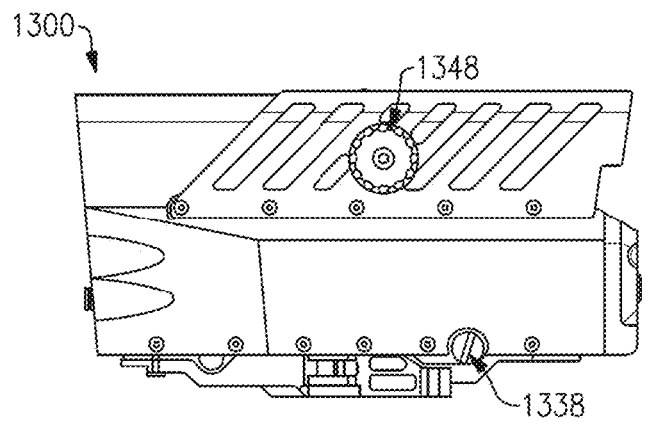
FIG. 14A illustrates the side view of the example scope or sight system of FIG. 13A in accordance with certain aspects of the present disclosure.
Figure 14B:
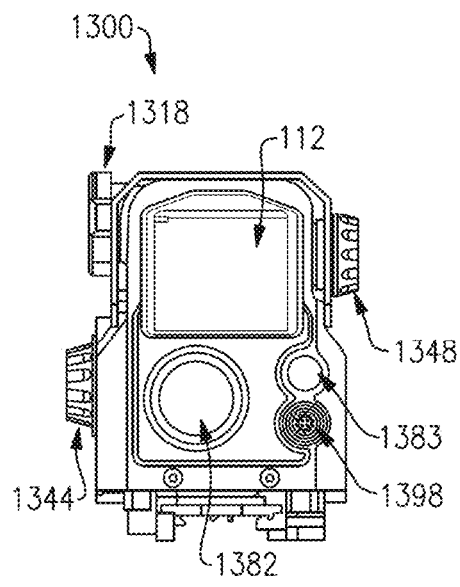
FIG. 14B illustrates the front view of the example scope or sight system of FIG. 13A in accordance with certain aspects of the present disclosure.
Figure 14C:
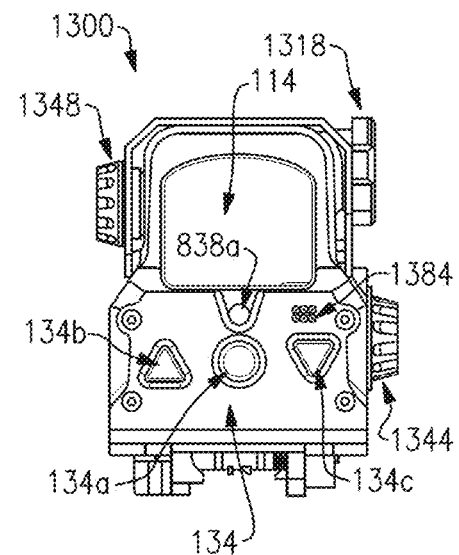
FIG. 14C illustrates the back view of the example scope or sight system of FIG. 13A in accordance with certain aspects of the present disclosure.
Figure 14D:
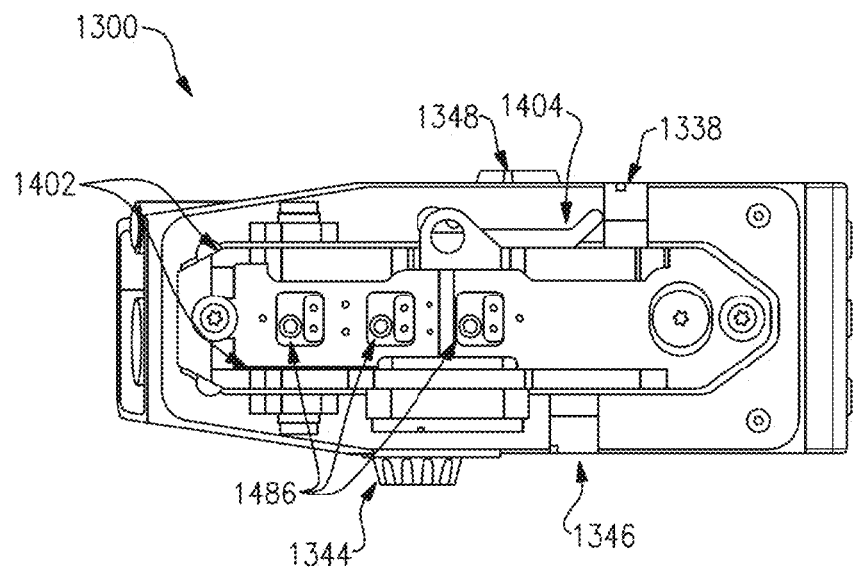
FIG. 14D illustrates the bottom view of the example scope or sight system of FIG. 13A in accordance with certain aspects of the present disclosure.
Figure 14E:
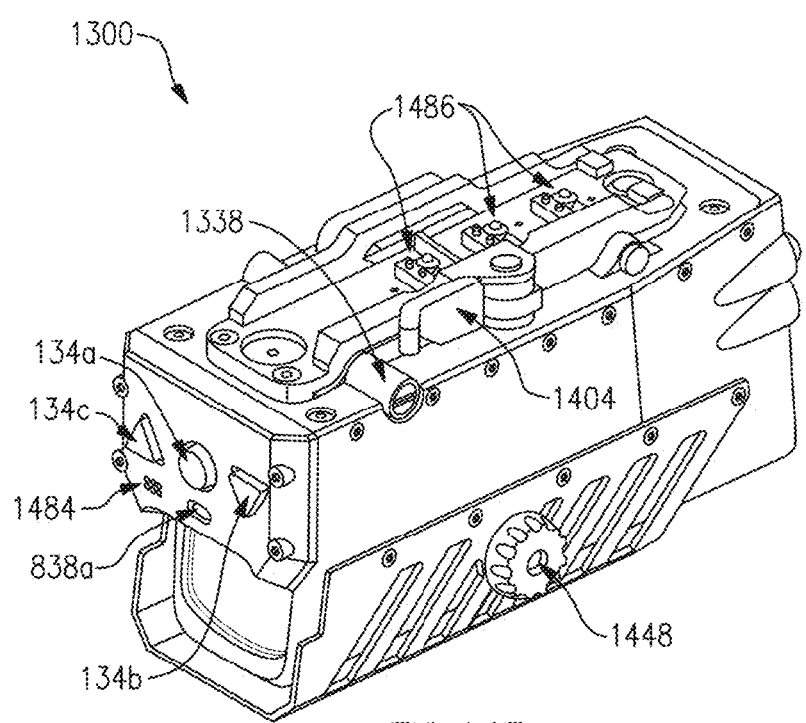
FIG. 14E illustrates the bottom perspective view of the example scope or sight system of FIG. 13A in accordance with certain aspects of the present disclosure.

FIG. 14A-14E illustrate the side view, front view, back view, bottom view, and the perspective bottom view of the scope 1300. As shown in FIGS. 14A-14C, the scope 1300 may include a video-view control knob 1348. The video view control knob 1348 may be used to activate/deactivate the video view mode and/or to change one or more control settings for the video view mode. Further, the scope 1300 may include a thermal/IR image control knob 1344 that may allow the user to activate/deactivate the thermal or infrared view modes. In some embodiments, the control knob 1348 and the control knob 1344 may be used to focus the video and/or thermal images generated or projected by the projector 128 onto the DV-display 130. In some implementations, the control knob 1348 and the IR/thermal image control knob 1344 may directly or indirectly control digital processing of the image generated by the visible image sensor 126 or the IR image sensor 122.

Although various user interface elements are described as knobs, buttons, or switches, the form of the user interface elements are not limited as such. Any type of user interface element may be used for any of the controls described herein. For example, user interface elements may include touch inputs, touch screens, physical buttons, rotatable knobs, flip switches, buttons, and the like.

As shown in the bottom view of the scope 130 (FIG. 14D), the scope 1300 may have a rail mount 1402 that allows the firearm scope 1300 to be removably mounted to a receiving or mounting rail of a firearm, weapon system, or other device that may exploit the functionalities provided by the firearm scope 1300. The firearm scope 1300 may be attached to a firearm or weapon using any type of attachment mechanism that enables the firearm scope 1300 to be securely affixed to the weapon. In the example shown, the firearm scope 1300 may have a rail grabber lever 1404 that can be used to manually tighten and loosen the rail mount 1402 to or from a receiving rail on a weapon. In other cases, the scope 1300 may snap into or onto a rail of the weapon. In some such cases, a release lever, button, or other element may be used to release the scope 1300 from the weapon. The rail mount 1402 may also include one or more electrical or optical connectors to enable electrical or optical communication between the scope and the firearm, weapon system, or other device. In the example shown, the rail mount 1402 includes three interface connectors 1486. These interface connectors 1486 may be powered rail interfaces configured to support electrical and/or optical connection to an underlying weapon. In some cases, the interface connectors 1486 provide electric power from a weapon to the scope 1300. Alternatively, the scope 1300 may be used to power elements of the weapon. Moreover, in some cases, the interface connectors 1486 may be used to connect to a charger to charge batteries of the scope 1300. The scope 1300 may use replaceable and/or rechargeable batteries.

Figure 15A:
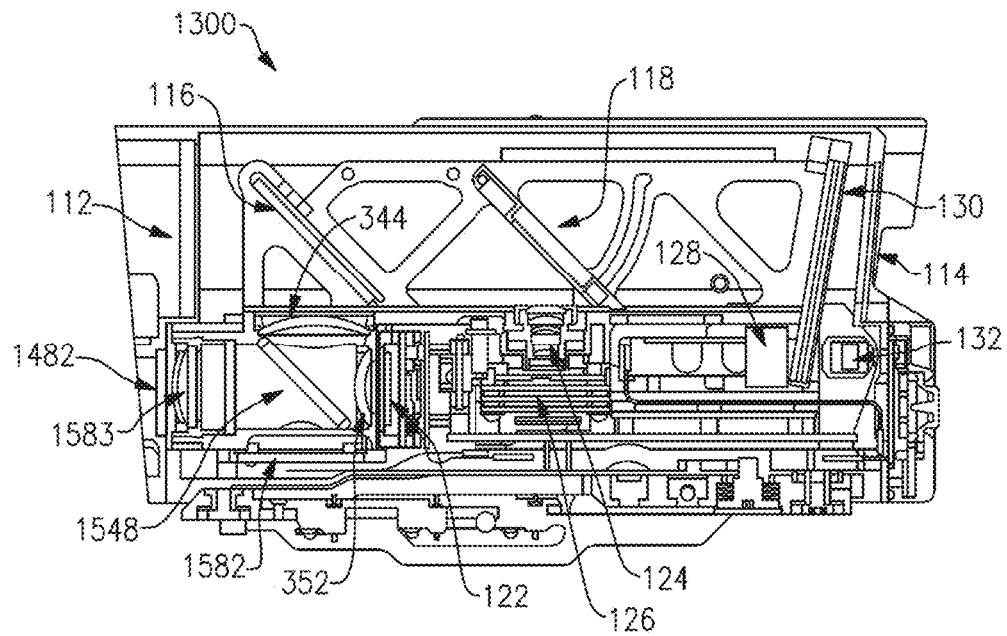
FIG. 15A illustrates the side view cross-section of the example scope or sight system of FIG. 13A in accordance with certain aspects of the present disclosure.

FIG. 15A illustrates the side view cross-section of the firearm scope or the sight system 1300 shown in FIGS. 13A and 14A. The scope 1300 can be configured to operate in direct-view, video view, and/or IR/thermal view modes. The arrangement and function of the components and subsystems in the firearm scope 1300 can include one or more of the previously described embodiments with respect to the firearm scope 200. More specifically, the components and imaging subsystems used to enable direct-view mode and support IR and/or visible video-view modes in the scope 1300 may be similar or identical to those described with respect to scope 200.

The scope 1300 includes DV-display 130 that enables multiple views via a single entrance window 112 and a single exit window 114. The DV-display 130 may be used to support, for example, direct-view, video-view, and/or infrared/thermal view. Each of the different views may be viewed or activated independently, or in combination with one another. Further, a reticle image can be superimposed on one or more of the views.

The scope 1300 includes an IR video imaging subsystem and a visible imaging subsystem that in combination with a DV-display subsystem enable the above-mentioned modalities. The IR imaging subsystem can comprise the beam splitter 116, the objective lens 344, a double-sided reflector 1548, an eyepiece 352, and an IR image sensor 122. The double-sided reflector 1542 may comprise two reflective surfaces configured to reflect light incident on both sides of the reflector. A first surface reflective surface of the double-sided mirror 1548 may be configured to reflect IR light reflected from the beam splitter 116 and direct it to the eyepiece 352. A second reflective surface of the double-sided reflector 1548 may be configured to reflect (or redirect) laser light (e.g., IR or visible) received from the rangefinder window 1482 and direct it to the rangefinder sensor 1582.

The visible imaging subsystem may comprise the pivotable mirror 118, the visible optical imaging subsystem 124 and the visible image sensor 126 (e.g., a CMOS imaging sensor).

The DV-display subsystem may comprise a DV-display 130 (e.g., the slab waveguide 454 configured to project an image received from one or more input image ports 456/462 via an image output port 458) and one or more projectors configured to project light to an input image port of the DV-display 130. In the example shown, the video projector 128 generates and projects images formed using the video signals received from the IR image sensor 122 and/or visible image sensor 126.

Figure 15B:
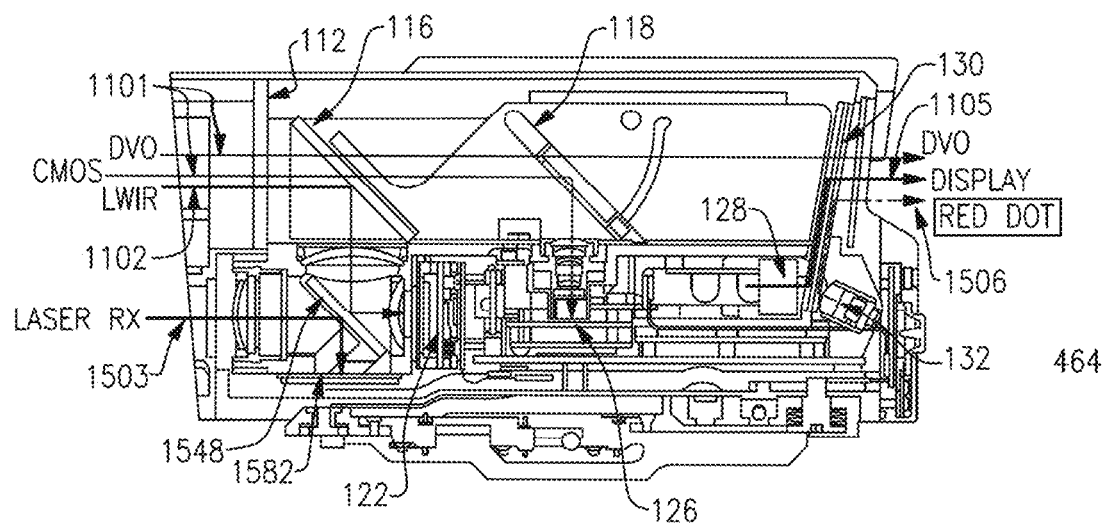
FIG. 15B illustrates the side view cross-section of the example scope or sight system of FIG. 13A in accordance with certain aspects of the present disclosure.

As a non-limiting example of the flow of light within the scope 1300, FIG. 15B illustrates several light rays depicting the optical paths associated with the direct view, video views, laser rangefinder, and reticle (or red dot) imaging. The light rays associated with the direct view and video views enter the scope 1300 through the entrance window 112. The visible light rays generate images via direct view or visible video view. For example, in the direct view mode (when the pivotable mirror 118 is in an OFF state (pivoted out of the light path) or if the pivotable mirror is partially transparent), the visible light ray 1101 light ray can pass through the beam splitter 116 and the DV-display 130. In the visible video-view mode (when the pivotable mirror 118 is in an ON state (positioned to redirect light towards the image sensor 126)), the visible light ray 1101 passes through the beam splitter 116 and is then redirected by the pivotable mirror 118 toward the visible image sensor 126. In the thermal video-view mode, the thermal (LWIR) light ray 1102 is redirected by the beam splitter 116 and the double-sided reflector 1548 toward the infrared image sensor 122. In video-view modes (visible or thermal), the image sensors generate video signals, the projector 128 converts the video signals to images and sends the images to the DV-display 130. In the example shown, ray 1105 is generated by the projector 128, coupled from the projector 128 to the DV-display 130 and redirected toward the exit window 114 by the DV-display 130. The DV-display 130 may also receive a reticle image (e.g., a red dot image) from a second projector 132 (reticle projector or red dot projector) and combine the reticle image with the image generated by the projector 128. In the examples shown, ray 1506 is generated by the second projector 132 and redirected toward the exit window 114 by the DV-display 130. In some cases, an additional projector may be used to project additional video or data to be superimposed on one or more other views displayed on the DV-display 130 or viewable through the DV-display 130. For example, an additional projector may be used to project cartridge data, battery data, geolocation data, weapon state data, or any other type of data on one or more views (e.g., thermal, video, direct views, etc.)

As described above the second reflective surface of the double-sided reflector 1548 may be configured to reflect laser light (IR or visible) associated with the laser rangefinder 882 and received from laser rangefinder aperture. In the example shown, the ray 1503, which may be a received laser beam, is redirected toward the rangefinder sensor 1582 by the second reflecting surface of the double-sided reflector 1548. In the example shown, the laser ray 1503 can be associated with the reflection or scattering of an incident laser light generated by the laser rangefinder and emitted via the laser Tx aperture 1383.

As described above, in some implementations, the firearm scope or sight system 200 or 1300 may be configured to support direct-view and thermal video-view modes while omitting support for non-thermal video view modes. In these embodiments, the pivotable mirror 118, the visible light imaging subsystem 124, and the visible image sensor 126 (e.g., a CMOS image sensor) may be omitted from the scope 200 or 1300. Omitting the visible video imaging system, can reduce the size, weight, and the power consumption of such scopes. For example, without the optics and hardware use to support video-view, the length of the scope 1600 can be shortened compared to scopes that support video view (e.g., the scopes 200 and 1300). Advantageously, a lightweight and compact scope that still supports, direct-view and thermal video-view modes, and supports a superimposed a reticle image in both modes, can be used with smaller firearms, and/or to reduce the weight of the scope and consequently, the weapon system that uses the scope. Moreover, reduced power consumption may result in extended battery life or reduced battery recharging time.

Figure 16A:
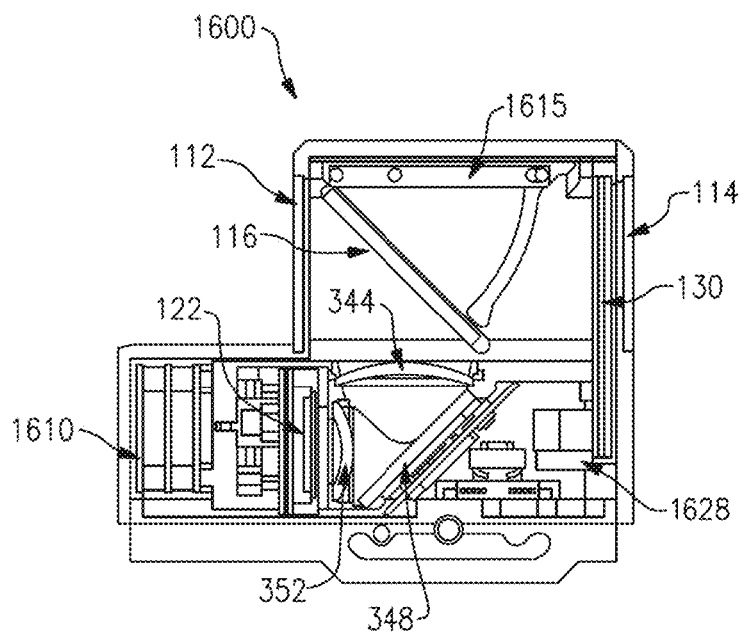
FIG. 16A illustrates the side view cross-section of an example scope or sight system configured to operate in direct-view and/or IR/thermal video-view modes.

FIG. 16A illustrates the side view cross-section of an example compact scope or compact sight system 1600 configured to operate in direct-view and/or IR/thermal video-view modes. In some embodiments, the scope 1600 can include one or more of the previously described features described with respect to the firearm scope 200 or 1300.

The components within the scope may be arranged and/or configured to enable direct view and/or thermal/IR video-view, while providing a bore-sighted reticle image as a single composite image. The scope 1600 may include a first window (an entrance window) 112 and a second window (an exit window 114). Light may enter the scope 1600 through the entrance window 112 and the direct view or the video images may be viewed by the user through the exit window 114. The scope 1600 may further include: a beam splitter 116 (e.g., dichroic mirror/beam splitter), an IR mirror 348, an objective lens 344, an eyepiece 352, an IR image sensor 122, a DV-display 130, and a projector 1628. The projector 1628 may be used to project a thermal image onto the DV-display 130. In some embodiments, the projector 1628 may be configured to project the thermal image along with a reticle image. In other words, in some cases, the projector 1628 may combine the functionality of the projectors 128 and 132. In some such embodiments, the projector 1628 may comprise two projectors and a beam combiner configured to generate a composite image and project the composite image to an input image port of the DV-display 130. For example, the projector 1628 may comprise the configuration described with respect to FIG. 4C where the beam combiner 466 combines the images received from the projector 128 and projector 132 and outputs a composite image. Alternatively, or in addition, the scope 1600 may include a second projector (e.g., a red dot projector or a reticle projector) for projecting a reticle onto the DV-display 130, which may have two image input ports.

In addition, the scope 1600 may include a sunshield 1615. The sunshield 1615 may be flappable and may be used to block some light. It may be desirable to block at least some light when in an environment with a lot of direct light. By blocking at least some of the light, it may be easier to see a projected thermal image. In some cases, the sunshield 1615 blocks all visible light and only thermal view is available. In other cases, the sunshield 1615 only blocks some visible light and direct view may still be available. The scope 1600 may further include an electronic system 1610 configured to provide control and support the IR/thermal image sensor 122, the projectors, and the DV-display 130. As described above, the projector 1628 may project a first image (e.g., IR/thermal image of a target scene) and a second image (e.g., a reticle image), via one or more input image ports of the DV-display 130. As described above, the first and the second projector may be powered by different power sources. In some examples, the second projector may consume less power than the first projector. In some cases, such as when the second projector includes a reticle projector, the second projector may include a laser diode used as an optical source to generate the reticle image. In some embodiments, the second projector may be configured to project image of symbols including but not limited to a reticle image to the DV-display 130. In some examples, the symbols may include one or more of: a cartridge count indicative of a number of cartridges within a magazine, a status of a power source; an identifier of a target status within the target scene; a jam state of a firearm; a communication state between the firearm scope and the firearm, or any other type of data that may be projected onto the DV-display.

The beam splitter 116 may be configured to allow transmission of light within a selected wavelength range (e.g., a visible light range, such as between 0.4 and 2 micrometers), while re-directing light within a different wavelength range (e.g., an infrared light range, such as between 5 to 15 micrometers) toward the objective lens 344. As such, in presence of sufficient visible light, the user can observe the surrounding environment through the DV-display 130 and the beam splitter 116. If the IR/thermal-view mode is active (e.g., the IR image sensor 122 is powered and generates a video signal), the user may see an IR/thermal image of the surrounding environment superimposed on a scene that is directly observable via the entrance window 112 and exit window 114.

The objective lens 344, the IR mirror 348 and the eyepiece 352, form an IR/thermal image on the IR image sensor 122 using IR/thermal radiation received from the entrance window 112. The IR image sensor 122 can be a thermal focal-plane array capable of processing light within the infrared spectrum. The IR image sensor 122 generates a video signal and transmits the video signal to the projector 1628. The projector 1628 generates an image and couples the image to the DV-display 130 (e.g., via the input image port 456). The DV-display forms a final IR/thermal image that may be seen by the user via the exit window 114 simultaneously with the directly observed scene. The DV-display can be a transparent display substrate comprising a waveguide that allows visible light incident on the waveguide to pass from the entrance window 112 to the exit window 114, while guiding the thermal image received from an input image port or input optical coupling region of the waveguide and outputting the thermal image via an out-image port. The DV-display may have a luminous transmittance greater than or equal to about 80% using CIE Illuminant D65.

The flippable sunshield 1615 may be used to block the direct view optical path (from the entrance window 112 to the exit window 114), when the IR/thermal view mode is activated. Advantageously, blocking the direct view when viewing the IR/thermal images formed by the DV-display 130, eliminates the ambient light that may reduce the visibility of the IR/thermal image by the user.

Figure 16B:
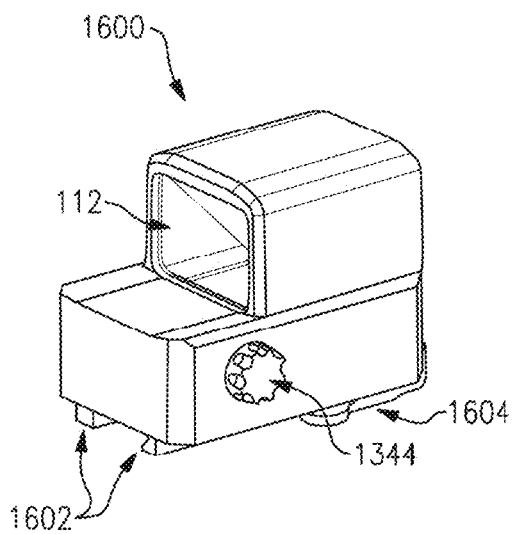
FIG. 16B illustrates the front perspective view of the example scope or sight system of FIG. 16A in accordance with certain aspects of the present disclosure.
Figure 16C:
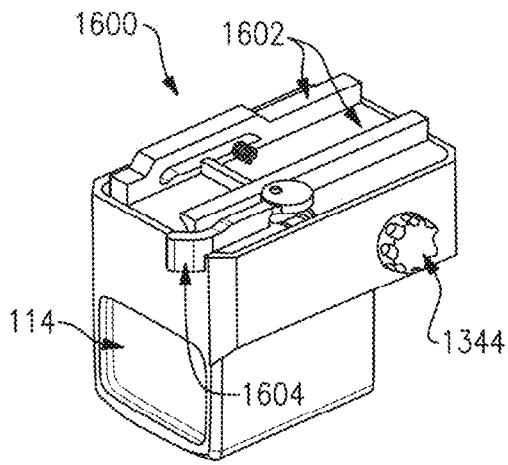
FIG. 16C illustrates the bottom perspective view of the example scope or sight system of FIG. 16A in accordance with certain aspects of the present disclosure.

FIGS. 16B and 16C illustrate the front and the bottom perspective views of the compact scope or compact sight system 1600 (shown in FIG. 16A). The compact scope 1600 may include an IR image control knob 1344 that allows the user to control the IR image seen through the exit window 114. For example, the IR image control knob may be used to activate/deactivate the thermal view and/or to focus the IR/thermal image formed by the DV-display 130. In some embodiments, the IR image control knob 1344 may be a digital focus knob that can be used to focus the IR image by changing the video signal generated by the IR image sensor 122 (e.g., using a signal processing unit in the electronic system 1610).

As shown in the bottom perspective view (FIG. 16C), the compact scope 1600 may have a rail mount 1602 that allows the compact scope 1600 to be removably mounted to a receiving or mounting rail of a firearm, weapon system, or other device that may exploit the functionalities provided by the compact scope 1600. The compact scope 1600 may be attached to a firearm or weapon using any type of attachment mechanism. In the example shown, the compact scope 1600 has a rail grabber lever 1604 lever that can be used to manually tighten and loosen the rail mount 1402 to or from a receiving rail on a weapon. In some embodiments, the rail mount 1602 may also include one or more electrical or optical connectors to enable electrical or optical communication between the compact scope and the firearm, weapon system, or other device.

In some embodiments, the firearm scope 1600 may include a user interface that allows a user to adjust the images generated and projected by the first and the second projectors. For example, the user may adjust a location of the reticle image within the transparent display substrate.

Example Weapon System with Multi-Function Single-View Scope

In some embodiments, a weapon system may comprise a firearm and a firearm scope, (e.g., firearm scope 200, 1300 or 1600) mounted or attached to the firearm. The firearm may have one or more mounts for attaching one or more accessories to the firearm. The firearm scope may be attached to the firearm via one of the mounts. For example, a rail mount (e.g., rail mount 202, 1402 or 1602) of the firearm scope may be connected to the mount. In some cases, the mount may accept mounting rails configured to be compatible with Picatinny rails, Weaver rails, or the like. In some examples, the firearm can be a rifle, a shotgun, a machine gun, or the like.

In some embodiments, the firearm may include a transmitter for transmitting data to the firearm scope. The firearm scope may have a receiver configured to receive data from the firearm via a data connection established between the transmitter and the receiver. In some examples, the transmitter can be a wireless transmitter and the receiver can be a wireless receiver. In some other examples, the transmitter can be an optical transmitter and the receiver can be an optical receiver. In some embodiments, the transmitter can be part of a firearm transceiver (e.g., electronic or optical transceiver) and the receiver can be part of a scope transceiver (e.g., wireless transceiver 990, an electronic transceiver or an optical transceiver). In some embodiments, the firearm transceiver and the scope transceiver can be optical transceivers. In some implementations, an optical data link may be established between the firearm transceiver and the scope transceiver. The optical data link may be used to communicate optical data between the firearm and the firearm scope. The optical data may comprise an optical carrier modulated by digital data.

In some embodiments, the data connection or data link (e.g., optical data link) established between the firearm scope and the firearm may be used to transmit firearm data (e.g., data associated with the status of the firearm) from the firearm to the firearm scope. Firearm data may include: a cartridge count of cartridges within a magazine inserted into the firearm, a cartridge count of cartridges within one or more magazines registered to the firearm, a jam state of the firearm, a battery status of a battery within the firearm, a state of electronics included in the firearm, a magazine insertion status of the firearm, a firearm safety status, or any other data relating to operation of a firearm, and like. In some cases, the firearm data can be digitized, and corresponding digital data may be converted to optical data that can be transmitted via the optical data link between the firearm and the firearm scope.

Upon receiving the firearm data, the firearm scope may present one or more images comprising the firearm data and/or one or more symbols associated with the firearm data, via the DV-display 130. The images may be generated by a first image source (e.g., the first projector 128) or a second image source (e.g., the second projector 132) of the firearm scope. In some examples, the EPCU 110 may receive the firearm data from the transceiver (e.g., wireless transceiver 990), and determine one or more symbols using the firearm data, generate an image comprising the determined one or more symbols and present the image to the user (e.g., user 113) via the DV-display 130 (e.g., a waveguide display). In some examples, the EPCU 110 may determine a symbology (the one or more symbols) using a processor (e.g., an FPGA 983, an ASIC, or a general-purpose processor) and based on the data (e.g., firearm data) received from the firearm and/or other electronic devices (e.g., the goggle 989) in communication with the scope. In some cases, the data received over the data connection may comprise control data usable for changing one or more settings of the firearm scope (e.g., settings associated with images displayed, operational mode of the scope, and the like). Upon receiving the control data, the EPCU 110 may determine one or more setting changes based on the control data and change one or more settings of the firearm accordingly. In some cases, the EPCU 110 may require a user confirmation via a user interface of the firearm scope (e.g., a user interface 134) before changing the one or more settings.

In some embodiments, an electrical connection may be established between the firearm and the firearm scope (e.g., via the mounting rail of the scope and the mount of the firearm). The electrical connection may be used for data communication and electric power transport. In some examples, the firearm may supply electric power to a portion or all the electronic components and subsystems of the firearm scope (e.g., EPCU 110, wireless transceiver 990, visible image sensor 126, IR image sensor 122, reticle projector 132, etc.). In some examples, the user may select a subsystem of the firearm scope to receive power from the firearm.

Firearm Scope without DV-Display

In some embodiments, a firearm scope or a sight system may support simultaneous direct view and video view without using a DV-display. For example, a firearm scope may use a beam splitter, or a combination of beam splitters and reflectors to superimpose one or more video images on a direct view image observable via an exit window of the firearm scope. In some cases, a video image can be a composite video image observable via the exit window. In some examples, the video image may comprise an auxiliary video image and an image observed via the exit window may be an augmented reality image (e.g., the direct view image augmented by the auxiliary video image). The auxiliary video image may include a bore-sighted reticle image and image of auxiliary information. In some cases, the reticle image may comprise a ballistic reticle image. In some cases, the auxiliary information may include information obtained from a subsystem of the firearm scope, a sensor, the firearm, or from other devices or modules that are in communication with the firearm scope.

Additionally, the firearm scope may enable night vision by capturing an IR/thermal image of a target scene and converting the IR/thermal image to an IR/thermal video image viewable through the exit window. In some cases, an IR image may comprise an image formed by light having a wavelength in the IR wavelength range with or without auxiliary illumination (e.g., auxiliary IR illumination) of the target scene. In some cases, a thermal image may comprise an image formed by thermal radiation (e.g., natural thermal emission from a target or scene) or light having a wavelength in the LWIR range without any auxiliary illumination or the target or the target scene. Advantageously, the auxiliary and IR/thermal video images may assist the user with target acquisition and engagement in various environmental conditions. In some embodiments, the IR/thermal video image and the auxiliary video image may be generated by a single video projection system of the firearm scope. In some cases, the video projection system may generate the auxiliary video image using an auxiliary video signal generated by a processor in the firearm scope.

Figure 17A:
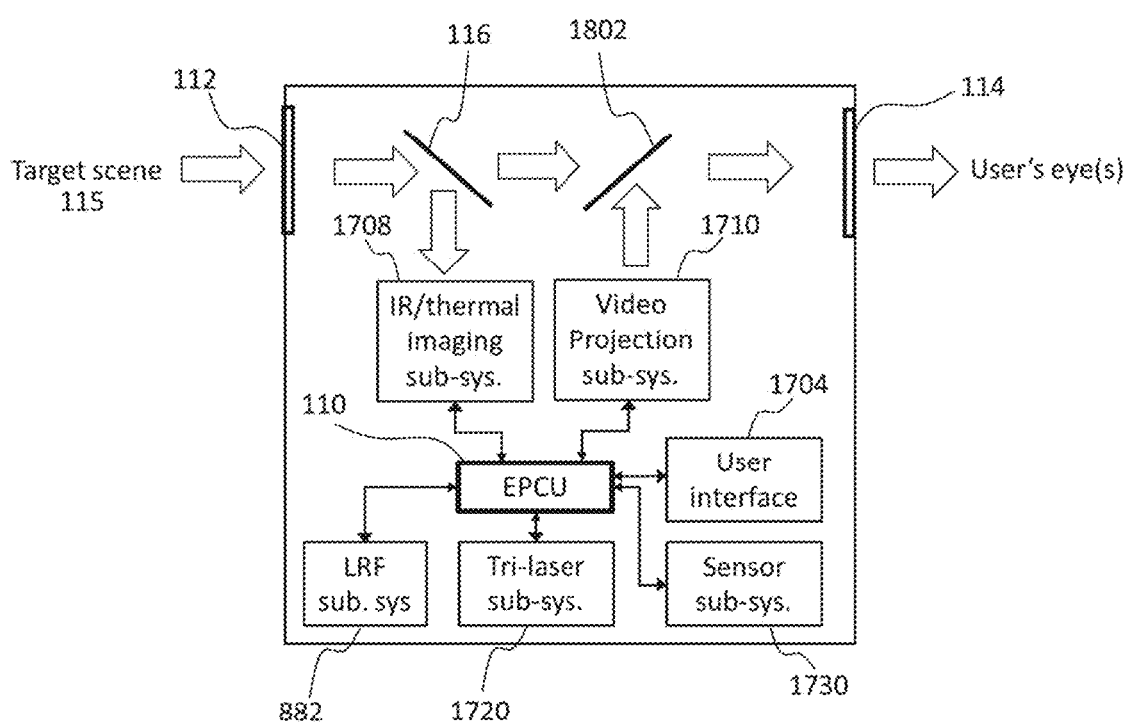
FIG. 17A presents a block diagram of an example firearm scope or sight system without a DV-display in accordance with certain aspects of the present disclosure.

FIG. 17A presents a block diagram of an example firearm scope 1700 or sight system without a DV-display in accordance with certain aspects of the present disclosure. As previously described, embodiments described herein are not necessarily mutually exclusive. Thus, embodiments of the scope 1700 may include other embodiments described above and below, and vice versa. Further, each embodiment or iteration of the scopes described herein may share one or more features of the other scopes described herein. Moreover, the firearm scope 1700 may be used with any type of firearm and may be capable of presenting (e.g., as an auxiliary video image) any type data that may be received from a firearm or another device. For example, the firearm scope 1700 may present weapon status information and or magazine cartridge counts using one or more of the embodiments described in U.S. Pat. No. 10,557,676, dated Feb. 11, 2020, titled "FIREARM AMMUNITION AVAILABILITY DETECTION SYSTEM," which is hereby incorporated by reference in its entirety for all purposes.

The thin black arrows and thick gray arrows of FIG. 17A depict electric connection and optical propagation respectively. In certain aspects, the sight system or scope 1700 may include an entrance window 112. The entrance window 112 may permit visible and IR light received from the target scene 115 to enter the sight system or firearm scope 1700. Further, the scope 100 may include an exit window 114 that permits a user to view a direct view of the target scene 115 and one or more video images superimposed on the direct view. The firearm scope 1700 may include an IR/thermal imaging subsystem 1708, a video projection subsystem 1710, an electronic processing and control unit (EPCU) 110, a user interface 1704 (e.g., a three-button user interface), a laser rangefinder (LRF) 882, a tri-laser subsystem 1720, and a sensor subsystem 1730 (e.g., for example an environmental sensor suite for measuring and monitoring pressure, humidity, and temperature). The scope 1700 may further include a dichroic beam splitter 116 and a beam splitter 1802. The dichroic beam splitter 116 transmits visible light received from the entrance window 112 and reflects IR light received from the entrance window toward the IR/thermal imaging subsystem 1708. The beam splitter 1802 transmits the visible light received from the dichroic beam splitter 116 and redirects video images received from the video projection subsystem 1710, to form a composite image viewable via the exit window 114. The composite image may comprise a direct view image of the target scene and video images generated by the video projection subsystem. The video image may comprise the IR/thermal video image and the auxiliary video image. In some cases, the auxiliary information included in the auxiliary video image may include data received from the sensor subsystem 1730 and/or the LRF 882, data received from an external device (e.g., an LRF ore sensor connected to the firearm) via a wireless link, and/or data received via an interface (e.g., a signal interface) of the firearm scope 1700.

In some cases, the EPCU may include a memory and at least one processor configured to execute the machine-readable instructions stored in the memory. The EPCU 110 may include a field programmable gate array (FPGA), a memory unit, a digital signal processing unit, an internal wireless transceiver, a field programmable gate array (FPGA). In some examples, the EPCU 110 of the firearm scope 1700 may comprise one or more features of the EPCU 110 of the firearm scope 200 (e.g., features shown in FIG. 9).

The EPCU 110 may receive and process the electronic signals generated by IR/thermal imaging subsystem 1708, the video projection subsystem 1710, the LRF subsystem 882, the tri-laser subsystem 1720, the sensor subsystem 1730, and the user interface 1704. In some embodiments, the EPCU 110 may automatically control different subsystems and/or allow the user to control them via the user interface 1704. In some embodiments, the EPCU 110 may generate the bore sighted reticle image included in the auxiliary video image and send it the corresponding video image to the video projection subsystem.

In some embodiments, the firearm scope 1700 may be used as a clip-on sight system to enhance the performance of a primary firearm scope (herein referred to as the primary scope) used with a firearm. A firearm scope comprising a primary scope and a cli-on sight system may be herein referred to as a compound firearm scope. In some examples, the firearm scope may be connected to the primary scope to superimpose the auxiliary video image and/or the IR/thermal video image on the direct view image provided by the primary scope and generate an augmented reality image. In these examples, a portion of light from the target scene transmitted through the clip-on sight system, and video images generated by the clip-on sight system may be received by the primary scope (e.g., via an entrance window). The final composite image may be viewable via an exit window of the primary scope.

The primary scope may comprise any of various types of rifle scopes, including low power variable optic (LPVO) scopes such as the TANGO6T rifle scope, manufactured by Sig Sauer of Newington, New Hampshire, U.S.A. In various embodiments, a firearm scope may be compatible with a standard 24 mm LPVO. For example, the firearm scope may be connected to a standard 24 mm LVPO and enable viewing auxiliary information, a bore sighted reticle image, and/or IR/thermal image of a target scene overlaid on the direct view image provided by the LVPO.

In some cases, the primary scope can be a magnifying scope having a selectable magnification power. For example, a magnification power of the primary scope can be 1×, 2×, 4×, 6×, 8×, 10×, 15×, 20× or other values. In some such cases, a size of the video image provided by the clip-on sight system may be adjusted manually (e.g., via a user interface of the clip-on sight system), or automatically (e.g., by a control system of the clip-on sight system).

FIGS. 17B and 17C illustrate a perspective front view of two compound firearm scopes comprising two firearm scopes (or clip-on sight systems) 1700a/1700b connected to a primary scope 1702 in accordance with certain aspects of the present disclosure. The primary scope 1702 may be a day view firearm scope, a night vision firearm scope, an infrared firearm scope, a telescopic sight, or a sight without optical power. In some cases, the primary scope 1702 may comprise an LPVO. The firearm copes 1700a/1700b may be two different embodiments of the firearm scope 1700. In some cases, the firearm scopes 1700a and 1700b may comprise one or more features described above with respect to firearm scope 1700 and vice versa. While FIGS. 17B and 17C show the firearm scopes 1700a/1700b connected to the primary scope 1702, in various embodiments, the firearm scopes 1700a/1700b may be used as stand-alone firearm scopes or sight systems with a firearm or other devices.

The firearm scope 1700a shown in FIG. 17B may comprise: a housing 1701a that includes an entrance window 112, a rangefinder aperture 1382 positioned below the entrance window 112, an exit window (not shown), a 3-button user interface 1704 disposed on a sidewall of the housing 1701*a*, a rail mount 1706, and two mounting clips configured for connecting the firearm scope 1700*a* to the primary scope 1702.

The firearm scope 1700*b* shown in FIG. 17B may comprise: a housing 1701*b* that includes an entrance window 112, a rangefinder aperture 1382 positioned above the entrance window 112, an exit window (not shown), a 3-button user interface 1704 disposed on a top surface of the housing 1701*b*, a rail mount 1706 and one mounting clip 1703*b* configured for connecting the firearm scope 1700*b* to the primary scope 1702. In some embodiments, the firearm scope 1700*b* may comprise the optical and electronic systems included in the firearm scope 1700*a* and provide the same functionalities.

In various embodiments, the mounting clips 1705/1703*a/* 1703*b* can be adjustable and configured to support connecting the firearm scope 1700*a* or 1700*b* to a variety of primary scopes having different designs and geometries, and optically aligning the firearm scopes 1700*a* or 1700*b* with the primary scope 1702. In some cases, optical alignment of the firearm scopes 1700*a* or 1700*b* with the primary scope 1702 may include aligning a reticle image of the firearm scope with a bore sighted reticle of the primary scope.

In some embodiments, the housing 1701*a* (or housing 1701*b*) houses several subsystems and components including but not limited to a video projection subsystem, an IR/thermal imaging subsystem, a laser rangefinder (LRF), a battery (e.g., a rechargeable battery), a tri-laser subsystem, a sensor suite, and an electronic processing and control unit (EPCU). The EPCU 110 may have one or more features or functionalities described above with respect to the EPCU 110 of the scope 100 or 200 in FIG. 9. The video projection subsystem may be configured to superimpose an auxiliary video image and/or an IR/thermal video image, on a direct view mage received from the entrance window 112 and transmitted to the primary scope or to user's eye, via the exit window 114. The auxiliary video image, the IR/thermal video image, and the direct view image may be viewed through the exit window 114. In some cases, the auxiliary video image, and the IR/thermal video image may be combined as a composite image viewable or receivable through the exit window.

In some embodiments, the three-button user interface may be used to activate, deactivate, or control various subsystems and features of the firearm scope 1700*a* (or 1700*b*) including but limited to: the IR/thermal imaging subsystem, the video projection subsystem, the auxiliary information included in the auxiliary image, the brightness and/or magnification of the IR/thermal video image and/or the auxiliary video image (together or independently), a laser pointer, the LRF, the sensor suite, and/or a wireless transceiver.

The rail mount 1706 may be used to mount the firearm scope 1700*a* (or 1700*b*) on a mounting rail of the firearm or another device. The rail mount 1706 may be configured to exchange signals, power, and data between the firearm scope 1700*a*, and the firearm or a device to which the firearm scope 1700*a* (or 1700*b*) is attached. The rail mount 1706 can be configured to be compatible with Picatinny rails, Weaver rails, or the like. In some cases, the rail mount 1706 is compatible with different types of powered mounting rails and mounting rails with data or signal interfaces.

In some embodiments, the rail mount 1706 may include a power interface and a signal interface. The signal interface may be used for receiving signals from the mounting rail or sending signals to the mounting rail. In some embodiments, the signals can be exchanged through non-contact optical, contact optical, direct contact electrical links, capacitive data transfer, or inductive data transfer. In some cases, the rail mount 1706 may comprise one or more features described with respect to the rail mount 202 and rail communication module 986. In some cases, the power interface of the rail mount 1706 can be configured to provide and/or receive power to/from the firearm. The power can be provided or received through inductive coupling or a direct electrical connection.

A signal received by the rail mount 1706 can be a control signal or a data signal. For example, a control signal received from the mounting rail may activate or deactivate a subsystem or a sensor of the firearm scope 1700*a*. The data signal may comprise data (e.g., digital data) generated by the firearm, a subsystem of the firearm, or a system that is in communication with the device. For example, the data signal may be generated by an ammunition counter of a firearm and indicate an ammunition count in the firearm. As another example, the data signal may be generated by a sensor or a detector (e.g., an environmental sensor or an eye detector) connected to or in communication with the firearm.

In various embodiments, the auxiliary information included in the auxiliary video image may include data associated with signals received from the signal interface and/or from a subsystem of the firearm scope.

The firearm scope 1700, 1700*a* and/or 1700*b* can include one or more of the features previously described with respect to the firearm scope or sight systems 200, 1300, and/or 1600. In some embodiments, an imaging subsystem of the firearm scope 1700, 1700*a* or 1700*b*, may be identical or similar to an imaging subsystem of the firearm scopes 200, 1300, and/or 1600.

In some implementations, the housing 1701*a* can include one or more mounting rails, which may be integrated with or otherwise attached to the housing 1701*a* for mounting, powering, and/or connecting add-on modules to firearm scope 1700*a*. In some cases, the add-on modules may be bore-sighted. These add-on modules may include, for example, an ultraviolet imager, an infrared illuminator, or the like. The mounting rails can be configured to be compatible with Picatinny rails, Weaver rails, or the like.

Figure 17D:
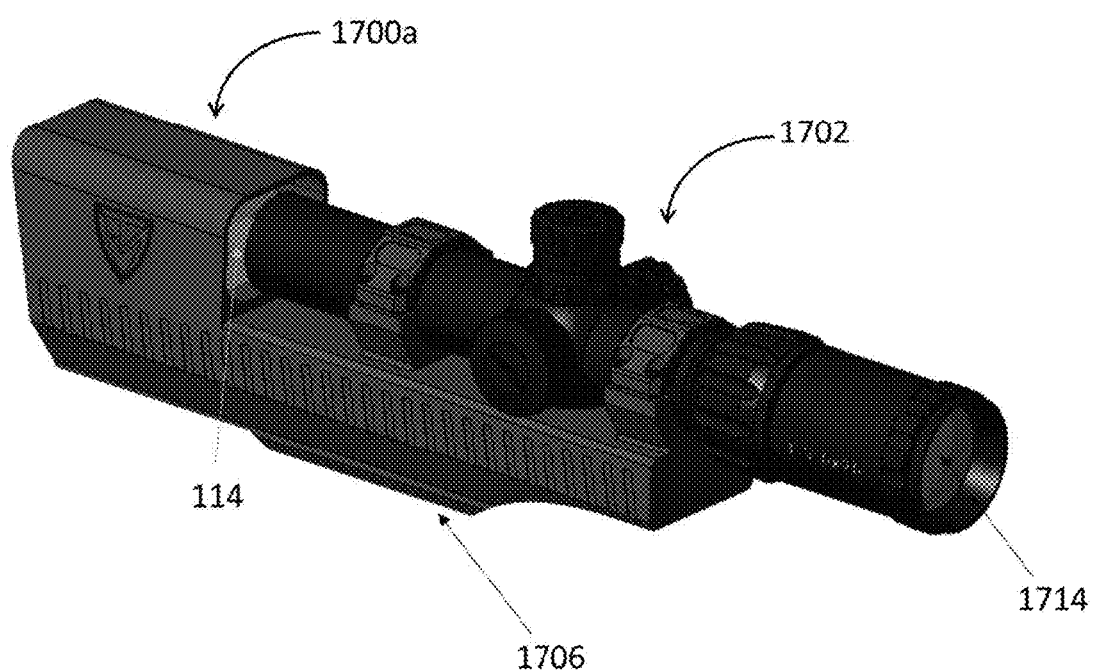
FIG. 17D illustrate a perspective back view of a compound firearm scope shown in FIG. 17B.

FIG. 17D illustrates a rear perspective view of the firearm scope 1700*a* connected to the primary scope 1702. An entrance window of the primary scope 1702 may be aligned with the exit window 114 of the firearm scope 1700*a* such that the direct view image received from the entrance window 112, the IR video image and the auxiliary video image projected by the video projection system, can be viewed through an exit window 1714 of the primary scope 1702.

Figure 18:
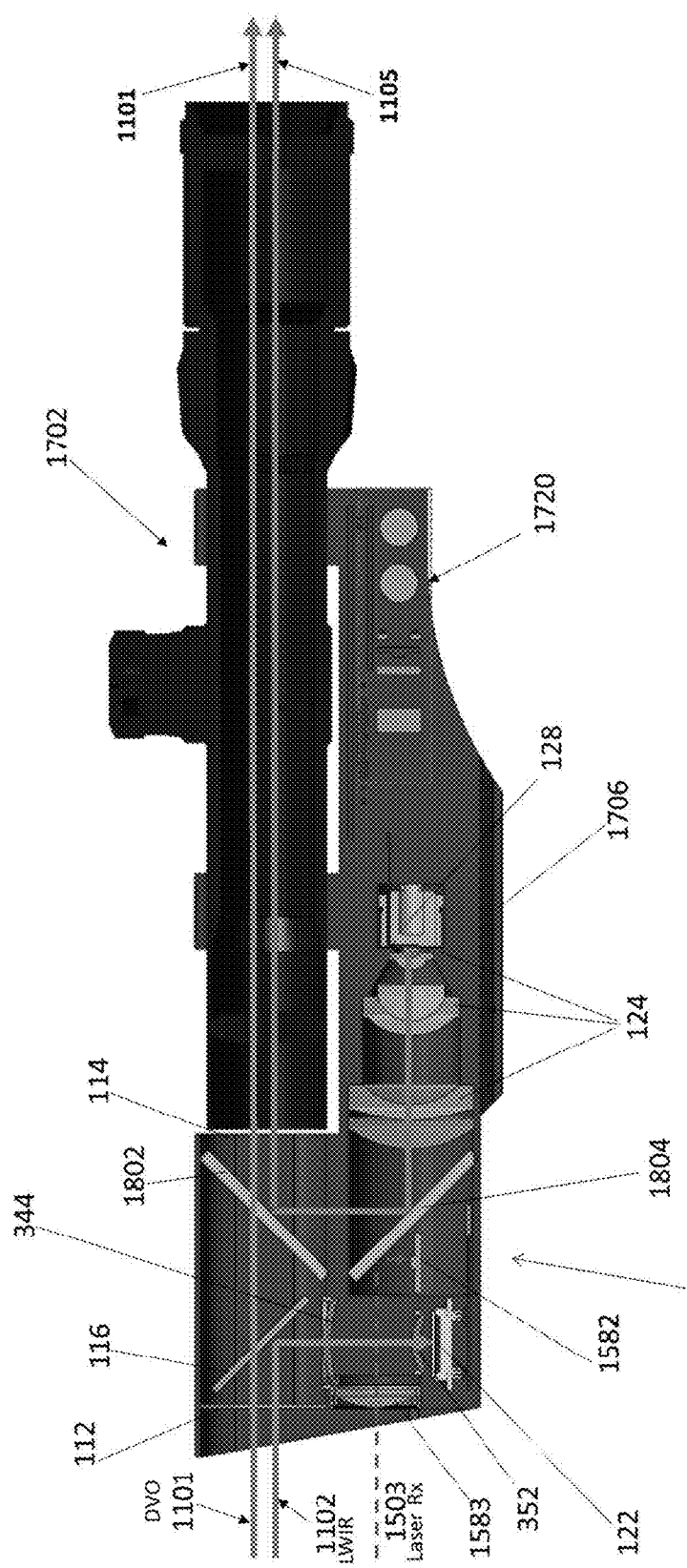
FIG. 18 illustrates the side view cross-section of the firearm scope shown in FIG. 17B.

FIG. 18 illustrates the side view cross-section of the firearm scope 1700*a* shown in FIG. 17B. The firearm scope 1700*a* can be configured to provide a direct view of a target scene with or without an overlay video image that may comprise an IR/thermal video image and/or an auxiliary video image. The arrangement and functions of the components and subsystems in the firearm scope 1700*a* can include one or more of the features previously described with respect to the firearm scopes 200, 1300 and/or 1600. More specifically, the components and subsystems used to generate the IR/thermal video image and the auxiliary video image in the firearm scope 1700*a*, may be similar or identical to those described with respect to firearm scope 200, 1300, or 1600.

The firearm scope 1700*a* includes an IR/thermal imaging subsystem and a video projection subsystem that enable the above-mentioned imaging modalities. Additionally, the firearm scope 1700*a* may include a tri-laser subsystem 1720, and a laser rangefinder (LRF) receiver, and a sensor subsystem. The tri-laser subsystem may include a visible laser pointer, an IR laser pointer, and a ranging laser. The ranging laser and the LRF receiver may constitute the LRF subsystem configured to determine a distance between the firearm scope and a target or point in the target scene. The subsystems of the firearm scope 1700a may be controlled by the EPCU included in the housing 1701a. In some embodiments, a subsystem or a feature of a subsystem may be controlled by a firearm or a device to which the clip-on sight control is attached, or another device that is in communication with the EPCU. The subsystems and the EPCU may be powered by the battery included in the housing 1701a and/or receive power from the power interface of the rail mount 1706.

In some embodiments, the interconnections between the IR/thermal imaging, the video projection, the LRF, the tri-laser, the sensor subsystem and the EPCU of the firearm scope 1700a, may comprise the interconnections between the IR/thermal imaging subsystem 1708, the video projection subsystem 1710, the LRF 882, the tri-laser subsystem 1720, the sensor subsystem 1730, and the EPCU 110 of the firearm scope 1700. In some cases, tone or more features of the IR/thermal imaging, the video projection, the LRF, the tri-laser, and the sensor subsystems of the firearm scope 1700a, may be controlled using a user interface and via EPCU.

The visible and IR/thermal light rays reflected or generated by a target scene enter the firearm scope 1700a through the entrance window 112. The visible light rays may pass through the firearm scope 1700a, exit via the exit window 114, and enter an eye of the user or the primary scope 1702 (e.g., via an entrance window of the primary scope 1702). The primary scope 1702 may generate a direct view image of the target scene using the visible light rays received from the exit window 114. The direct view image can be viewed through an eye piece or an exit widow of the primary scope 1702. IR/thermal light rays may be redirected toward the IR/thermal imaging subsystem of the firearm scope 1700a. The IR/thermal imaging subsystem may form an IR/thermal image of the target scene and generate a corresponding IR video signal usable for generating an IR/thermal video image. The video projection subsystem may generate video light rays using the IR video signal and/or an auxiliary video signal received from the EPCU. The video light rays may be directed toward the exit window 114 and received by the primary scope 1702 or a user's eye. In some cases, the video light rays output by the firearm scope 1700a, may be received by the primary scope 1702 to form a final video image viewable through the eye piece or the exit widow of the primary scope 1702. In some embodiments, the primary scope may form the final video image on the same image plane where the direct view image is formed. As a non-limiting example of the flow of light within the firearm scope 1700a and the primary scope 1702, FIG. 18 illustrates three light rays depicting the optical paths associated with the direct view, IR/thermal and auxiliary video views, and the laser rangefinder (LRF). The visible light ray 1101 passes through the entrance window 112, the dichroic beam splitter 116 and a beam splitter 1802, the exit window 114 and becomes incident on the objective lens or the entrance window of the primary scope 1702. The IR/thermal light ray 1102 passes through the entrance window 112 and is redirected by the beam splitter 116 toward the infrared image sensor 122. The video light ray 1105, that is generated by the projector 128, is redirected by the double-sided reflector 1804 toward the beam splitter 1802. The beam splitter 1802 further redirects the video light ray 1105 toward the entrance window or the objective lens of the primary scope 1702. After exiting the primary scope 1702, the visible light ray 1105 and the video light ray 1101 may enter an eye of a user.

The IR/thermal imaging subsystem may comprise, the dichroic beam splitter 116, an IR objective lens 344, an IR eyepiece 352, and the IR image sensor 122 (e.g., an IR focal-plane array). The dichroic beam splitter 116, the objective lens 344, the eyepiece 352, and the IR image sensor 122 of the firearm scope 1700a may include one or more features described with respect to their counterparts in the firearm scope 200, 1300 or 1600. The IR/thermal imaging subsystem may generate an IR/thermal video signal usable for generating an IR/thermal video image of a target scene. As described above, the IR/thermal light rays received via the entrance window 112 may be reflected toward the IR objective lens 344 by the dichroic beam splitter 116. The received IR light rays may pass through and transformed by the IR objective lens 344 and the IR eyepiece 352, to form an IR/thermal image on the IR image sensor 122. In response to formation of the IR/thermal image, the IR image sensor 122 may generate the IR/thermal video signal. In some cases, the IR/thermal imaging subsystem may be a high field of view (HFoV) imaging system. For example, an angular field of view of the IR/thermal imaging subsystem may be between 10 and 15 degrees, or between 15 and 20 degrees, or larger.

The video projection subsystem may comprise the beam splitter 1802, a double-sided reflector 1804, a visible optical imaging subsystem 124 and the projector 128. In some embodiments, the projector 128 may comprise an LED display (e.g., a high brightness micro-LED display). The visible optical imaging subsystem 124 and the projector 128 of the firearm scope 1700a may include one or more features described with respect to their counterparts in the firearm scope 200, 1300, 1600, or 1700. The video projection subsystem may generate video images using IR/thermal video signals received from the IR/thermal imaging subsystem (e.g., from the IR image sensor 122 or a signal processor/amplifier) and/or the auxiliary video signals generated and received from the EPCU. The EPCU may generate the auxiliary video signals using data stored in a memory of the EPCU or data received from an external device via the rail mount 1706 or wireless link (e.g., a wireless link between a transceiver of the EPCU and the external device). The dichroic beam splitter 116, the beam splitter 1802, and the double-sided reflector 1804 enable daylight vision, night vision, and viewing the auxiliary information via a single entrance window 112 and a single exit window 114. In some examples, the beam splitter 1802 may split an incident visible light beam (e.g., having a wavelength between 0.4 microns and 0.7 microns) to a transmitted light beam and a reflected light beam. In some cases, a splitting ratio of the beam splitter 1802 (e.g., the ratio between the intensity of the transmitted light beam and the reflected light beam) may be 90/10, 80/20, 70/30, or 60/40. In some examples, the beam splitter 1802 may comprise a plurality of dielectric layers disposed on a substrate. The number of dielectric layers, optical property, and thickness of each dielectric layer may be selected to provide a desired splitting ratio for light having a wavelength within the visible wavelength range.

The double-sided reflector 1804, may comprise two reflective surfaces configured to reflect light incident on both sides of the reflector. A first surface reflective surface of the double-sided mirror 1804 (facing the visible imaging subsystem) may be configured to reflect visible light received from the video projection subsystem and redirect it to beam splitter 1802. A second reflective surface of the double-sided reflector 1804 (facing the RFL lens 1583) may be configured to reflect (or redirect) laser light (e.g., IR or visible light) received from the LRF lens 1583 and direct it to the rangefinder sensor 1582.

In some embodiments, the projector 128 uses the auxiliary video signal and/or the IR video signal to generate a video image and project the video image onto the visible imaging subsystem 124. The visible imaging subsystem 124 transforms the video image received from the projector 128 to a video image viewable via the primary scope 1702. In some examples, a distance between the image plane of the visible imaging subsystem 124 and the entrance window of the primary scope 1702, can be within a range substantially equal to the target range (e.g., a range of distances between a target and the entrance window of the primary scope 1702). The primary scope 1702 may generate an image comprising the video image superimposed on the direct view image of the target scene on a single image plane. As such, the eye of the user can simultaneously focus on the video image and the target scene. In some cases, visible imaging subsystem 124 comprises a plurality of compound lenses configured to generate a video image with minimal aberration. In some cases, a magnification of the video image generated by the projector (and therefore the magnification of the final video image (e.g., a composite video image) transmitted to the exit window 114, may be controlled by the EPCU. The EPCU may control the magnification of the video image automatically or based on user input received from a user interface. In some cases, the EPCU may automatically control the magnification of the video image based on a magnification of the primary scope. For example, the primary scope may send a magnification signal indicative of a magnification selected for the primary scope (e.g., by the user), and the EPCU may use the magnification signal to electronically adjust the magnification of the video image.

In some examples, the video image may comprise the IR/thermal video image, the auxiliary video image or both. In some cases, the IR/thermal video image included in the video image may be parallax free image.

In some embodiments, a user can control the IR video signal and the auxiliary video signal independently, using a user interface of the firearm scope 1700*a* (e.g., the 3-button user interface 1704). In some examples, the user may control the content of the video image superimposed on the direct view image by activating or deactivating the IR or the auxiliary video signals. When both IR and the auxiliary video signals are activated, the projector 128 may generate a composite video image comprising an IR/thermal video image of the target scene and an auxiliary video image. In some embodiments, the tri-bottom user interface may allow a user to activate a menu in the auxiliary video image, navigate through the menu options, and select an option.

In some cases, the EPCU may automatically activate or deactivate the auxiliary video signal or the IR/thermal video signal based on a signal received from a sensor (e.g., a light level sensor that monitors a level of visible light in the environment surrounding the firearm scope 1700*a*).

As described above, some embodiments include or are configured to connect to a laser rangefinder (LRF) subsystem. The LRF subsystem can comprise a ranging laser and an LRF receiver. The LRF receiver can include the rangefinder lens 1583, the double-sided reflector 1804, and a rangefinder sensor 1582. In some cases, the rangefinder sensor may comprise an avalanche photodiode (APD). In some examples, the ranging laser may generate a laser beam (e.g., a visible or IR laser beam), and transmit the laser beam toward the target scene. The LRF receiver may receive reflected or scattered light associated with the laser beam transmitted to the target scene (e.g., light scattered or reflected from a point or object in the target scene). The reflected laser light 1503 may be received by the rangefinder lens 1583 and redirected to the rangefinder sensor 1582 by the double-sided mirror 1804. A focal distance of the rangefinder lens may be selected such that the received light is focused on the rangefinder sensor 1582. In some embodiments, the LRF may have two separate apertures or a single aperture positioned on the front surface of the firearm scope for transmitting and receiving laser beams. In some examples, a laser beam is transmitted via a laser transmitter aperture and the reflected or scattered light may be received by the rangefinder lens 1583. The LRF may be configured to measure a distance between the firearm scope and a target or a point in the target scene based at least in part on the received reflected/scattered light associated with an incident laser beam generated by the LRF. In some examples, the ranging laser can be a pulsed laser and the LRF may determine the distance based a time delay between transmission of a laser pulse and detection of the reflected light by the rangefinder sensor 1582. In some cases, the distance or the target range is determined by the EPCU based on signals received from the LRF. In some cases, the distance or target range determined by LRF may be included in the auxiliary information presented in the auxiliary video image. In some cases, the distance or target range determined by LRF may be used to generate a ballistic reticle image with automatic aiming point selection. In some examples, the LRF may be configured to determine target ranges or distances between 100 m to 500 m, 500 m to 1 km, 1 km to 2 km, 2 km to 3 km, or other ranges. In some cases, the LRF may receive sensor signals indicative of a level of humidity or a temperature of the environment surrounding the firearm scope. In some such cases, the LRF may determine the target range or the distance based at least in part on data received from a temperature sensor and/or humidity sensor (e.g., the temperature sensor or the humidity sensor included in the sensor subsystem). In some embodiments, the LRF may determine a target range upon receiving a trigger signal from the EPCU. The EPCU may automatically generate the LRF trigger signal at time periods selected by the user. In some cases, the EPCU may generate the LRF trigger signal upon receiving a user interaction with a user interface. As such, a user may obtain and observe the target range at any time. In some cases, EPCU may send a trigger signal to the LRF when the user activates a ballistic reticle image. In some examples, when the ballistic reticle image is activated, the LRF may continuously obtain the target range to update a red dot or the aiming point of the ballistic reticle image.

An auxiliary video signal may comprise a signal generated by a sensor (e.g., an environmental sensor), a detector (e.g., an eye detector), the LRF subsystem, the EPCU, the signal interface of the rail mount 1706, an add-on module, or another device. In some cases, the EPCU generates the auxiliary video signal using signals or data received from: the signal interface of the rail mount 1706, the LRF, the sensor suite, the IR/thermal imaging system, the video projection system, and the like. In some cases, the EPCU generates the auxiliary signals using wireless signals received from an external device (separated from the firearm) or an add-on module. In these cases, a wireless link may be established between a wireless transceiver included in or connected to the EPCU and the add-on module or the device. In some cases, the device can be a pair of night vision goggles, a head mounted display, a display system attached to a helmet, and/or any other type of equipment that may be included as part of a user's or soldier's kit. In some cases, an auxiliary video signal may comprise a video signal usable for generating a reticle image.

As describes above the auxiliary image may include auxiliary information and a bore sighted reticle image. In some examples, auxiliary information may include information associated with: the firearm or a device to which the clip-on scope is attached (e.g., number of round left in the magazine, . . . ), information associated with the surrounding environment sensor (e.g., light level, altitude, pressure, temperature, wind speed, wind direction, and the like), information associated with the firearm scope 1700a (e.g., amount of charge left in the battery, status of a subsystem, and the like), information associated with a device or add-on module that is in communication with the firearm or the firearm scope, data received from LRF, and the like. In various embodiments, auxiliary information may present as textual, numerical, or symbolic information in the auxiliary image.

In some cases, the image seen by the user directly through the exit window 114, or through the primary scope 1702 connected to the firearm scope 1700a when the auxiliary video image is superimposed on the direct view image, may comprise the image seen by the user through the firearm scope 200 as illustrated in FIG. 10.

In some embodiments, the user may control the auxiliary information and the reticle image included in the auxiliary image using a user interface. In some cases, the user interface can include the 3-button user interface 1704, a user interface of the firearm, or a user interface that is in communication with the firearm scope 1700a via a wireless link or via the signal interface of the rail mount 1706. For example, the user can use the user interface to select and change the auxiliary information presented in the auxiliary image and change the arrangement and positon of the auxiliary information in the auxiliary image. In some embodiments, the user may use the user interface to control the reticle image. For example, the user may change a shape (e.g., between circular or rectangular), a size, a type, or a color of the reticle, or align the reticle image to align the reticle image with firearm barrel's bore axis.

FIG. 19A illustrates an example of the tri-laser subsystem 1720 of the firearm scope 1700a. The tri-laser subsystem 1720 may comprise the ranging laser 1900, an IR laser pointer 1902, a red laser pointer 1904, two mirrors and two dichroic beam splitters mounted on tri-laser bench 1922. A first mirror 1910 may be positioned above the red laser pointer 1904 and configured to reflect the red laser beam 1916 generated by the red laser pointer toward the target. A first dichroic beam splitter 1908 may be located above the IR laser pointer 1902 and configured to transmit the red laser beam 1916 reflected from the first mirror 1910 and reflect the IR laser beam 1914 generated by the IR laser pointer 1902 toward the target. A second mirror 1911 may be located in front of an output aperture of the ranging laser 1900 and configured to reflect the IR laser beam 1912 generated by the ranging laser 1900 toward a second dichroic beam splitter 1906 positioned above the second reflector 1911. The second dichroic beam splitter 1906 may be configured to transmit the red laser beam reflected by the first mirror 1910, transmit the IR laser beam reflected by the first dichroic beam splitter 1908, and further reflect the raging laser beam reflected by the second mirror 1911 toward the target. In some embodiments, the mirrors 1911/1910 and the dichroic beam splitters 1906/1908 may be aligned such that a ranging laser beam reflected by the second dichroic beam splitter 1906, an IR laser beam reflected by the first dichroic beam splitter 1908, and a red laser beam reflected by the first mirror 1910, are collinear and become incident on a single point in the target scene. In some embodiments, the red, IR and ranging laser beams are aligned with the firearm barrel's bore axis. In some such embodiments, the user may use a point in the target scene illuminated by the red laser beam and/or the IR laser beam, as the aiming point. In some cases, the user may activate the IR/thermal subsystem to observe a point illuminated by the IR laser beam in the IR/thermal video image superimposed on the direct view image. In some embodiments, the EPCU of the firearm scope 1700a may automatically activate the IR laser pointer when the IR/thermal subsystem is activated. In some embodiments, the EPCU may automatically activate the IR/thermal subsystem when the IR laser pointer is activated. A user may independently activate or deactivate the IR laser pointer and the red laser pointer using a user interface of the firearm scope 1700a (e.g., the 3-button user interface 1704). In some examples, the EPCU may automatically control the IR laser pointer and the red laser pointer based on a light level signal received from a light sensor. For example, when the light level signal indicates a light level below a threshold light level, the EPCU may activate the IR laser pointer. In some cases, when the IR laser is activated (automatically or manually), the EPCU may automatically deactivate the red laser pointer.

In some embodiments, the red, IR and ranging laser beams may be aligned with respect to the bore sighted reticle image included in an auxiliary video image such that they become incident on a point in the target scene associated, for example, with a central aiming point of the reticle image.

The ranging laser beam can be a visible laser or IR laser beam. In some cases, the ranging laser can be a pulsed or modulated laser. In some such cases, a pulse width/period or a modulation frequency of the ranging laser may be controlled by the EPCU or an electronic control system of the LRF. The ranging laser may be automatically activated when the LRF subsystem is activate by a user.

FIG. 19B is perspective from view of the firearm scope 1700a connected to a primary scope illustrating the position of the tri-laser subsystem 1720 inside the firearm scope 1700a and a laser aperture 1920 located on the frond surface of the firearm scope 1700a. The laser aperture 1920 may be aligned with respect to the tri-laser subsystem 1720 such that the red, IR and ranging laser beams generated by the tri-laser subsystem 1720 can exit the housing 1701a via the laser aperture 1920. In some cases, the red, IR and ranging laser beams are collinear and exit the housing 1701a via the laser aperture 1920 as a single composite laser beam.

In some cases, the firearm scope 1700a (or 1700b) may have a design to reduce a dimension or a size of a compound sight system comprising the firearm scope 1700a. Advantageously, a compound sight system comprising the firearm scope 1700a (or 1700b) connected to a primary scope, may be more compact than a compound sight system comprising a single view clip-on night vision sight system (such as, for example, the PS28 night vision clip-on system, manufactured by ATN of Doral, Florida, U.S.A.) connected to the same primary scope. In some cases, a clip-on night vision system supports IR/thermal viewing but does not provide an auxiliary video image. In some cases, the clip-on night vision system may not include an LRF and/or laser pointers. As such, a compound sight system that includes the firearm scope 1700a may support additional functionalities compared to a compound sight system that includes the single view clip-on night vision system.

FIG. 20A-20D illustrate different views of an example compound sight system 2000 comprising the firearm scope 1700a connected to the primary scope 1702.

The firearm scope 1700a has a length 2012a along a longitudinal direction (e.g., parallel to the optical axis of the primary scope 1702) and a height 2014a along a vertical direction perpendicular to the longitudinal direction. In some examples, the length 2012a of the firearm scope 1700a may be between 6-8 inches, 8-10 inches, 10-12 inches, or 6-12 inches. In some examples, the height 2014a of the firearm scope 1700a may be between 1-2 inches, 2-3 inches, or 1-3 inches. In the example shown, the firearm scope 1700a has a length of 9.5 inches and a height of 2.8 inches. The compound sight system 2000 may have a length 2010 along the longitudinal direction. In some cases, the length 2010a of the compound sight system 2000 may be a distance between the entrance window of the firearm scope 1700a and the exit window of the primary scope. In some cases, the length 2010a of the compound sight system 2000 may be between 10-12 inches, 12-14 inches, or 10-14 inches.

FIG. 21A-21C illustrate different views of another compound sight system 2002 comprising a clip-on weapon sight 2100 connected to the primary scope 1702 included in the compound sight system 2000. In some cases, the clip-on weapon sight 2100 can be an FWS-I (Family of Weapon Sights—Individual) night vision clip-on sight. The compound sight system 2002 includes a scope mount 2102 on which the primary scope 1702 is mounted.

The clip-on weapon sight 2100 may have a length 2012b along a longitudinal direction (e.g., parallel to the optical axis of the primary scope 1702) and a height 2014b along a vertical direction perpendicular to the longitudinal direction. In the example shown, the clip-on weapon sight 2100 has a length of 7.3 inches and a height of 2.75 inches. The compound sight system 2002 may have a length 2010b along the longitudinal direction. In some cases, the length 2010b of the compound sight system 2002 may be a distance between the entrance window of the clip-on weapon sight 2100 and the exit window of the primary scope 1702. In the example shown, the length 2010b of the compound sight system 2002 is 16 inches.

As such, while the length 2012a of the firearm scope 1700a is larger than that of the clip-on weapon sight 2002, the length of the compound sight system 2000 is smaller than that of the compound sight system 2002. In some cases, the larger length of the firearm scope 1700a enables additional functionalities (e.g., providing an auxiliary video image and laser rang finding) and its unique design makes the resulting compound sight system smaller than those based on standard clip-on weapon sights (e.g., clip-on night vision sight systems).

Figure 22A:
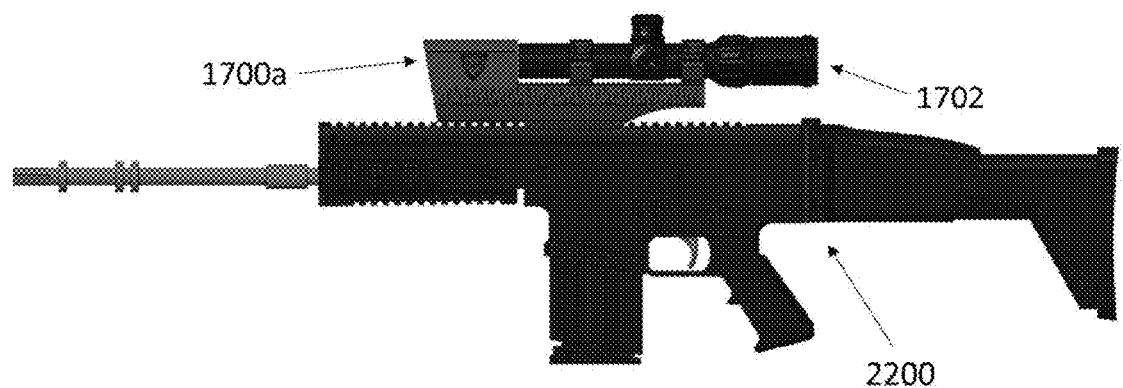
FIG. 22A illustrates the compound sight system shown in FIG. 20A-20D mounted on a firearm (SCAR 17).
Figure 22B:
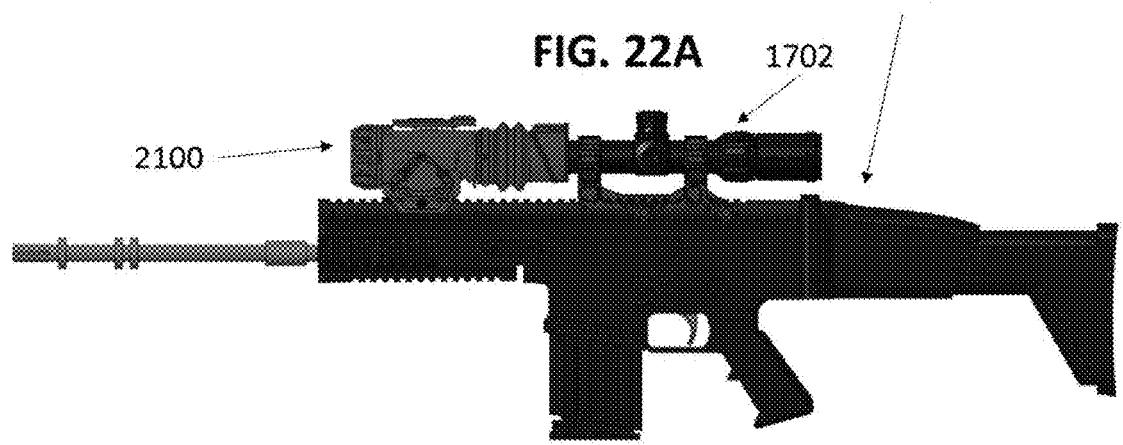
FIG. 22B illustrates the compound sight system shown in FIG. 21A-21C mounted on the same firearm shown in FIG. 22A.

FIG. 22A illustrates the compound sight system 2000 mounted on a firearm 2200 (e.g., a SCAR 17 as-operated automatic rifle). FIG. 22B illustrates the compound sight system 2002 mounted on the same firearm 2200 shown in FIG. 22A.

In some examples, the firearm scope 112 may comprise the tri-laser subsystem, the LRF subsystem, the video projection subsystem, and the IR/thermal imaging subsystem described above with respect to the firearm scope 1700a. In some such examples, the LRF receiver, the IR/thermal imaging subsystem, the projector, the visible imaging subsystem, and the double-sided mirror of the clip-on sight system 1700a may be positioned above, below, or to the side of the direct view optical path of the firearm scope.

Figure 23A:
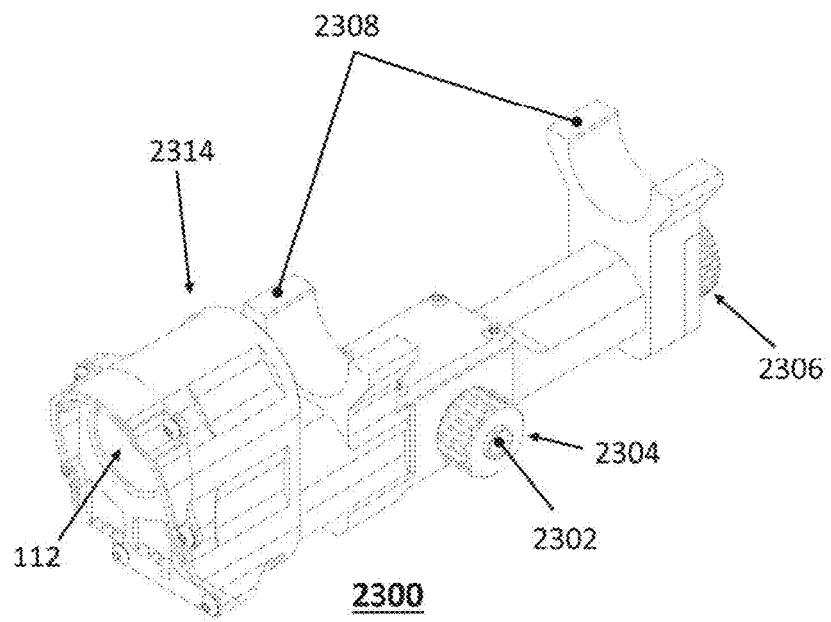
FIGS. 23A and 23B illustrate another firearm scope.
Figure 23B:
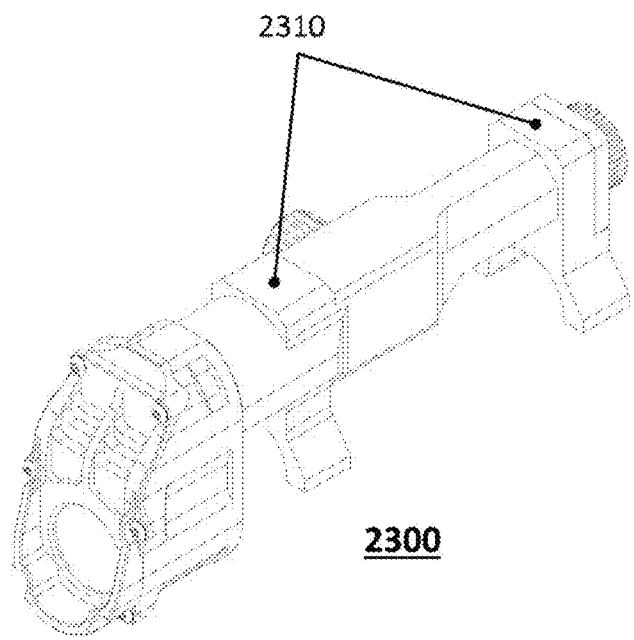

FIGS. 23A and 23B illustrate a sight system 2300, configured to provide a direct view image with or without an overlay auxiliary video image. The sight system 2300 may be a firearm scope, which may be used alone or in combination with another scope. In some cases, the sight system may be a clip-on sight system or may be part of a clip-on sight system that includes mechanical hardware for attaching the sight system 2300 to a firearm and/or to another scope. In some cases, the sight system 2300 may comprise one or more features described with respect to the firearm scope 1700, or 1700a/1700b. In some implementations, the sight system 2300 may be used as a stand-alone scope mounted on a firearm. The user may directly view a target scene through the sight system 2300. In some cases, the user may activate an auxiliary video image to superimpose auxiliary information and/or a bore sighted reticle image to the direct view seen via an exit window of the sight system 2300.

In some embodiments, the sight system 2300 may be connected to the primary scope and allow a target scene to be viewed through an exit window of the primary scope. In some embodiments, the sight system 2300 may provide an auxiliary video image to the primary scope and allow the target scene and the auxiliary video image to be simultaneously viewed through the primary scope. In some cases, a user's eyes can simultaneously focus on the target scene and the auxiliary video image. The auxiliary video image may comprise one or more features described above with respect to the auxiliary video image provided by the firearm scope 1700a.

In some examples, the sight system 2300 may comprise a housing 2314 that includes an entrance window 112, an exit window (not shown), rotary knob 2304 disposed on a sidewall of the housing 2314, two mounting seats 2308, a battery cap 2306, two rail interfaces 2310, and two adjustable clips configured for mounting the firearm scope 1700a on the primary scope 1702.

In various embodiments, the mounting seats 2308 may be configured to support mounting a variety of primary scopes on the sight system 2300 and optically aligning the sight system 2300 with the primary scope such that the different sight systems share a common optical path and/or a common field of view. In some cases, optical alignment of the sight system 2300 with the primary scope may include aligning a reticle image provided by the firearm scope with a bore sighted reticle of the primary scope.

In some embodiments, the housing of the sight system 2300 houses several subsystems and components including but not limited to a video projection subsystem, a battery (e.g., a rechargeable battery) and an electronic processing and control unit (EPCU). The video projection subsystem may be configured to superimpose an auxiliary video image, on a direct view mage received from the entrance window 112. The auxiliary video image, and the direct view image may be viewed through an exit window of the primary scope.

In some examples, the rail interfaces 2310 may be configured to exchange data between the firearm scope 1700a, and the firearm or a device to which the sight system 2300 is attached. In some examples, the rail interfaces 2310 may comprise a rail mount configured to be compatible with Picatinny rails, Weaver rails, or the like.

In some cases, the housing 2314 may be fabricated using a single part or several parts attached to each other. Advantageously, a multi-part housing may facilitate fabricating the sight system 2300 and replacing or repairing optical, electronic, and mechanical components housed inside the housing 2314. In some examples, the housing 2314 may comprise a main body, a front window seat, an electronic compartment cover and a back cover.

Figure 24:
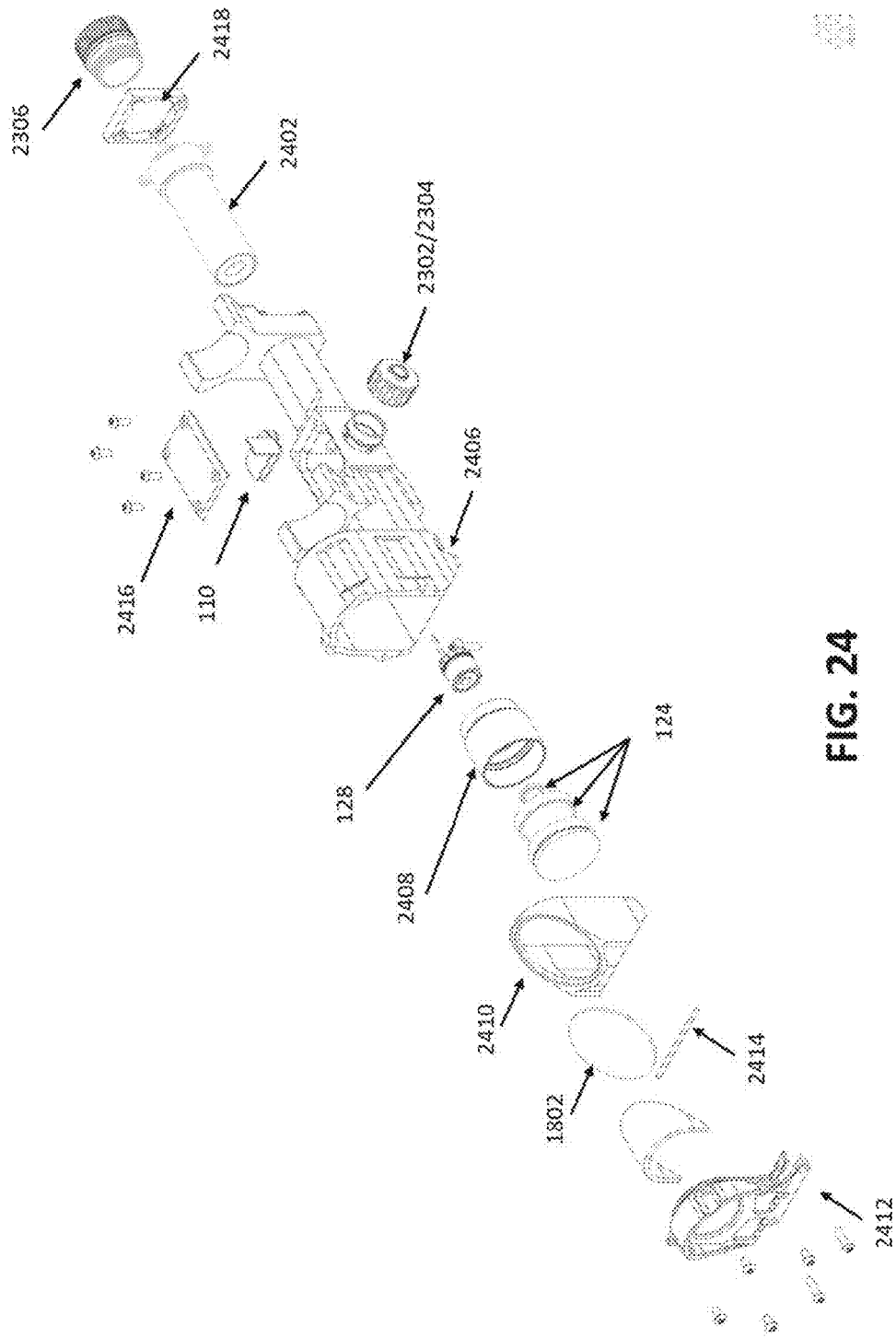
FIG. 24 illustrates a perspective view of the components that constitute the firearm scope shown in FIGS. 23A and 23B.

FIG. 24 illustrates a perspective view of at least some of the components that constitute the sight system 2300. The components used in the sight system 2300 may include: a front window seat 2412, a beam splitter 1802, a mirror 2414, a mirror mount 2410, a lens a visible imaging subsystem 124, a lens tube 2408, a projector 128, the main body of housing 2314, an electronic system 2404, an electronic compartment cover 2416, the rotary knob 2304, a back cover 2418 and a battery cap 2306. In some examples, the sight system 2300 may be powered by a battery 2402 (e.g., a rechargeable battery) placed in the housing body 2406. In some cases, the sight system 2300 may be powered by a power interface included in the rail interfaces 2310. In some cases, the electronic system 2404 may comprise an EPCU (e.g., EPCU 110 in firearm scope 1700, or the EPCU described with respect to firearm scope 1700a).

Figure 25:
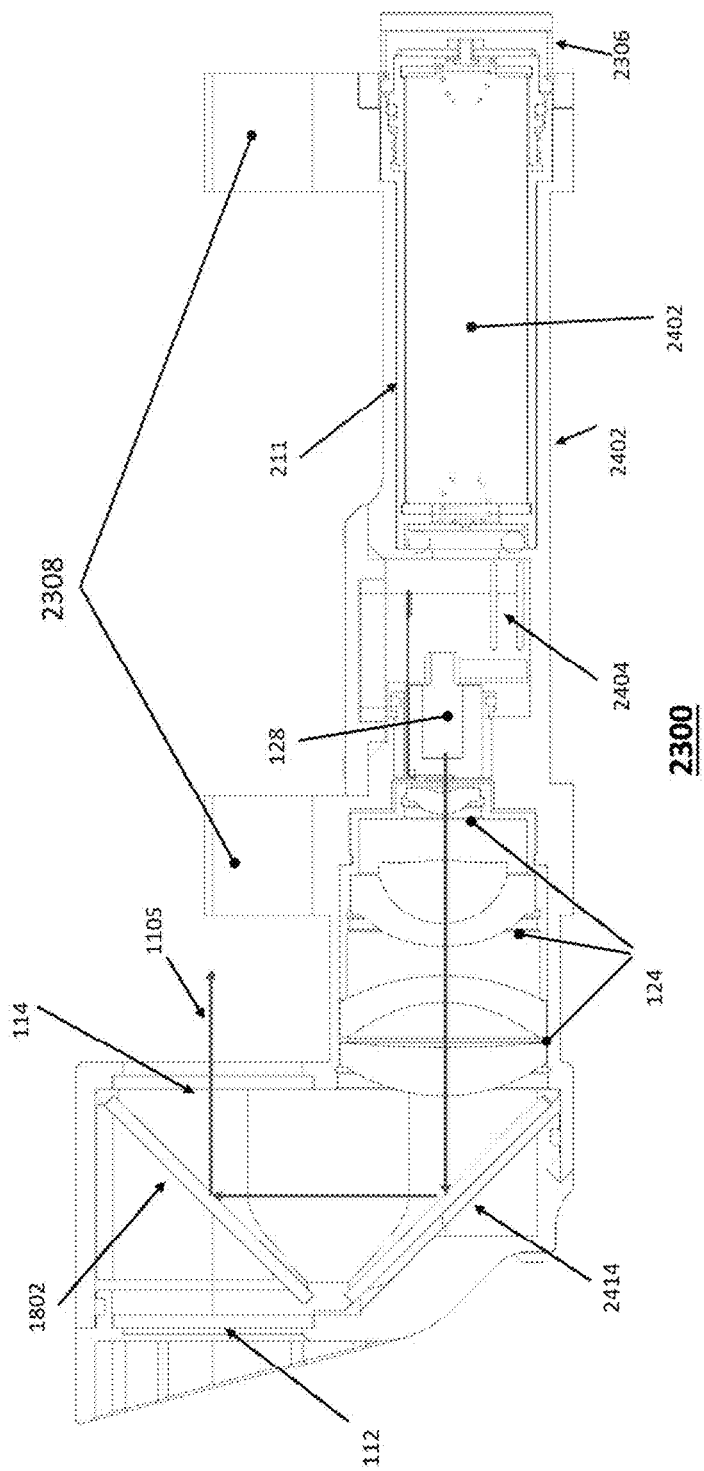
FIG. 25 illustrates the side view cross-section of the firearm scope shown in FIGS. 23A/B and FIG. 24.

FIG. 25 illustrates the side view cross-section of the sight system 2300 shown in FIGS. 23A/B and FIG. 24. The sight system 2300 can be configured to provide a direct view of a target scene with or without an overlay auxiliary video image. The arrangement and functions of the components and subsystems in the sight system 2300 can include one or more of the features previously described with respect to the firearm scopes 200, 1300, 1600, 1700 or 1700a. More specifically, the components and subsystems used to generate the auxiliary video image in the sight system 2300, may be similar or identical to those described with respect to scope 200, 1300, 1600, 1700, 1700a, or 1700b.

The sight system 2300 may include a video projection subsystem that enables the above-mentioned imaging modalities. The video projection subsystem of the sight system 2300 may be controlled by the EPCU (e.g., the EPCU included in the electronic system 2404). The EPCU may have one or more features or functionalities described above with respect to the EPCU 110 of the scope 100 or 200 in FIG. 9 or the scopes 1700, or 1700a/1700b in FIG. 17A-D. In some embodiments, the video projection subsystem or a feature of the video projection a subsystem may be controlled by a firearm or a device to which the clip-on sight control is attached, or another device that is in communication with the EPCU. The subsystems and the EPCU may be powered by the battery 2402 included in the housing 2314 and/or receive power from the power interface of the rail interfaces 2310. In some cases, the battery 2402 can be a rechargeable battery.

The visible light rays reflected or generated by a target scene may enter the sight system 2300 through the entrance window 112. At least a portion of these visible rays may pass through the sight system 2300 and enter the primary scope to form a direct view image. The video projection subsystem may generate video light rays using an auxiliary video signal received from the EPCU. The video light rays may be directed toward the exit window 114. Using the video light rays received from the sight system 2300, the primary scope may form a video image viewable through the eye piece or the exit widow of the primary scope. In some embodiments, the primary scope may form the video image on the same image plane where the direct view image is formed. As a non-limiting example of the flow of light within the sight system 2300, FIG. 25 illustrates a video light ray 1105, that is generated by the projector 128 and redirected by the mirror 2414 toward the beam splitter 1802. The beam splitter 1802 further redirects the video light ray 1105 toward the exit window 114.

The video projection subsystem may comprise the beam splitter 1802, the mirror 2414, the visible optical imaging subsystem 124 and the projector 128. The visible optical imaging subsystem 124 and the projector 128 of the sight system 2300 may include one or more features described with respect to their counterparts in the firearm scope 200, 1300, 1600, 1700, or 1700a. The video projection subsystem may generate video images using auxiliary video signals received from the EPCU. The beam splitter 1802, and the mirror 2414 may enable viewing the target scene and the auxiliary information via a single entrance window 112 and a single exit window 114. In some examples, the beam splitter 1802 may split an incident visible light beam (e.g., having a wavelength between 0.4 microns and 0.7 microns) to a transmitted light beam and a reflected light beam. In some cases, a splitting ratio of the beam splitter 1802 (e.g., the ratio between the intensity of the transmitted light beam and the reflected light beam) may be 90/10, 80/20, 70/30, or 60/40.

The mirror 2414 may have a reflectance larger than 95%, larger than 97%, or larger than 99% for light having a wavelength within the visible wavelength range. The projector 128 uses the auxiliary video signal and/or the IR video signal to generate a video image and project the video image onto the visible imaging subsystem 124. The visible imaging subsystem 124 transforms the video image received from the projector 128 to a video image viewable via the primary scope. In some examples, a distance between the image plane of the visible imaging subsystem 124 and the entrance window of the primary scope, can be within a range substantially equal to the target range (e.g., a range of distances between a target and the entrance window of the primary scope). The primary scope may generate an image comprising the video image superimposed on the direct view image of the target scene on a single image plane. As such, the eye of the user can simultaneously focus on the video image and the target scene. It should be understood that the term "primary scope" as used herein is used to distinguish a scope that may be used in combination with the sight system 2300 or sight system and not to limit the relative importance of the primary scope or the sight system 2300.

As indicated above, the sight system 2300 may be used independently, or as an add-on (e.g., a clip-on) sight system. For example, the sight system 2300 may be positioned between a target scene and another scope, such as, but not limited to, the scope 1702. The sight system 2300 may include a housing with a first optical element. This first optical element may be a window, such as an entrance window 112, that admits light. Alternatively, or in addition, the first optical element may be any other device that can admit light. For example, the first optical element may be a powered device (e.g., a projector) that can inject light into the sight system 2300. This light may be generated or reflected by elements of a target scene. Further, the housing may include a second optical element. The second optical element, much like the first optical element, may be a window, such as an exit window 114 that transmits a direct view image of the target scene. Alternatively, or in addition, the first optical element may be any other device that can output light. For example, the second optical element may be a powered device (e.g., a projector) that can output light from the sight system 2300. This direct view image may be formed from the light, or at least a portion of the light, admitted through the entrance window 112. In some cases, the entrance window 112 and/or exit window 114 may be replaced by an opening or aperture.

The sight system 2300 may be configured to superimpose an image, such as a digital image or a computer-generated image, on at least a portion of the direct view image of the targe scene. This image may be transmitted to the sight system 2300 via a wireless, wired, or optical connection. Alternatively, or in addition, the image may be generated by a process of the sight system 2300. Further, the image may include any type of data, image, symbology, or annotation that may be displayed to a user instead of or in addition to a direct view image of the target scene. In other words, the image may substitute for the direct view image or may be super imposed with the direct view image enabling a user to simultaneously view the direct view image and the image. Further, the data may include a reticle or reticle image, an ammunition count for a magazine or a cumulative ammunition count for a plurality of magazines, symbology (e.g., battery status, magazine status, ammunition count, etc.) associated with a firearm (e.g., a firearm to which the sight system 2300 is attached or registered), symbology associated with the sight system 2300 (e.g., battery status, position of a flip mirror, etc.), symbology associated with a target scene (e.g., distance or range, number of moving targets, etc.), symbology associated with a user's kit (e.g., number of registered magazines, ammunition count of ammunition available to the user, etc.), battery level of a battery in a magazine, scope, or firearm of the user, or any other type of data that may be desired or able to be super imposed with the direct view image. In some cases, the data may be an image of the target scene. For example, a thermal image or video image of the target scene may be presented or displayed through the exit window 114. At least some of the data may be obtained from a data source in communication with the sight system 2300. The data source may be a firearm, a scope, a magazine, or an electronic computing system (e.g., a smartphone, goggles, tablet, etc.) in communication with the sight system 2300.

The sight system 2300 may include a beam splitter 1802 that can receive light from the entrance window 112 associated with the target scene. The beam splitter 1802 may be configured to permit the transmission of visible light with a luminous transmittance greater than or equal to 80% using CIE Illuminant D65. Moreover, the beam splitter 1802 may be configured to permit the reflection of visible light with a luminous reflectance less than or equal to 20% using CIE Illuminant D65. In some cases, the beam splitter 1802 is an 80/20 beam splitter meaning that 80% of visible light may be transmitted while 20% of visible light may be reflected. In some cases, the beam splitter 1802 may transmit less visible light while reflecting more visible light. For example, the beam splitter 1802 may be a 60/40, 65/45, 70/30, or 75/25 beam splitter. In other cases, the beam splitter 1802 may transmit more visible light while reflecting less visible light. For example, the beam splitter 1802 may be an 85/15, 87/13, 90/10, or 95/5 beam splitter. Further, it should be understood that other configurations of the beam splitter 1802 may be possible.

In some embodiments, the beam splitter 1802 may include one or more dielectric layers that provide the beam splitter 1802 with its ratio of transmitted light to reflected light. Moreover, in some cases, the beam splitter 1802 may have a coating that permits the transmission of visible light with a luminous transmittance greater than or equal to 80% using CIE Illuminant D65. The coating may further permit the reflection of visible light with a luminous reflectance less than or equal to 20% using CIE Illuminant D65. Further, the beam splitter 1802 may include an anti-reflective coating. The anti-reflective coating may be on a different surface of the beam splitter 1802 than the coating that permits the transmission of visible light. For example, the coating may be on the surface of the beam splitter 1802 that, at least partially, faces the entrance window 112, while the anti-reflective coating may be on the surface of the beam splitter 1802 that are least partially faces the exit window 114. In some cases, the coating that permits the transmission of visible light and the anti-reflective coating may be on opposite surfaces.

The beam splitter 1802 can include one or more optical substrates and one or more functional layers to provide desired optical and/or mechanical characteristics. Functional layers can include, for example and without limitation, mirror stacks, gradients, polarizers, hard coatings, adhesives, index matching layers, anti-reflection coatings, interference stacks, anti-static coatings, wavelength-specific reflection or absorption layers, infrared reflection or absorption layers, and/or anti-fog coatings or layers. In certain embodiments, index matching techniques can be used to provide desirable or targeted optical characteristics. For example, like or dissimilar index materials can be used in boundary layers to provide desired index and Abbe numbers or to reduce reflections. Index matching materials, such as adhesives or dielectric layers, can be used to match the index of adjacent layers in the functional stack. Index matching materials can be used that have an index that is dissimilar to adjacent layers in a functional stack. Using matching or similar index materials in adjacent layers can result in an optical element with desired index and Abbe numbers. Using dissimilar or mismatched index materials in adjacent layers can reduce reflections. Any combination of materials can be used based at least in part on their indices to produce desired effects.

The sight system 2300 may further include a projector 128. The projector 128 may include any type of graphics projection system configured to project graphics, video, symbology, or any type of image that may be viewable by a user. Further, the projector 128 may by a projection system, a display system, a combination of a projection and display system, or any type of electronic display system that can output an image that may be viewable by a user. In some cases, the projector 128 may be a 2-dimensional or 3-dimensional display. For example, the projector 128 may be a light projector that projects light into a waveguide forming an image that is viewable by a user via the exit window 114. As another example, the projector 128 may be or may include a light-emitting diode (LED) display, a liquid crystal display (LCD), or a digital micromirror device (DMD). In some cases, the use of the beam splitter 1802 and the projector 128 may result in a dimmed image or an image that can be difficult to see in some lighting due to decreased luminance caused by using the beam splitter under particular lighting conditions. In cases where the beam splitter transmits less visible light, it may be more difficult or even not possible to view the target scene with the human eye under particular light conditions. For example, a 60/40 beam splitter may make it challenging to view a target scene at dusk or dawn.

Moreover, it may be challenging to see symbology or other images generated by the projector 128. For example, at dawn or dusk, the use of the 60/40 beam splitter may result in not only a dimmer view of the target scene, but also a dimmed view of an image generated by the projector 128. Thus, in some cases, the sight system using a 60/40 beam splitter and, for example, an LCD projector 128 may not be useable at certain times of day or within particular lighting conditions.

In some cases, the beam splitter 1802 may be moveable and can be moved out of the path of light received from the entrance window 112 enabling a user to view a target scene under low light conditions. Alternatively, or in addition, a high-power projector 128 may be used enabling a brighter image to be projected and consequently, the use of a beam splitter 1802 (e.g., an 80/20 or 90/10 beam splitter) with greater transmittance and lower reflectivity. However, the use of a high-power projector 128 may cause an excessive drain on the battery 2402 making the projector 128 unusable for long periods of time.

In some embodiments, the projector 128 may be implemented using brighter display technologies than prior display technologies. For example, the projector 128 may be implemented using a quantum dot organic light-emitting diode (QD-OLED) display. In some cases, QD-OLED may lack sufficient brightness under certain lighting levels.

In some implementations, the projector 128 may be implemented using a micro light-emitting diode (micro-LED) display. The projector 128 implemented using the micro-LED display may use less power than other projectors. For example, while an LCD display may use several Watts of power, a micro-LED display may use a fraction of a Watt of power for the same size screen. In some cases, the power consumption of the projector 128 implemented using the micro-LED display may be less than or equal to 100 mW at an average picture level (APL) of 6%.

Further, a projector 128 implemented using the micro-LED display may have a significantly greater luminance than other projectors, even at the lower power consumption rate. For example, the projector 128 may have a luminance greater than or equal to 50,000 cd/m$^2$ (or 50,000 nits) with a power consumption of less than or equal to 100 mW at an average picture level (APL) of 6%. Advantageously, using a projector 128 with a luminance greater than or equal to 50,000 nits enables the use of a beam splitter 1802 with a luminous transmittance greater than or equal to 70% using CIE Illuminant D65 and a luminous reflectance less than or equal to 30% using CIE Illuminant D65 (e.g., an 80/20 beam splitter). In some cases, the beam splitter 1802 may be 80/20, 85/15, 87/13, 90/10, or more. Although the aforementioned examples have a sum of luminous transmittance and luminous reflectance equal to 100%, in some cases, the sum of luminous transmittance and luminous reflectance of the beam splitter 1802 may be less than 100%.

In some cases, the projector 128 may have a luminance greater than 50,000 nits. For example, the projector 128 may have a luminance of 100,000 nits, 250,000 nits, 500,000 nits, 4,000,000 nits, or more, or any value in between the aforementioned examples. Moreover, the projector 128 may have a power consumption of less than 100 mW. For example, the projector 128 may have a power consumption of 50 mW, 25 mW, 15 mW, or less, or any value in between the aforementioned examples. Moreover, it should be understood that the power consumption may vary depending on the APL of the projector 128. The aforementioned examples may reflect the power consumption at an APL of 6%.

The projector 128 may support a relatively high refresh rate. For example, the projector 128 may support a refresh rate of 125 Hz. However, in some cases, a refresh rate of 125 Hz may be unnecessary for projecting or superimposing symbology or other data on the target scene. In some such cases, the refresh rate may be set as low as 40 Hz, 30 Hz, 20 Hz, or 10 Hz, or any value in between. In other cases, the refresh rate may be higher or lower than the aforementioned examples. It can be important to reduce power consumption in certain use cases to extend battery life. For example, in military applications, it can be important that power is available when needed for a firearm scope. By reducing the refresh rate of the projector 128, power consumption may be further improved while maintaining visibility of the target scene and the superimposed symbology or data. Further, in some cases, the refresh rate may be adjusted dynamically. For example, the refresh rate may be set lower (e.g., at 15 or 10 Hz) when static or infrequently changing symbology is used (e.g., battery status, reticle display, etc.). In other cases, the refresh rate may be set higher (e.g., 30 or 40 Hz) when dynamic or frequently changing symbology is used (e.g., ammunition count, compass direction, etc.). In some cases, the refresh rate may vary dynamically and automatically based on the data displayed or being updated. In other cases, the refresh rate may be set to a static value based on displayed symbology, selected mode, or user control.

In some cases, the projector 128 may be configured to project or display particular visible frequencies. These frequencies may be associated with particular colors. For example, the projector 128 may be a red light display, a green light display, or a blue light display. In other cases, the projector 128 may be a full color display capable of displaying any colors or light within the visible spectrum. Further, the beam splitter 1802 may be configured to permit the reflection of visible light without filtering frequencies within the visible light spectrum. In other words, the beam splitter 1802 may be a neutral beam splitter enabling a user to view the target scene without distortion of color or otherwise.

As stated above, the projector 128 may be a two- or three-dimensional display system. This display system may include a set of pixels. Power consumption may be further reduced by turning on a subset of the available pixels. For example, pixels in a designated portion (e.g., upper left corner, or bottom 15% of the viewing space, etc.) of the view-space formed by the exit window 114 may be turned on while other pixels remain off. As another example, pixels necessary or sufficient to display symbology or data may be turned on while remaining pixels may be kept off. In some cases, assuming the projector 128 is formed by a set of N pixels, the projector 128 may be configured to turn on a particular fraction of pixels, or less than N pixels. In other cases, all N pixels may be turned on. The pixels of the projector 128 may be individually-addressable pixels. The use of individually-addressable pixels enables control over the pixels used to display symbology and other data, as well as enabling control over the pixels that are turned on.

Further, the pixel-density of the projector 128 may be more than or equal to 150 pixels per inch (PPI). In some cases, the pixel-density may be more than or equal to 3,000 PPI, 5,000 PPI, 6,000 PPI, or more or any value in between the aforementioned examples. Further, the pixel pitch (or dot pitch) may be less than 200 μm. In some cases, the pixel pitch may be as low as 4 μm.

As has previously been described herein, the projector 128 may display video or an image by generating or projecting a set of frequencies in the visible light spectrum, which may be reflected by the beam splitter 1802 towards the exit window 114. A user may view the projected image directly, or through another optical system, such as a primary scope 1702 with an entrance window aligned with the exit window 114.

The image projected may include any type of data, symbology, or otherwise that can be represented visually. For example, the image may include an indication of ammunition within a magazine, such as a magazine inserted into a firearm that is operatively connected to the sight system

2300. As another example, the image may include an indication of ammunition within a magazine (or set of magazines) registered or associated with a firearm or a user. Additionally, or alternatively, the image may be of a reticle or other aiming guide for guiding aim of a firearm or weapon system. In some cases, the image may include any type of symbology associated with a firearm (e.g., magazine inserted status, battery level, etc.), the sight system 2300 (e.g., battery level, projector 128 on, etc.), the target scene (e.g., range or distance to target, daylight level, time, etc.), or a user's kit (e.g., ammunition count, magazine count, etc.). In some cases, the image may be a video image of the target scene. For example, the video image may be a zoomed in or enhanced view of the target scene. As another example, the image may be a thermal image of the target scene.

The data or corresponding symbology displayed by the projector 128 may be from the projector 128 (e.g., a battery of the sight system 2300 or data from a rangefinder incorporated into the sight system 2300). Alternatively, the data or corresponding symbology may be received from or generated based on data received from an external data source. This external data source may be a firearm, a magazine, or any electronic device that can communicate directly or indirectly with the sight system 2300. The external data source may communicate via a wired, wireless, or optical connection to the sight system 2300. For example, an optical connection between the firearm and the sight system 2300 may be used to communicate an ammunition count of a magazine inserted into the firearm to the sight system 2300. The projector 128 may then superimpose symbology representing the magazine count on a direct view of a target scene enabling a user to see the target scene and ammunition count simultaneously in the exit window 114 of the sight system 2300. In some embodiments, the sight system 2300 may include a processor that can generate the image for projection or display by the projector 128.

As previously described, in some cases, the sight system 2300 may be used without an additional scope or sight system. In such cases, a user may observe a target scene via the exit window 114 based on light admitted via the entrance window 112. However, in other cases, the sight system 2300 may be used in combination with a primary scope or another sight system (e.g., another scope, binoculars, etc.). Further, in some cases, the sight system 2300 may be mounted in combination with the primary scope. Mounting the sight system 2300 (or secondary scope) with the primary scope may be achieved in several different ways while achieving the advantages disclosed herein. For example, the primary scope and the sight system 2300 may each be mounted to a rail of a firearm. The sight system 2300 may be mounted directly in front of the primary scope where the front may be closer to the muzzle of the firearm and the rear closed to the stock. Further, the sight system 2300 may be mounted close enough to the primary scope to eliminate or minimize a gap between the exit window 114 of the sight system 2300 and an entrance window of the primary scope. In some such cases, the sight system 2300 and the primary scope may each be attached to the firearm without being attached to each other. In other embodiments, the sight system 2300 may be mounted to the firearm, such as via a rail mount, and the primary scope may attach to the sight system 2300 in such a manner as to align the exit window 114 of the sight system 2300 and the entrance window of the primary scope. In yet other embodiments, the primary scope may be mounted to the firearm, such as via a rail mount, and the sight system 2300 may include clips or other mechanical mounting accessories that enable the sight system 2300 to mount or connect to the primary scope in such a manner as to align the exit window 114 of the sight system 2300 and the entrance window of the primary scope.

Figure 26A:
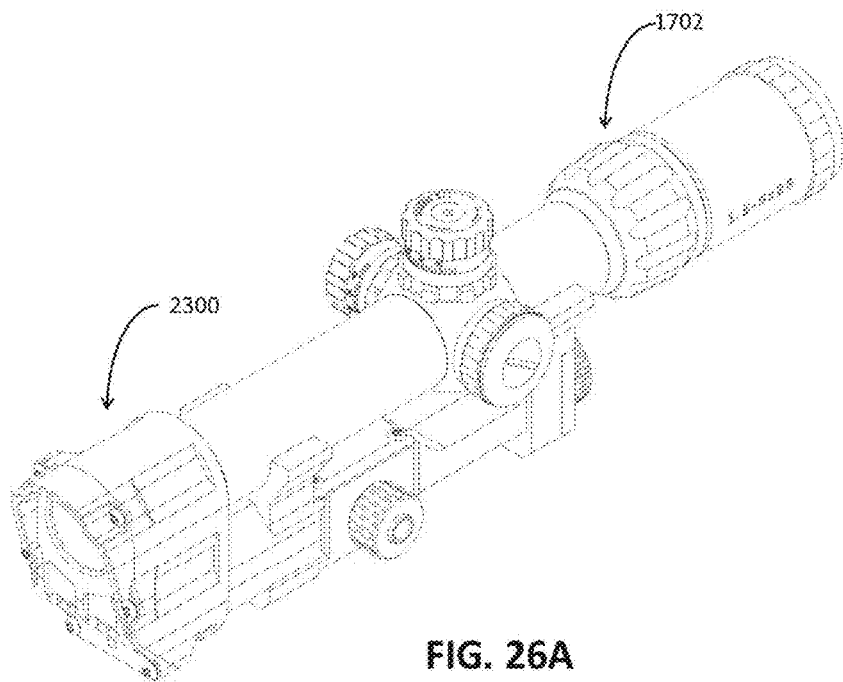
FIGS. 26A and 26B illustrate a perspective view and a side cross-section view of a compound firearm sight system comprising the firearm scope shown in FIGS. 23A, 23B, 24, and 25 connected to a primary scope.
Figure 26B:
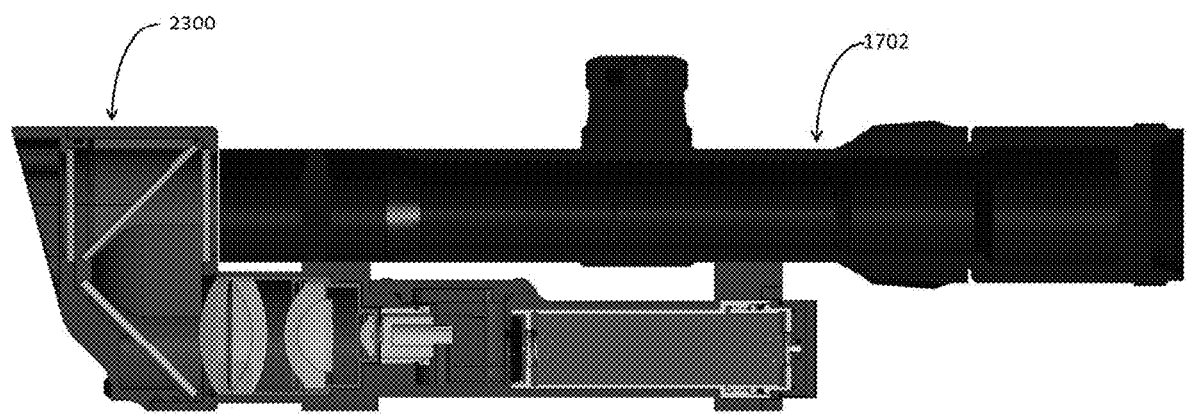

FIGS. 26A and 26B illustrate a perspective view and a side cross-section view of a compound firearm sight system comprising the sight system 2300 connected to primary scope 1702.

In some embodiments, the sight system 2300 may comprise a tri-laser subsystem, a laser rangefinder, and a sensor subsystem. In some cases, the tri-laser subsystem, the laser rangefinder, and the sensor subsystem of the sight system 2300 may comprise the tri-laser, the laser rangefinder, and the sensor subsystems described above with respect to the firearm scope 1700, 1700*a*/1700*b*. In some cases, the tri-laser subsystem included in the sight system 2300 may not include an IR laser pointer.

Figure 27B:
FIGS. 27A and 27B illustrate an example target scene viewed through a compound sight system shown in FIG. 17A-17D.
Figure 27A:

FIGS. 27A and 27B illustrate an example target scene viewed through a compound sight system comprising the firearm scope 1700*a* connected to a primary scope 1702 (e.g., a standard 24 mm LVPO). FIG. 27A shows the exit aperture of the primary scope and FIG. 27B is a close-up view of the exit window. The rectangular reticle may be a part of the video image superimposed on the direct view image.

In some embodiment, the EPCU on a firearm scope may be configured to automatically disable, the video image, the IR/thermal video image, the auxiliary video image, or a set of auxiliary information in the auxiliary video to save power.

In some embodiments, the bore sighted reticle image included in the auxiliary video image may be a ballistic reticle having multiple aiming points. In some cases, the bore sighted reticle image may be an automatic ballistic reticle that includes an aiming point selected based on a ranging signal received from a laser rangefinder (LRF). For example, the selected aiming point may be an aiming point of the plurality of aiming points presented in the reticle image that is highlighted or presented with a different color. In some cases, the aiming points not selected may be dimed or eliminated from the reticle image.

In some cases, the LRF may be a built-in LRF included in the firearm scope (e.g., the firearm scope 1700*a*/100*b*). In some cases, the LRF may be an LRF of the firearm or the primary scope.

Example Rangefinder

Figure 28:
FIG. 28 illustrates an example of a rangefinder in accordance with certain embodiments.

FIG. 28 illustrates an example of a rangefinder 2800 in accordance with certain embodiments. The rangefinder 2800 may include any type of rangefinder that may be used to identify a distance to a target. The rangefinder 2800 may be a laser rangefinder and may support any distance. For example, the rangefinder 2800 may have a range of more than 500 meters, 1000 meters, 2000 meters, 2500 meters, 5000 meters, 1 mile, 2 miles, or more.

Further, the rangefinder 2800 may have a transmitter configured to transmit data from the rangefinder 2800 to an electronic device, such as the primary scope 1702 or the sight system 2300. The transmitter may be a wired, wireless, or optical transmitter that can communicate with a wired, wireless, or optical receiver of the electronic device. For example, the rangefinder 2800 may transmit a distance to a target to the sight system 2300 enabling the sight system 2300 to display the distance to the target to a user. Advantageously, by transmitting the data to a sight system 2300, a user can view a target scene, the distance to a target within the target scene, and any additional desired data or symbology simultaneously in one image.

Figure 29:
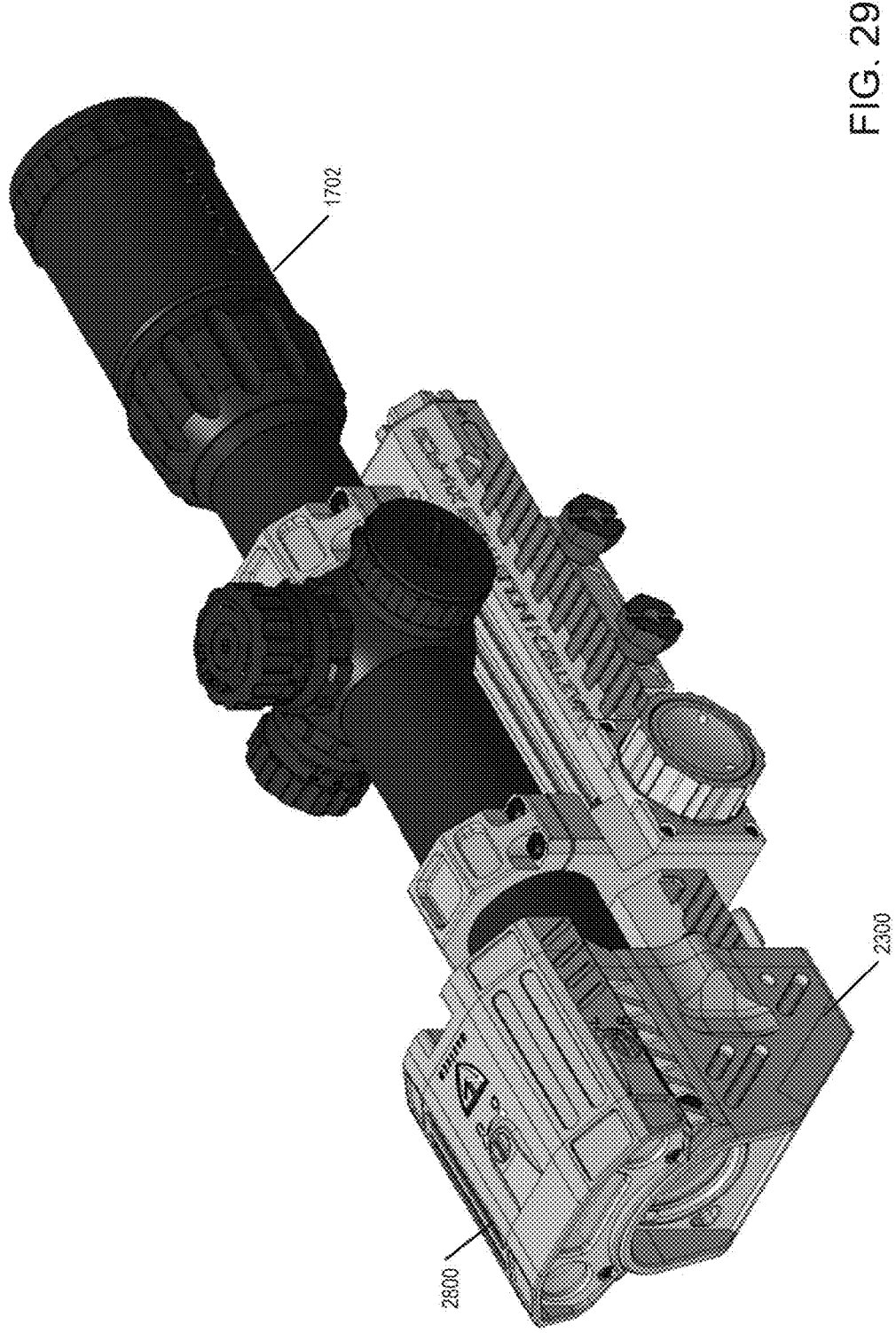
FIG. 29 illustrates an example of the rangefinder of FIG. 29 in combination with a compound sight system in accordance with certain embodiments.

FIG. 29 illustrates an example of the rangefinder 2800 of FIG. 29 in combination with a compound sight system in accordance with certain embodiments. As illustrated in FIG. 29, the rangefinder 2800 may be mounted with respect to the sight system 2300. The sight system 2300 may be used solitarily or in combination with the primary scope 1702. The rangefinder 2800 may be mounted on the sight system 2300 using a hot shoe connection. In some cases, the hot shoe connection may align an optical window of the rangefinder 2800 with an optical window or the sight system 2300 enabling optical transmission of data between the rangefinder 2800 and the sight system 2300. Alternatively, or in addition, the hot shoe connection may align a near field (e.g., NFC) or short-range transceiver (e.g., Bluetooth, Zigbee, etc.) of the rangefinder 2800 with a near field or short-range transceiver of the sight system 2300 enabling transmission of data between the rangefinder 2800 and the sight system 2300.

Further, the hot shoe connection may be replaced with alternative systems for mounting the rangefinder 2800 to the sight system 2300. Alternatively, or in addition, the rangefinder 2800 may be configured to mount to the primary scope 1702 and/or to a rail of a firearm. In some such cases, the rangefinder 2800 may be positioned in a manner that enable communication between the rangefinder 2800 and one or more of the sight systems 2300, primary scope 1702, or the firearm. In some cases, the rangefinder 2800 may be configured to communicate with another electronic device (e.g., a helmet, smartphone, smartwatch, tablet, etc.). In some such cases, the electronic device may communicate with the sight system 2300, primary scope 1702, and/or firearm enabling transmission of the data directly or indirectly from the rangefinder 2800 to the sight system 2300, primary scope 1702, or the firearm.

In some cases, the rangefinder 2800 may be shaped to fit or connect snugly with the sight system 2300, primary scope 1702, and/or a firearm. For example, the rangefinder 2800 may be shaped to have a similar or identical curvature as the sight system 2300 increasing the area of contact with the sight system 2300.

In some cases, the rangefinder 2800 may be a wireless military grade laser range finder. In some such cases, the rangefinder 2800 may use single pulse technology that can provide instant or fast range returns. Moreover, the rangefinder 2800 may determine a range of a fast-moving target. The rangefinder 2800 may use the short-wave infrared (SWIR) band for low detectability. Moreover, the rangefinder 2800 may have a range of 5,000 yards or greater with 10% reflectivity.

In some cases, the rangefinder 2800 may use NFC or ultra-wideband (UWB) to enable wireless pairing and communication. In some cases, the rangefinder 2800 may be controlled using a remote controller, such as the remote controller 3000 described in more detail below.

Further, the rangefinder 2800 may be battery powered or may be powered by any power source, such as a battery located within the sight system 2300 or a firearm. In some cases, the rangefinder 2800 may be as small as 2.5×2×1 inches. In other cases, the rangefinder 2800 may be larger or smaller. Further, the rangefinder 2800 may mount to the sight system 2300 or a rail (e.g., a picatinny rail) either directly or using an adapter.

Example Remote Controller

FIG. 30 illustrates an example remote controller 3000 in accordance with certain embodiments. The remote controller 3000 may be configured to control one or more features of a firearm or firearm accessory. For example, the remote controller 3000 may be configured to activate/deactivate the rangefinder 2800, an ammunition count process or display performed by a firearm or magazine, activate image or symbology display features of the sight system 2300, activate thermal imaging of the primary scope 1702, cycle through different display options of the sight system 2300 or primary scope 1702, or activate/deactivate any other features of the sight system 2300 or primary scope 1702, firearm, or electronic systems as disclosed herein.

In some cases, the remote controller 3000 may include an optical or wireless transceiver enabling the remote controller 3000 to transmit control signals to the sight system 2300, primary scope 1702, a firearm, or other electronic device. Further, the remote controller 3000 may be programmable and can be programmed either directly or through an electronic device configured to communicate with the remote controller 3000.

As illustrated, the remote controller 3000 may have up to three different control buttons enabling activation or deactivation of up to three features or display modes or a system controlled by the remote controller 3000. However, more features may be controlled via different interaction patters with the control buttons of the remote controller 3000. Moreover, the remote controller 3000 may include more or fewer buttons than displayed in FIG. 30. Further, in some cases, the buttons may be replaced or augmented with other user interface elements. For example, the remote controller 3000 may include a touchscreen interface, slide controls, or other user interface features.

The remote controller 3000 may attach to the sight system 2300, primary scope 1702, or a firearm. The remote controller 3000 may include any type of connection system that enables the remote controller 3000 to connect to the sight system 2300, primary scope 1702, or a firearm. For example, the remote controller 3000 may include clips or a hot shoe connector. In some cases, the remote controller 3000 may slide onto a rail or have a screw connector.

The remote controller 3000 may be configured to use wired, wireless (e.g., NFC or Bluetooth), or optical communication to communicate with the sight system 2300, primary scope 1702, or a firearm. Further, the remote controller 3000 may be positioned to facilitate optical or wireless communication when connected or attached to the sight system 2300, primary scope 1702, or a firearm.

The remote controller 3000 may be powered by a battery. Alternatively, or in addition, the remote controller 3000 may receive power from another device, such as the sight system 2300 or the firearm.

Figure 31:
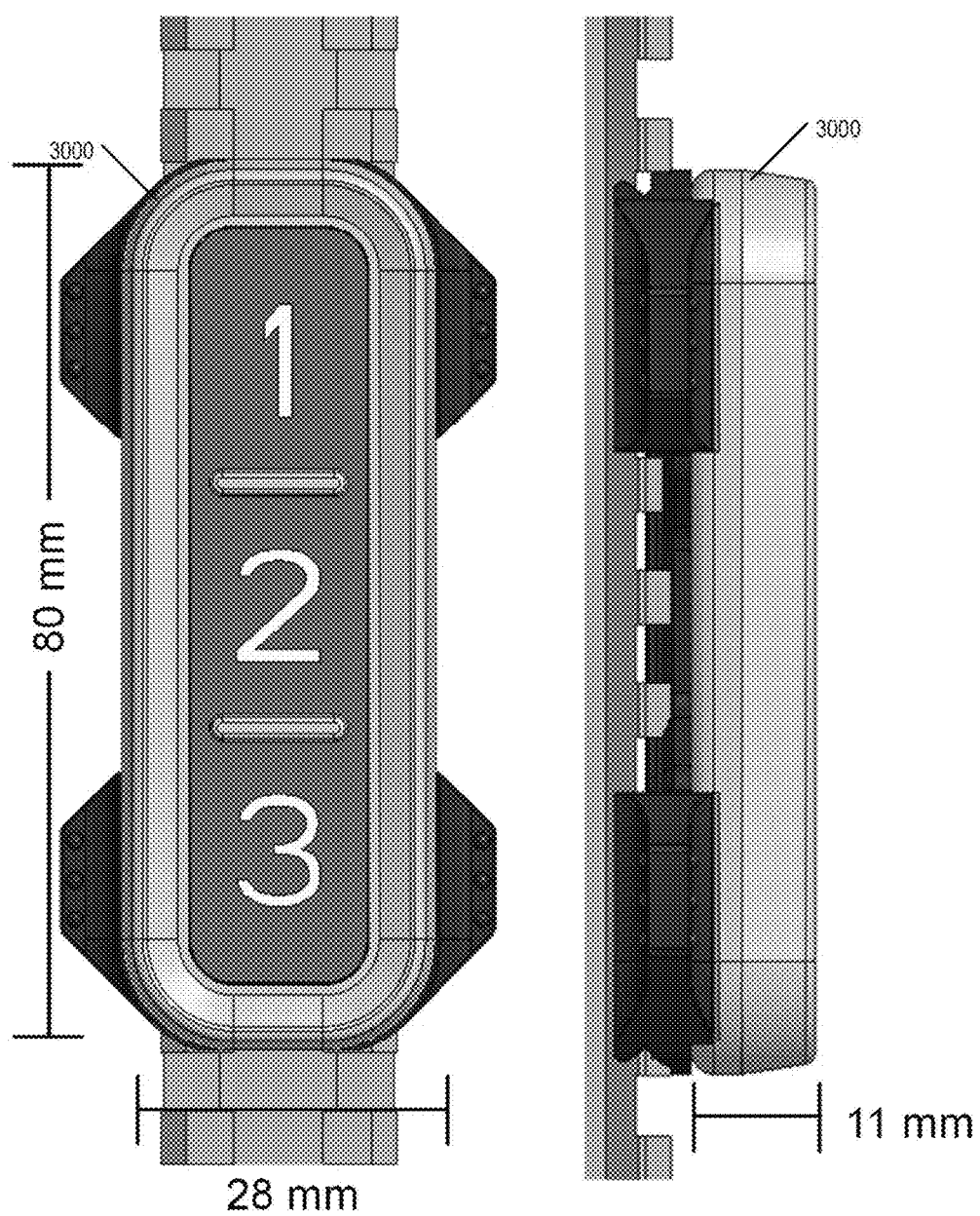
FIG. 31 illustrates an example of the remote controller of FIG. 30 attached to a rail of a firearm in accordance with certain embodiments.

FIG. 31 illustrates an example of the remote controller 3000 of FIG. 30 attached to a rail of a firearm in accordance with certain embodiments. As illustrated, the remote controller 3000 may have a length of 80 mm and a depth of 11 mm. Accordingly, the remote controller 3000 can be attached to the firearm with minimal to no interference with use of the firearm or line of sight of a scope used with the firearm. Further, it should be understood that the remote controller 3000 may be smaller or larger than illustrated. For example, a remote controller 3000 with less user interface elements may be smaller. Conversely, a remote controller 3000 with more user interface elements may be larger.

Figure 32:
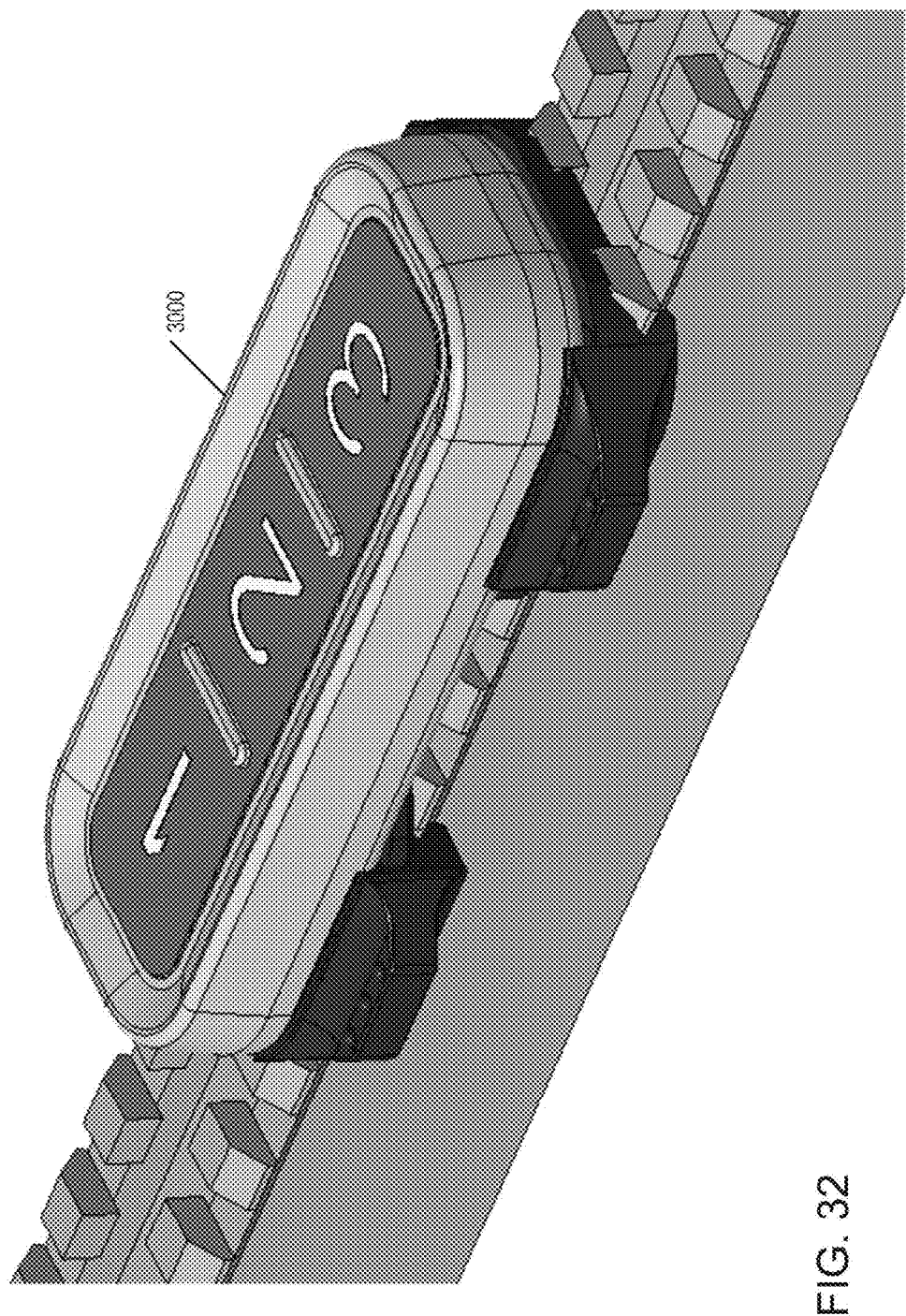
FIG. 32 illustrates a perspective view of the remote controller of FIG. 30 attached to a rail of a firearm in accordance with certain embodiments.

FIG. 32 illustrates a perspective view of the remote controller 3000 of FIG. 30 attached to a rail of a firearm in accordance with certain embodiments. As illustrated, the remote controller 3000 may slide onto or otherwise clip onto a rail of a firearm. However, it should be understood that other attachment mechanisms are possible. Further, the remote controller 3000 may connect to other locations of a firearm, such as a handle, stock, of magazine port.

Example Use Cases

Certain aspects of the operation of an example firearm scope 1700a/1700b, or 2300 of the present disclosure are described below. A firearm scope may operate in two main view modes: direct view, or simultaneous direct view and video view. In the video view mode, the content of the video image superimposed on the direct view may be different for different settings selected by the user or different configurations.

The configuration of the firearm scope 1700, 1700a/1700b shown in FIG. 17 may support multiple view modes including: 1) direct view; 2) simultaneous direct view and IR/thermal video-view; 2) simultaneous direct view and auxiliary video-view; or 4) simultaneous direct view, IR/thermal view, and auxiliary video-view. The configuration of the sight system 2300 shown in FIG. 25 may support multiple view modes including: 1) direct view; 2) simultaneous direct view and auxiliary video-view. By supporting multiple view modes simultaneously, it is possible for a user to see augmented data that augments a direct view. For example, IR/thermal views and/or auxiliary video views may augment the direct view.

1) Direct view: In this mode of operation, the user may turn off the video projection subsystem to see the target scene without any overlay image via the primary scope. In some cases, the user may use a reticle of the primary scope for target acquisition. In some cases, a direct view image generated by the primary scope may be a magnified image (e.g., magnified by a factor of 2, 4, 8, or 10).

2) Simultaneous direct view and auxiliary video-view: In this mode of operation, the user may turn on the video projection subsystem and activate the auxiliary video signal (e.g., using the user interface 1704 or the rotary knob 2304), to overlay an auxiliary image on the direct view seen via the primary scope. In some cases, the auxiliary video image may comprise a bore sighted reticle image. In some cases, the auxiliary image may comprise the bore sighted reticle image and auxiliary information. The reticle image and/or the auxiliary information, that are simultaneously viewable with the direct view image, may facilitate target acquisition by the user. The user may use the user interface 1704 or the rotary knob 2304 to select and change the content of the auxiliary video image.

3) Simultaneous direct view and IR/thermal video-view: In this mode of operation, the user may turn on the video projection subsystem and activate the IR/thermal video signal (e.g., using the user interface 1704 or the rotary knob 2304), to overlay an IR/thermal video image on the direct view seen via the primary scope. In some cases, the IR/thermal video image may facilitate target acquisition when a light level in the surrounding environment is low.

4) Simultaneous direct view, IR/thermal view, and auxiliary video-view: In this mode of operation, the user may turn on the video projection subsystem and activate the auxiliary video signal and the IR/thermal video signal (e.g., using the user interface 1704 or the rotary knob 2304), to overlay a thermal video image and an auxiliary video image on the direct view seen via the primary scope.

Is some embodiments, the EPCU may receive a light level signal from a light level sensor indicating that a level of visible light in the surrounding environment. In some cases, when the video projection subsystem is on, the EPCU may automatically activate the IR/thermal video signal when the light level indicated by the light level signal is below a threshold level. In some cases, the EPCU may automatically turn on the video projection system and activate the IR/thermal video signal when the light level indicated by the light level signal is below a threshold level.

In some embodiments, the direct view image generated by the primary scope may be a magnified image (e.g., magnified by a factor of 2, 4, 8, or 10). In some such cases, the user may adjust a size of the video image based on a magnification level of the primary scope. In some cases, the EPCU of the firearm scope may automatically adjust the size of the video image based on the magnification level of the primary scope. For example, the EPCU may receive a signal indicative of the magnification level of the primary scope and adjust the video image size accordingly. The signal may be transmitted from the primary scope to the firearm scope via rail mount signal interfaces of the primary scope to the firearm scope.

In some embodiments, the user may adjust the brightness of the video image superimposed on the direct view image to optimize a contrast between the direct view image and the video image. In some cases, the user may adjust the brightness of the IR/thermal image and the auxiliary information image in the video image independently.

In various embodiments, the user may use an external user interface that is in communication with the firearm scope, to control one or more features or functions of the firearm scope. In some examples, the user may use an external user interface that is in communication with the firearm scope, to control one or more features or functions of the firearm scope that are not controllable using a user interface of the firearm scope. In some cases, the external user interface can be a user interface of the firearm or other devices to which the firearm scope is connected. In some embodiments, the external user interface may be a standalone user interface that is in communication with the firearm scope via a wired or a wireless link.

Firearm Scope with Magnifying Power and without DV-Display

In some embodiments, a firearm scope or a sight system may provide a direct view for visible wavelength range and also support at least one video view (e.g., LWIR or thermal video view for night vision, visible video view for low light condition, or SWIR video view), without using a direct view display (DV-display). In some cases, direct view may comprise a magnified view of the target scene. In some cases, a magnification of the magnified view can be adjustable. In some cases, the firearm scope may use a switchable mirror (e.g., a pivotable mirror), to switch between the direct view mode and a video view mode. The firearm scope may include a direct view system that generates a direct view image of a target scene in the direct view mode, an IR/thermal video view system that generates an IR/thermal video image of the target scene in the video IR/thermal video view mode, and a visible video view system that generates a visible video image of the target scene in the visible video view mode. An IR/thermal video image of the target scene may correspond to an image of the target scene generated based on thermal radiation or long wavelength IR (LWIR) light. The IR/thermal video view system may enable night vision by capturing an IR/thermal image of a target scene and converting the IR/thermal image to a corresponding IR/thermal video image viewable through an exit port (e.g., an eyepiece) of the firearm scope. A visible video image of the target scene may correspond to an image of the target scene generated based using visible light (e.g., low intensity visible light), or short wavelength IR (SWIR) light. The visible video view system may capture an image of the target scene illuminated under daylight condition, low light condition, or illumination by SWIR light (e.g., an auxiliary illumination) and convert the image to a corresponding visible video image viewable through the exit port of the firearm scope. In some implementations, the IR/thermal video image and visible video image may be generated by a single video projector (or video display) in different operating modes of the firearm scope. In some cases, a video view may be used to provide a safe view of the target scene under different lighting conditions by protecting the user from anti-scope measures that may blind the user.

Additionally, the firearm scope may be capable of superimposing an auxiliary video image on the direct view image, the IR/thermal video image, or the visible video image. In some examples, a processor of the firearm scope may superimpose an auxiliary video image on the IR/thermal video image or the visible video image, by digitally combining the auxiliary video image with the IR/thermal video image or the visible video image in electronic domain. In some examples, an optical system of the firearm scope may superimpose an auxiliary video image on the direct view image, by overlaying the auxiliary video image on the direct view image in optical domain (e.g., using a beam splitter). The auxiliary video image may comprise symbology (e.g., a magazine count, a range value, operating mode data, etc.) and/or a reticle image that can assist a user of the firearm scope with target acquisition. In some embodiments, the auxiliary video image superimposed on the direct view image may be generated by an auxiliary video system, and the auxiliary video image superimposed on the IR/thermal video image may be directly generated by the same video projector that generates the IR/thermal video image. In some embodiments, the IR/thermal video view system, the visible video view system, the direct view system, the auxiliary video system, and the corresponding electronic circuitry and user interfaces, may be included in a single enclosure or housing, or within multiple housings that are housed together within a single outer housing or case. In some examples, the firearm scope may include a laser pointer and laser range finder (LRF). At least a portion of the electronic and opto-electronic systems and subsystems of the firearm scope may be powered by a battery included in the enclosure.

In some cases, an IR image may comprise an image formed by light having a wavelength in the IR wavelength range with or without auxiliary illumination (e.g., auxiliary IR illumination) of the target scene. In some cases, a thermal image may comprise an image formed by thermal radiation (e.g., natural thermal emission from a target or scene) or light having a wavelength in the LWIR range without any auxiliary illumination or the target or the target scene.

In some embodiments, an IR/thermal video or a video image may comprise a composite video image formed by overlaying an auxiliary video image on the IR/thermal video image or video image. The IR/thermal video image, the video image and the auxiliary video image may be generated by a single video projection system of the firearm scope. In some cases, the video projection system may generate the auxiliary video image using auxiliary video signals generated by a processor in the firearm scope.

The auxiliary video image may include a bore-sighted reticle image and image of auxiliary information. In some cases, the reticle image may comprise a ballistic reticle image. In some cases, the auxiliary information may include information obtained from a subsystem of the firearm scope (e.g., a sensor or rangefinder), the firearm, or from other devices or modules that are in communication with the firearm scope.

In some cases, the firearm scope may be capable of magnifying the IR/thermal video image, the video image, or the composite video image using a digital zoom. In some embodiments, the user may use a user interface of the firearm scope to adjust a magnification of the IR/thermal video image, the video image, or the composite video image. In some cases, the magnification of the auxiliary video image may be substantially equal to the magnification of the thermal video image or the magnification of the video image. In some examples, the firearm scope may allow a user to adjust the magnification of the auxiliary video image independent of the magnification of the IR/thermal video image or the magnification of the video image. In some examples, the firearm scope may allow a user to independently adjust the magnification different parts of the auxiliary video image. For example, the user may reduce a magnification of the auxiliary information in the auxiliary video image compared to a magnification of the reticle image.

The optical power of the direct view system may be provided by a magnifying optical system (e.g., a telescope) comprising at least one objective lens or lens system (herein referred to as "objective"), and one eyepiece lens or lens system (herein referred to as "eyepiece). Additionally, in some cases, the direct view system may include a relay lens system that receives an initial image from the objective and relays it to the eyepiece. In some cases, the relay lens system may magnify the initial image as it is relayed to the eyepiece. In some embodiment, the total magnification of the magnifying optical system may be determined by the objective lens, the relay lens system, and the eyepiece. The total magnification can be an angular magnification of an image of the target scene viewed through the eyepiece, with respect to the target scene viewed along the same optical path via the entrance window in the absence of the objective, relay lens system, and the eyepiece.

In some cases, the relay lens system may comprise at least one movable lens that when moved along a longitudinal direction extended from an entrance lens to an exit lens of the relay lens system, changes the total magnification of the magnifying optical system. In some cases, the relay lens system may comprise at least two movable lenses. In some such cases, the total magnification of the magnifying optical system may be adjusted by changing the position of one or both movable lenses, or a relative distance between the two movable lenses, along the longitudinal direction. In some cases, the position of a movable lens or the relative distance between the two movable lenses can be directly adjusted by a user using a mechanical user interface. Alternatively, in some embodiments, the position of a movable lens or the relative distance between the two movable lenses can be adjusted by user using one or more electromechanical actuators controlled via a user interface.

The eyepiece may use the image received from the relay lens system to generate a final magnified image viewable by a user. The magnifying optical system may generate an angularly magnified image of a target scene by modifying the optical path of the light rays (e.g., visible light rays) received from the target scene.

In some cases, the firearm scope may use a beam splitter, or a combination of beam splitters and reflectors to superimpose one or more auxiliary video images on a direct view image observable via the eyepiece. In some examples, the image observed via the eyepiece may be an augmented reality image comprising the direct view image augmented by the auxiliary video image.

Figure 33:
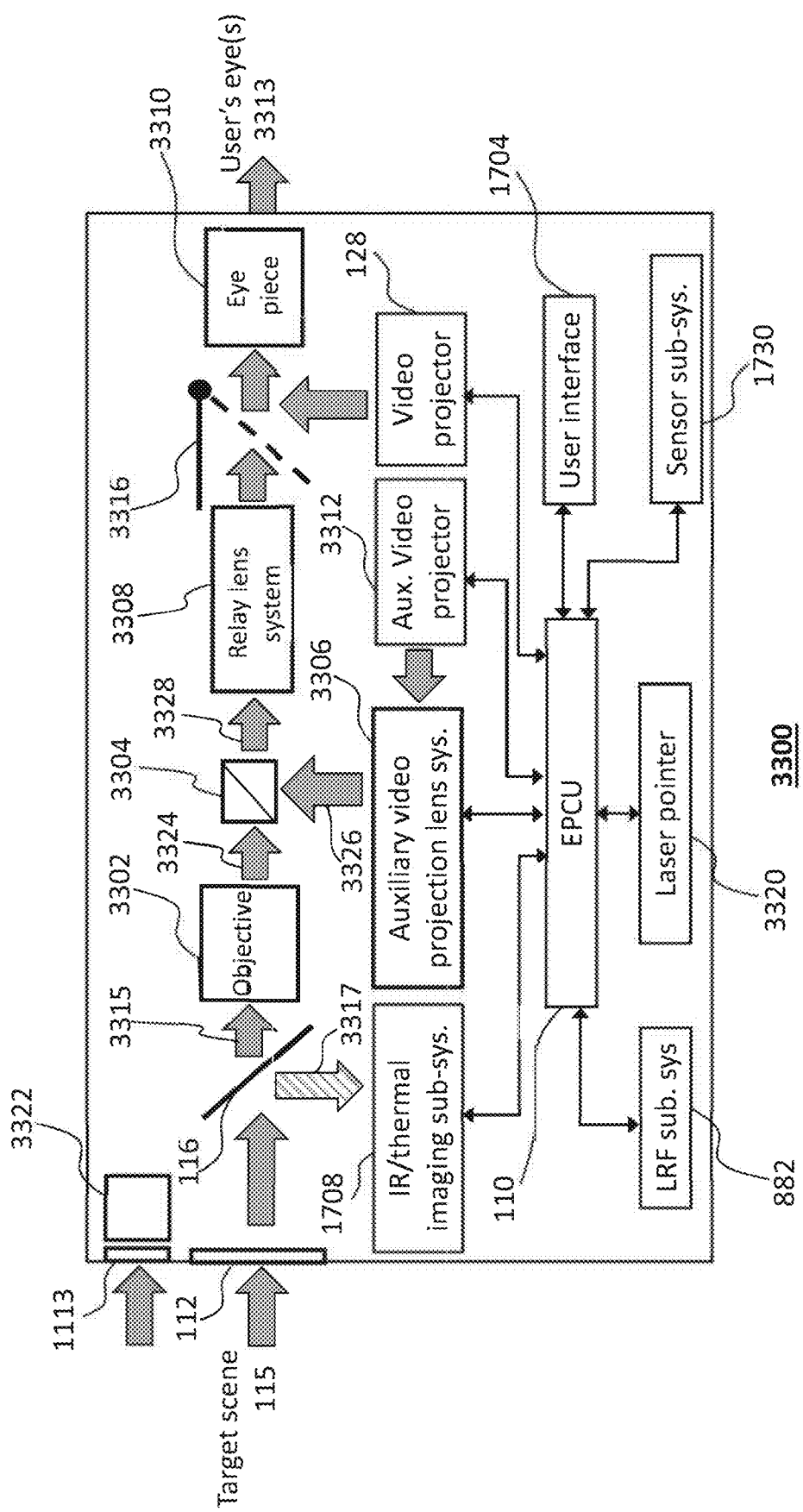
FIG. 33 illustrates a block diagram of an example firearm scope or sight system with magnifying optical power and without a DV-display in accordance with certain aspects of the present disclosure.

FIG. 33 illustrates a block diagram of an example firearm scope 3300 or sight system with magnifying power and without a DV-display in accordance with certain aspects of the present disclosure. As previously described, embodiments described herein are not necessarily mutually exclusive. Thus, embodiments of the scope 3300 may include other embodiments described above and below, and vice versa. Further, each embodiment or iteration of the scopes described herein may share one or more features of the other scopes described herein. Moreover, the firearm scope 3300 may be used with any type of firearm and may be capable of presenting (e.g., as an auxiliary video image) any type data that may be received from a firearm or another device. For example, the firearm scope 3300 may present weapon status information and/or magazine cartridge counts using one or more of the embodiments described in U.S. Pat. No. 10,557,676, dated Feb. 11, 2020, titled "FIREARM AMMUNITION AVAILABILITY DETECTION SYSTEM," which is hereby incorporated by reference in its entirety for all purposes. The firearm scope 3300 may comprise one or more features described above with respect to the firearm scope 100 or 1700.

The thin black arrows and thick gray arrows of FIG. 33 depict electrical connections and optical propagation respectively. In certain aspects, the sight system or firearm scope 3300 may include an entrance window 112 configured to permit visible and infrared (IR) light received from a target scene 115 to enter the sight system or firearm scope 3300. Further, the firearm scope 3300 may include an exit window or exit port that permits a user to view a direct view of the target scene 115 with or without auxiliary video images superimposed/overlaid on the direct view image, or an IR/thermal video image with or without auxiliary video images superimposed/overlaid on the IR/thermal video image. The firearm scope 3300 may include an IR/thermal imaging subsystem 1708, a video projector 128, an electronic processing and control unit (EPCU) 110, a user interface 1704, a laser rangefinder (LRF) 882, and a laser pointer 3320. In some embodiments, the sight system or firearm scope 3300 may include a sensor subsystem 1730 (e.g., for example an environmental sensor suite for measuring and monitoring pressure, humidity, and temperature). The firearm scope 3300 a dichroic beam splitter 116, an objective 3302, a relay lens system 3308, and an eyepiece 3310. In some embodiments, the combination of objective 3302, the relay lens system 3308, and the eyepiece 3310 may be configured to generate a non-magnified or magnified (e.g., angularly magnified) image of the target scene 115. In some cases, the relay lens system 3308 may be configured to enable adjustment (e.g., continuous adjustment) of the magnification of the optical system (e.g., a telescope) formed by the objective 3302, the relay lens system 3308, and the eyepiece 3310, between 1× and 20× or more. For example, the relay lens system 3308 may comprise one or more movable lenses, and a total magnification of the optical system may be adjusted by changing the position of at least one of the movable lenses.

A beam splitter 3304 may be disposed between the objective 3302 and the relay lens system 3308. The position of the eyepiece 3310 along a longitudinal direction extended from the entrance window 112 to the relay lens system may be adjustable using a mechanical user interface or electro-mechanical actuator. In some cases, a user may compensate or adjust the diopter of the magnifying optical system (the direct view system) or a video view system (e.g., the IR/thermal or visible video view system) by changing a longitudinal distance between the exit lens (last lens) of the relay lens system 3308 and the eye piece 3310.

The dichroic beam splitter 116 transmits a first portion 3315 of light received from the entrance window 112 and reflects a second portion 3317 of light received from the entrance window 112 toward the IR/thermal imaging subsystem 1708. The first portion 3315 may comprise visible light and the second portion 3317 of light may comprise IR-thermal light.

The beam splitter 3304 may transmit the visible light received from the objective 3302 and redirect auxiliary video images received from the auxiliary video projection lens system 3306.

In some embodiments, the objective 3302 may form a first image 3324 of the target scene 115 based on the first portion of light received from the entrance window 112. The beam splitter 3304 may overlay the auxiliary video image on the first image to form and a composite image 3328. The composite image may be processed by relay lens system 3308 and the eyepiece 3310 to generate the direct view image viewed by the user.

The firearm scope 3300 may include an auxiliary video projector 3312 configured to generate auxiliary video images using the video signals received from the EPCU 110 or other subsystems of the scope 3300. The auxiliary video projection lens system 3306 may receive the auxiliary video images from the auxiliary video projector 3312 and form an auxiliary video image configured to be combined with the image received from the objective 3302 to generate a composite image, by the beam splitter 3304. The composite image may comprise a direct view image of the target scene 115 and the auxiliary video images generated by the auxiliary video projector 3312.

The second portion of light 3317 (e.g., IR/thermal light) reflected by the dichroic beam splitter 116 may be received by the IR/thermal imaging subsystem 1708. The IR/thermal imaging subsystem 1708 may form an IR/thermal image using IR/thermal light received from the dichroic beam splitter 116, generate a corresponding IR/thermal video signal, and transmit (directly or via the EPCU 110) the corresponding IR/thermal video signal to the video projector 128. Upon receiving the video signal, the video projector 128 may generate an IR/thermal video image (a visible image) corresponding to the IR-thermal image projected on an IR sensor of the IR/thermal imaging subsystem 1708.

In some embodiments, the firearm scope 3300 may comprise a second entrance window 1113 and a visible imaging subsystem 3322 configured to receive light from the target scene 115 via the second entrance window 1113. The visible imaging subsystem 3322 may generate a video signal usable for the video projector 128 to generate a video image of the target scene under normal day light condition, low light condition (e.g., dusk, dawn, cloudy, and the like), or auxiliary illumination. Similar to the IR/thermal video system, the visible video system may provide the video image of the scene to the user's eye when the switchable mirror 316 is in an ON state or in a position where light from the video projector 112 is reflected toward the eye piece 3310 and direct view is clocked. In some cases, a user may choose between visible or IR/thermal video views using the user interface 1704. In some cases, when the switchable mirror 3316 is in the ON state, the firearm scope 3400 may automatically activate the visible video imaging system 1708 or the visible imaging subsystem 3322, and the video projector 128 depending on the user's selection via the user interface. The visible video imaging subsystem 3322 may comprise a visible light sensor (e.g., a CMOS sensor) and one or more lenses configured to project visible light received from the target scene 115 on the visible light sensor. In some cases, the visible light sensor may have a spectral response extended to short wavelength infrared (SWIR) region enabling video via under low light or auxiliary illumination. In some cases, the auxiliary illumination may comprise SWIR light. In some embodiments, visible video imaging system can be connected to the video projector 128 directly or via the EPCU of the firearm scope 3400. The visible imaging subsystem 3322 may have a fixed of variable field of view. In some cases, the field of view of the visible imaging subsystem 3322 may be adjusted using an electromechanical controller.

The sight system or firearm scope 3300 may include a switchable mirror (e.g., a moveable or pivotable mirror 3316) that enables a user to transition the view between a direct view and the video view (e.g., IR/thermal video view, or visible video view). The switchable mirror 3316 may permit light to travel between the relay lens system 3308 and the eyepiece 3310 when in an OFF state (e.g., mirror up position) that does not interrupt the traversal of light within the scope 3300. Conversely, the switchable mirror 3316 may block the direct view and redirect visible light received from video projector 128 towards the eyepiece 3310 when in an ON state (e.g., mirror down position). As such, when the IR/thermal imaging system 1708 and the video projector 128 are activated, and the switchable mirror 3316 is in the ON state, the IR/thermal video image that is generated using the IR/thermal light received from the target scene 115 may projected to the user's eye 3313 by the eyepiece 3310. In some implementations, the switchable mirror can be replaced by any redirection element, moveable or otherwise, that is configured to redirect the light within the visible wavelength range (e.g., from approximately 380 nanometers to 740 nanometers) towards the eyepiece 3310. In some cases, the switchable mirror 3316 can be an electrochromic mirror mounted at a particular position and/or a particular angle (e.g., 45 degrees or 60 degrees) with respect to a straight optical path extended from the entrance window 112 to the eyepiece 3310. The state of the electrochromic mirror can be switched by the user by means of electronic signals sent from the EPCU 110 to the electrochromic mirror. In the ON state, the electrochromic mirror may reflect more than 90% of the optical intensity having a wavelength within the visible range (e.g., 0.4-0.9 micrometers). In the OFF state, the electrochromic mirror may transmit more than 90% of optical intensity having a wavelength within the visible range (e.g., 0.4-0.9 micrometers).

In some cases, in addition to the video image (generated using a video signal received from the visible imaging subsystem 3322), or the IR/thermal video image (generated using the video signal received from the IR/thermal imaging subsystem 1708), the video image generated by the video projector 128 may comprise an auxiliary video image superimposed on the video image.

In some embodiments, the video projector 128 may receive the auxiliary video image from the EPCU 110 or other subsystems of the sight system of firearm scope 3300. In some cases, the auxiliary video image may comprise a bore sighted reticle image and auxiliary information including but not limited to data received from the sensor subsystem 1730 or the LRF 882, data received from an external device (e.g., an LRF or sensor connected to the firearm) via a wired/wireless link, and/or data received via an interface (e.g., a signal interface) of the firearm scope 3300.

In some cases, the EPCU 110 may include a memory and at least one processor configured to execute the machine-readable instructions stored in the memory. The EPCU 110 may include a field programmable gate array (FPGA), a memory unit, a digital signal processing unit, an internal wireless transceiver, a field programmable gate array (FPGA). In some examples, the EPCU 110 of the firearm scope 3300 may comprise one or more features of the EPCU 110 of the firearm scope 200 (e.g., features shown in FIG. 9).

The EPCU 110 may receive and process the electronic signals generated by IR/thermal imaging subsystem 1708, the video projector 128, the LRF subsystem 882, the laser pointer 3320, the sensor subsystem 1730, and the user interface 1704. In some embodiments, the EPCU 110 may automatically control different subsystems and/or allow the user to control them via the user interface 1704. In some embodiments, the EPCU 110 may generate the bore sighted reticle image included in the auxiliary video image and send it to the video projector 128 or the auxiliary video projector 3312 for superposition or combination with the IR/thermal video image or the direct view image.

In some cases, the objective 3302, relay lens system 3308, and the eyepiece 3310 may form a telescope having a magnification power from 1× to 20×, or greater values. In some embodiments, the objective 3302, relay lens system 3308, and the eyepiece 3310 may form a telescope having a selectable or adjustable magnification power. For example, a magnification power (angular magnification power) of the telescope can be selected by a user (e.g., using the user interface 1704), to be 1×, 2×, 4×, 6×, 8×, 10×, 15×, 20× or any values between these values of other values. In some embodiments, the magnification of the telescope can be adjusted by moving one or more lenses of the relay lens system 3308. In some embodiments, at least one lens of the relay lens system 3308 may be moved mechanically or electromechanically, using a user interface of the firearm scope 3400. In some cases, a size of the video image provided by the video projector 128 or auxiliary video projector 3312 may be adjusted manually (e.g., via the user interface 1704), or automatically (e.g., by a control system included in the EPCU 110).

Figure 34A:
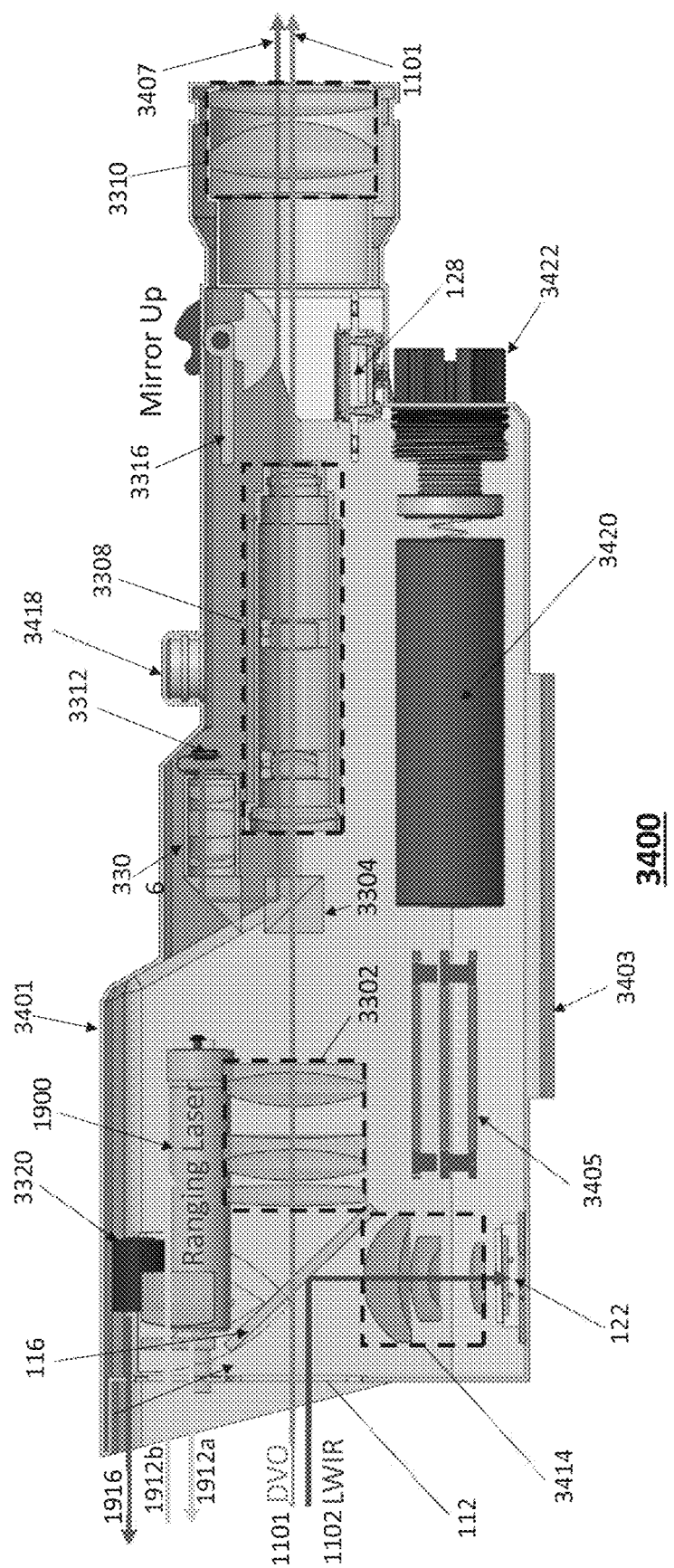
FIG. 34A illustrates side view cross-section of an example firearm scope configured to provide a magnified direct view with or without overlay auxiliary video image.

FIG. 34A illustrates the side view cross-section of an example firearm scope 3400 that can be configured to provide a direct view and an IR/thermal video view, with or without overlay auxiliary video images. The arrangement and functions of the components and subsystems in the firearm scope 3400 can include one or more of the features previously described with respect to the firearm scope 3300, or firearm scopes 200, 1300, 1600, and/or 1700a. More specifically, the components and subsystems used to generate the IR/thermal video image and the auxiliary video image in the firearm scope 3400, may be similar or identical to those described with respect to firearm scopes 3300, 200, 1300, 1600, and/or 1700a.

In some embodiments the firearm scope 3400 may comprise an IR/thermal video view system and a direct view system. A dichroic beam splitter 116 and a beam splitter (e.g., a double prism) 3304 enable magnified daylight vision, night vision, and viewing the auxiliary information via a single entrance window 112 and a single eyepiece 3310.

The direct view system may be configured to generate a magnified (e.g., angularly magnified) image of a target scene using visible light received from the target scene 115. The direct view system may comprise a telescope formed by at least one objective 3302 and one eyepiece 3310. The objective 3302 and the eyepiece 3310 may each comprise a group of lenses. In some cases, each group of lenses may include at least one doublet configured to reduce chromatic aberration. The telescope may have angular magnification from 2 to 50. In some embodiments, the direct view system may include a relay lens system 3308 disposed between the objective 3302 and the eyepiece 3310 to extend the length of the telescope, e.g., to enable overlaying an auxiliary video image on the direct view image. In some examples, the relay lens system 3308 may comprise a group of lenses configured to relay an image generated by the objective 3302 to the eyepiece 3310. In some cases, the group of lenses may include four lenses some of which may be doublets.

In some cases, the first image plane of the telescope formed by the objective 3302, relay lens system 3308, and the eyepiece 3310 may be located between the objective lens 3302 and the beam splitter 3304. In some cases, the first image plane of the telescope formed by the objective 3302, relay lens system 3308, and the eyepiece 3310 may be located between the beam splitter 3304 and the relay lens system 3308.

In some embodiments, the firearm scope 3400 may include an auxiliary video system configured to generate an auxiliary video image and overlay the auxiliary video image on the direct view image generated by the telescope. The auxiliary video system may be disposed in an optical path between the objective 3302 and the eyepiece 3310. In some embodiments, the auxiliary video system may comprise an auxiliary video projector 3312, and an auxiliary video projection lens system 3306. In some examples, the auxiliary video projector 3312 generates an initial auxiliary video image using a video signal (e.g., received from an EPCU of the firearm scope 3400) and the auxiliary video projection lens system 3306 uses the initial auxiliary video image to generate an auxiliary video image configured to be overlaid on the direct view image generated by the direct view system. The video projection lens system 3306 may comprise one or more lenses configured to generate an auxiliary video image and an optical element (e.g., a prism or a mirror) for directing the resulting auxiliary video image toward a beam splitter 3304 disposed along an optical path extended from the objective 3302 to the relay lens system 3308. The beam splitter 3304 may receive the auxiliary video image from the auxiliary video projection lens system 3306 and superimpose the auxiliary video image on an image generated by the objective 3302 so that after passing through the relay lens system 3308 and the eyepiece 3310, the direct view image and the auxiliary video image are projected on the user's eye as a composite image. In some cases, the user's eye simultaneously focuses on the auxiliary information associated with the auxiliary video image and the direct view image.

The IR/thermal video view system may be configured to generate an IR/thermal video image of the target scene 115 using IR/thermal light received from the target scene 115. The IR/thermal video view system may include an IR/thermal imaging subsystem 1708 configured to generate IR/thermal video signals associated with IR/thermal images of the target scene 115, and a video projector 128 configured to project a corresponding IR/thermal video image into user's eye via the eyepiece 3310. The IR/thermal imaging subsystem 1708 may comprise an IR/thermal imaging lens system 3414 and an IR image sensor 122. The IR/thermal imaging lens system 3414 may comprise a group of lenses configured to form an IR/thermal image of the target scene 115 on the IR sensor 122. In some examples, the IR/thermal imaging lens system 3414 may include three lenses. The IR image sensor 122 can be made of a semiconductor material. For example, the IR image sensor 122 can be made of mercury cadmium tellurite (HgCdTe) or an antimonide based material (e.g., InAs, GaSb, AlSb). The semiconductor material can be a superlattice made of one or more of the aforementioned materials. Alternatively, the IR image sensor 122 can also be formed from an array of microbolometers.

In some embodiments, the entrance window 112, beam splitter 3304, one or more lenses of the group of lenses in the objective 3302, relay lens system 3308, and/or eye piece 3310, may include antireflection (AR) coatings on an entrance and/or exit surface, configured to reduce reflection of light within visible wavelength range from the corresponding surface. An AR coating may be formed from one or more dielectric layers configured to reduce the reflection of light from the surface. In some embodiments, the entrance window 112, the beam splitter 3304, the objective 3302, the relay lens system 3308, and the eye piece 3310, may each have an optical transmission larger than 60%, larger than 70%, larger than 80%, or larger than 90%, in the visible wavelength range. In some embodiments, a total optical transmission of the direct view system of the firearm scope 3400 within visible wavelength range and along an optical path extending from the entrance window 112 to the eyepiece 3310 (including the entrance window 112 and the eyepiece 3310), can be larger than 60%, larger than 70%, larger than 80%, or larger than 90%. In some examples, a total optical transmission for visible light incident on the beam splitter 3304 and exiting the eye piece 3310 can be larger than larger than 70%, larger than 80%, or larger than 90%. Advantageously, a firearm scope having a direct view system having a high optical transmission (e.g., larger than 60%, 70% or 80%) provides a high brightness display configured to provide a clear magnified image of the target scene. In some embodiments, the firearm scope 3400 may provide bright magnified image of the target scene with an overlaid bore sighted reticle image and augmented with auxiliary information (e.g., magazine count, target range, and the like). In some such embodiments, the auxiliary video projector 3312 may comprise a high brightness display (e.g., LED display) configured to provide a clear and highly visible reticle image and auxiliary information, despite a low reflectivity (e.g., less than 30%, less than 20%, or less than 10%). In some embodiments, the auxiliary video projector 3312 can be a monochrome (e.g., having a green or red center wavelength) display. In some such embodiments, the beam splitter 3304 may be configured to reflect light within a narrow wavelength range (e.g., less than 100 nm, less than 50 nm, or less than 30 nm) around the center wavelength of the monochrome auxiliary video projector 3312.

In some embodiments, an integrated visible light transmission value of the sight system can be larger than 60%, 70%, 80%, or 90% at least for light having wavelengths between 400 nm and 750 nm, 450 nm and 700 nm, between 500 nm and 650 nm, or narrower or wider wavelength ranges. In some cases, the integrated visible light transmission value of the sight system for light having wavelengths between a first wavelength and a second wavelength, can be a ratio between the integral of the wavelength dependent intensity of the light incident on the entrance window of the sight system, divided the integral of the wavelength dependent intensity of the light output from the exit aperture of the sight system (e.g., 3310), where both integrals are calculated from th first wavelength to the second wavelength.

In some embodiments, the auxiliary video projector 3312 may comprise a 2-dimensional color display with a luminance greater than or equal to 50,000 cd/m$^2$, 70,000 cd/m$^2$, 100,000 cd/m$^2$, 150,000 cd/m$^2$, 200,000 cd/m$^2$, or greater values. The auxiliary video projector 3312 may have a power consumption of less than or equal to 20 mW, 50 mW, 100 mW, 150 mW, 200 mW at an APL of 6%.

In some embodiments, the video projector 128, comprises a 2-dimensional monochrome display with a luminance less than or equal to 40,000 cd/m$^2$, 20,000 cd/m$^2$, 10,000 cd/m$^2$, 5000 cd/m$^2$, or smaller values. The video projector 128 may have a power consumption of less than or equal to 20 mW, 50 mW, 100 mW, 150 mW, 200 mW at an APL of 6%.

In some cases, the auxiliary video projector 3312 may have a lower resolution but higher brightness compared to the video projector 128. In some embodiments, the power consumption tradeoff between brightness and resolution for the auxiliary video projector 3312 and the video projector 128 may enable reducing an overall power consumption of the firearm scope 3400 while providing a high-resolution IR/thermal video image of the target scene for low light and/or night vision and a bright auxiliary video image to augment a direct view image for daylight vision.

In some cases, one or more lenses used in the IR/thermal imaging lens system 3414, the objective 3302, the auxiliary projection lens system 3306, the relay lens system 3308, and/or the eyepiece, may comprise a graded index (GRIN) lens. Advantageously, including lenses and lens systems comprising GRIN lenses may reduce the size and weight of the firearm scope 3400.

In some embodiments, the firearm scope 3400 may comprise a visible video system configured to generate a video signal usable for the video projector 128 to generate a video image of the target scene. In some examples, the visible video system and the video projector 128 may be configured to provide the video image of the target scene under low light condition, day light condition, or a target scene illuminated by auxiliary illumination. In some cases, the visible light sensor may have a spectral response extended to short wavelength infrared (SWIR) region enabling video via under low light or auxiliary illumination. In some cases, the auxiliary illumination may comprise SWIR light. Similar to the IR/thermal video system, the visible video system may provide the video image of the scene to the user's eye when the switchable or pivotable mirror 316 is ON state (e.g., the pivotable mirror 3316 is turned down). In some cases, a user interface element (e.g., a switch or a knob) of the firearm scope 3440 may provide the use with option of choosing between visible or IR/thermal video views. In some cases, when the pivotable mirror 3316 is turned down (ON state), the firearm scope 3400 may automatically activate the visible or IR/thermal video systems depending on user's selection via the user interface. In some cases, when the pivotable mirror 3316 is turned down (ON state), the user may use the same or another user interface element to switch between the visible or IR/thermal video views. The visible video system may comprise a visible light sensor (e.g., a CMOS sensor) and one or more lenses configured to project visible light received from the target scene on the visible light sensor. In some examples the visible video system may receive light from the target scene via the entrance window 112 and a second entrance widow separate from the entrance window 112. In some cases, the visible video system may comprise one or more features described above with respect to the visible imaging subsystem 124 and the visible image sensor 126. In some embodiments, the visible video imaging system can be connected to the video projector 128 directly or via the EPCU of the firearm scope 3400.

In some embodiments, the firearm scope 3400 may include a laser pointer 3320, a laser rangefinder (LRF) subsystem 882, and/or a sensor subsystem 1730. The laser pointer 3320 may include a visible laser pointer (e.g., a red laser pointer) configured to project a laser beam on a target to help with aiming toward the corresponding illuminated point on the target that is observable via the direct view or IR/thermal video view. The laser rangefinder (LRF) subsystem 882 comprise a ranging laser 1900 and a receiver configured to determine a distance between the firearm scope and a target or point in the target scene 115. In some examples, the ranging laser 1900 may generate a laser beam 1912a (e.g., a visible or IR laser beam), and transmit the laser beam toward the target scene. The LRF receiver may then receive reflected or scattered light 1912b (e.g., light scattered or reflected from a point or object in the target scene) associated with the laser beam 1912a. The LRF may be configured to measure a distance between the firearm scope and the target or the point in the target scene, based at least in part on the received reflected/scattered light 1912b. In some examples, the ranging laser 1900 can be a pulsed laser and the LRF may determine the distance based on a time delay between transmission of a laser pulse and detection of the reflected light by the LRF receiver. In some cases, the distance or the target range is determined by the EPCU based on electronic signals received from the LRF.

In some embodiments, the subsystems of the firearm scope 3400 may be controlled by electronic circuitry 3405 included in the enclosure 3401. The electronic circuitry 3405 may comprise the EPCU 110. In some embodiments, a subsystem or a feature of a subsystem may be controlled by a firearm or a device to which the firearm scope 3400 is added or operatively connected, or another device that is in communication with the firearm scope 3400 (e.g., via the EPCU 110). In some examples, systems, subsystems of the firearm scope and the EPCU 110 may be powered by the battery 34520 included in the housing 3401 and/or receive power from a power interface of the rail mount 3403 of the firearm scope 3400.

In some embodiments, the interconnections between the IR/thermal imaging subsystem 1708, the video projector 128, the LRF 882, the laser pointer 3320, the sensor subsystem of the firearm scope 3400, may comprise the interconnections between the IR/thermal imaging subsystem 1708, the video projector 128, the LRF 882, the laser pointer 3320, the sensor subsystem 1730, and the EPCU 110 of the firearm scope 3400. In some cases, one or more features of the IR/thermal imaging subsystem 1708, the video projector 128, the auxiliary video projector 3312, the LRF 882, the laser pointer 3320, and the sensor subsystem 1730 of the firearm scope 3400, may be controlled using a user interface and via EPCU.

The firearm scope 3400 may include a moveable or pivotable mirror 3316 that enables a user to transition the view between the direct view and the IR/thermal video view. In some cases, the firearm scope 3400 may operate in a direct view mode when the pivotable mirror 3316 is in the OFF state, and in an IR/thermal view mode when the pivotable mirror 3316 is in the ON state. In the example shown in FIG. 34A the pivotable mirror 3316 is in OFF state allowing the light rays exiting the relay lens system 3308 to reach the eyepiece 3310 where a magnified image is formed and projected on the user's eye.

The visible light and IR/thermal light rays reflected or generated by a target scene may enter the firearm scope 3400 through the entrance window 112. The visible light rays may pass through the dichroic beam splitter 116, the objective 3302, and the relay lens system 3308. When the pivotable mirror 3316 is in the OFF state, the image formed by the objective 3302 and relayed by the relay lens system 3308, may be received by the eyepiece 3310 the forms the final image (e.g., a magnified image).

Figure 34B:
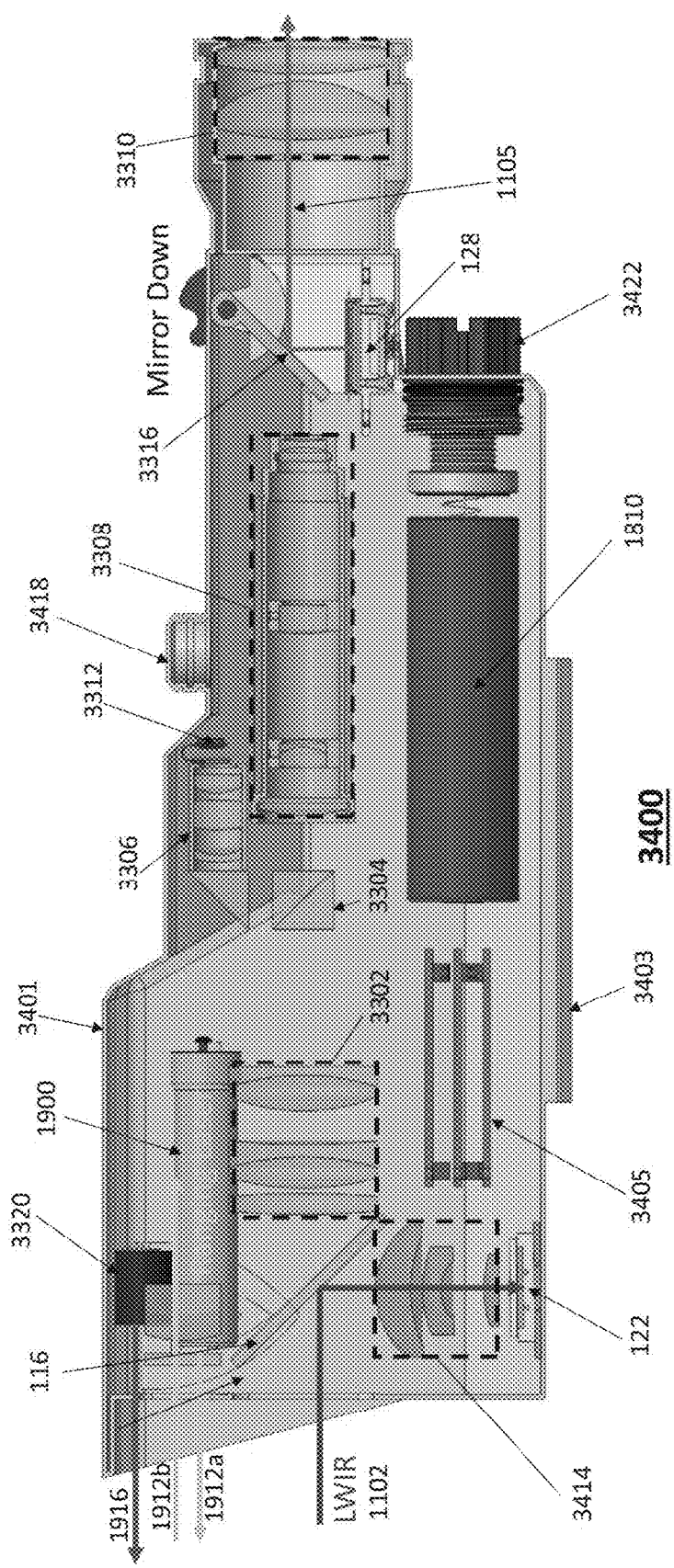
FIG. 34B illustrates side view cross-section of an example firearm scope shown in FIG. 34B configured to provide an IR/thermal video view with or without overlay auxiliary video image.

IR/thermal light rays may be redirected by the dichroic beam splitter 116 toward the IR/thermal imaging lens system 3414 that forms an IR/thermal image of the target scene on the IR sensor 122. The IR sensor 122 may generate a corresponding IR/thermal video signal usable for generating an IR/thermal video image. The video projector 128 may receive the IR/thermal video signal from the IR sensor 122 (directly or via the EPCU 110 of the firearm scope 3400) and generate an IR/thermal video image using the IR/thermal video signal. Additionally, the video projector 128 may receive an auxiliary video signal, e.g., from the EPCU, and generate a composite video image comprising the IR/thermal video image and an auxiliary video image. When the pivotable mirror 3316 is in the ON state (as shown in FIG. 34B), the IR/thermal video image or the composite video image generated by the video projector 128 may be redirected to the eyepiece 3310 by the pivotable mirror 3316 and the user may observe the IR/thermal video image with or without the auxiliary video image. In some embodiments, the IR sensor 122 and the video projector 128 may be automatically activated when the user changes the position of the pivotable mirror 3316 to block the direct view (e.g., from up to down), and deactivated when the user changes the position of the pivotable mirror 3316 (e.g., from down to up) to clear the direct view optical path from the entrance window 112 to the eyepiece 3310. When the IR/thermal imaging subsystem and the video projector 128 are activated, the user may use a user interface of the firearm 3400 to enable or disable the auxiliary video image superimposed on the IR/thermal video image. In some cases, the IR/thermal imaging subsystem may be a high field of view (HFoV) imaging system. For example, an angular field of view of the IR/thermal imaging subsystem may be between 10 and 15 degrees, or between 15 and 20 degrees, or larger.

In some embodiments, the user interface may allow the user to select the content of the auxiliary video images projected by the video projector 3312. Or the video projector 128.

As a non-limiting example of the flow of light within the firearm scope 3400 when the pivotable mirror 3316 is in OFF state, FIG. 34A and FIG. 34B illustrate seven light rays depicting the optical paths associated with the direct view, the auxiliary image superimposed on the direct view, IR/thermal video view, the LRF 882, and the laser pointer 3320. The visible light ray 1101 passes through the entrance window 112, the dichroic beam splitter 116, the objective 3302, the beam splitter 3304, the relay lens system 3308, and exits the firearm scope 3400 via the eyepiece 3310. The IR/thermal light ray 1102 passes through the entrance window 112 and is redirected by the dichroic beam splitter 116 toward the IR imaging lens system 3414 and is projected on the infrared image sensor 122. The auxiliary video light ray 3407, that is generated by the auxiliary video projector 3312, passes through the auxiliary video projection lens system 3306 and is redirected by the beam splitter 3304 toward the relay lens system 3308, and then passes through the relay lens system 3308 and exits the firearm scope 3400 via the eyepiece 3310. After exiting the firearm scope 3400, the auxiliary video light ray 3407 and the video light ray 1101 may enter an eye of a user.

As a non-limiting example of the flow of light within the firearm scope 3400 when the pivotable mirror 3316 is in the ON state, FIG. 34A illustrates five light rays depicting the optical paths associated with the IR/thermal video view, the LRF 882, and the laser pointer 3320. The IR/thermal ray 1102 passes through the entrance window 112, is redirected toward the IR/thermal imaging lens system 3414, and is projected on the IR sensor 122 by the IR/thermal imaging lens system 3414. The IR/thermal video ray generated by the video projector 128 is redirected by the pivotable mirror 3316 toward the eyepiece 3310, and exits the firearm scope 3400 via the eyepiece 3310.

The dichroic beam splitter 116, the lenses in the IR/thermal imaging lens system 3414, and the IR image sensor 122 of the firearm scope 3400 may include one or more features described with respect to their counterparts in the firearm scope 200, 1300, 1600, or 1700a.

The auxiliary video projector 3312 may comprise an LED display (e.g., a micro-LED display or quantum dot organic light-emitting diode (QD-OLED) display). The video projector 128 may comprise an LCD or LED-based (micro-LED) monochrome or color micro display. The video projector 128 can be configured to project imagery, symbology, and/or other types of visual data received from EPCU 110. For example, the video projector 128 may generate video images using IR/thermal video signals received from the IR/thermal imaging subsystem (e.g., from the IR image sensor 122 or a signal processor/amplifier) and/or the auxiliary video signals from the EPCU. The auxiliary video projector 3312 may generate auxiliary video images using the auxiliary video signals received from the EPCU. In some cases, the video projector 3312 can be a high brightness video projector. In some examples, the video projector 3312 may have lower power consumption compared to the video projector 128. In some cases, the video projector 128 and/or the video projector 3312 may comprise one or more features described above with respect to video projector 128 of the firearm scope 1330 or 1700a.

The EPCU may generate the auxiliary video signals for overlaying on the direct view image or combining with the IR/thermal video image, using data stored in a memory of the EPCU or data received from an external device via the rail mount 1706 or wireless link (e.g., a wireless link between a transceiver of the EPCU and the external device).

In some examples, the beam splitter 3304 can be a double prism beam splitter configured to split an incident visible light beam (e.g., having a wavelength between 0.4 microns and 0.7 microns) to a transmitted light beam and a reflected light beam. In some cases, a splitting ratio of the beam splitter 1802 (e.g., the ratio between the intensity of the transmitted light beam and the reflected light beam) may be 95/5, 90/10, 80/20, or 70/30. In some examples, the beam splitter 3304 may comprise a plurality of dielectric layers disposed on a substrate. The number of dielectric layers, optical property, and thickness of each dielectric layer may be selected to provide a desired splitting ratio for light having a wavelength within the visible wavelength range. In some cases, the beam splitter 3304 is configured to permit transmission of visible light with a luminous transmittance greater than or equal to 50%, 60%, 70%, or 80% using CIE Illuminant D65; and permit the reflection of visible light with a luminous reflectance less than or equal to 50%, 40%, 30%, or 20% using CIE Illuminant D65.

In some cases, a magnification of the IR/thermal video image generated by the video projector 128 may be controlled by the EPCU. The EPCU may control the magnification of the video image automatically or based on user input received from a user interface.

In some embodiments, a user can control the IR/thermal video signal and the auxiliary video signal independently, using a user interface of the firearm scope 3400. In some examples, the user may control the content of the auxiliary video image superimposed on the direct view image or combined with the IR/thermal video image.

In some cases, the EPCU may automatically activate or deactivate the auxiliary video signal based on a signal received from a sensor.

In some cases, the distance or target range determined by LRF may be included in the auxiliary information presented in the auxiliary video image. In some cases, the distance or target range determined by LRF may be used to generate a ballistic reticle image with automatic aiming point selection. In some examples, the LRF may be configured to determine target ranges or distances between 100 m to 500 m, 500 m to 1 km, 1 km to 2 km, 2 km to 3 km, or other ranges. In some cases, the LRF may receive sensor signals indicative of a level of humidity or a temperature of the environment surrounding the firearm scope. In some such cases, the LRF may determine the target range or the distance based at least in part on data received from a temperature sensor and/or humidity sensor (e.g., the temperature sensor or the humidity sensor included in the sensor subsystem). In some embodiments, the LRF may determine a target range upon receiving a trigger signal from the EPCU. The EPCU may automatically generate the LRF trigger signal at time periods selected by the user. In some cases, the EPCU may generate the LRF trigger signal upon receiving a user interaction with a user interface. As such, a user may obtain and observe the target range at any time. In some cases, EPCU may send a trigger signal to the LRF when the user activates a ballistic reticle image. In some examples, when the ballistic reticle image is activated, the LRF may continuously obtain the target range to update a red dot or the aiming point of the ballistic reticle image.

In some cases, the EPCU generates the auxiliary video signal using signals or data received from: the signal interface of the rail mount 3403, the LRF, the sensor suite, the IR/thermal imaging system, the video projection system, and the like. In some cases, the EPCU generates the auxiliary signals using wireless signals received from an external device (separated from the firearm) or an add-on module. In these cases, a wireless link may be established between a wireless transceiver included in or connected to the EPCU and the add-on module or the device. In some cases, the device can be a pair of night vision goggles, a head mounted display, a display system attached to a helmet, and/or any other type of equipment that may be included as part of a user's or soldier's kit. In some cases, an auxiliary video signal may comprise a video signal usable for generating a reticle image.

As described above the auxiliary image may include auxiliary information and a bore sighted reticle image. In some examples, auxiliary information may include information associated with: the firearm or a device to which the clip-on scope is attached (e.g., number of rounds remaining in the magazine, communication status for the magazine, battery level of a magazine battery, etc.), information associated with the surrounding environment sensor (e.g., light level, altitude, pressure, temperature, wind speed, wind direction, and the like), information associated with the firearm scope 3400 (e.g., amount of charge left in the battery, status of a subsystem, and the like), information associated with a device or add-on module that is in communication with the firearm or the firearm scope, data received from LRF, and the like. In various embodiments, auxiliary information may present as textual, numerical, or symbolic information in the auxiliary image.

In some cases, the image displayed or output to a user of the firearm scope 3400 directly through the eyepiece 3310 when the auxiliary video image is superimposed on the direct view image, may comprise the image illustrated in FIG. 10.

In some embodiments, the user may control the auxiliary information and the reticle image included in the auxiliary image using a user interface. In some cases, the user interface can include a user interface of the firearm scope 3400, a user interface of the firearm, or a user interface that is in communication with the firearm scope 3400 via a wireless link or via the signal interface of the rail mount 3403. For example, the user can use the user interface to select and change the auxiliary information presented in the auxiliary image and change the arrangement and position of the auxiliary information in the auxiliary image. In some embodiments, the user may use the user interface to control the reticle image. For example, the user may change a shape (e.g., between circular or rectangular), a size, a type, or a color of the reticle, or align the reticle image to align the reticle image with firearm barrel's bore axis.

In various embodiments, one or more of the LRF 882, laser pointer 3320, sensor subsystem 1730, or the auxiliary video system, may be excluded from the firearm scope 3300 or 3400. In some cases, the functionality associated with an excluded system or subsystem may be provided by an external system in communication with the firearm scope 3300 or 3400 that may be mounted on or operatively connected to the firearm scope 3300 or 3400.

FIG. 35A-35C illustrate the side view, front view and back view of an example of the firearm scope 3400. In some embodiments, the firearm scope 3400 may comprise a housing 3401 that houses the optical and electronic components and subsystems of the firearm scope 3300 and/or 3400 including but not limited to an IR/thermal imaging subsystem, laser rangefinder (LRF) subsystem, a battery (e.g., a rechargeable battery), a laser pointer, a sensor subsystem, and an electronic processing and control unit (EPCU).

The housing 3401 may include: an entrance window 112, an exit port comprising an eye cup 3508, a control knob 3504, a first reticle control knob 3418, a pivotable mirror control knob 3506, a first battery cap 3422, and a rail mount 3403. In some embodiments, such as the example shown, the control knob 3504 is disposed on a sidewall of the housing 3401, the first reticle control knob 3418 is disposed on a top surface of the housing 3401, and the pivotable mirror control knob 3506 is disposed on another sidewall of the housing 3401 near the eye cup 3508.

The control knob 3504 may be used to select between different operational modes and selecting different menu options presented for each mode via the eye piece. For example, the control know 3504 may be used to activate/deactivate the IR/thermal video view mode, visible video view mode, change one or more control settings for each mode, change and select the content of the auxiliary video image and the like. In some implementations, the control knob 3504 may directly or indirectly control digital processing of the image generated by the projector 128. In some implementations, the control knob 3504 may be used to activate/deactivate the auxiliary video image superimpose on the magnified the direct view image and/or to change a content of the auxiliary video image, or focus/defocus the auxiliary video images projected by the auxiliary video projector 3312 to the user's eye 331.

In some aspects, the IR image 122 sensor can be a zoom-capable imager. In some cases, the user can adjust the magnification settings of the IR image sensor 122 using one or more user interfaces (e.g., the Control knob 3504). In some cases, the combination of the infrared image sensor 122 with the infrared imaging lens system 3414 can provide an effective field of view of between 2 degrees and 18 degrees depending on the selected magnitude of the digital zoom. For example, in a case without magnification when the video image is the same size as an undirect view image, the field of view can be 18 degrees. In contrast, when the magnification is set to 8×, the field of view may be reduced to 2 degrees. For any given magnification, the effective field of view may exceed 18 degrees (e.g., the effective field of view may be 30, 60, 90 degrees).

Although various user interface elements are described as knobs, buttons, or switches, the form of the user interface elements are not limited as such. Any type of user interface element may be used for any of the controls described herein. For example, user interface elements may include touch inputs, touch screens, physical buttons, rotatable knobs, flip switches, buttons, and the like.

Although various user interface elements are described as knobs, buttons, or switches, the form of the user interface elements are not limited as such. Any type of user interface element may be used for any of the controls described herein.

The mirror control knob 3506 can be used to change the state of a pivotable mirror (e.g., pivotable mirror 3316) or a switchable mirror, between an OFF state for direct view through the entrance window 112 (e.g., direct-view mode), or an ON state for activating the IR/thermal video-view mode. In OFF state, the pivotable mirror 3316 may be turned, moved up, or otherwise removed from the optical or viewing path between the relay lens system 3308 and the eyepiece 3310. In the ON state, the pivotable mirror 3316 may be turned, move down or otherwise positioned within the optical path between the relay lens system 3308 and the eyepiece 3310 and may block the direct view.

In some examples, the mirror control knob 3316 may also control the electronic components and circuitry associated with IR/thermal video imaging. For example, when the mirror control knob 3316 is in ON state, where the mirror blocks the optical path between the relay lens system 3308 and the eyepiece 3310, the IR sensor 122, the video projector 128, and the corresponding electronic circuitry associated with transition and processing of the video signals may be turned off. In other implementations, separate controls may be used to activate/deactivate IR/thermal video view mode. Advantageously, the ability to control the activation and deactivation of IR/thermal video view mode can extend the battery life of the scope power supply by reducing power consumption during periods when only direct view is used.

The rail mount 3403 may allow the firearm scope 3400 to be removably mounted to a receiving or mounting rail of a firearm, weapon system, or other device that may exploit the functionalities provided by the firearm scope 3400. The firearm scope 3400 may be attached to a firearm or weapon using any type of attachment mechanism that enables the firearm scope 3400 to be securely affixed to the weapon. The rail mount 3403 may be configured to exchange signals, power, and data between the firearm scope 3400, and the firearm or a device to which the firearm scope 3400 is attached. The rail mount 3403 can be configured to be compatible with Picatinny rails, Weaver rails, or the like. In some cases, the rail mount 3403 is compatible with different types of powered mounting rails and mounting rails with data or signal interfaces.

In some embodiments, the rail mount 3403 may include a power interface and a signal interface. The signal interface may be used for receiving signals from the mounting rail or sending signals to the mounting rail. In some embodiments, the signals can be exchanged through non-contact optical, contact optical, direct contact electrical links, capacitive data transfer, or inductive data transfer. In some cases, the rail mount 3403 may comprise one or more features described with respect to the rail mount 202 and rail communication module 986. In some cases, the power interface of the rail mount 3403 can be configured to provide and/or receive power to/from the firearm. The power can be provided or received through inductive coupling or a direct electrical connection.

A signal received by the rail mount 3403 can be a control signal or a data signal. For example, a control signal received from the mounting rail may activate or deactivate a subsystem or a sensor of the firearm scope 3400. The data signal may comprise data (e.g., digital data) generated by the firearm, a subsystem of the firearm, or a system that is in communication with the device. For example, the data signal may be generated by an ammunition counter of a firearm and indicate an ammunition count in the firearm. As another example, the data signal may be generated by a sensor or a detector (e.g., an environmental sensor or an eye detector) connected to or in communication with the firearm.

FIG. 35B illustrates a front panel of the firearm scope 3400. The front panel may include a LRF entrance window 1382, a LRF exit window 3518, a laser pointer window 3516 through which the laser beam generated by the laser pointer 3320 exits the housing 3401, the entrance window 112, and the second entrance window 3514 through which the visible video imaging system receives light from the target scene. The LRF exit window 3518 may be configured to allow the laser beam 1912a generated by the ranging laser 1900 exit the housing 3401. The LRF entrance window 1382 may be configured receive the reflected or scattered light 1912b associated with the laser beam 1912a.

FIG. 35C illustrates a back panel of the firearm scope 3400. The back panel may include a first battery cap 3422, a second battery cap 3524, and a second reticle control knob 3520. In some cases, the first reticle control knob 3418 may be used to adjust an elevation of the reticle with respect to an entrance aperture of the auxiliary projection lens system 3306 and the second reticle control knob 3520 be used to adjust an azimuthal angle of the reticle with respect to the auxiliary projection lens system 3306.

Figure 36A:
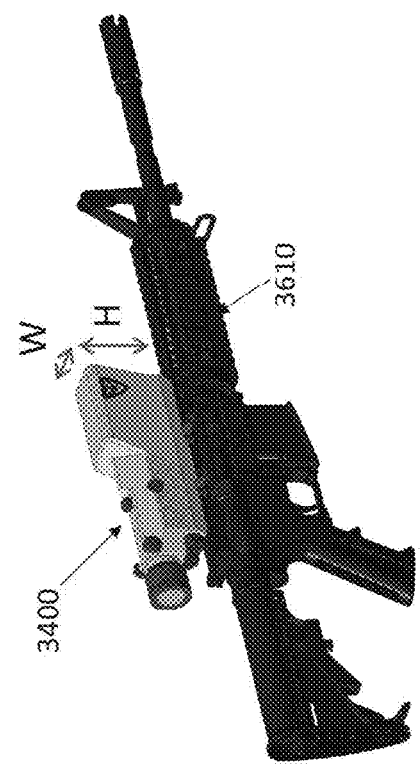
FIGS. 36A-36B illustrate a front perspective view (A), and a back perspective view (B) of the firearm scope shown in Figured 34A-34B and 35A-35C, mounted on a firearm.
Figure 36B:
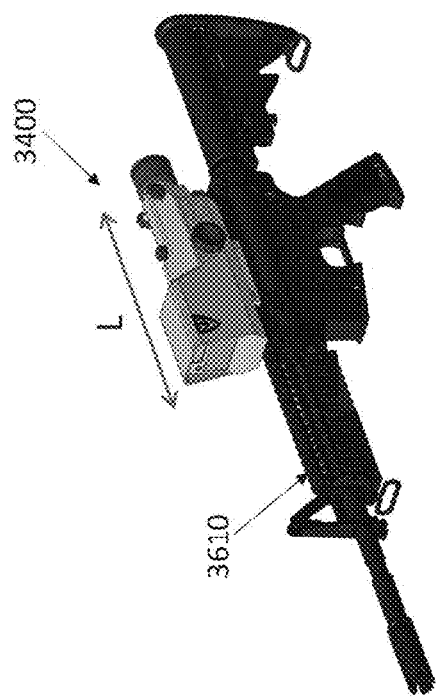

FIGS. 36A and 36B illustrate front and back perspective views of the firearm scope 3400 mounted on a firearm 3610. In some embodiments the length (L) of the firearm scope 3400 can be from 8 to 12 inches, a width (W) of the firearm scope 3400 can be from 2.5 to 3.5 inches, and a height (H) of the firearm scope 3400 can be from 3 to 4 inches. In various embodiments, the length (L), width (W), and height (H) of the firearm scope 3400 can have values larger or smaller than the values specified above.

Example Use Cases

As described above, the configurations of the firearm scopes 3300 and 3400 may support multiple view modes including: 1) direct view mode; 2) simultaneous direct view with auxiliary video view; 3) IR/thermal view; or 4) simultaneous IR/thermal view with auxiliary video view. By supporting multiple view modes simultaneously, it is possible for a user to see augmented data that augments a direct view. For example, IR/thermal views and/or auxiliary video views may augment the direct view.

1) Direct magnified view: In this mode of operation, the user may put the switchable mirror 3316 in the OFF state (e.g., by rotating the pivotable mirror 3316 up), and turn off the auxiliary video subsystem to see a magnified image of the target scene generated without any overlay image. In some cases, a direct magnified image may be an image having an angular magnification factor from 1 to 20 or larger. In some cases, the user may adjust a magnification level of the direct view system using a user interface of the firearm scope.

2) Simultaneous direct magnified view and auxiliary video view: In this mode of operation, the user may user may put the switchable mirror 3316 in the OFF state (e.g., by rotating the pivotable mirror 3316 up) and turn on the auxiliary video system (e.g., using the control knob 3504), to overlay an auxiliary image on the direct view image. In some cases, the auxiliary video image may comprise a bore sighted reticle image. In some cases, the auxiliary image may comprise the bore sighted reticle image and auxiliary information. The reticle image and/or the auxiliary information, that are simultaneously viewable with the direct view image, may facilitate target acquisition by the user. The user may use the knob 3504 to select and change the content of the auxiliary video image.

3) IR/thermal video-view: In this mode of operation, the user may put the switchable mirror 3316 in the ON state (e.g., by rotating the pivotable mirror 3316 down), and turn on the IR/thermal video view system, to see an IR/thermal video image of the target scene via the eyepiece 3310. The IR/thermal video image may be used a light level in the surrounding environment is very low or at night.

4) Simultaneous thermal video-view and auxiliary video view: In this mode of operation, the user may put the switchable mirror 3316 in the ON state (e.g., by rotating the pivotable mirror 3316 down), turn on the IR/thermal video view system, and activate the auxiliary video signal to overlay an auxiliary video image on the IR/thermal video image. In some embodiments, the user may turn on the IR/thermal video view system using a first user interface and activate the auxiliary video signal using a one or more second user interfaces of the firearm scope. In some examples, putting the switchable mirror 3316 in the ON state may automatically turn on the IR/thermal video view system. In some cases, the user may adjust the brightness of the IR/thermal image using a user interface element.

5) Day light/low light video-view: In this mode of operation, the user may put the switchable mirror 3316 in the ON state (e.g., by rotating the pivotable mirror 3316 down), and turn on the video view system, to see a video image of the target scene via the eyepiece 3310 under day light, low light, or auxiliary illumination (e.g., SWIR illumination).

6) Simultaneous day light/low light video-view and auxiliary video view: In this mode of operation, the user may put the switchable mirror 3316 in the ON state (e.g., by rotating the pivotable mirror 3316 down), turn on the video view system, and activate the auxiliary video signal to overlay an auxiliary video image on the video image. In some examples, putting the switchable mirror 3316 in the ON state may automatically turn on the video view system. In some cases, the user may adjust the brightness of the video image using a user interface element.

Advantageously, operating the firearm scope 3400 in a video view mode (visible or R/thermal) may protect user's eye from a possible laser light attach via the entrance window 112.

In some embodiments, the user may adjust the brightness of the auxiliary video image superimposed on the direct view image or the IR/thermal video image to optimize a contrast between the direct view image or the IR/thermal video, and the auxiliary video image.

In some embodiments, the user may adjust the size of the auxiliary video image superimposed on the direct view image or the IR/thermal video image. In some cases, the EPCU of the firearm scope may automatically adjust the size of the video image based on the magnification level of direct view system or the IR/thermal view system. For example, the EPCU may receive a signal indicative of the magnification level of direct view system or the IR/thermal view system and adjust the auxiliary video image size accordingly.

In various embodiments, the user may use an external user interface that is in communication with the firearm scope, to control one or more features or functions of the firearm scope 3300 or 3400. In some examples, the user may use an external user interface that is in communication with the firearm scope 3300 or 3400, to control one or more features or functions of the firearm scope 3300 or 3400 that are not controllable using a user interface of the firearm scope 3300 or 3400. In some cases, the external user interface can be a user interface of the firearm or other devices to which the firearm scope is connected. In some embodiments, the external user interface may be a standalone user interface that is in communication with the firearm scope 3300 or 3400 via a wired or a wireless link.

Example Embodiments

The following is a list of multiple sets of example numbered embodiments. The features recited in the below list of example embodiments can be combined with additional features disclosed herein. Further, each set of example numbered embodiments in the following list can be combined with one or more additional sets of example numbered embodiments from the following list. Furthermore, additional inventive combinations of features are disclosed herein, which are not specifically recited in the below list of example embodiments, and which do not include the same features as the embodiments listed below. For sake of brevity, the below list of example embodiments does not identify every inventive aspect of this disclosure. The below list of example embodiments is not intended to identify key features or essential features of any subject matter described herein.

1. A weapon system comprising:
   a firearm comprising a mount configured to support attachment of an accessory to the firearm; and
   a firearm scope mountable to the firearm via the mount of the firearm, the firearm scope comprising a sight system configured to admit light via a first window of the firearm scope and present a target scene or an image of the target scene, to a user via a second window of the firearm scope, wherein the image of the target scene is formed based at least in part on light admitted by the first window of the firearm scope, the sight system comprising:
      a first image source configured to generate a first image for presentation to the user, wherein the first image source generates the first image based at least in part on the admitted light;
      a second image source configured to generate a second image comprising a reticle for presentation to the user;
      a waveguide display configured to display the second image superimposed on the first image to the user; and
      an image projector configured to project at least the first image onto the waveguide display.

2. The weapon system of embodiment 1, wherein the firearm comprises a rifle.
3. The weapon system of embodiment 1, wherein the mount comprises a Picatinny rail or a Weaver rail.
4. The weapon system of embodiment 1, further comprising a data connection between the firearm and the firearm scope.
5. The weapon system of embodiment 4, wherein the firearm further comprises a transmitter and the firearm scope further comprises a receiver, and wherein the data connection is formed by the transmitter of the firearm and the receiver of the firearm scope.
6. The weapon system of embodiment 5, wherein the transmitter is part of a first transceiver, and the receiver is part of a second transceiver.
7. The weapon system of embodiment 4, wherein the firearm further comprises a first optical transceiver and the firearm scope further comprises a second optical transceiver, and wherein the data connection is formed by the first optical transceiver and the second optical transceiver.
8. The weapon system of embodiment 4, wherein the firearm scope is configured to determine symbology corresponding to data received from the firearm over the data connection.
9. The weapon system of embodiment 8, wherein the first image source is further configured to generate the first image based at least in part on the symbology.
10. The weapon system of embodiment 8, wherein the second image further comprises the symbology and wherein the second image source is further configured to generate the second image based on the symbology.
11. The weapon system of embodiment 8, wherein the data comprises a cartridge count of cartridges within a magazine inserted into the firearm; a cartridge count of cartridges within one or more magazines registered to the firearm; a jam state of the firearm; a battery status of a battery within the firearm; a status of electronics included in the firearm; a magazine insertion status of the firearm; or a firearm safety status.
12. The weapon system of embodiment 8, wherein the firearm scope further comprises a processor configured to determine the symbology based at least in part on the data received via the data connection.
13. The weapon system of embodiment 4, wherein the firearm is further configured to provide control data over the data connection to the firearm scope, and wherein the firearm scope is further configured to modify one or more settings of the firearm scope based on the control data.
14. The weapon system of embodiment 1, wherein the second image source comprises a reticle image generator.
15. The weapon system of embodiment 14, wherein the reticle image generator comprises a laser diode.
16. The weapon system of embodiment 14, wherein the firearm scope further comprises a user interface configured to receive one or more inputs from the user, and wherein the firearm scope is further configured to modify a configuration of the reticle image generator based on the one or more inputs.
17. The weapon system of embodiment 1, further comprising a magazine that includes an ammunition counter configured to count a number of cartridges within the magazine.
18. The weapon system of embodiment 17, wherein the image projector generates a display of a symbol corresponding to the number of cartridges within the magazine.
19. The weapon system of embodiment 1, wherein the firearm scope further comprises coupling optics that couple the first image with the second image to obtain a superimposed image, and wherein the image projector is further configured to project the superimposed image onto the waveguide display.
20. The weapon system of embodiment 1, wherein the image projector is configured to project at least the first image onto gratings of the waveguide display.
21. The weapon system of embodiment 20, wherein the image projector is configured to project a first portion of the first image onto a grating of a first layer of the waveguide display, a second portion of the first image onto a grating of a second layer of the waveguide display, and a third portion of the first image onto a grating of a third layer of the waveguide display.
22. The weapon system of embodiment 21, wherein the first portion of the first image comprises light within red wavelength region and the first layer of the waveguide display is configured to reflect light within red wavelength region, the second portion of the first image comprises light within green wavelength region and the second layer of the waveguide display is configured to reflect light within green wavelength region, and the third portion of the first image comprises light within blue wavelength region and the third layer of the waveguide display is configured to reflect light within blue wavelength region.
23. The weapon system of embodiment 1, wherein the firearm scope further comprises a second projector configured to project at least the second image onto the waveguide display.
24. The weapon system of embodiment 23, wherein the image projector projects the first image onto the waveguide display via a first input port of the waveguide display, and the second projector projects the second image onto the waveguide display via a second input port of the waveguide display.
25. The weapon system of embodiment 23, wherein the second projector comprises the second image source.
26. The weapon system of embodiment 23, wherein the second projector is powered by a different power source than the image projector.
27. The weapon system of embodiment 1, wherein the firearm is further configured to supply power to at least a portion of the firearm scope.
28. The weapon system of embodiment 1, wherein the first image and the second image are viewable through the second window.
29. The weapon system of embodiment 1, wherein the first image corresponds to the target scene.

Additional embodiments of the present disclosure can be described in view of the following numbered embodiments:
1. A firearm scope capable of providing both a video-view mode and a direct-view mode through a single viewing window, the firearm scope comprising:
    a housing comprising a first window configured to admit light and a second window that enables a user to view a target scene; and
    a sight system at least partially housed within the housing, the sight system configured to process the admitted light and to present the target scene to the user via the second window, the sight system comprising:
- a direct view display viewable through the second window, the direct view display having a luminous transmittance greater than or equal to about 30% using CIE Illuminant D65 when viewed within at least 10 degrees of perpendicular to the direct view display, thereby permitting a direct view of the target scene through a transparent display substrate of the direct view display;
- a redirection element configured to redirect at least some of the admitted light received through the first window towards an image sensor when in a first state;
- the image sensor configured to generate an image based on the light received from the redirection element; and
- a projector configured to project the image onto the transparent display substrate of the direct view display.

2. The firearm scope of embodiment 1, wherein the direct view display comprises a waveguide.

3. The firearm scope of embodiment 1, wherein the direct view display comprises a see-through display or a transparent laser display configured to support augmented reality.

4. The firearm scope of embodiment 1, wherein the direct view display has a luminous transmittance greater than or equal to about 80% using CIE Illuminant D65.

5. The firearm scope of embodiment 1, further comprising an optical coupler configured to couple light corresponding to the image that is output by the projector to an input port of the direct view display.

6. The firearm scope of embodiment 1, wherein the redirection element comprises a pivotable mirror configured to pivot between at least a first position associated with the first state and a second position associated with a second state, wherein the redirection element redirects the at least some of the admitted light to the image sensor when in the first position, and wherein the redirection element does not redirect the at least some of the admitted light to the image sensor when in the second position associated with the second state.

7. The firearm scope of embodiment 1, wherein the redirection element comprises a beam splitter.

8. The firearm scope of embodiment 6, wherein the beam splitter has at least 50% luminance transmittance.

9. The firearm scope of embodiment 1, wherein the redirection element comprises an electrochromic mirror.

10. The firearm scope of embodiment 1, wherein the image sensor comprises a complementary metal-oxide-semiconductor (CMOS) sensor.

11. The firearm scope of embodiment 1, wherein the image sensor comprises a focal-plane array.

12. The firearm scope of embodiment 1, further comprising a second image sensor configured to generate a second image at least from long-wavelength infrared light within a wavelength range of between 8 to 15 micrometers.

13. The firearm scope of embodiment 12, wherein the second image sensor comprises a focal-plane array.

14. The firearm scope of embodiment 12, further comprising a second redirection element configured to reflect at least the long-wavelength infrared light towards the second image sensor.

15. The firearm scope of embodiment 14, wherein the second redirection element is configured to at least transmit light within a visible wavelength range of between 380 to 740 nanometers.

16. The firearm scope of embodiment 12, further comprising a processor configured to combine the image and the second image to obtain a combined image, wherein the projector projects the image onto the transparent display substrate by projecting the combined image onto the transparent display substrate.

17. The firearm scope of embodiment 1, further comprising a second projector configured to project symbology onto the transparent display substrate of the direct view display.

18. The firearm scope of embodiment 17, wherein the symbology comprises a reticle image.

19. The firearm scope of embodiment 18, wherein a configuration of the second projector is adjustable enabling adjustment of the reticle image.

20. The firearm scope of embodiment 17, wherein the projector and the second projector are powered by separate power sources.

21. The firearm scope of embodiment 17, wherein the second projector comprises a laser diode.

22. The firearm scope of embodiment 17, wherein the symbology comprises weapon or magazine status information.

23. The firearm scope of embodiment 1, wherein the image projected onto the transparent display substrate corresponds to the target scene.

24. The firearm scope of embodiment 1, wherein the direct view and the image are simultaneously viewable through the second window.

25. The firearm scope of embodiment 1, wherein the image and a second image generated based at least in part on long-wavelength infrared light are selectively viewable through the second window.

Additional embodiments of the present disclosure can be described in view of the following numbered embodiments:

1. A firearm scope capable of displaying superimposed source imagery on a waveguide display, the firearm scope comprising:
- a housing comprising a first window configured to admit light and a second window that enables a user to view a target scene; and
- a sight system at least partially housed within the housing, the sight system configured to process the admitted light and to present the target scene to the user via the second window, the sight system comprising:
  - a first image source configured to generate a first image for presentation to the user, wherein the first image source generates the first image based at least in part on the admitted light;
  - a second image source configured to generate a second image for presentation to the user, wherein the second image comprises symbology;
  - a waveguide display configured to display the second image superimposed on the first image to the user; and
  - an image projector configured to project at least the first image onto the waveguide display.

2. The firearm scope of embodiment 1, wherein the image projector projects the first image onto the waveguide display via a first optical input location of the waveguide display.
3. The firearm scope of embodiment 1, wherein the symbology comprises a reticle image and the second image source comprises a reticle image generator.
4. The firearm scope of embodiment 3, wherein the reticle image generator comprises a laser diode.
5. The firearm scope of embodiment 3, further comprising a user interface configured to adjust a configuration of the reticle image generator in response to a user input.
6. The firearm scope of embodiment 1, wherein the second image source comprises a second projector configured to project the second image onto the waveguide display.
7. The firearm scope of embodiment 1, wherein the first image source and the second image source are powered by separate power sources.
8. The firearm scope of embodiment 1, further comprising a second image projector configured to project at least the second image onto the waveguide display.
9. The firearm scope of embodiment 8, wherein the image projector projects the first image onto the waveguide display via a first optical input location of the waveguide display and the second image projector projects the second image onto the waveguide display via a second optical input location of the waveguide display.
10. The firearm scope of embodiment 9, wherein the second optical input location is on a different face of the waveguide display than the first optical input location.
11. The firearm scope of embodiment 8, further comprising a coupling optics system that mixes an output of the image projector corresponding to the first image with an output of the second image projector corresponding to the second image to obtain a third image comprising the second image superimposed on the first image.
12. The firearm scope of embodiment 11, wherein the coupling optics system is further configured to provide the third image to an optical input location of the waveguide display enabling the waveguide display to display the second image superimposed on the first image to the user.
13. The firearm scope of embodiment 8, wherein the image projector projects the first image onto a first set of one or more gratings of the waveguide display the second image projector projects the second image onto a second set of one or more gratings of the waveguide display.
14. The firearm scope of embodiment 13, wherein the first set of one or more gratings and the second set of one or more gratings are accessible via a single optical input location of the waveguide display.
15. The firearm scope of embodiment 1, further comprising an optical receiver configured to receive digital data indicative of a number of cartridges available to the user.
16. The firearm scope of embodiment 15, wherein the symbology comprises an indication of the number of cartridges available to the user.
17. The firearm scope of embodiment 1, wherein the first image source comprises a complementary metal-oxide-semiconductor (CMOS) sensor.
18. The firearm scope of embodiment 1, wherein the waveguide display has a luminous transmittance greater than or equal to about 80% using CIE Illuminant D65.
19. The firearm scope of embodiment 1, wherein the waveguide display is further configured to display the second image to the user without presentation of the first image.
20. The firearm scope of embodiment 1, wherein the admitted light comprises long-wavelength infrared light.
21. The firearm scope of embodiment 20, wherein the first image comprises a thermal image.
22. The firearm scope of embodiment 20, wherein the first image comprises a thermal image combined with a visible light image created from light included in the admitted light that is within a visible wavelength range.
23. The firearm scope of embodiment 20, wherein the long-wavelength infrared light is within a wavelength range of between 8 to 15 micrometers.
24. The firearm scope of embodiment 1, wherein the waveguide display is formed from multiple layers comprising a red layer configured to receive light within the red wavelengths, a green layer configured to receive light within the green wavelengths, and a blue layer configured to receive light within the blue wavelengths.
25. The firearm scope of embodiment 24, wherein the image projector is configured to project the light within the red wavelengths to an input port of the red layer, project the light within the green wavelengths to an input port of the green layer, and project the light within the blue wavelengths to an input port of the blue layer.
26. The firearm scope of embodiment 1, wherein the first image and the second image are selectively viewable through the second window.
27. The firearm scope of embodiment 1, wherein the first image and the second image are simultaneously viewable through the second window.
28. The firearm scope of embodiment 1, wherein the symbology of the second image is user selectable.

Additional embodiments of the present disclosure can be described in view of the following numbered embodiments:
1. A firearm scope capable of providing both a thermal-view mode and a direct-view mode through a single viewing window, the firearm scope comprising:
  a housing comprising a first window configured to admit light and a second window that enables a user to view a target scene; and
  a sight system at least partially housed within the housing, the sight system configured to process the admitted light and to present the target scene to the user via the second window, the sight system comprising:
    a direct view display viewable through the second window, the direct view display transparent when viewed at a range of angles, thereby permitting
    a direct view through a transparent display substrate of the direct view display; a beam splitter configured to permit the transmission of light within a visible wavelength range while reflecting light within an infrared wavelength range towards an image sensor;
    the image sensor configured to generate a thermal image based on the light within the infrared wavelength range received from the beam splitter, thereby permitting a thermal view; and
    a projector configured to project the thermal image onto the transparent display substrate of the direct view display.

2. The firearm scope of embodiment 1, wherein the image sensor comprises a thermal focal-plane array capable of processing light within the infrared spectrum.
3. The firearm scope of embodiment 1, wherein the beam splitter comprises a dichroic mirror.
4. The firearm scope of embodiment 1, wherein the direct view display comprises a waveguide.
5. The firearm scope of embodiment 1, wherein the direct view display comprises a see-through display or a transparent laser display configured to support augmented reality.
6. The firearm scope of embodiment 1, wherein the direct view display has a luminous transmittance greater than or equal to about 80% using CIE Illuminant D65.
7. The firearm scope of embodiment 1, further comprising a second projector configured to project a reticle image onto the transparent display substrate of the direct view display.
8. The firearm scope of embodiment 7, further comprising a user interface configured to receive input indicative of an adjustment to the reticle image, wherein the second projector adjusts a location of a projection of the reticle image within the transparent display substrate based on the input.
9. The firearm scope of embodiment 7, wherein the projector and the second projector are powered by separate power sources.
10. The firearm scope of embodiment 7, wherein the second projector comprises a laser diode.
11. The firearm scope of embodiment 1, further comprising a second projector configured to project symbology onto the transparent display substrate of the direct view display.
12. The firearm scope of embodiment 11, wherein the symbology comprises one or more of: a cartridge count indicative of a number of cartridges within a magazine; a status of a power source; an identifier of a target status within the target scene; a jam state of a firearm; a communication state between the firearm scope and the firearm.
13. The firearm scope of embodiment 1, further comprising a redirection element configured to redirect the light within the visible wavelength range towards a second image sensor.
14. The firearm scope of embodiment 13, wherein the second image sensor comprises a complementary metal-oxide-semiconductor (CMOS) sensor.
15. The firearm scope of embodiment 13, wherein the second image sensor is configured to generate an image based on the light within the visible wavelength range received from the redirection element.
16. The firearm scope of embodiment 15, further comprising a processor configured to superimpose the image with the thermal image to obtain a combined image.
17. The firearm scope of embodiment 16, wherein the projector is further configured to project the thermal image by projecting the combined image onto the transparent display substrate of the direct view display.
18. The firearm scope of embodiment 15, wherein the projector is further configured to project the image onto the transparent display substrate of the direct view display.
19. The firearm scope of embodiment 18, wherein the image is simultaneously viewable through the second window with the direct view, the thermal view, or both the direct view and the thermal view.
20. The firearm scope of embodiment 15, further comprising a second projector configured to project the image onto the transparent display substrate of the direct view display.
21. The firearm scope of embodiment 20, wherein the image is simultaneously viewable through the second window with the direct view, the thermal view, or both the direct view and the thermal view.
22. The firearm scope of embodiment 13, wherein the redirection element is moveable between a first position that enables the redirection element to redirect the light within the visible wavelength range towards the second image sensor and a second position that permits the light within the visible wavelength range to reach the direct view display without being blocked by the redirection element.
23. The firearm scope of embodiment 1, further comprising an eye detector configured to detect whether an eye of the user is within a threshold distance of the second window.
24. The firearm scope of embodiment 23, further comprising a controller configured to deactivate the image sensor and the projector when the eye of the user is not detected within the threshold distance of the second window.
25. The firearm scope of embodiment 23, further comprising a controller configured to cause at least one of the image sensor or the projector to enter a low-power mode when the eye of the user is not detected within the threshold distance of the second window.
26. The firearm scope of embodiment 1, wherein the direct view and the thermal image are viewable through the second window.
27. The firearm scope of embodiment 1, wherein the direct view and the thermal image are simultaneously viewable through the second window.
28. The firearm scope of embodiment 1, further comprising a sunshield configured to reduce an ambient light admitted by the first window.

Additional embodiments of the present disclosure can be described in view of the following numbered embodiments:
1. A firearm scope configured to provide a view of a target scene to a user, the firearm scope comprising:
    a housing comprising a first aperture configured to admit light and a second aperture configured to present the target scene to the user; and
    a sight system at least partially housed within the housing, the sight system configured to process the admitted light and to present the target scene to the user via the second aperture, the sight system comprising:
        a dichroic mirror configured to reflect at least some light of the admitted light that is within infrared spectrum and transmit at least some light of the admitted light that is within visible spectrum;
        a moveable mirror configured to reflect at least some light within the visible spectrum towards an optical subsystem when the moveable mirror is within a first position associated with a first state;
        an image processor configured to generate an image based on light received from the optical subsystem;
        a projector configured to project the image into a first point of ingress of a holographic waveguide; and
        the holographic waveguide configured to present the image to the user when in the first state.

2. The firearm scope of embodiment 1, wherein the light admitted by the first aperture comprises visible light within the visible spectrum and infrared light within the infrared spectrum.
3. The firearm scope of embodiment 1, wherein the dichroic mirror is at least partially transparent to the user.
4. The firearm scope of embodiment 1, wherein the dichroic mirror is positioned at an angle configured to reflect the light within the infrared spectrum towards an infrared subsystem.
5. The firearm scope of embodiment 4, wherein the infrared subsystem is configured to generate an infrared image, and the projector is further configured to project the infrared image using the holographic waveguide.
6. The firearm scope of embodiment 1, wherein the moveable mirror is configured to be moveable to a second position associated with a second state that permits the at least some light within the visible spectrum to be passed through to the holographic waveguide without being reflected by the moveable mirror.
7. The firearm scope of embodiment 1, wherein the projector and holographic waveguide are calibrated such that light of an RGB output of the projector is matched to gratings at an input of the holographic waveguide such that reflections of the RGB output within the holographic waveguide form the image on a portion of the holographic waveguide aligned with the second aperture.
8. The firearm scope of embodiment 1, further comprising a second projector configured to project a reticle image using the holographic waveguide.
9. The firearm scope of embodiment 8, wherein the reticle image is bore-sighted.
10. The firearm scope of embodiment 8, wherein the second projector projects the reticle image into the first point of ingress of the holographic waveguide.
11. The firearm scope of embodiment 8, wherein the second projector projects the reticle image into a second point of ingress of the holographic waveguide that differs from the first point of ingress.
12. The firearm scope of embodiment 11, wherein the second point of ingress is on a different surface of the holographic waveguide than the first point of ingress.
13. The firearm scope of embodiment 8, wherein the projector and the second projector are powered by separate power sources.
14. The firearm scope of embodiment 8, wherein the second projector comprises a laser diode.
15. The firearm scope of embodiment 8, wherein a configuration of the second projector is adjustable enabling adjustment of the reticle image.
16. The firearm scope of embodiment 1, wherein the image generated by the image processor comprises a zoomed in image.
17. The firearm scope of embodiment 1, wherein the image processor comprises a complementary metal-oxide-semiconductor (CMOS) sensor.
18. The firearm scope of embodiment 1, wherein the holographic waveguide is at least partially transparent to the user.
19. The firearm scope of embodiment 1, further comprising a receiver configured to receive digital data indicative of a number of cartridges available to a user.
20. The firearm scope of embodiment 19, wherein the receiver comprises an optical receiver.
21. The firearm scope of embodiment 19, wherein the receiver communicates with a transmitter of a firearm that incorporates or is attached to the firearm scope.
22. The firearm scope of embodiment 19, wherein the number of cartridges comprises a number of cartridges within a magazine inserted into a firearm that incorporates or is attached to the firearm scope.
23. The firearm scope of embodiment 19, wherein the number of cartridges comprises a number of cartridges within one or more magazines registered with a firearm that incorporates or is attached to the firearm scope.
24. The firearm scope of embodiment 19, wherein one of the projector or a second projector configured to project a reticle image is further configured to project an image associated with the digital data onto the holographic waveguide.

Additional embodiments of the present disclosure can be described in view of the following:
1. A firearm scope capable of providing a direct view image of a target scene and a video image viewable via a single aperture, the firearm scope comprising:
    a housing comprising a first window configured to admit light and a second window that enables outputting the direct view image of the target scene and the video image; and
    a sight system at least partially housed within the housing, the sight system configured to process the admitted light and to transmit the direct view image and the video image to the second window, the sight system comprising:
        a first beam splitter configured to permit the transmission of light within a visible wavelength range while reflecting light within an infrared wavelength range towards an image sensor;
        the image sensor configured to generate a thermal video signal based on the reflected light within the infrared wavelength range received from the first beam splitter, thereby permitting a thermal view;
        a video projection system configured to receive the thermal video signal and to generate the video image;
        a second beam splitter configured to permit the transmission of a portion of light received from the first window to the second window while redirecting the video image received from the video projection system to the second window, thereby transmitting the direct view image of a target scene and the video image via the second window.
2. The firearm scope of embodiment 1, wherein the direct view image of the target scene and the video image are simultaneously viewable through the second window.
3. The firearm scope of embodiment 1, wherein the image sensor comprises a thermal focal-plane array capable of processing light within the infrared spectrum.
4. The firearm scope of embodiment 1, wherein the first beam splitter comprises a dichroic mirror.
5. The firearm scope of embodiment 1, wherein the second beam splitter comprises a 90/10 beam splitter.
6. The firearm scope of embodiment 1, wherein the video image comprises an auxiliary video image.
7. The firearm scope of embodiment 1, wherein the video image comprises a thermal video image of the target scene.

8. The firearm scope of embodiment 7, further comprising a processor configured to generate the thermal video image of the target scene using the thermal video signal.
9. The firearm scope of embodiment 8, wherein the processor is further configured to generate an auxiliary video image and to superimpose the auxiliary video image with the thermal video image to obtain a composite video image, and wherein the video image comprises the composite video image.
10. The firearm scope of embodiment 1, wherein video image comprises a bore sighted reticle image.
11. The firearm scope of embodiment 10, further comprising a user interface configured to receive input indicative of an adjustment to the content of the bore sighted reticle image.
12. The firearm scope of embodiment 1, wherein the video image comprises auxiliary information.
13. The firearm scope of embodiment 12, further comprising a sensor subsystem.
14. The firearm scope of embodiment 13, wherein the sensor subsystem comprises a pressure sensor, a temperature sensor, and a humidity sensor.
15. The firearm scope of embodiment 13, wherein the auxiliary information comprises data received from the sensor subsystem.
16. The firearm scope of embodiment 12, further comprising a laser rangefinder system configured to determine a distance between a target point and the first window.
17. The firearm scope of embodiment 16, wherein the auxiliary information comprises the distance between a target point and the first window.
18. The firearm scope of embodiment 12, wherein auxiliary information comprises information associated with the firearm.
19. The firearm scope of embodiment 12, wherein auxiliary information comprises information associated with the surrounding environment.
20. The firearm scope of embodiment 12, further comprising a user interface configured to receive input indicative of an adjustment to the content of the auxiliary information.
21. The firearm scope of embodiment 1, further comprising a tri-laser subsystem comprising a range finding laser, a red laser pointer and an IR laser pointer.

Additional embodiments of the present disclosure can be described in view of the following:

1. A firearm scope capable of providing a direct view image of a target scene and a video image viewable via a single aperture, the firearm scope comprising:
    a housing comprising a first window configured to admit light and a second window that enables outputting the direct view image of the target scene and the video image;
    a processor configured to generate an auxiliary video signal and transmit the auxiliary video signal to a video projection system to generate the video image;
    a sight system at least partially housed within the housing, the sight system configured to process the admitted light and to transmit the direct view image and the video image to the second window, the sight system comprising:
        the video projection system configured to generate the video image using the auxiliary video signal;
        a beam splitter configured to permit the transmission of a portion of light received from the first window to the second window while redirecting the video image received from the video projection system to the second window, thereby transmitting the direct view image of a target scene and the video image via the second window.
2. The firearm scope of embodiment 1, wherein the direct view image of the target scene and the video image are simultaneously viewable through the second window.
3. The firearm scope of embodiment 1, wherein the beam splitter comprises a 90/10 beam splitter.
4. The firearm scope of embodiment 1, wherein video image comprises a bore sighted reticle image.
5. The firearm scope of embodiment 4, further comprising a user interface configured to receive input indicative of an adjustment to the content of the bore sighted reticle image.
6. The firearm scope of embodiment 1, wherein the video image comprises auxiliary information.
7. The firearm scope of embodiment 6, further comprising a sensor subsystem.
8. The firearm scope of embodiment 7, wherein the sensor subsystem comprises a pressure sensor, a temperature sensor, and a humidity sensor.
9. The firearm scope of embodiment 7, wherein the auxiliary information comprises data received from the sensor subsystem.
10. The firearm scope of embodiment 6, further comprising a laser rangefinder system configured to determine a distance between a target point and the first window.
11. The firearm scope of embodiment 6, wherein the auxiliary information comprises the distance between a target point and the first window.
12. The firearm scope of embodiment 6, wherein auxiliary information comprises information associated with the firearm.
13. The firearm scope of embodiment 6, wherein auxiliary information comprises information associated with the surrounding environment.
14. The firearm scope of embodiment 6, further comprising a user interface configured to receive input indicative of an adjustment to the content of the auxiliary information.
15. The firearm scope of embodiment 1, further comprising a tri-laser subsystem comprising a range finding laser, a red laser pointer and an IR laser pointer.

Additional embodiments of the present disclosure can be described in view of the following:

1. A compound sight system capable of providing a direct view image of a target scene and a video image viewable via a primary scope through a single aperture, the compound sight system comprising:
    the primary scope, wherein the primary firearm scope comprises:
        an entrance window configured to admit light and an exit window to view images associated with the admitted light wherein the primary scope is configured to process the admitted light and to transmit the direct view image to the exit window; and
    a clip-on sight system connected to the primary scope, the clip-on sight system comprising:
        a housing comprising a first window configured to admit light and a second window that enables transmitting the direct view image of the target scene and the video image to the entrance window of the primary scope; and
        a sight system at least partially housed within the housing, the sight system configured to process the admitted light and to transmit the direct view image and the video image to the second window, the sight system comprising:
   a first beam splitter configured to permit the transmission of light within a visible wavelength range while reflecting light within an infrared wavelength range towards an image sensor;
   the image sensor configured to generate a thermal video signal based on the reflected light within the infrared wavelength range received from the first beam splitter, thereby permitting a thermal view;
   a video projection system configured to receive the thermal video signal and to generate the video image;
   a second beam splitter configured to permit the transmission of a portion of light received from the first window to the second window while redirecting the video image received from the video projection system to the second window, thereby transmitting the direct view image of a target scene and the video image to the primary scope via the second window.
2. The compound sight system of embodiment 1, wherein the direct view image of the target scene and the video image are simultaneously viewable through the second window.
3. The compound sight system of embodiment 1, wherein the video image comprises an auxiliary video image.
4. The compound sight system of embodiment 1, wherein the video image comprises a thermal video image of the target scene.
5. The compound sight system of embodiment 4, wherein the clip-on sight system further comprises a processor configured to generate the thermal video image of the target scene using the thermal video signal.
6. The compound sight system of embodiment 5, wherein the processor is further configured to generate an auxiliary video image and to superimpose the auxiliary video image on the thermal video image to obtain a composite video image, and wherein the video image comprises the composite video image.
7. The compound sight system of embodiment 1, wherein video image comprises a bore sighted reticle image.
8. The compound sight system of embodiment 7, further comprising a user interface configured to receive input indicative of an adjustment to the content of the bore sighted reticle image.
9. The compound sight system of embodiment 1, wherein the video image comprises auxiliary information.
10. The compound sight system of embodiment 9, wherein the clip-on sight system further comprises a sensor subsystem.
11. The compound sight system of embodiment 10, wherein the auxiliary information comprises data received from the sensor subsystem.
12. The compound sight system of embodiment 9, wherein the clip-on sight system further comprises a laser rangefinder system configured to determine a distance between a target point and the first window.
13. The compound sight system of embodiment 1, wherein the auxiliary information comprises the distance between a target point and the first window.
14. The compound sight system of embodiment 1, wherein auxiliary information comprises information associated with the firearm.
15. The compound sight system of embodiment 1, wherein the clip-on sight system further comprises a tri-laser subsystem comprising a range finding laser, a red laser pointer and an IR laser pointer.
16. The compound sight system of embodiment 1, wherein the clip-on sight system further comprises a user interface configured to receive input indicative of an adjustment to the content of the auxiliary information.
17. The compound sight system of embodiment 1, wherein the primary scope is configured to process the admitted light to generate a magnified direct view image having a magnification factor, where in the magnification is selected by a user.
18. The compound sight system of embodiment 17, wherein the primary scope is further configured to process the video image received from the second window to generate a magnified video image.
19. The compound sight system of embodiment 18, wherein the clip-on sight system further comprises a processor configured to generate the video image based on the magnification factor.
20. The compound sight system of embodiment 1, wherein the first beam splitter and the second beam splitter form a single beam splitter system.

Additional embodiments of the present disclosure can be described in view of the following:
1. A clip-on sight system configurable to operate in combination with a primary scope of a firearm configured to fire ammunition received from a magazine inserted into the firearm, the clip-on sight system comprising:
   a housing configured to operatively connect to the firearm, the housing comprising a first optical element configured to admit light and a second optical element that enables transmitting a direct view image of a target scene to the primary scope;
   a sight system at least partially housed within the housing, the sight system configured to process the admitted light, to superimpose an image on at least a portion of the direct view image, and to transmit the direct view image and the image to the second optical element, the sight system comprising:
      a beam splitter configured to:
         permit the transmission of visible light with a luminous transmittance greater than or equal to 70% using CIE Illuminant D65; and
         permit the reflection of visible light with a luminous reflectance less than or equal to 30% using CIE Illuminant D65; and
      a graphics projection system configured to generate the computer-generated image, the graphics projection system comprising a 2-dimensional display with a luminance greater than or equal to 50,000 cd/m$^2$ and a power consumption of less than or equal to 100 mW at an average picture level (APL) of 6%.
2. The clip-on sight system of embodiment 1, wherein a sum of the luminous transmittance and the luminous reflectance is less than or equal to 100%.
3. The clip-on sight system of embodiment 1, wherein the graphics projection system has a refresh rate of 10 Hz or less.
4. The clip-on sight system of embodiment 1, wherein the 2-dimensional display comprises a set of pixels.

5. The clip-on sight system of embodiment 4, wherein the graphics projection system is configured to turn on a subset of the set of pixels when displaying the image.
6. The clip-on sight system of embodiment 4, wherein the set of pixels comprises N pixels, and wherein the graphics projection system is configured to turn on between less than N pixels up to N pixels at a particular point in time.
7. The clip-on sight system of embodiment 4, wherein the set of pixels comprises a set of individually-addressable pixels.
8. The clip-on sight system of embodiment 1, wherein the beam splitter is configured to permit the reflection of visible light without filtering frequencies within the visible light spectrum.
9. The clip-on sight system of embodiment 1, wherein the 2-dimensional display comprises a red light display, a green light display, a blue light display, or a full color display.
10. The clip-on sight system of embodiment 1, wherein the 2-dimensional display has a power consumption of less than or equal to 50 mW at the APL of 6%.
11. The clip-on sight system of embodiment 10, wherein the 2-dimensional display has a power consumption of less than or equal to 25 mW at the APL of 6%.
12. The clip-on sight system of embodiment 11, wherein the 2-dimensional display has a power consumption of less than or equal to 15 mW at the APL of 6%.
13. The clip-on sight system of embodiment 1, wherein the 2-dimensional display comprises a pixel density of more than or equal to 3000 pixels per inch (PPI).
14. The clip-on sight system of embodiment 13, wherein the 2-dimensional display comprises a pixel density of more than or equal to 5000 PPI.
15. The clip-on sight system of embodiment 1, wherein the 2-dimensional display has a luminance greater than or equal to 100,000 cd/m$^2$.
16. The clip-on sight system of embodiment 1, wherein the 2-dimensional display has a luminance greater than or equal to 250,000 cd/m$^2$.
17. The clip-on sight system of embodiment 1, wherein the image comprises an indication of ammunition within a magazine.
18. The clip-on sight system of embodiment 1, wherein the image comprises a reticle image.
19. The clip-on sight system of embodiment 1, wherein the image comprises symbology associated with a firearm, the clip-on sight system, the target scene, or a user's kit.
20. The clip-on sight system of embodiment 1, wherein the image comprises a distance to a target within the target scene.
21. The clip-on sight system of embodiment 1, wherein the image comprises a battery level of a battery.
22. The clip-on sight system of embodiment 1, wherein the image comprises a thermal image of the target scene.
23. The clip-on sight system of embodiment 1, wherein the image comprises a video image of the target scene.
24. The clip-on sight system of embodiment 1, wherein the image comprises an indication of data received from a data source.
25. The clip-on sight system of embodiment 24, wherein the data source comprises a magazine or a firearm.
26. The clip-on sight system of embodiment 24, wherein the data is received from a wireless connection, a wired connection, or an optical connection to the data source.
27. The clip-on sight system of embodiment 1, wherein the 2-dimensional display comprises a micro light-emitting diode (micro-LED) display.
28. The clip-on sight system of embodiment 1, wherein the 2-dimensional display comprises a quantum dot organic light-emitting diode (QD-OLED) display.
29. The clip-on sight system of embodiment 1, wherein the graphics projection system further comprises a processor configured to generate the image based on data received by the processor.
30. The clip-on sight system of embodiment 1, wherein the direct view image and the image are directly viewable via the second optical element.
31. The clip-on sight system of embodiment 1, wherein the direct view image and the image are viewable via the primary scope positioned between the second optical element and an eye of a user.
32. The clip-on sight system of embodiment 1, wherein, when the housing is operatively connected to the firearm, the second optical element is aligned with a first optical element of the primary scope enabling a user to observe a target scene through an optical path formed by the clip-on sight system in combination with the primary scope.
33. The clip-on sight system of embodiment 1, wherein the beam splitter comprises a coating on a first surface of the beam splitter.
34. The clip-on sight system of embodiment 33, wherein the coating is configured to permit the transmission of visible light with a luminous transmittance greater than or equal to 80% using CIE Illuminant D65.
35. The clip-on sight system of embodiment 33, wherein the beam splitter further comprises an anti-reflective coating on a second surface of the beam splitter, wherein the second surface is opposite to the first surface of the beam splitter.

Additional embodiments of the present disclosure can be described in view of the following:

1. A firearm scope configured to provide at least one of a direct view image and a video image of a target scene to a user via an eyepiece, wherein the video image comprises a thermal video image or a visible video image of the target scene, the firearm scope comprising:
a housing comprising an entrance window configured to admit light and an exit aperture configured to output the direct view image of the target scene and the video image; and
a sight system at least partially housed within the housing, the sight system configured to process at least a portion of the admitted light to generate output light comprising at least one of the direct view image or the video image, the sight system comprising:
a dichroic beam splitter configured to transmit a first portion of the admitted light and to reflect a second portion of the admitted light, wherein the first portion of the admitted light is within a visible spectrum and wherein the second portion of the admitted light is within an infrared spectrum;
an objective lens configured to generate a first image using the first portion of the admitted light,
an auxiliary video system comprising at least an auxiliary video projector configured to generate a first auxiliary video image;
a beam splitter configured to redirect the first auxiliary video image from the auxiliary video system and to overlay the first auxiliary video image on the first image to form a composite image, wherein the beam splitter has a luminous transmittance greater than or equal to 70% and less than or equal to 95% with respect to CIE Illuminant D65;

an image sensor configured to generate a thermal video signal using the second portion of the admitted light;

a video projector configured to generate the thermal video image of the target scene based on the thermal video signal; and a redirection element configured to redirect the thermal video image toward the eyepiece and block the direct view image when the redirection element is in a first state and the sight system is in a thermal video view mode, wherein at least the eyepiece generates the direct view image based on the composite image, and wherein a brightness of the auxiliary video projector is greater than a brightness of the video projector.

2. The firearm scope of embodiment 1, wherein at least 70% of visible light admitted via the entrance window is output via the eyepiece.

3. The firearm scope of embodiment 1, wherein an integrated visible light transmission value of the sight system, at least for light having wavelengths between 450 nm and 700 nm, is greater than or equal to 70%.

4. The firearm scope of embodiment 1, wherein the composite image comprises a magnified view of the target scene.

5. The firearm scope of embodiment 4, further comprising a relay lens system disposed along an optical path extending from the objective lens to the eyepiece, the relay lens system configured to receive the composite image and relay the composite image to the eyepiece.

6. The firearm scope of embodiment 5, wherein at least a combination of the eyepiece and the relay lens system generates the direct view image based on the composite image.

7. The firearm scope of embodiment 5, wherein the relay lens system comprises at least one movable lens configured to adjust a magnification of the direct view image.

8. The firearm scope of embodiment 5, wherein the beam splitter is disposed along the optical path between the objective lens and the relay lens system and is configured to redirect the first auxiliary video image toward the relay lens system while allowing transmission of the first image to the relay lens system.

9. The firearm scope of embodiment 86, wherein the beam splitter is configured to transmit at least 80% of light incident on the beam splitter.

10. The firearm scope of any one of embodiments 1-9, wherein the redirection element comprises a pivotable mirror configured to pivot between a first position associated with the first state and a second position associated with a second state.

11. The firearm scope of any one of embodiments 1-10, wherein a resolution of the auxiliary video projector is less than a resolution of the video projector.

12. The firearm scope of any one of embodiments 1-11, wherein the second portion of the admitted light comprises thermal radiation or light within a long wavelength infrared (LWIR) spectrum.

13. The firearm scope of any one of embodiments 1-12, further comprising a second entrance window configured to admit light, and a video imaging system configured to generate a video signal associated with an image of the target scene formed on a second image sensor using the light admitted through the second entrance window.

14. The firearm scope of any one of embodiment 13, wherein the second image sensor comprises a Complementary metal-oxide semiconductor (CMOS) focal-plane array capable of processing light at least within a visible range.

15. The firearm scope of any one of embodiment 13, wherein the second image sensor comprises a CMOS focal-plane array capable of processing light at least within a short-wavelength infrared (SWIR) spectrum.

16. The firearm scope of embodiment 13, wherein the video projector is further configured to generate the visible video image of the target scene based on the video signal when the sight system is in a video view mode, and wherein the visible video image is viewable via the eyepiece when the redirection element is in the first state.

17. The firearm scope of embodiment 16, further comprising a user interface configured to receive input indicative of a selection between the visible video view mode and the thermal video view mode.

18. The firearm scope of embodiment 16, further comprising a processor configured to generate a second auxiliary image and to superimpose the second auxiliary image with the visible video image to obtain a composite visible video image, wherein the composite visible video image is viewable via the eyepiece.

19. The firearm scope of embodiment 18 wherein the processor is further configured to superimpose the second auxiliary image with the thermal video image to obtain a composite thermal video image, wherein the composite thermal video image is viewable via the eyepiece.

20. The firearm scope of embodiment 18, further comprising a user interface configured to receive input indicative of an adjustment to a content of the first auxiliary video image or the second auxiliary video image.

21. The firearm scope of embodiment 18, further comprising a user interface enabling independent adjustment of a magnification of the second auxiliary image and, the magnification of the visible video image or the thermal video image.

22. The firearm scope of embodiment 18, wherein first auxiliary video image and the second auxiliary video image comprise a bore sighted reticle image.

23. The firearm scope of embodiment 18, wherein first auxiliary video image and the second auxiliary video image comprise auxiliary information comprising at least one of:
a distance between a target point and the entrance window of the firearm scope;
information associated with the firearm; or
an indication of ammunition within a magazine.

24. The firearm scope of embodiment 23, further comprising a laser rangefinder system configured to determine the distance between the target point and the entrance window or the firearm scope.

25. The firearm scope of any one of embodiments 1-24, wherein the image sensor comprises a thermal focal-plane array capable of processing light within at least a long-wavelength infrared (LWIR) spectrum.

26. The firearm scope of any one of embodiments 1-23, wherein the beam splitter is configured to permit transmission of visible light with a luminous transmittance greater than or equal to 80% using CIE Illuminant D65, and permit reflection of visible light with a luminous reflectance less than or equal to 20% using CIE Illuminant D65.

27. The firearm scope of any one of embodiments 1-26, wherein the video projector comprises a full color 2-dimensional display with a luminance less than or equal to 20,000 cd/m$^2$.

28. The firearm scope of embodiment 27, wherein the full color 2-dimensional display has a luminance less than or equal to 10,000 cd/m$^2$.

29. The firearm scope of any one of embodiments 1-28, wherein the auxiliary video projector comprises a monochrome 2-dimensional display with a luminance greater than or equal to 50,000 cd/m$^2$.

30. The firearm scope of embodiment 29, wherein the monochrome 2-dimensional display has a power consumption of less than or equal to 100 mW at an APL of 6%.

31. The firearm scope of embodiment 29, wherein the monochrome 2-dimensional display has a luminance greater than or equal to 100,000 cd/m$^2$.

32. A firearm scope configured to provide at least one of a direct view image and a video image of a target scene to a user via an eyepiece, wherein the video image comprises a thermal video image or a visible video image of the target scene, the firearm scope comprising:
   a housing comprising a first entrance window and a second entrance window configured to admit light and an exit aperture configured to output the direct view image of the target scene and the video image of the target scene; and
   a sight system at least partially housed within the housing, the sight system configured to process at least a portion of the admitted light to generate output light comprising at least one of the direct view image or the video image, the sight system comprising:
      a dichroic beam splitter configured to transmit a first portion of the admitted light and to reflect a second portion of the admitted light, wherein the first portion of the admitted light is within a visible spectrum, and wherein the second portion of the admitted light is within an infrared spectrum;
      an objective lens and a relay lens system disposed along a longitudinal optical path extending from the first entrance window to the eyepiece, wherein a combination of the objective lens, the relay lens system, and the eyepiece generates an output image of the target scene based at least in part on the first portion of the admitted light, and wherein the output image is viewable via the eyepiece;
      an auxiliary video system comprising at least an auxiliary video projector configured to generate a first auxiliary video image;
      a beam splitter along the longitudinal optical path between the objective lens and the relay lens system, the beam splitter configured to redirect the first auxiliary video image from the auxiliary video system along the longitudinal optical path so that it is viewable via the eyepiece, wherein the beam splitter has a luminous transmittance greater than or equal to 70% and less than or equal to 95% with respect to CIE Illuminant D65;
      a first image sensor configured to generate a thermal video signal using the second portion of the admitted light;
      a second image sensor configured to generate a visible video signal using light received from the second entrance window;
      a video projector configured to generate the video image of the target scene based on the thermal video signal or the visible video signal; and
      a redirection element configured to redirect the video image received from the video projector toward the eyepiece and block the direct view image, when the redirection element is in a first state,
      wherein the direct view image comprises the output image and the first auxiliary image, and
      wherein a brightness of the auxiliary video projector is greater than a brightness of the video projector.

Terminology

The embodiments described herein are exemplary. Modifications, rearrangements, substitute processes, etc. may be made to these embodiments and still be encompassed within the teachings set forth herein. One or more of the steps, processes, or methods described herein may be carried out by one or more processing and/or digital devices, suitably programmed.

Depending on the embodiment, certain acts, events, or functions of any of the algorithms described herein can be performed in a different sequence, can be added, merged, or left out altogether (e.g., not all described acts or events are necessary for the practice of the algorithm). Moreover, in certain embodiments, acts or events can be performed concurrently, e.g., through multi-threaded processing, interrupt processing, or multiple processors or processor cores or on other parallel architectures, rather than sequentially.

The various illustrative logical blocks, modules, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a processor configured with specific instructions, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The elements of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of computer-readable storage medium known in the art. An exemplary storage medium can be coupled to the processor such that the processor can read information from, and write information to, the storage medium. In the alternative, the storage medium can be integral to the processor. The processor and the storage medium can reside in an ASIC. A software module can comprise computer-executable instructions which cause a hardware processor to execute the computer-executable instructions.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," "involving," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all the elements in the list.

Disjunctive language such as the phrase "at least one of X, Y or Z," unless specifically stated otherwise, is otherwise understood with the context as used in general to present that an item, term, etc., may be either X, Y or Z, or any combination thereof (e.g., X, Y and/or Z). Thus, such disjunctive language is not generally intended to, and should not, imply that certain embodiments require at least one of X, at least one of Y or at least one of Z to each be present.

The terms "about" or "approximate" and the like are synonymous and are used to indicate that the value modified by the term has an understood range associated with it, where the range can be ±20%, ±15%, ±10%, ±5%, or ±1%. The term "substantially" is used to indicate that a result (e.g., measurement value) is close to a targeted value, where close can mean, for example, the result is within 80% of the value, within 90% of the value, within 95% of the value, or within 99% of the value.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to illustrative embodiments, it will be understood that various omissions, substitutions, and changes in the form and details of the devices or algorithms illustrated can be made without departing from the spirit of the disclosure. As will be recognized, certain embodiments described herein can be embodied within a form that does not provide all the features and benefits set forth herein, as some features can be used or practiced separately from others. All changes which come within the meaning and range of equivalency of the claims are to be embraced within their scope.

What is claimed is:

1. A clip-on sight system configurable to operate in combination with a primary scope of a firearm configured to fire ammunition received from a magazine inserted into the firearm, the clip-on sight system comprising:
   a housing configured to operatively connect to the firearm, the housing comprising a first optical element configured to admit light and a second optical element that enables transmitting a direct view image of a target scene to the primary scope; and
   a sight system at least partially housed within the housing, the sight system configured to process the admitted light, to superimpose an image on at least a portion of the direct view image, and to transmit the direct view image and the image to the second optical element, the sight system comprising:
      a beam splitter configured to:
         permit transmission of visible light with a luminous transmittance greater than or equal to 70% using CIE Illuminant D65; and
         permit reflection of visible light with a luminous reflectance less than or equal to 30% using CIE Illuminant D65; and
      a graphics projection system configured to generate a computer-generated image, the graphics projection system comprising a 2-dimensional display with a luminance greater than or equal to 50,000 cd/m$^2$ and a power consumption of less than or equal to 100 mW at an average picture level (APL) of 6%.

2. The clip-on sight system of claim 1, wherein a sum of the luminous transmittance and the luminous reflectance is less than or equal to 100%.

3. The clip-on sight system of claim 1, wherein the graphics projection system has a refresh rate of 10 Hz or less.

4. The clip-on sight system of claim 1, wherein the 2-dimensional display comprises a set of individually-addressable pixels and wherein the graphics projection system is configured to turn on a subset of the set of individually-addressable pixels when displaying the image.

5. The clip-on sight system of claim 1, wherein the beam splitter is configured to permit the reflection of visible light without filtering frequencies within a visible light spectrum.

6. The clip-on sight system of claim 1, wherein the 2-dimensional display comprises a red light display, a green light display, a blue light display, or a full color display.

7. The clip-on sight system of claim 1, wherein the 2-dimensional display has a power consumption of less than or equal to 50 mW at the APL of 6%.

8. The clip-on sight system of claim 7, wherein the 2-dimensional display has a power consumption of less than or equal to 25 mW at the APL of 6%.

9. The clip-on sight system of claim 8, wherein the 2-dimensional display has a power consumption of less than or equal to 15 mW at the APL of 6%.

10. The clip-on sight system of claim 1, wherein the 2-dimensional display comprises a pixel density of more than or equal to 3000 pixels per inch (PPI).

11. The clip-on sight system of claim 10, wherein the 2-dimensional display comprises a pixel density of more than or equal to 5000 PPI.

12. The clip-on sight system of claim 1, wherein the 2-dimensional display has a luminance greater than or equal to 100,000 cd/m².

13. The clip-on sight system of claim 12, wherein the 2-dimensional display has a luminance greater than or equal to 250,000 cd/m².

14. The clip-on sight system of claim 1, wherein the image comprises one or more of the following: an indication of ammunition within a magazine; a reticle image; symbology associated with a firearm; symbology associated with the clip-on sight system; symbology associated with the target scene; or symbology associated with a user's kit; an indication of a distance to a target within the target scene; or an indication of a battery level of a battery.

15. The clip-on sight system of claim 1, wherein the image comprises a thermal image of the target scene or a video image of the target scene.

16. The clip-on sight system of claim 1, wherein the image comprises an indication of data received from a data source.

17. The clip-on sight system of claim 16, wherein the data source comprises a magazine or a firearm.

18. The clip-on sight system of claim 16, wherein the data is received from a wireless connection, a wired connection, or an optical connection to the data source.

19. The clip-on sight system of claim 1, wherein the 2-dimensional display comprises a micro light-emitting diode (micro-LED) display or a quantum dot organic light-emitting diode (QD-OLED) display.

20. The clip-on sight system of claim 1, wherein the graphics projection system further comprises a processor configured to generate the image based on data received by the processor.

21. The clip-on sight system of claim 1, wherein the direct view image and the image are directly viewable via the second optical element.

22. The clip-on sight system of claim 1, wherein the direct view image and the image are viewable via the primary scope positioned between the second optical element and an eye of a user.

23. The clip-on sight system of claim 1, wherein, when the housing is operatively connected to the firearm, the second optical element is aligned with a first optical element of the primary scope enabling a user to observe a target scene through an optical path formed by the clip-on sight system in combination with the primary scope.

24. The clip-on sight system of claim 1, wherein the beam splitter comprises a coating on a first surface of the beam splitter.

25. The clip-on sight system of claim 24, wherein the coating is configured to permit the transmission of visible light with a luminous transmittance greater than or equal to 80% using CIE Illuminant D65.

26. The clip-on sight system of claim 24, wherein the beam splitter further comprises an anti-reflective coating on a second surface of the beam splitter, wherein the second surface is opposite to the first surface of the beam splitter.

* * * * *